US011939512B2

(12) United States Patent
Junge et al.

(10) Patent No.: US 11,939,512 B2
(45) Date of Patent: Mar. 26, 2024

(54) DICHROIC DYE COMPOSITION

(71) Applicant: Merck Patent GmbH, Darmstadt (DE)

(72) Inventors: Michael Junge, Pfungstadt (DE); Ewa Ptak, Weiterstadt (DE); Christoph Wetzel, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/295,913

(22) PCT Filed: Nov. 21, 2019

(86) PCT No.: PCT/EP2019/082006

§ 371 (c)(1),
(2) Date: May 21, 2021

(87) PCT Pub. No.: WO2020/104563

PCT Pub. Date: May 28, 2020

(65) Prior Publication Data

US 2023/0053362 A1 Feb. 23, 2023

(30) Foreign Application Priority Data

Nov. 23, 2018 (EP) .................................... 18208072
Sep. 12, 2019 (EP) .................................... 19196906

(51) Int. Cl.

| | |
|---|---|
| *G02F 1/1333* | (2006.01) |
| *C09K 19/30* | (2006.01) |
| *C09K 19/34* | (2006.01) |
| *C09K 19/60* | (2006.01) |
| *C09K 19/04* | (2006.01) |

(52) U.S. Cl.

CPC ............ *C09K 19/608* (2013.01); *C09K 19/30* (2013.01); *C09K 19/3003* (2013.01); *C09K 19/3068* (2013.01); *C09K 19/3402* (2013.01); *C09K 2019/0466* (2013.01); *C09K 2019/3004* (2013.01); *C09K 2019/3009* (2013.01); *C09K 2019/301* (2013.01); *C09K 2019/3016* (2013.01); *C09K 2019/3019* (2013.01); *C09K 2019/3021* (2013.01); *C09K 2019/3025* (2013.01); *C09K 2019/3071* (2013.01); *C09K 2019/3078* (2013.01); *C09K 2019/3422* (2013.01)

(58) Field of Classification Search

CPC .. C09K 19/608; C09K 19/30; C09K 19/3003; C09K 19/3068; C09K 19/3402; C09K 2019/0466; C09K 2019/3004; C09K 2019/3009; C09K 2019/301; C09K 2019/3016; C09K 2019/3019; C09K 2019/3021; C09K 2019/3025; C09K 2019/3071; C09K 2019/3078; C09K 2019/3422

See application file for complete search history.

(56) References Cited

U.S. PATENT DOCUMENTS

| | | | | |
|---|---|---|---|---|
| 5,762,824 | A | 6/1998 | Kawashukuda et al. | |
| 6,033,598 | A | 3/2000 | Kaneko et al. | |
| 8,927,856 | B2 | 1/2015 | Debije et al. | |
| 9,249,356 | B2 | 2/2016 | Van Oosten et al. | |
| 9,701,905 | B2 | 7/2017 | Junge et al. | |
| 10,344,217 | B2 * | 7/2019 | Kirsch | H01L 51/0068 |
| 10,598,998 | B2 * | 3/2020 | Junge | G02F 1/133528 |
| 10,655,067 | B2 * | 5/2020 | Junge | C09K 19/601 |
| 10,723,950 | B2 * | 7/2020 | Junge | C09K 19/3491 |
| 2010/0259698 | A1 | 10/2010 | Powers et al. | |
| 2015/0299577 | A1 | 10/2015 | Junge et al. | |
| 2016/0108317 | A1 | 4/2016 | Kirsch et al. | |
| 2018/0142153 | A1 | 5/2018 | Kirsch et al. | |
| 2019/0153320 | A1 | 5/2019 | Kirsch et al. | |
| 2023/0053362 | A1 * | 2/2023 | Junge | C09K 19/3497 |

FOREIGN PATENT DOCUMENTS

| | | | |
|---|---|---|---|
| WO | 09141295 | A1 | 11/2009 |
| WO | 10118422 | A2 | 10/2010 |
| WO | 13004677 | A1 | 1/2013 |
| WO | 14090373 | A1 | 6/2014 |
| WO | 14187529 | A1 | 11/2014 |
| WO | 16177449 | A1 | 11/2016 |
| WO | 2018015320 | | 1/2018 |

OTHER PUBLICATIONS

G. H. Heilmeier et al., „Guest-Host Interaction In Nematic Liquid Crystals. A New Electro-Optic Effect, Applied Physics Letters, 13 (1968), pp. 91-92.

International Search Report PCT/EP2019/082006 dated Feb. 6, 2020 (pp. 1-3).

* cited by examiner

*Primary Examiner* — Geraldina Visconti
(74) *Attorney, Agent, or Firm* — Millen, White, Zelano & Branigan, P.C.; Brion P. Heaney

(57) ABSTRACT

The present invention relates to compositions comprising a combination of benzothiadiazole and thiadiazoloquinoxaline derivatives, to liquid-crystalline media containing the compositions, and to the use of the compositions and the media in optical, electronic and electro-optical devices, in particular in devices for regulating the passage of energy from an outside space into an inside space, for example in switchable windows.

21 Claims, No Drawings

DICHROIC DYE COMPOSITION

The present invention relates to compositions comprising a combination of benzothiadiazole and thiadiazoloquinoxaline derivatives, to liquid-crystalline media containing the compositions, and to the use of the compositions and the media in optical, electronic and electro-optical devices, in particular in devices for regulating the passage of energy from an outside space into an inside space, for example in switchable windows.

Liquid crystals are used in particular as dielectrics in display devices, wherein the optical properties of such materials can be influenced by an applied voltage. Electro-optical devices based on liquid crystals are well known in the art and can be based on various effects. Devices of this type are, for example, cells having dynamic scattering, DAP (deformation of aligned phases) cells, TN cells having a twisted nematic structure, STN ("supertwisted nematic") cells, SBE ("superbirefringence effect") cells, OMI ("optical mode interference") cells and guest-host cells.

Devices based on the guest-host effect were first described by Heilmeier and Zanoni (G. H. Heilmeier et al., Appl. Phys. Lett., 1968, 13, 91f.) and have since then found widespread use, principally in liquid crystal (LC) display elements. In a guest-host system, the LC medium comprises one or more dichroic dyes in addition to the liquid crystal. Owing to the directional dependence of the absorption by the dye molecules, the transmissivity of the dye-doped liquid crystal to light can be modulated when the dyes change their alignment together with the liquid crystal.

Besides the use in LC displays, devices of this type are also used as switching elements for regulating the passage of light or energy, as described for example in WO 2009/141295 and WO 2010/118422.

For the devices for regulating the passage of energy from an outside space into an inside space, a number of different technical solutions have been proposed.

In one of the possible modes for the devices, a liquid-crystalline medium in combination with one or more dichroic dyes as generally described above can be used in the switching layer(s). By application of a voltage, a change in the orientational alignment of the dichroic dye molecules can be achieved in these switching layers. Owing to the direction-dependent absorption, a change in the transmissivity of the switching layer can thus be obtained. A corresponding device is described, for example, in WO 2009/141295.

Alternatively, such a change in the transmission behaviour can also be achieved without electrical voltage by a temperature-induced transition from an isotropic state of the liquid-crystalline medium to a liquid-crystalline state, as described, for example, in US 2010/0259698.

WO 2009/141295 and WO 2010/118422 describe liquid-crystalline media for display elements of the guest-host type which comprise cyanobiphenyl derivatives and one or more dichroic dyes. For the same application, U.S. Pat. Nos. 6,033,598 and 5,762,824 describe LC media which, besides one or more dichroic dyes, comprise one or more compounds each consisting of three ring elements which are substituted by one or more fluorine atoms.

Rylene dyes have been described for use in the above-mentioned devices, for example in WO 2009/141295, WO 2013/004677 and WO2014/090373.

WO 2014/187529 describes the use of liquid-crystalline media comprising benzothiadiazole derivatives for use in devices for regulating the passage of energy from an outside space into an inside space.

WO 2016/177449 describes the use of liquid-crystalline media comprising thiadiazoloquinoxaline derivatives for use in devices for regulating the passage of energy from an outside space into an inside space.

There is still a need in the art for dichroic dye compounds and compositions and media comprising these compounds which give benefits in terms of device performance and reliability.

An object of the present invention is therefore to provide improved compositions comprising dichroic compounds, wherein these compositions are particularly useful for guest-host type applications. It is a particular object to provide compositions which can give benefits in terms of performance, appearance, stability and reliability, also when used under more demanding working conditions such as at elevated temperatures or under direct and prolonged sunlight irradiation. It is furthermore an object to provide improved liquid-crystalline media which comprise these compositions and which exhibit broad and stable LC phase ranges and in particular favourable low-temperature stability and which furthermore can give a suitable high degree of order. It is a further object to provide a stable and reliable switching medium for electro-optical applications which allows a particularly beneficial performance in devices for regulating the passage of energy from an outside space into an inside space, in particular in smart switchable windows, e.g. in terms of the stability with respect to direct and prolonged irradiation of sunlight or the aesthetic impression. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above object and eventually provide additional advantages.

A first aspect of the present invention provides a composition comprising at least one compound of formula I

I

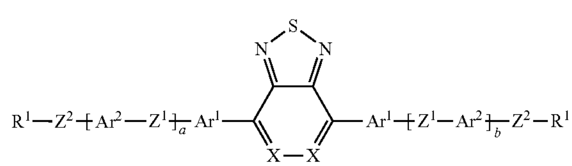

and at least one compound of formula II

II

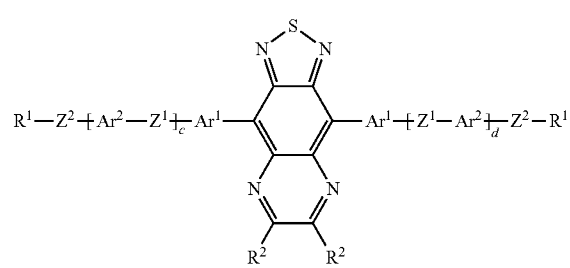

wherein $R^1$ on each occurrence, identically or differently, denotes H, F, CN, $N(R^z)_2$, $Si(R^z)_3$, or a straight-chain or branched alkyl or alkoxy having 1 to 20 C atoms, in which, in addition, one or more non-adjacent $CH_2$ groups may each be replaced, independently of one another by —C($R^z$)=C($R^z$)—, —C≡C—,

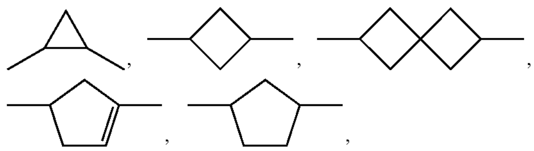

—N($R^z$)—, —O—, —S—, —CO—, —CO—O—, —O—CO— or —O—CO—O— in such a way that C and/or S atoms are not linked directly to one another, and in which, in addition, one or more H atoms may be replaced by F or CN, X on each occurrence, identically or differently, denotes $CR^a$ or N, $R^a$ on each occurrence, identically or differently, denotes straight-chain or branched alkyl having 1 to 12 C atoms, F, Cl, $N(R^z)_2$ or CN, $R^2$ and $R^z$ on each occurrence, identically or differently, denote H, halogen, straight-chain, branched or cyclic alkyl having 1 to 12 C atoms, in which, in addition, one or more non-adjacent $CH_2$ groups may be replaced by —O—, —S—, —CO—, —CO—O—, —O—CO— or —O—CO—O— in such a way that C and/or S atoms are not linked directly to one another, and in which, in addition, one or more H atoms may be replaced by F or Cl, $Ar^1$ and $Ar^2$ on each occurrence, identically or differently, denote an aryl or heteroaryl group, which may be substituted by one or more radicals L, L on each occurrence, identically or differently, denotes F, Cl, CN, OH, SCN, $SF_5$, $N(R^z)_2$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $Z^1$ on each occurrence, identically or differently, denotes a single bond, —O—, —S—, —C(O)—, —$CR^{y1}R^{y2}$—, —$CF_2O$—, —$OCF_2$—, —C(O)—O—, —O—C(O)—, —$OCH_2$—, —$CH_2O$—, —$CR^{x1}$=$CR^{x2}$—, —C≡C—, —$CR^{x1}$=$CR^{x2}$—CO—, —CO—$CR^{x1}$=$CR^{x2}$—, —$CR^{x1}$=$CR^{x2}$—COO—, —OCO—$CR^{x1}$=$CR^{x2}$— or —N=N—, $Z^2$ on each occurrence, identically or differently, denotes a single bond, —$CF_2O$—, —$OCF_2$— or —C≡C—, a, b, c and d independently of one another, denote 0 or 1, $R^{x1}$, $R^{x2}$ independently of one another, denote H, F, Cl, CN or alkyl having 1 to 12 C atoms, $R^{y1}$ denotes H or alkyl having 1 to 12 C atoms, and $R^{y2}$ denotes alkyl having 1 to 12 C atoms.

It has surprisingly been found that the compositions according to the invention which comprise at least one compound of formula I as described above and below in combination with at least one compound of formula II as described above and below exhibit excellent combined properties and characteristics, e.g. in terms of enhanced light and temperature stability and improved solubility in liquid-crystalline media.

While compounds of formula I on their own as well as compounds of formula II on their own can already exhibit favourable properties, e.g. a high dichroic ratio, a favourable colour purity and large extinction coefficients, in particular in the VIS and/or NIR region of light, the use of both classes of compounds together can provide further unexpected benefits.

The composition according to the invention containing the combination of compounds of formulae I and II can give improved lightfastness and enhanced solubility in liquid-crystalline media. In this respect the composition can exhibit excellent stability even under extended light irradiation at elevated temperatures, e.g. temperatures up to 70° C. and above.

The improved solubility of the compounds and the overall composition favourably contributes to improving the capabilities for the provision of tailor-made dye-doped liquid crystal media, especially in terms of giving specific colours or even covering the whole VIS range to achieve a black or colour-neutral appearance. Surprisingly also the NIR spectral range can be covered at least partially.

The compositions which comprise the combination of compounds together can give minimal or even no discernible residual fluorescence, in particular in the visible spectrum, such that unwanted or undesirable colour artefacts such as a red glow may be avoided or at least substantially reduced.

These favourable combined properties and characteristics of the composition can in turn be beneficial in terms of device stability, reliability, performance and appearance, even under more demanding environmental or working conditions, e.g. with respect to temperature or light exposure, for example in devices for optical, electro-optical and electronic applications.

The composition according to the invention is particularly useful for guest-host type applications, such as in dimmable smart windows, wherein the dye-doped liquid-crystalline media can exhibit suitably broad and stable LC phase ranges and in particular favourable low-temperature stability.

It is preferred that the composition comprises two or more compounds of the formula I and two or more compounds of the formula II.

Another aspect of the invention thus relates to a liquid-crystalline medium which comprises the composition according to the invention and in addition one or more mesogenic compounds.

The liquid-crystalline media according to the invention can give benefits in terms of device performance and reliability, in particular in smart switchable windows, e.g. in terms of the stability with respect to direct and prolonged irradiation of sunlight or the aesthetic impression.

A further aspect of the invention thus relates to the use of the liquid-crystalline medium according to the invention in an architectural window or a car sunroof.

The device according to the invention may also be applied to a commercial vehicle, a boat, a train or an airplane.

In a further aspect according to the invention there is provided a device for regulating the passage of energy from an outside space into an inside space, wherein the device contains a switching layer comprising the liquid-crystalline medium according to the invention. In particular, the device can be comprised in a window, especially a window of a building or a facade.

Therefore, another aspect of the invention relates to a window which comprises the device for regulating the passage of energy from an outside space into an inside space as described herein.

In a further aspect of the invention the compositions according to the invention are used in an electro-optical display, a device for regulating the passage of energy from an outside space into an inside space, an electrical semiconductor, an organic field-effect transistor, a printed circuit, a radio frequency identification element, a diode, an organic light-emitting diode, a lighting element, a photovoltaic device, in particular as a sensitizer or semiconductor therein, an optical sensor, an effect pigment, a decorative element or as a dye for colouring polymers, e.g. in the automotive field.

Without limiting the present invention thereby, in the following the invention is illustrated by the detailed description of the aspects, embodiments and particular features, and particular embodiments are described in more detail.

In the present invention a device for regulating the passage of energy from an outside space into an inside space is preferably taken to mean a device which regulates the passage of energy, in particular light and especially sunlight, through an area which is arranged within a structure of relatively lower energy transmissivity. The structure of lower energy transmissivity can e.g. be a wall or the body of a car. The energy can thus for example pass through an open area or in particular a glass area in the wall. The device is thus preferably arranged to be a constituent of a window, for example an insulated glazing unit.

The regulated passage of energy takes place from an outside space, preferably the environment exposed to direct or indirect sunlight radiation, into an inside space, for example a building or a vehicle, or another unit which is substantially sealed off from the environment.

For the purposes of the present invention, the term energy is taken to mean in particular energy by electromagnetic radiation in the UV-A, VIS and NIR region. In particular, it is taken to mean energy by radiation which is not absorbed or is only absorbed to a negligible extent by the materials usually used in windows, for example glass. Herein, the UV-A region is taken to mean the wavelength range from 320 to 380 nm, the VIS region is taken to mean the wavelength range from 380 nm to 780 nm and the NIR region is taken to mean the wavelength range from 780 nm to 2000 nm. Correspondingly, the term light is generally taken to mean electromagnetic radiation having wavelengths between 320 and 2000 nm, and in particular from 380 nm to 780 nm.

Herein, a dichroic dye is taken to mean a light-absorbing compound in which the absorption properties are dependent on the orientation of the compound relative to the direction of polarisation of the light. A dichroic dye compound in accordance with the present invention typically has an elongated shape, i.e. the compound is significantly longer in one spatial direction, i.e. along the longitudinal axis, than in the other two spatial directions.

The term "organic group" denotes a carbon or hydrocarbon group.

The term "carbon group" denotes a mono- or polyvalent organic group containing at least one carbon atom, where this group either contains no further atoms, such as, for example, —C≡C—, or optionally contains one or more further atoms, such as, for example, N, O, S, P, Si, Se, As, Te or Ge, for example carbonyl, etc. The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I, preferably F or Cl.

A carbon or hydrocarbon group can be a saturated group or an unsaturated group. Unsaturated groups are, for example, aryl, alkenyl or alkynyl groups. A carbon or hydrocarbon radical having 3 or more atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyl-oxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one more non-adjacent $CH_2$ groups may each be replaced, independently of one another, by —C($R^b$)═C($R^b$)—, —C≡C—, —N($R^b$)—, —O—, —S—, —CO—, —CO—O—, —O—CO—, —O—CO—O— in such a way that O and/or S atoms are not linked directly to one another.

$R^b$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO— or —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, trifluoromethyl, perfluoro-n-butyl, 2,2,2-trifluoroethyl, perfluorooctyl and perfluorohexyl.

Preferred alkenyl groups are, for example, ethenyl, propenyl, butenyl, pentenyl, cyclopentenyl, hexenyl, cyclohexenyl, heptenyl, cycloheptenyl, octenyl and cyclooctenyl.

Preferred alkynyl groups are, for example, ethynyl, propynyl, butynyl, pentynyl, hexynyl and octynyl.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy and n-dodecoxy.

Preferred amino groups are, for example, dimethylamino, methylamino, methylphenylamino and phenylamino.

Aryl and heteroaryl groups can be monocyclic or polycyclic, i.e. they can contain one ring, such as, for example, phenyl, or two or more rings, which may also be fused, such as, for example, naphthyl, or covalently bonded, such as, for example, biphenyl, or contain a combination of fused and linked rings. Heteroaryl groups contain one or more heteroatoms, preferably selected from O, N, S and Se. A ring system of this type may also contain individual non-conjugated units, as is the case, for example, in the fluorene basic structure.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are derived, for example, from the parent structures benzene, biphenyl, terphenyl, [1,1':3',1"] terphenyl, naphthalene, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalin-imidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b] thiophene, dithienothiophene, dihydro-thieno [3,4-b]-1,4-dioxin, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring, such as, for example, cyclohexane, or polycyclic, i.e. contain a plurality of rings, such as, for example, decahydronaphthalene or bicyclooctane. Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature ($T_g$) in the polymer, in particular bulky groups, such as, for example, t-butyl or optionally substituted aryl groups.

Preferred substituents are F, Cl, Br, I, —CN, —$NO_2$, —NCO, —NCS, —OCN, —SCN, —C(═O)N($R^a$)$_2$, —C(═O)$Y^1$, —C(═O)$R^a$, —N($R^a$)$_2$, in which $R^a$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or C.

More preferred substituents are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

Herein, the substituent denoted L on each occurrence, identically or differently, is F, Cl, CN, SCN, $SF_5$, N($R^z$)$_2$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms.

It is preferred that L on each occurrence, identically or differently, denotes F or straight-chain or branched, in each case optionally fluorinated, alkyl or alkoxy having 1 to 7 C atoms, "Substituted silyl or aryl" preferably means substituted by halogen, —CN, $R^{y1}$, —O$R^{y1}$, —CO—$R^{y1}$, —CO—O—$R^{y1}$, —O—CO—$R^{y1}$ or —O—CO—O—$R^{y1}$, in which $R^{y1}$ has the meaning indicated above.

In a preferred embodiment $Ar^1$ and $Ar^2$ on each occurrence, identically or differently, represent an aryl group having 6 to 15 C atoms or a heteroaryl group having 2 to 15 C atoms, which may be substituted by one or more radicals L as defined above and below, wherein L preferably is F.

$Ar^1$ and $Ar^2$ are particularly preferably selected on each occurrence, identically or differently, from groups, optionally substituted by radicals L and in particular F, derived from the parent substances benzene, fluorene, naphthalene, pyridine, pyrimidine, pyridazine, thiophene, selenophene, thiazole, thiadiazole, benzothiadiazole, dihydrothienodioxin, benzo-thiophene, dibenzothiophene, benzodithiophene, cyclopentadithiophene, thienothiophene, indenothiophene, furan, benzofuran, dibenzofuran and quinoline, and even more preferably from benzene, naphthalene, thiadiazole, thienothiophene and thiophene.

In a particularly preferred embodiment $Ar^1$ and $Ar^2$ denote, independently of one another, 1,4-phenylene, 1,4-naphthylene, 2,6-naphthylene, thiazole-2,5-diyl, thiophene-2,5-diyl or thienothiophene-2,5-diyl, wherein one or more H atoms may be replaced by the group L as defined above and below.

Even more preferably $Ar^1$ and $Ar^2$ denote on each occurrence, identically or differently, 1,4-phenylene, thiophene-2,5-diyl or thienothiophene-2,5-diyl, wherein one or more H atoms may be replaced by the group L as defined above and below, wherein L preferably denotes F.

It is particularly preferred that in the compounds of formulae I and II at least one of $Ar^1$ is thiophene-2,5-diyl or thienothiophene-2,5-diyl, more preferably thiophene-2,5-diyl.

In another embodiment it is preferred that in the compound(s) of formula I a and b are 0 and that at least one of $Ar^1$ is thienothiophene-2,5-diyl.

In a further embodiment it is preferred that in the compound(s) of formula II c and d are 0 and that at least one of $Ar^1$ is thienothiophene-2,5-diyl.

In a preferred embodiment $Z^1$ on each occurrence, identically or differently, denotes a single bond, —CH═CH—, —CF═CF— or —C≡C—. It is particularly preferred that $Z^1$ denotes a single bond.

It is preferred that $Z^2$ denotes a single bond.

Preferably, $R^1$ on each occurrence, identically or differently, denotes $N(R^z)_2$ or a straight-chain or branched alkyl or alkoxy having 1 to 20 C atoms, in which one or more H atoms may be replaced by F, and where $R^z$ has the meaning given above and below.

It is particularly preferred that $R^1$ identically or differently, denotes a straight-chain or branched, preferably branched, alkyl or alkoxy having 1 to 15 C atoms or $N(R^a)_2$, where $R^a$ is, independently of one another, a straight-chain alkyl having 1 to 9 C atoms, preferably ethyl, butyl, and hexyl.

In an embodiment $R^1$ on each occurrence, identically or differently, denotes a branched alkyl group having 3 to 20 C atoms, preferably 3 to 12 C atoms, in which one or more H atoms can be replaced by F, one or more $CH_2$ groups can be replaced by O and/or one or more CH groups can be replaced by N.

In a preferred embodiment $R^1$ denotes an alkyl group, preferably with a methyl, ethyl, n-propyl, n-butyl, or n-pentyl group bonded to an ethyl, n-propyl, n-hexyl, n-heptyl, n-octyl, n-nonyl, n-decyl or n-undecyl group, for example 2-ethylhexyl, 2-ethylheptyl, 2-ethyloctyl, 2-ethylnonyl, 2-ethyldecyl, 3-ethylhexyl, 3-ethylheptyl, 3-ethyloctyl, 3-ethylnonyl, 3-ethyldecyl, and the like.

In a particularly preferred embodiment $R^1$ on each occurrence, identically or differently, denotes ethyl, n-propyl, n-butyl, n-pentyl, n-hexyl, n-heptyl, ethoxy, n-propoxy, n-butoxy, n-pentyloxy, n-hexyloxy, n-heptyloxy, or a branched alkyl or alkoxy group having 3 to 12 C atoms.

In another preferred embodiment the group $R^1$ denotes a straight chain or branched alkyl or dialkylamino group having 1 to 12 C atoms per alkyl group.

Preferably, $R^2$ on each occurrence, identically or differently, denotes straight-chain or branched alkyl or alkoxy having 1 to 9 C atoms, preferably ethyl, n-propyl, n-butyl, n-pentyl, n-hexyl, n-heptyl, and in particular ethyl.

Preferably, $R^z$ denotes methyl, ethyl, n-propyl, n-butyl, n-pentyl, n-hexyl, n-heptyl, n-octyl or n-nonyl, more preferably ethyl, n-butyl or n-hexyl.

The groups $R^{x1}$ and $R^{x2}$ are preferably on each occurrence, identically or differently, H, F or an alkyl group having 1 to 6 C atoms, more preferably H or F, and in particular H.

In a preferred embodiment a, b, c and d all denote 1. However, in alternative embodiments it is also possible that at least one of a and b denotes 0 and/or that at least one of c and d denotes 0. It is thus also possible that a and b are both 0 and/or that c and d are both 0. In the case where one of a and b is 1 and the other one is 0, and likewise for c and d, asymmetrical compounds are obtained.

In a preferred embodiment, at least one of X denotes $CR^a$, preferably both groups X denote $CR^a$, where preferably $R^a$ is alkyl having 1 to 4 C atoms or H and in particular H. It is particularly preferred that both X denote $CR^a$ where $R^a$ is H. However, in alternative embodiments one or both groups X are N.

The compounds of formula I are preferably selected from the compounds of formulae I-a, I-b and I-c, and the compounds of formula II are preferably selected from the compounds of formulae II-a, II-b and II-c, I-a

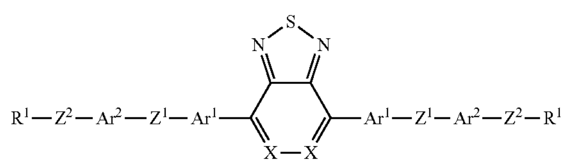

I-b

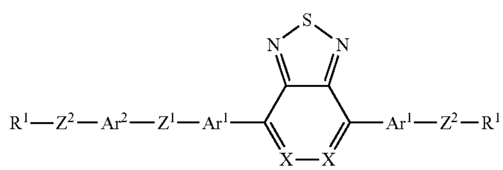

I-c

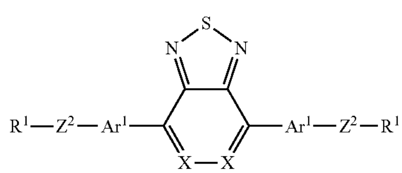

II-a

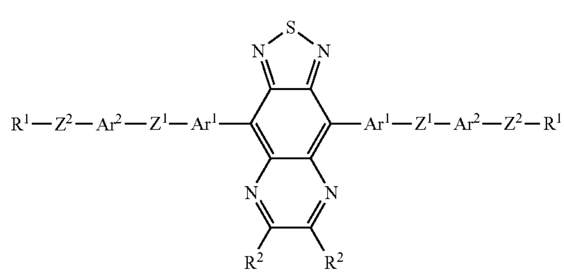

-continued

II-b

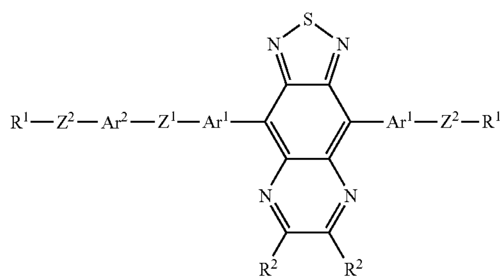

II-c

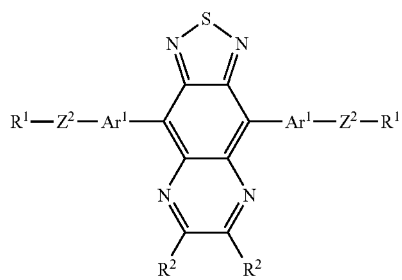

wherein the variable groups have the meanings as set forth for formulae I and II above, and wherein $Z^1$ and $Z^2$ preferably denote a single bond and $Ar^1$ and $Ar^2$ are preferably, on each occurrence identically or differently, selected from 1,4-phenylene, thiophene-2,5-diyl and thienothiophene-2,5-diyl where optionally these groups may be substituted by one or more F.

In an embodiment a composition is provided which comprises one or more compounds selected from the group of compounds of formulae I-i, I-ii and I-iii, preferably at least one compound of formula I-i, I-i

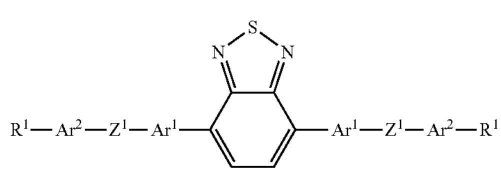

I-ii

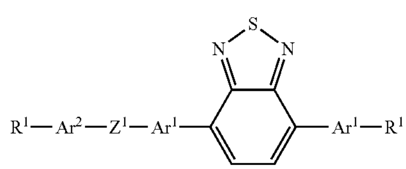

I-iii

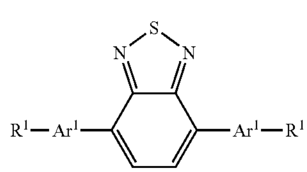

and one or more compounds selected from the group of compounds of formulae II-i, II-ii and II-iii, preferably at least one compound of formula II-i, II-i

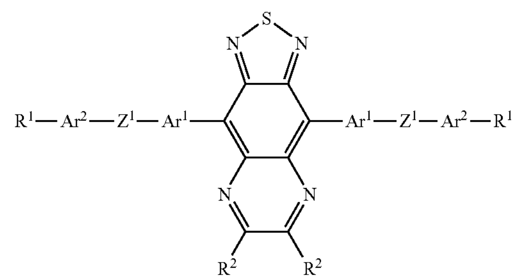

II-ii

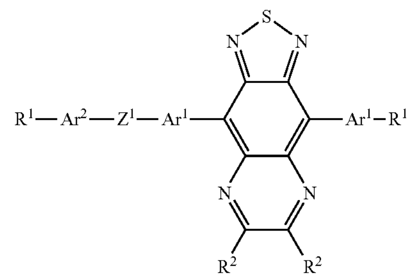

II-iii

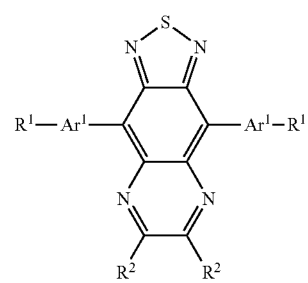

wherein $R^1$ identically or differently, denotes H, F, CN, $N(R^z)_2$, or a straight-chain or branched alkyl or alkoxy having 1 to 20 C atoms, in which, in addition, one or more non-adjacent $CH_2$ groups may each be replaced, independently of one another, by —C(R$^z$)═C(R$^z$)—, —C≡C—,

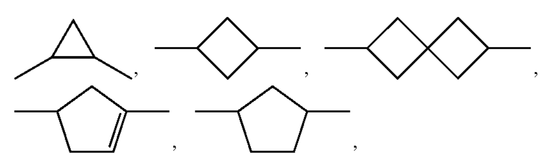

—N(R$^z$)—, —O—, —S—, —CO—, —CO—O—, —O—CO— or —O—CO—O— in such a way that C and/or S atoms are not linked directly to one another, and in which, in addition, one or more H atoms may be replaced by F or CN, $R^2$ and $R^z$ on each occurrence, identically or differently, denote H, halogen, straight-chain, branched or cyclic alkyl having 1 to 12 C atoms, in which, in addition, one or more non-adjacent $CH_2$ groups may be replaced by —O—, —S—, —CO—, —CO—O—, —O—CO— or —O—CO—O— in such a way that C and/or S atoms are not linked directly to one another, and in which, in addition, one or more H atoms may be replaced by F or Cl, $Ar^1$ and $Ar^2$ on each occurrence, identically or differently, denote an aryl or heteroaryl group, which may be substituted by one or more radicals L, L on each occurrence, identically or differently, denotes F, Cl, CN, OH, SCN, $SF_5$, $N(R^z)_2$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $Z^1$ on each occurrence, identically or differently, denotes a single bond, —O—, —S—, —C(O)—, —$CR^{y1}R^{y2}$—, —$CF_2O$—, —$OCF_2$—, —C(O)—O—, —O—C(O)—, —$OCH_2$—, —$CH_2O$—, —$CR^{x1}$=$CR^{x2}$—, —C≡C—, —$CR^{x1}$=$CR^{x2}$—CO—, —CO—$CR^{x1}$=$CR^{x2}$—, —$CR^{x1}$=$CR^{x2}$—COO—, —OCO—$CR^{x1}$=$CR^{x2}$— or —N=N—, $R^{x1}$, $R^{x2}$ independently of one another, denote H, F, Cl, CN or alkyl having 1 to 12 C atoms, $R^{y1}$ denotes H or alkyl having 1 to 12 C atoms, and $R^{y2}$ denotes alkyl having 1 to 12 C atoms.

For the compounds of formulae I-iii and II-iii it is preferred that at least one of $Ar^1$, preferably both groups $Ar^1$, denote(s) thienothiophene-2,5-diyl.

The compounds of formula I-i are preferably selected from the compounds of formulae I-i-a, I-i-b, I-i-c, I-i-d, I-i-e and I-i-f, more preferably I-i-a and I-i-c, and the compounds of formula II-i are preferably selected from the compounds of formulae II-i-a, II-i-b, II-i-c, II-i-d, II-i-e and II-i-f, more preferably II-i-a and II-i-c I-i-a

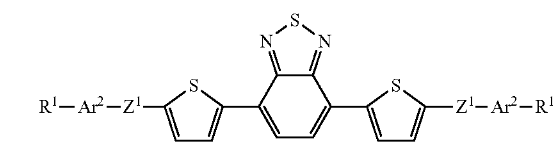

I-i-b

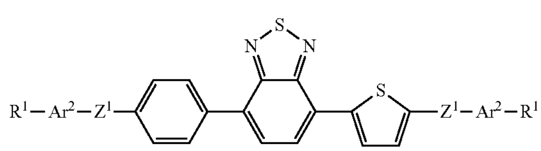

I-i-c

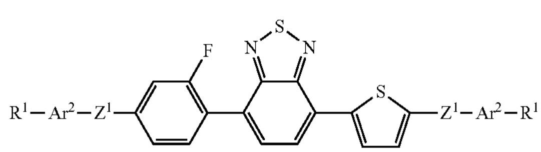

I-i-d

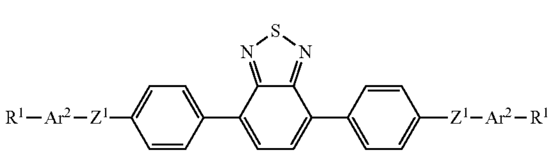

I-i-e

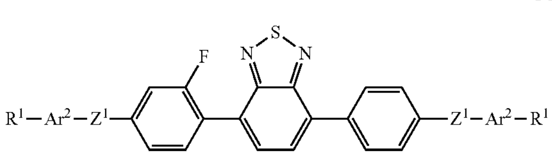

-continued

I-i-f

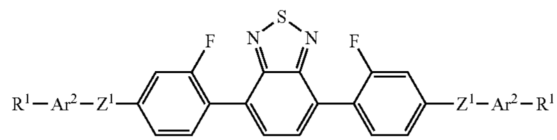

II-i-a

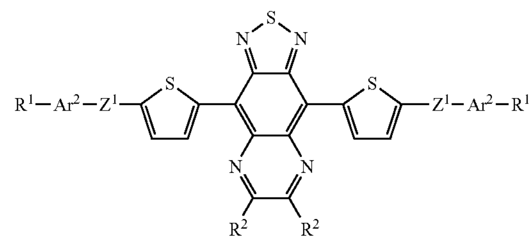

II-i-b

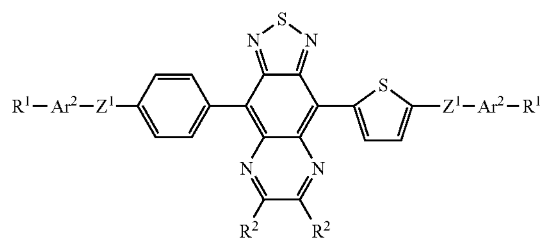

II-i-c

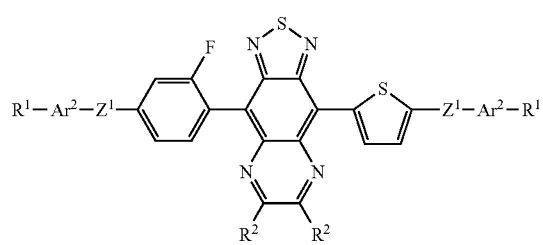

II-i-d

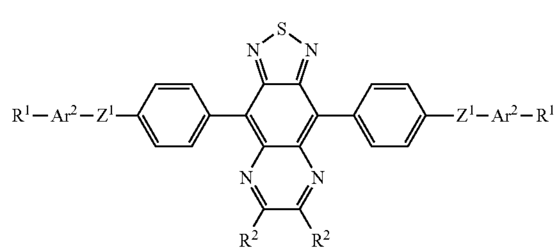

II-i-e

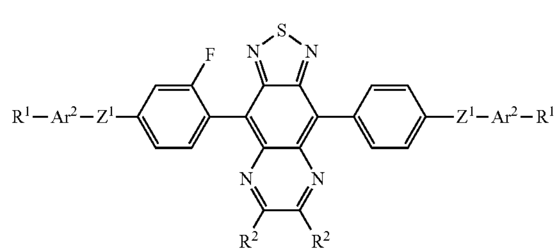

-continued

II-i-f

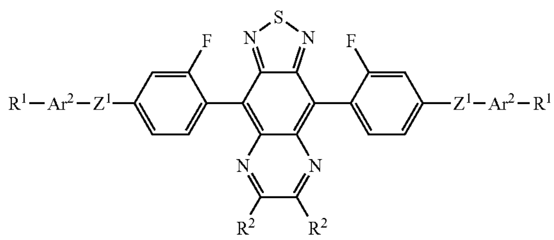

wherein $R^1$, $Ar^2$, $Z^1$ and $R^2$ have the meanings as set forth for formulae I and II above, and wherein $Z^1$ preferably denotes a single bond and $Ar^2$ is preferably, on each occurrence identically or differently, selected from 1,4-phenylene and thiophene-2,5-diyl where optionally these groups may be substituted by one or more F.

The liquid-crystalline media according to the invention preferably comprise one or more compounds selected from the group of compounds of formulae I-i-a and/or I-i-c together with one or more compounds of formula II-i-a.

In a preferred embodiment the compounds of formula I are selected from the compounds of formulae I-i-a-1, I-i-a-2 and I-i-c-1, and the compounds of formula II are selected from the compounds of formula II-i-a-1 and II-i-a-2

I-i-a-1

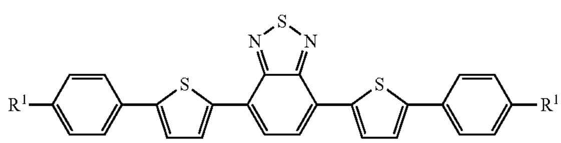

I-i-a-2

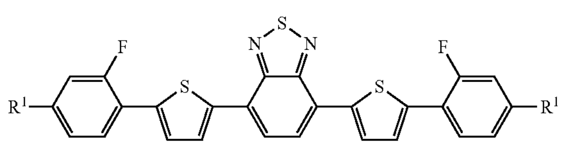

-continued

I-i-c-1

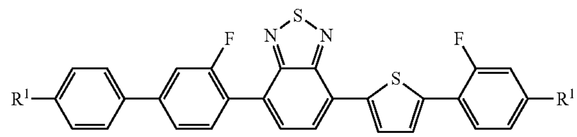

II-i-a-1

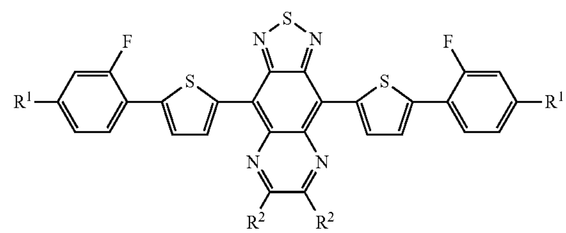

II-i-a-2

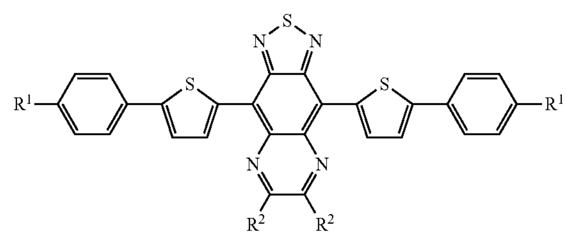

wherein $R^1$ has the meaning as set forth for formula I and $R^2$ has the meaning as set forth for formula II.

In a particularly preferred embodiment the composition according to the invention comprises at least one compound, preferably two or more compounds, selected from the compounds of formulae I-1, I-2, I-3 and I-4

I-1

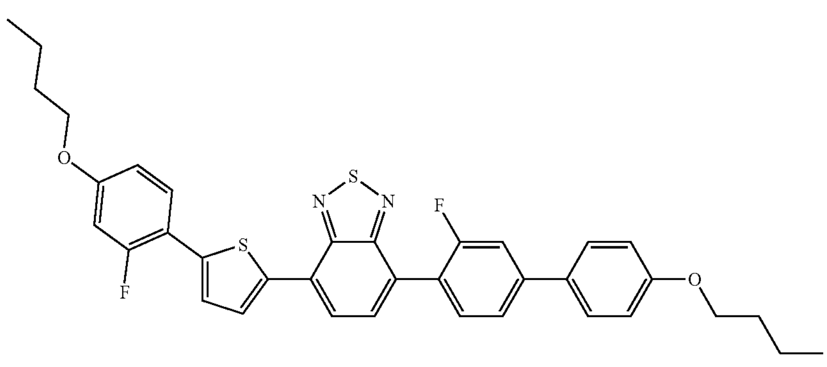

-continued
I-2
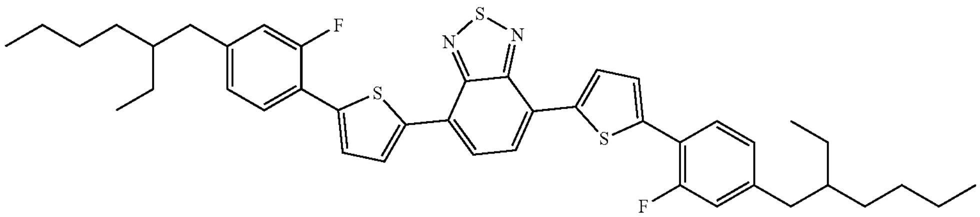
I-3
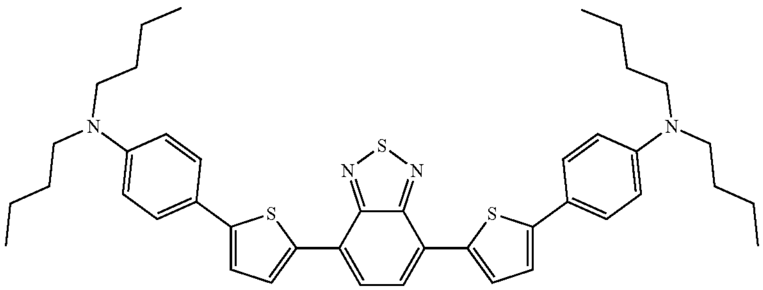
I-4
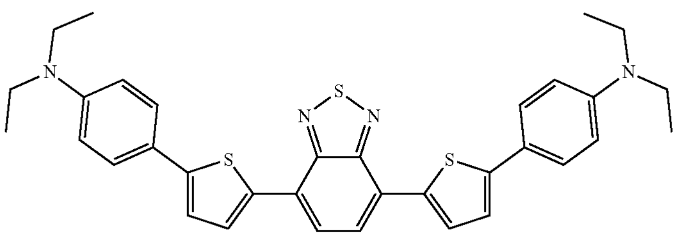
and at least one compound, preferably two or more compounds, selected from the compounds of formulae II-1, II-2, II-3, II-4 and II-5
II-1
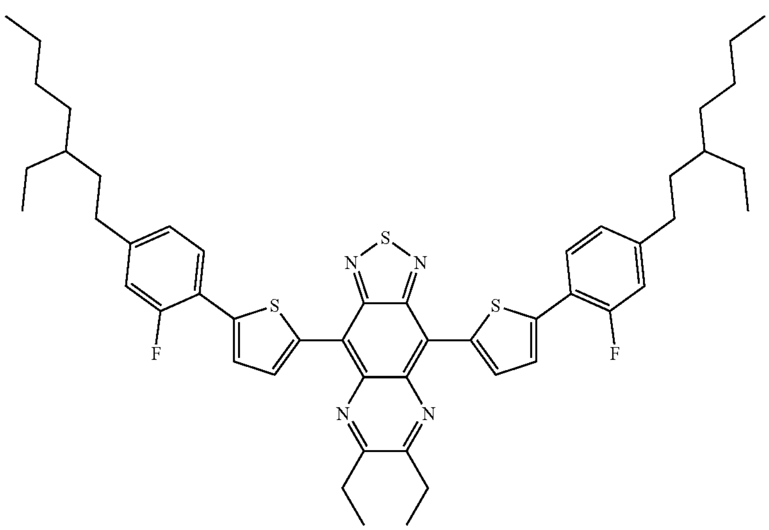

-continued
II-2
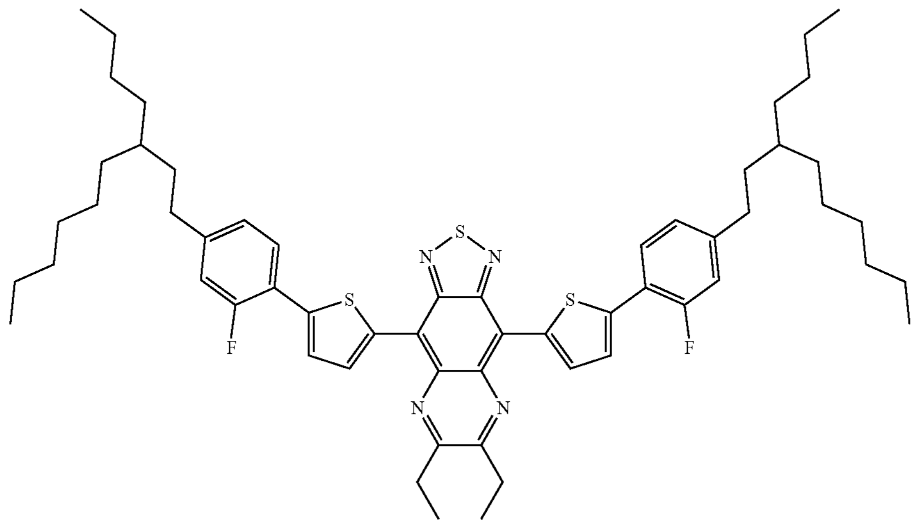
II-3
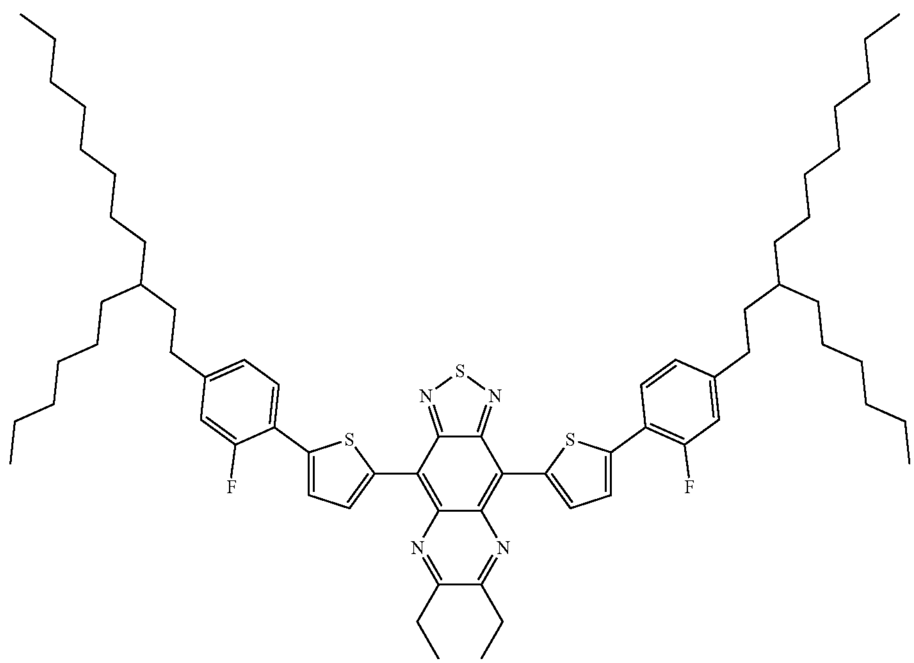
II-4
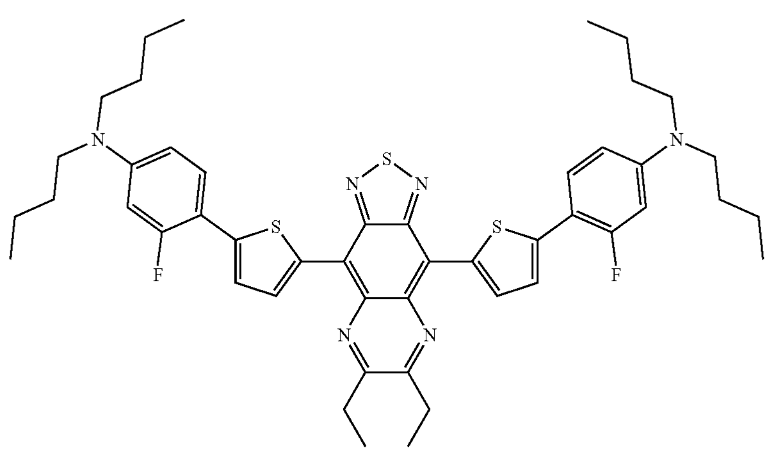

-continued

II-5

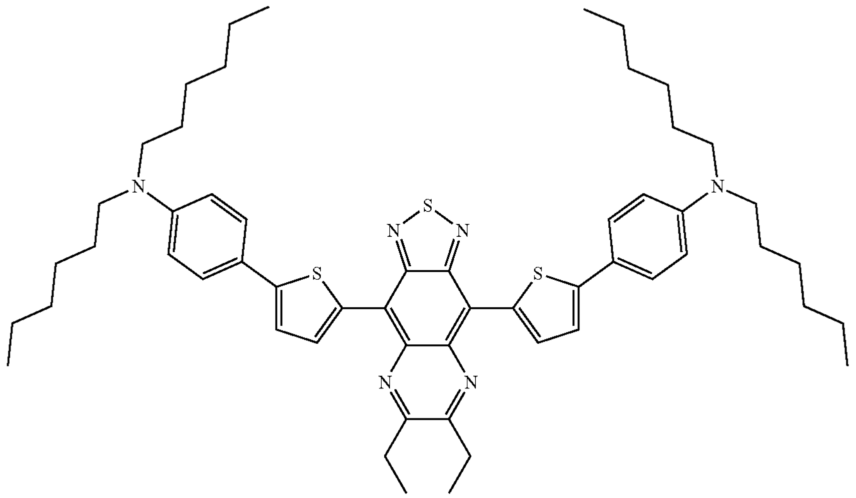

It is preferred that the composition contains two or more compounds of formula I, preferably three or more compounds of formula I and more preferably four or more compounds of formula I, in particular of the respective preferred sub-formulae as described above and below.

It is preferred that the composition contains two or more compounds of formula II, preferably three or more compounds of formula II and more preferably four or more compounds of formula II, in particular of the respective preferred sub-formulae as described above and below.

In a particularly preferred embodiment the composition contains two, three or four compounds, preferably three or four compounds and in particular three compounds, of the formulae I-1, I-2, I-3 and I-4, together with two or more compounds, preferably two, three or four compounds, of the formulae II-1, II-2, II-3, II-4 and II-5.

Owing to favourable compatibility, the compounds of formulae I and II, and the respective preferred sub-formulae as described above, may be mixed substantially in any proportion as desired. Typically the ratio of the amount of the compound contained in the composition in the lowest quantity to the amount of the compound contained in the composition in the highest quantity ranges from 1:1 to 1:100, preferably from 1:1 to 1:10.

The compounds and the amounts of the respective compounds of the formulae I and II, and the respective preferred sub-formulae as described above and below, to be included in the composition can favourably be chosen and mixed such that the desired or required colour effect for a given application can be obtained.

In an embodiment compounds are contained in the composition that respectively have a red colour, a green colour and a blue colour. In a preferred embodiment the compounds in the composition have absorptions that in total cover the entire visible spectrum. In this way a colour-neutral or black appearance may be obtained. Such a colour-neutral appearance may be favourable in applications where colour artefacts or residual colour should be minimized or avoided, e.g. in certain smart windows applications.

It was further found that it can be advantageous to include one or more near-infrared dyes in the composition. This provision can favourably contribute to minimizing or even avoiding residual fluorescence in the visible spectrum such that unwanted colour artefacts, e.g. a red glow, may be avoided or at least substantially reduced.

In a particularly preferred embodiment the composition comprises at least one purple dye, at least one blue dye, at least one yellow dye, at least one red dye and at least one near-infrared dye.

Preferably, the compositions and the liquid-crystalline media according to the present invention comprise one or more, preferably two or more, more preferably three or more and even more preferably four or more compounds selected from the group of the following compounds (1) to (310)

| | Compound | Degree of anisotropy |
|---|---|---|
| (1) | 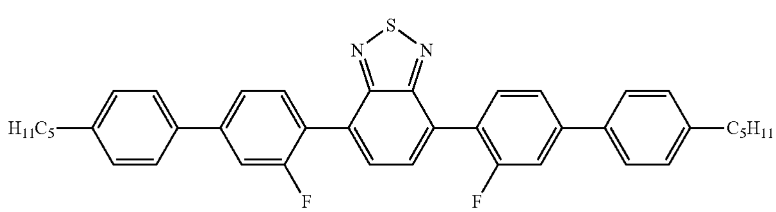 | 0.80 |

-continued
| | Compound | Degree of anisotropy |
|---|---|---|
| (2) | 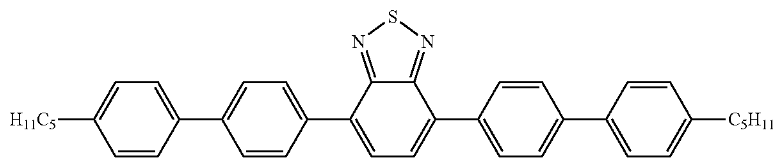 | 0.80 |
| (3) | 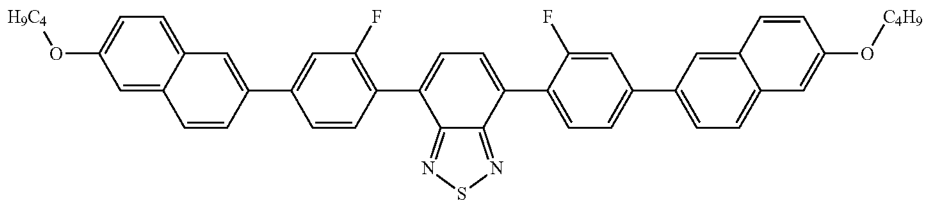 | |
| (4) | 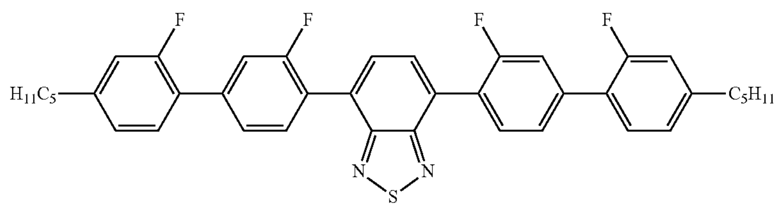 | 0.79 |
| (5) | 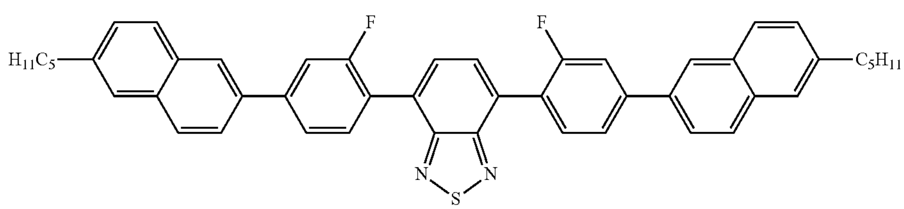 | 0.82 |
| (6) | 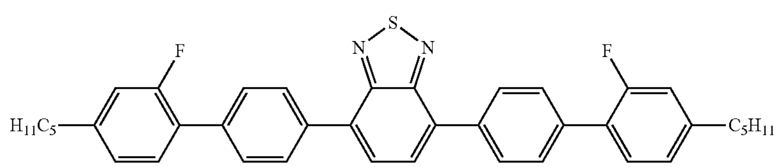 | 0.79 |
| (7) | 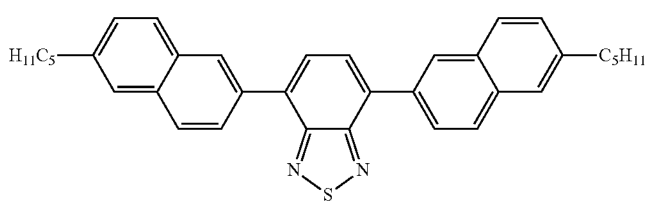 | 0.76 |
| (8) | 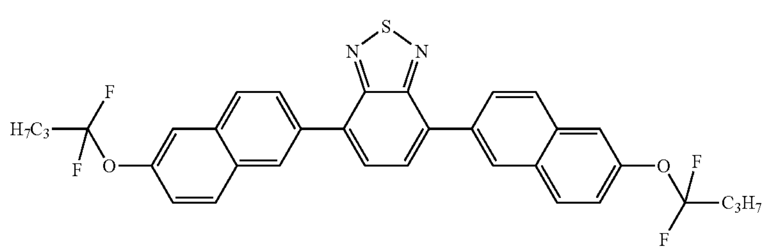 | 0.77 |

-continued
| | Compound | Degree of an-isotropy |
|---|---|---|
| (9) | 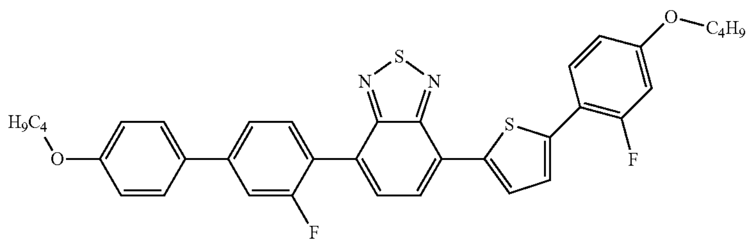 | 0.77 |
| (10) | 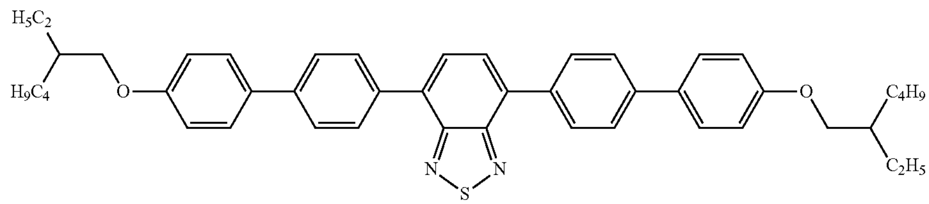 | 0.78 |
| (11) | 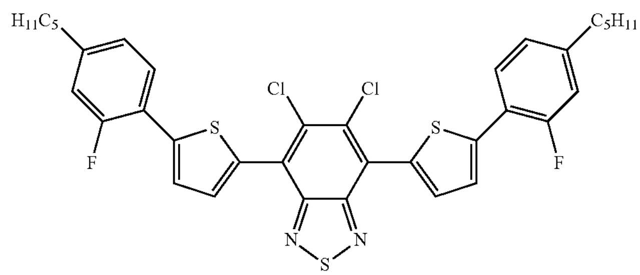 | 0.74 |
| (12) | 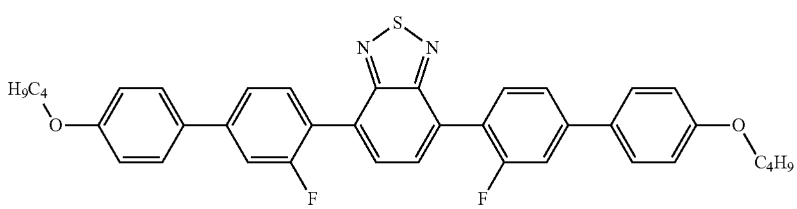 | 0.81 |
| (13) | 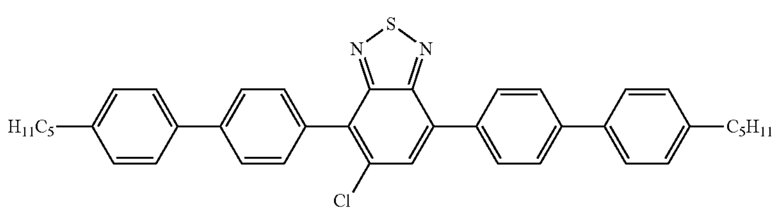 | 0.79 |
| (14) | 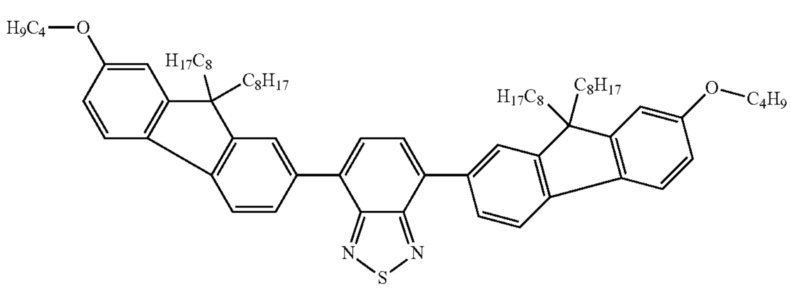 | 0.62 |

-continued
| | Compound | Degree of an-isotropy |
|---|---|---|
| (15) | 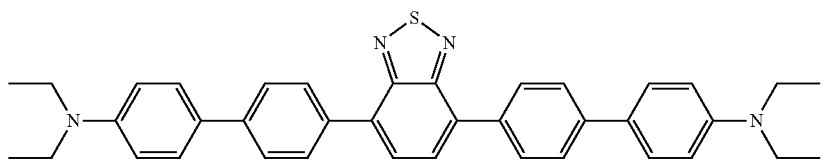 [SMILES: CCN(CC)c1ccc(-c2ccc(-c3ccc(-c4ccc(-c5ccc(N(CC)CC)cc5)cc4)c4nsnc34)cc2)cc1] | 0.77 |
| (16) | 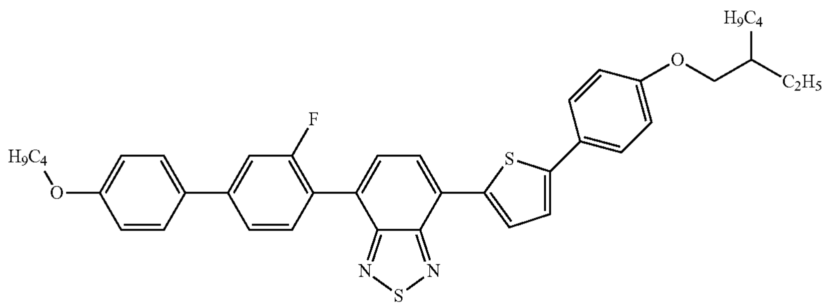 | 0.77 |
| (17) | 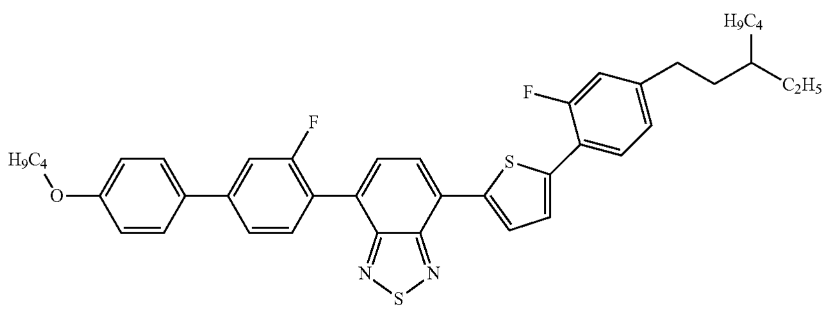 | 0.78 |
| (18) | 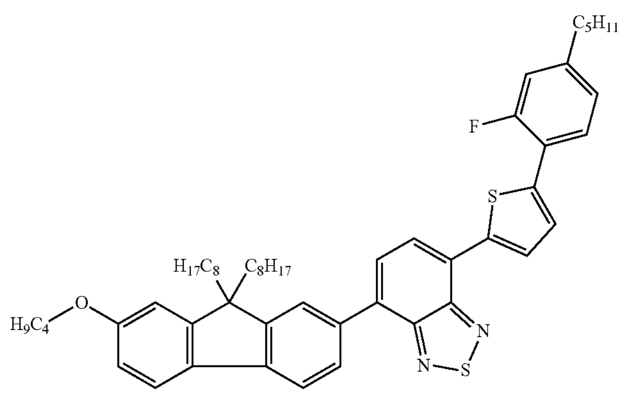 | 0.70 |
| (19) | 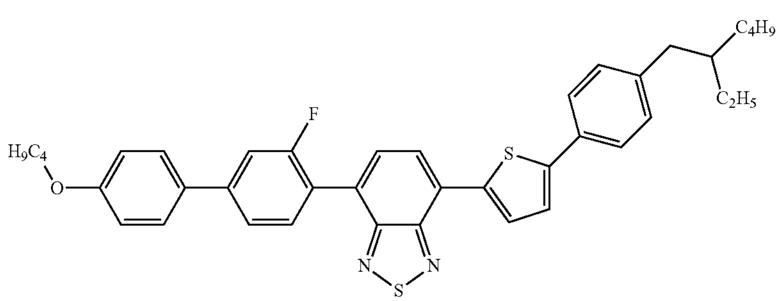 | 0.78 |

-continued
| | Compound | Degree of an-isotropy |
|---|---|---|
| (20) | 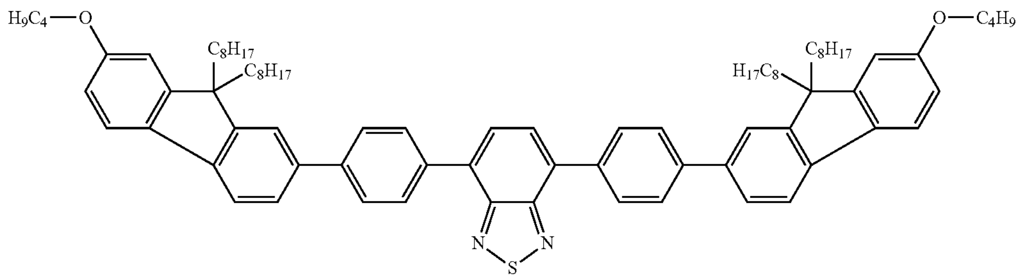 | 0.76 |
| (21) | 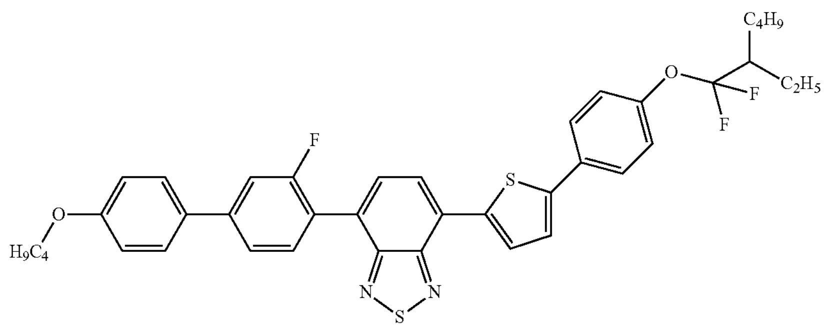 | 0.79 |
| (22) | 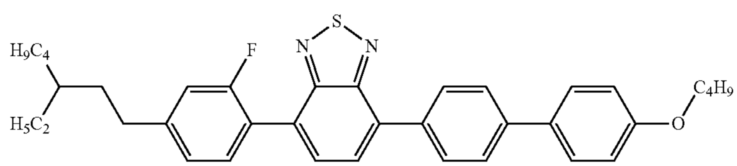 | 0.74 |
| (23) | 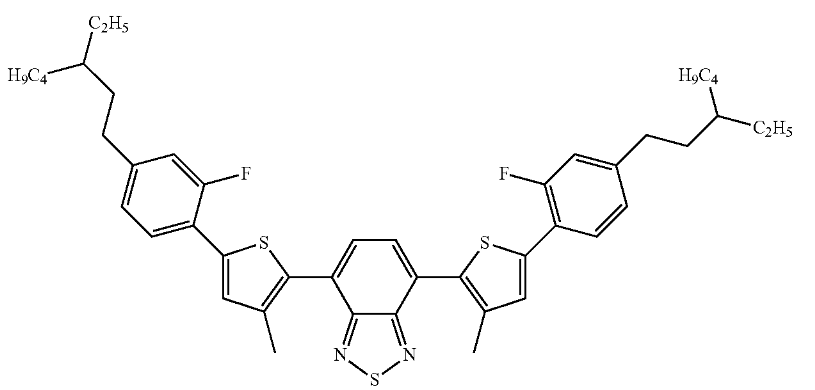 | 0.67 |
| (24) | 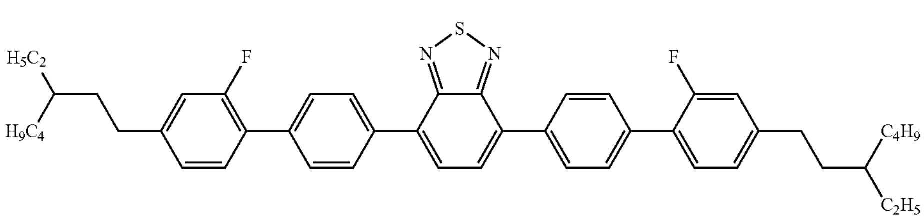 | 0.78 |

-continued
| | Compound | Degree of an-isotropy |
|---|---|---|
| (25) | 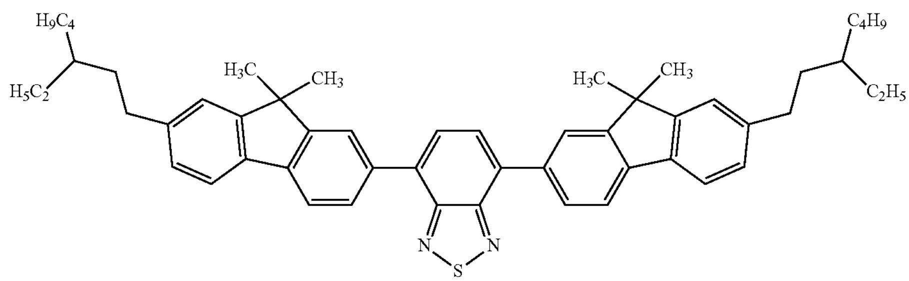  | 0.70 |
| (26) | 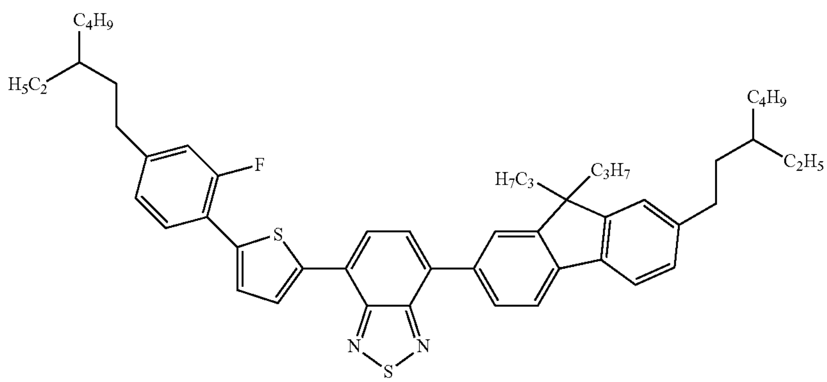  | 0.69 |
| (27) | 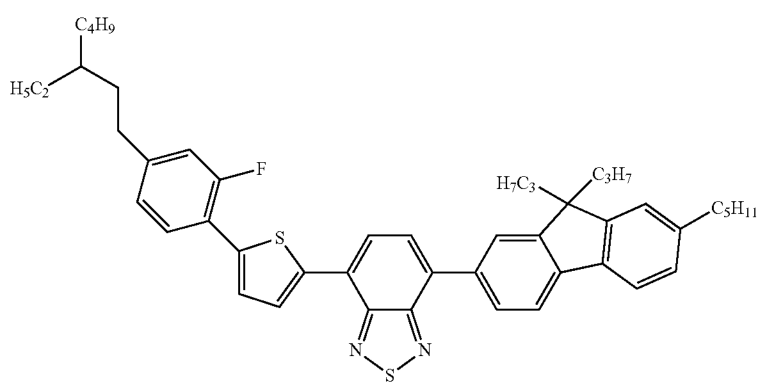  | 0.56 |
| (28) | 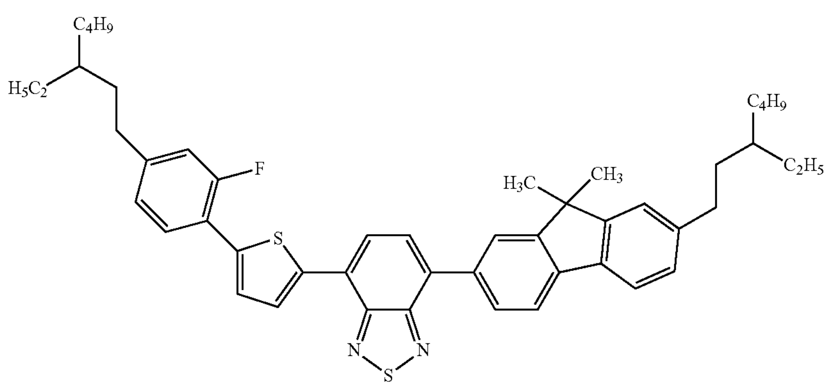  | 0.69 |

-continued
| | Compound | Degree of an-isotropy |
|---|---|---|
| (29) | 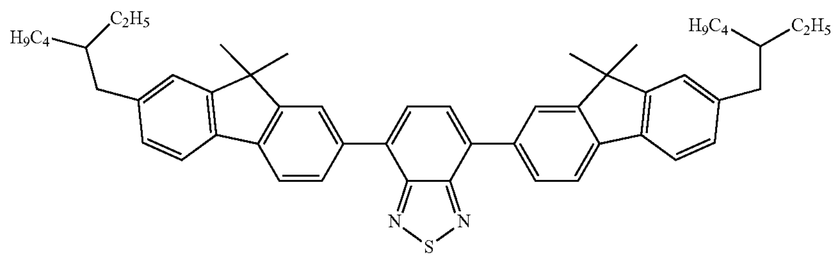 | 0.74 |
| (30) | 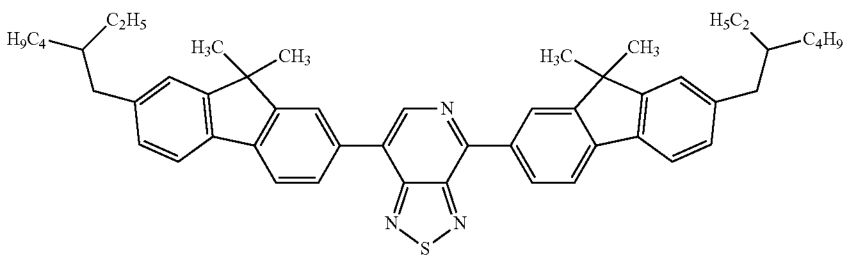 | 0.73 |
| (31) | 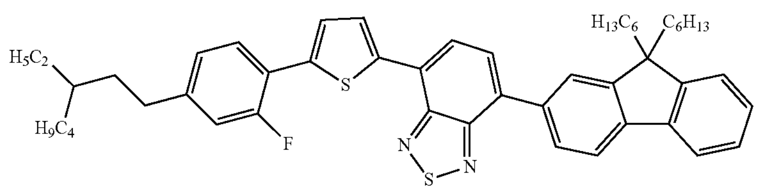 | 0.66 |
| (32) | 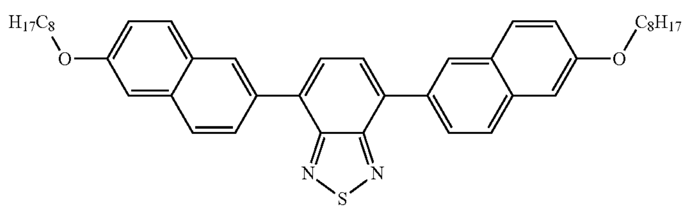 | |
| (33) | 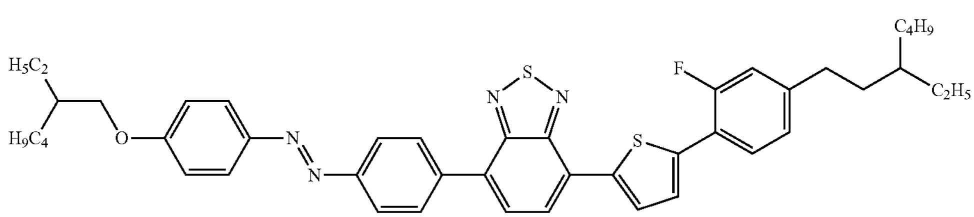 | 0.74 |
| (34) | 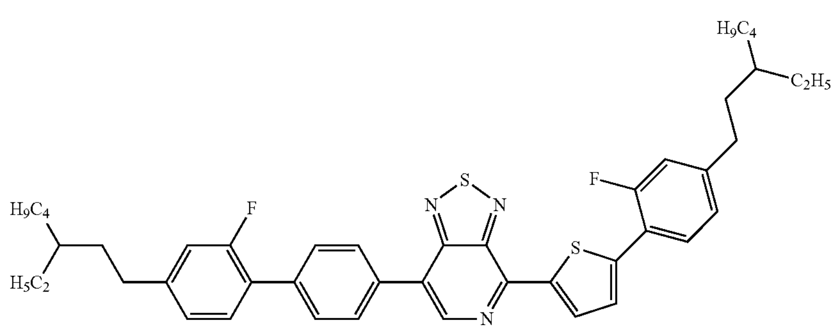 | 0.74 |

-continued
| | Compound | Degree of anisotropy |
|---|---|---|
| (35) | 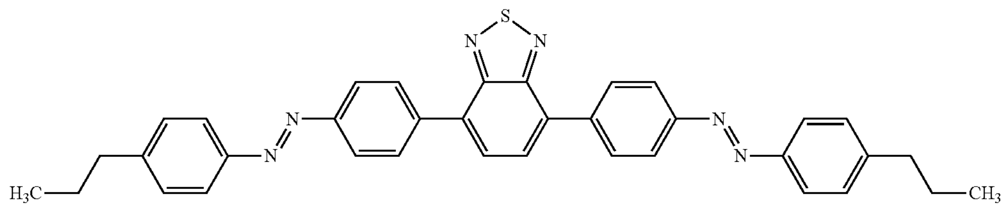 [SMILES: CCCc1ccc(/N=N/c2ccc(-c3ccc(-c4ccc(/N=N/c5ccc(CCC)cc5)cc4)c4nsnc34)cc2)cc1] | 0.79 |
| (36) | 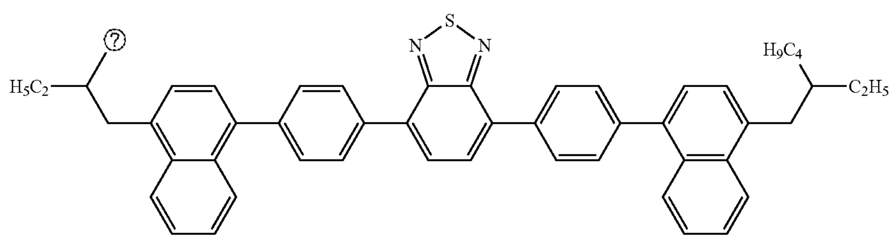 | 0.76 |
| (37) | 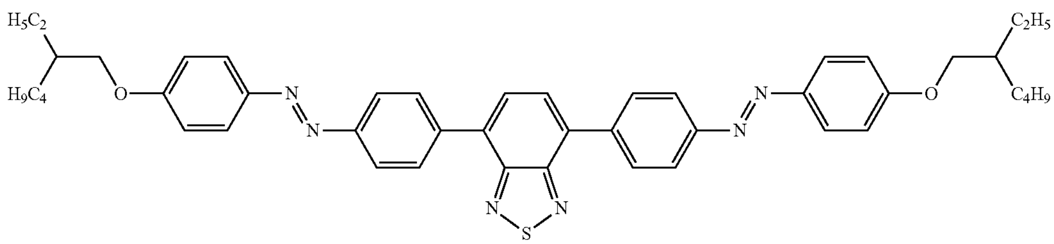 | 0.78 |
| (38) | 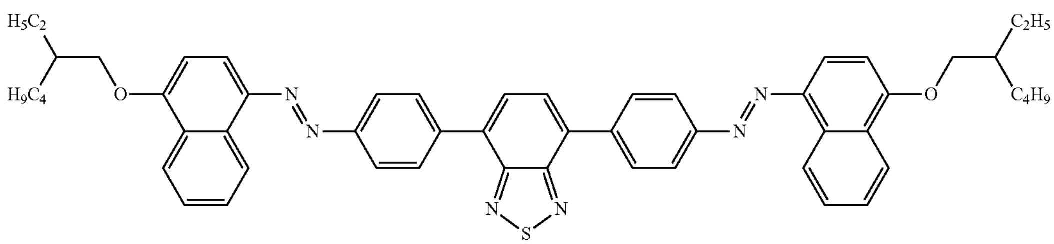 | 0.71 |
| (39) | 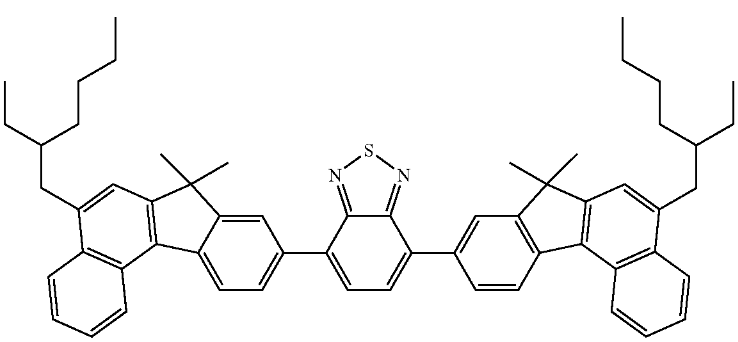 [SMILES: CCCCC(CC)Cc1cc2c(c3ccccc13)-c1ccc(-c3ccc(-c4ccc5c(c4)C(C)(C)c4cc(CC(CC)CCCC)c6ccccc6c4-5)c4nsnc34)cc1C2(C)C] | 0.78 |
| (40) | 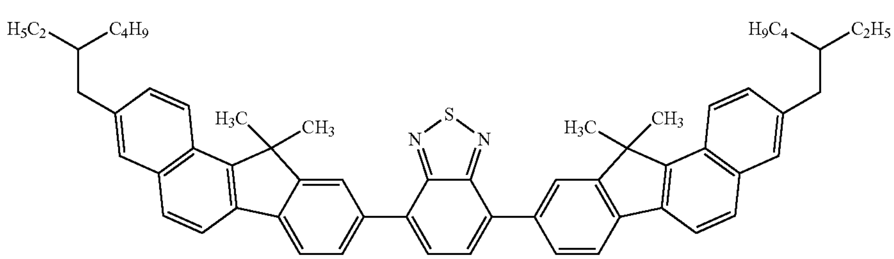 | 0.75 |

-continued
| | Compound | Degree of an-isotropy |
|---|---|---|
| (41) | 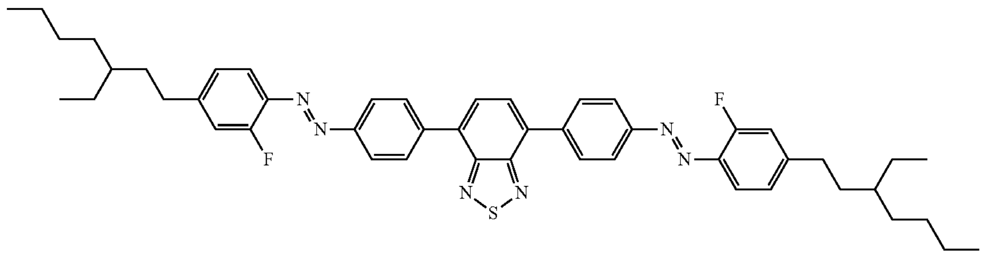 [SMILES: CCCCC(CC)CCc1ccc(/N=N/c2ccc(-c3ccc(-c4ccc(/N=N/c5ccc(CCC(CC)CCCC)cc5F)cc4)c4nsnc34)cc2)c(F)c1] | 0.80 |
| (42) | 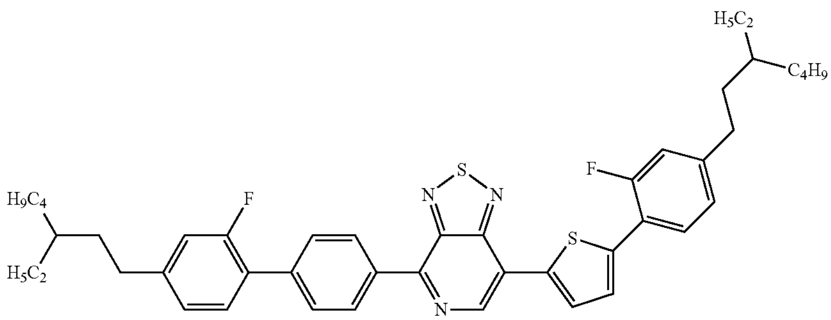 | 0.77 |
| (43) | 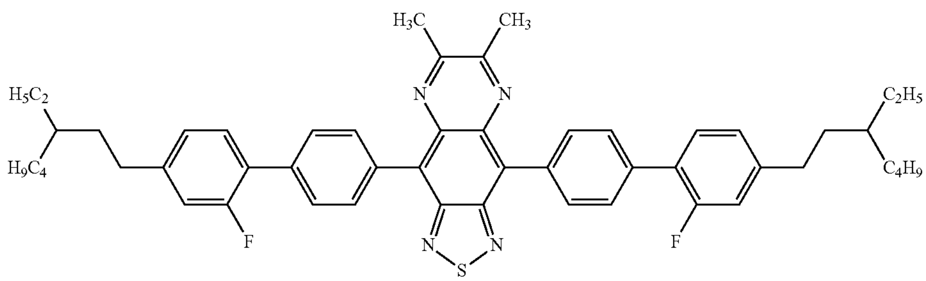 | 0.80 |
| (44) | 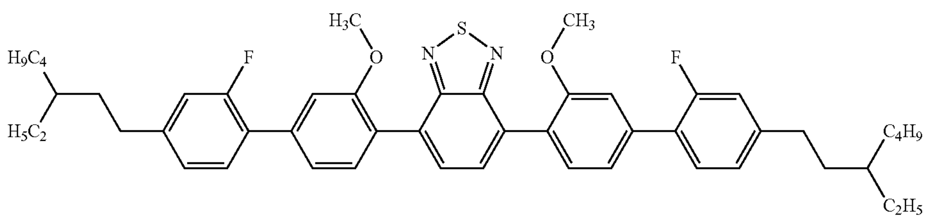 | 0.72 |
| (45) | 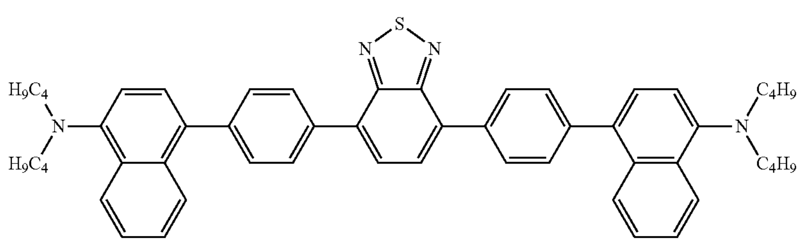 | |
| (46) | 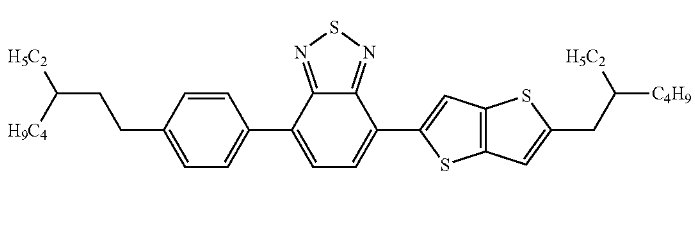 | 0.70 |

-continued
| | Compound | Degree of anisotropy |
|---|---|---|
| (47) | 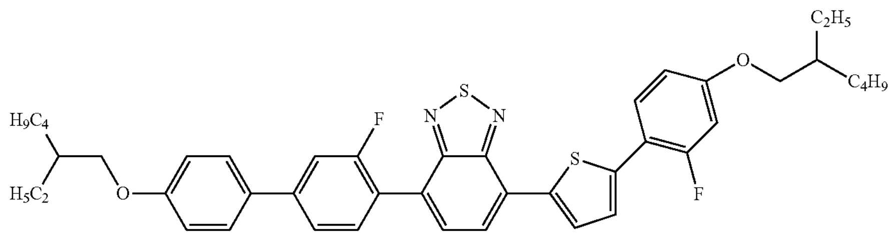 | 0.77 |
| (48) | 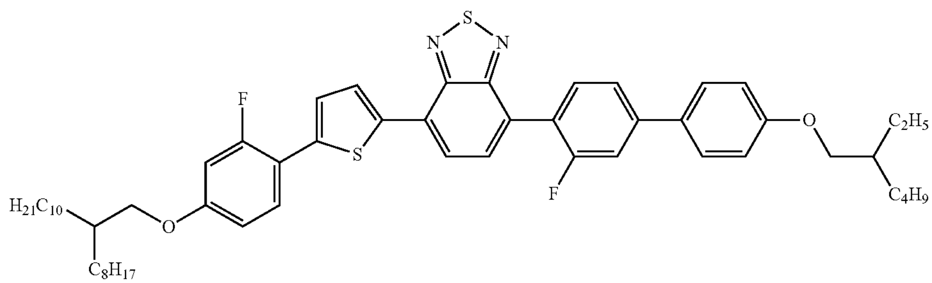 | 0.77 |
| (49) | 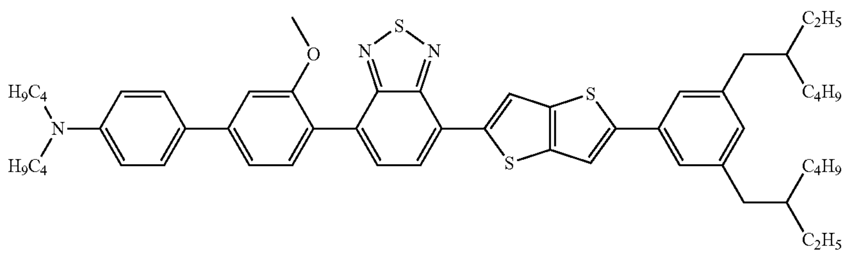 | 0.73 |
| (50) | 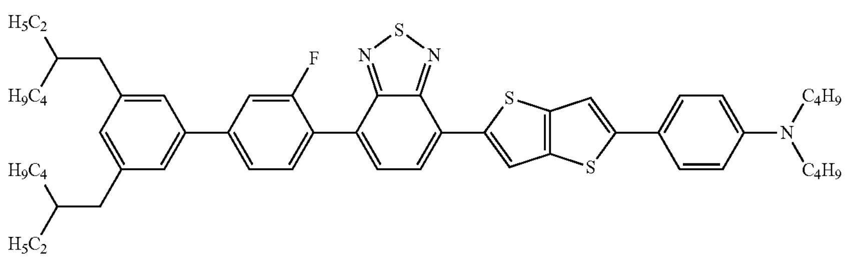 | 0.77 |
| (51) | 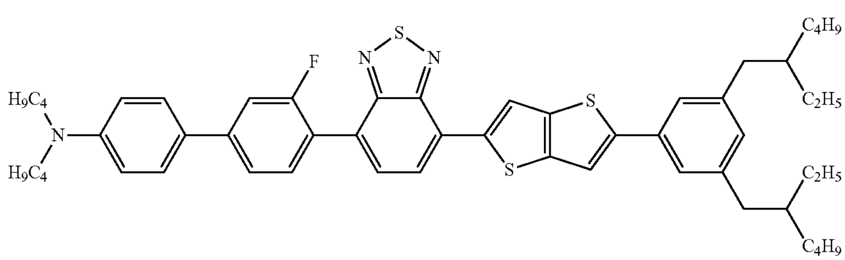 | 0.75 |
| (52) | 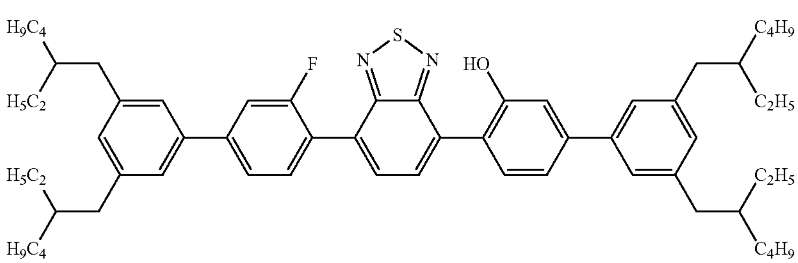 | 0.55 |

-continued
| | Compound | Degree of an-isotropy |
|---|---|---|
| (53) | 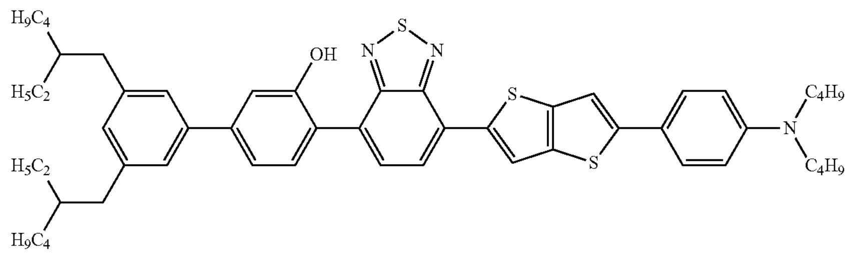 | 0.76 |
| (54) | 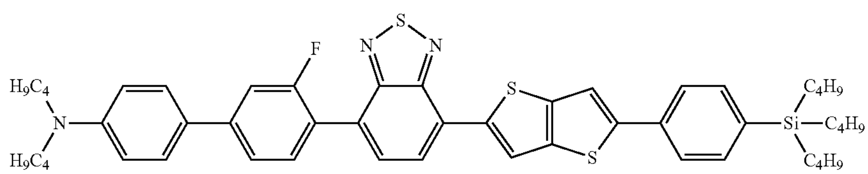 | 0.78 |
| (55) | 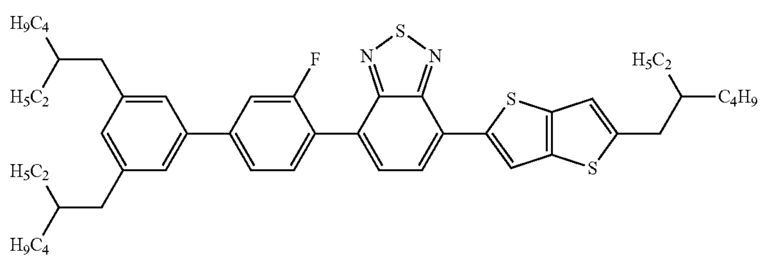 | 0.70 |
| (56) | 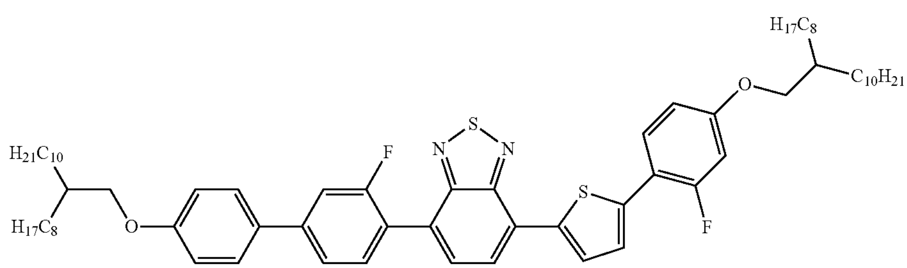 | 0.75 |
| (57) | 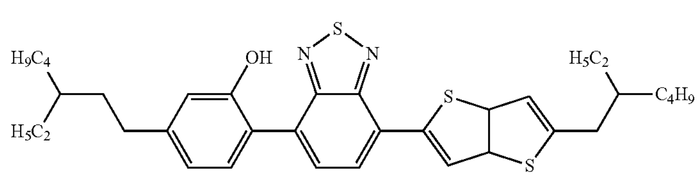 | 0.71 |
| (58) | 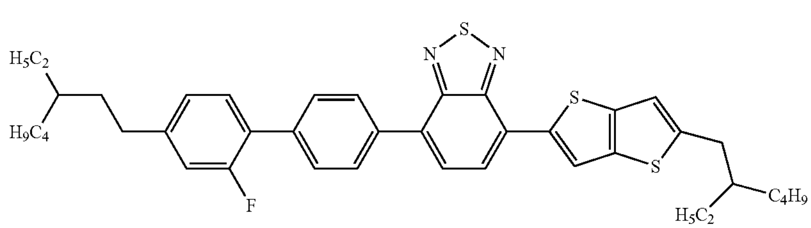 | 0.76 |

-continued
| | Compound | Degree of an-isotropy |
|---|---|---|
| (59) | 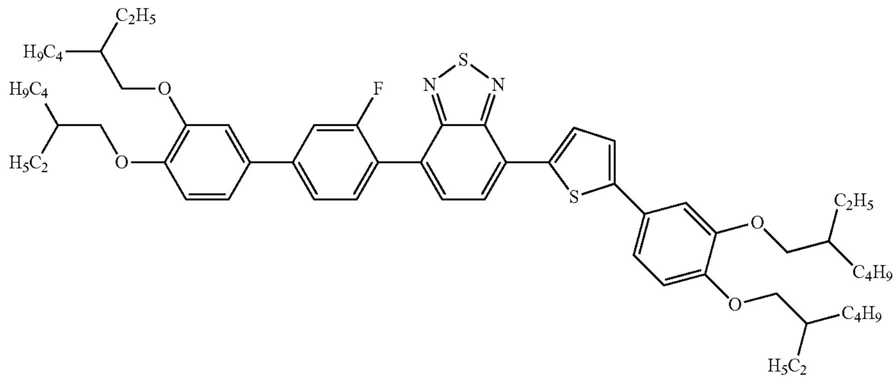 | 0.65 |
| (60) | 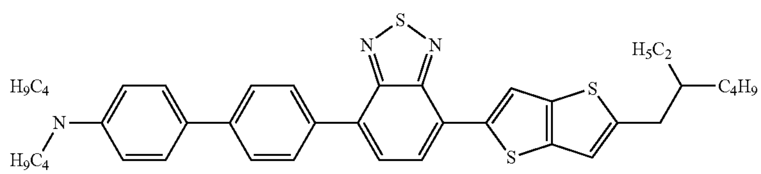 | 0.75 |
| (61) | 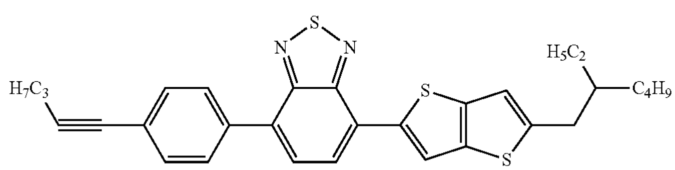 | 0.65 |
| (62) | 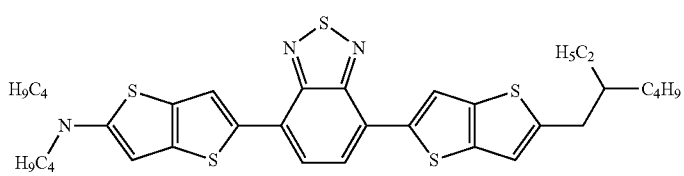 | 0.72 |
| (63) | 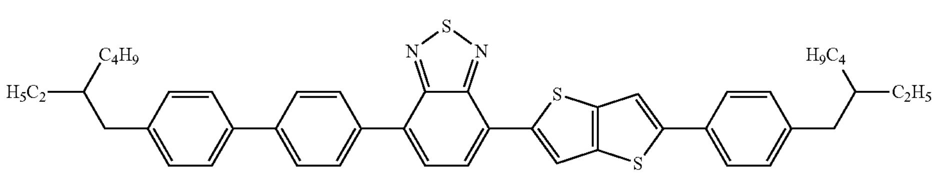 | 0.81 |
| (64) | 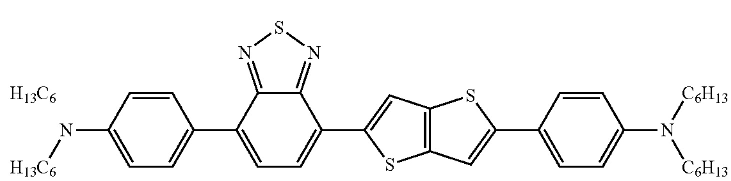 | 0.77 |
| (65) | 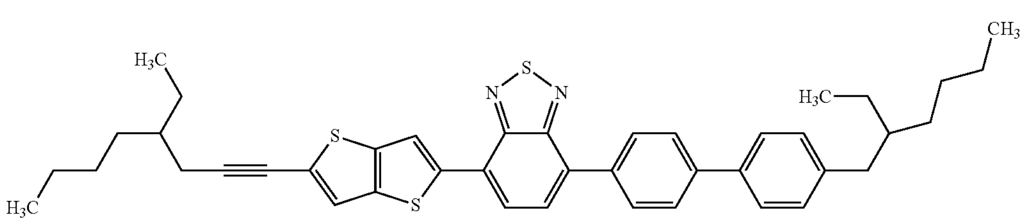 [SMILES: CCCCC(CC)CC#Cc1cc2sc(-c3ccc(-c4ccc(-c5ccc(CC(CC)CCCC)cc5)cc4)c4nsnc34)cc2s1] | 0.78 |

-continued
| | Compound | Degree of an-isotropy |
|---|---|---|
| (66) | 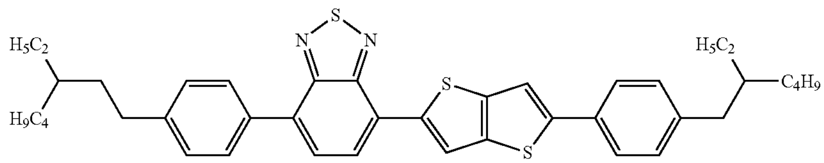 | 0.79 |
| (67) | 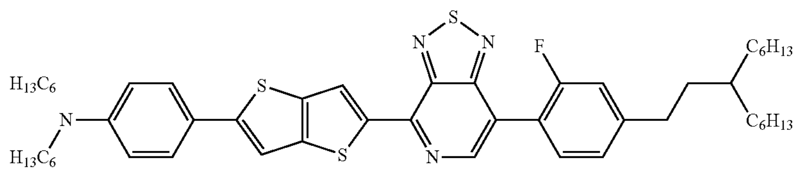 | 0.78 |
| (68) | 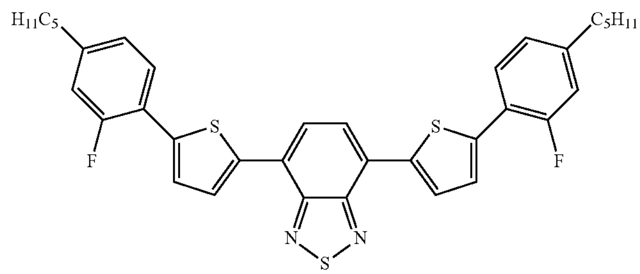 | 0.71 |
| (69) | 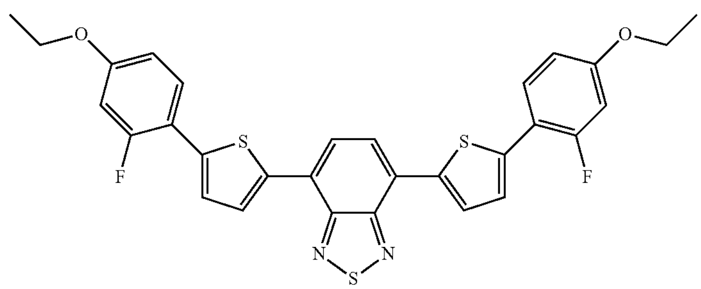 [SMILES: CCOc1ccc(-c2ccc(-c3ccc(-c4ccc(-c5ccc(OCC)cc5F)s4)c4nsnc34)s2)c(F)c1] | 0.73 |
| (70) | 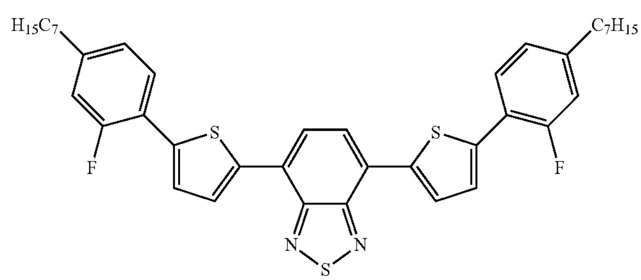 | 0.71 |
| (71) | 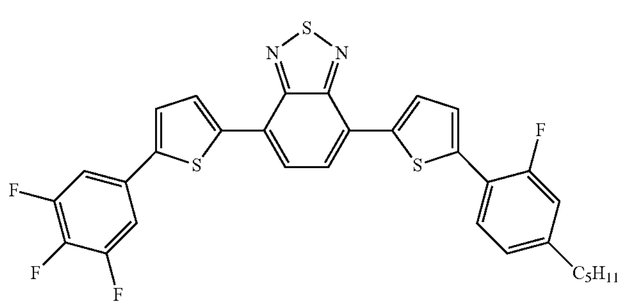 | 0.69 |

-continued
| | Compound | Degree of an-isotropy |
|---|---|---|
| (72) | 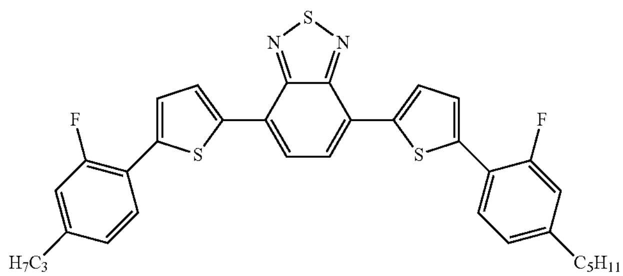 | 0.69 |
| (73) | 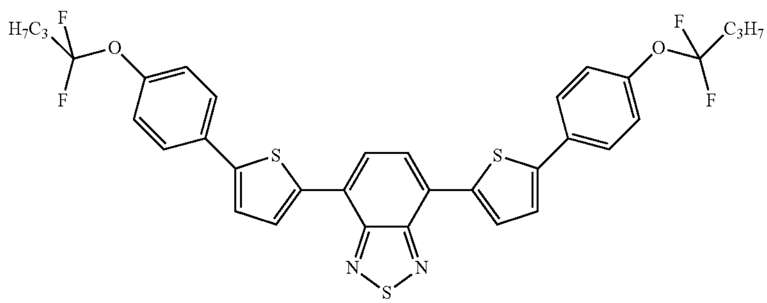 | 0.73 |
| (74) | 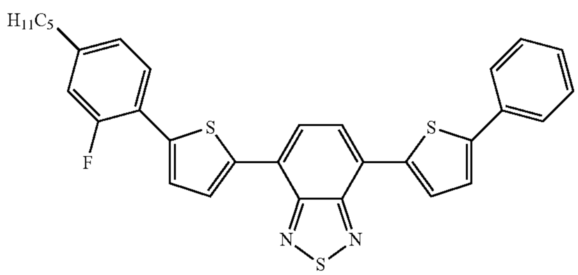 | 0.68 |
| (75) | 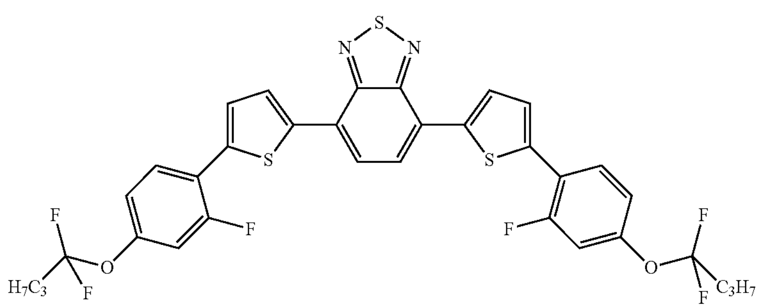 | 0.73 |
| (76) | 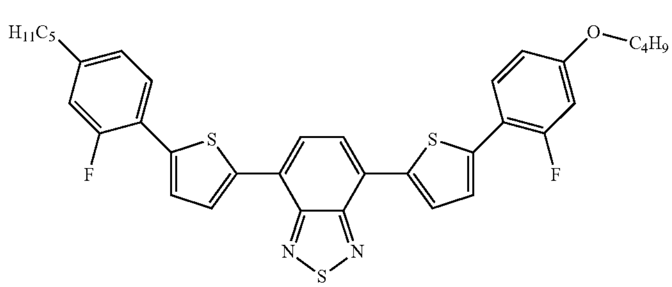 | 0.80 |

-continued
| | Compound | Degree of an-isotropy |
|---|---|---|
| (77) | 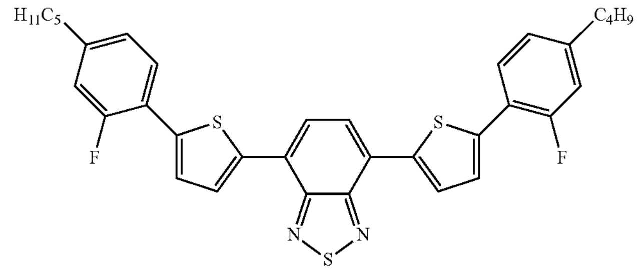 | 0.73 |
| (78) | 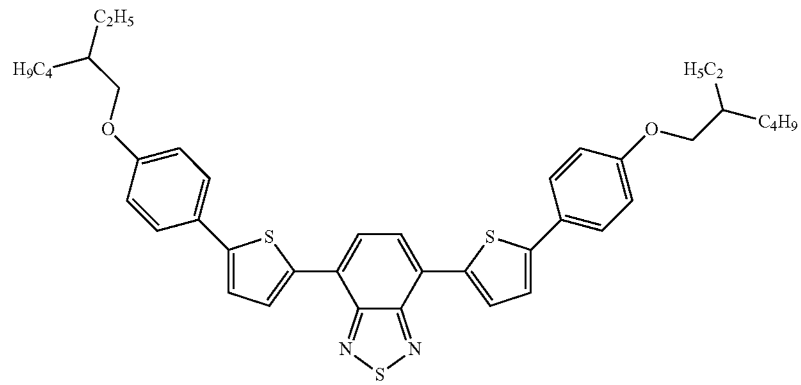 | 0.72 |
| (79) | 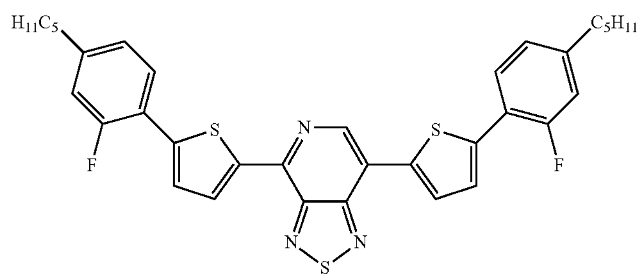 | 0.72 |
| (80) | 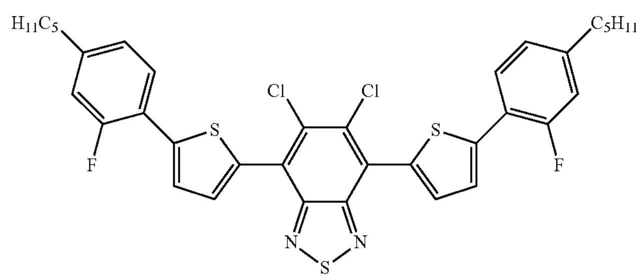 | 0.74 |
| (81) | 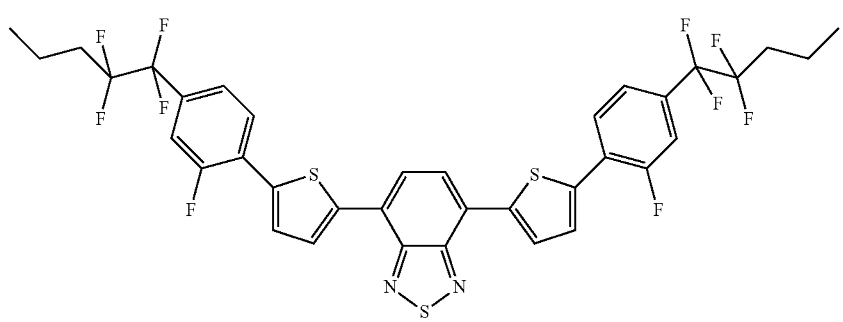 [SMILES: CCCC(F)(F)C(F)(F)c1ccc(-c2ccc(-c3ccc(-c4ccc(-c5ccc(C(F)(F)C(F)(F)CCC)cc5F)s4)c4nsnc34)s2)c(F)c1] | 0.73 |

-continued
| | Compound | Degree of an-isotropy |
|---|---|---|
| (82) | 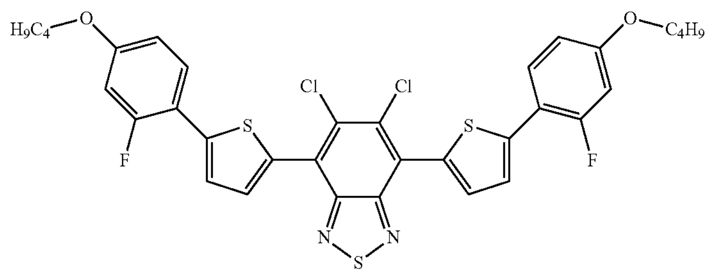 | 0.74 |
| (83) | 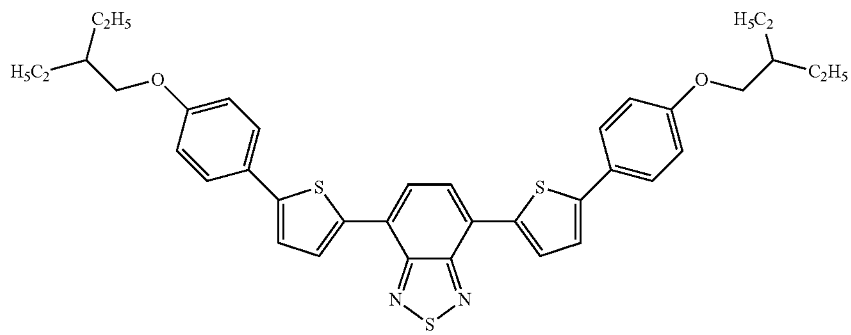 | 0.78 |
| (84) | 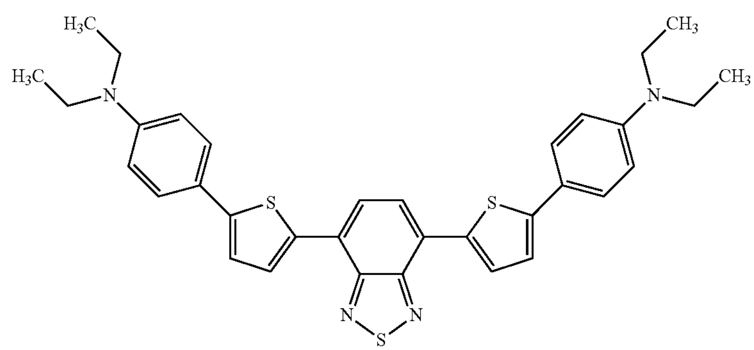 [SMILES: CCN(CC)c1ccc(-c2ccc(-c3ccc(-c4ccc(-c5ccc(N(CC)CC)cc5)s4)c4nsnc34)s2)cc1] | 0.73 |
| (85) | 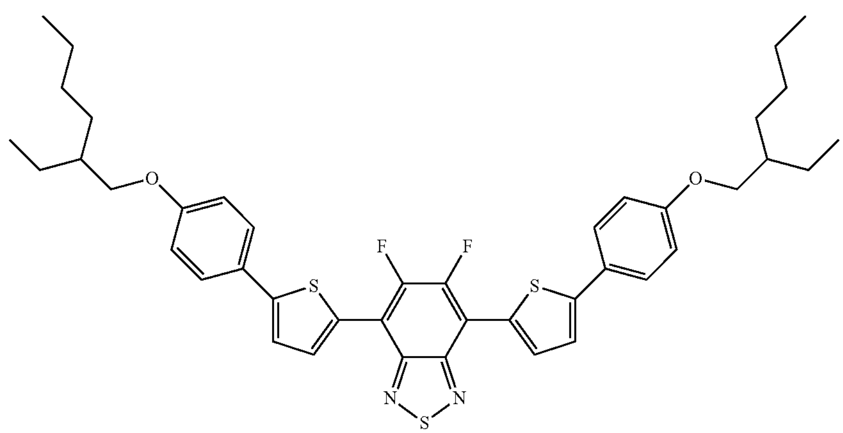 [SMILES: CCCCC(CC)COc1ccc(-c2ccc(-c3c(F)c(F)c(-c4ccc(-c5ccc(OCC(CC)CCCC)cc5)s4)c4nsnc34)s2)cc1] | 0.73 |

-continued
| | Compound | Degree of an-isotropy |
|---|---|---|
| (86) | 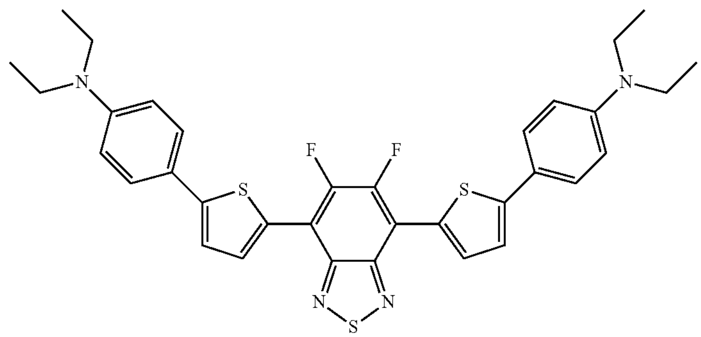 [SMILES: CCN(CC)c1ccc(-c2ccc(-c3c(F)c(F)c(-c4ccc(-c5ccc(N(CC)CC)cc5)s4)c4nsnc34)s2)cc1] | 0.74 |
| (87) | 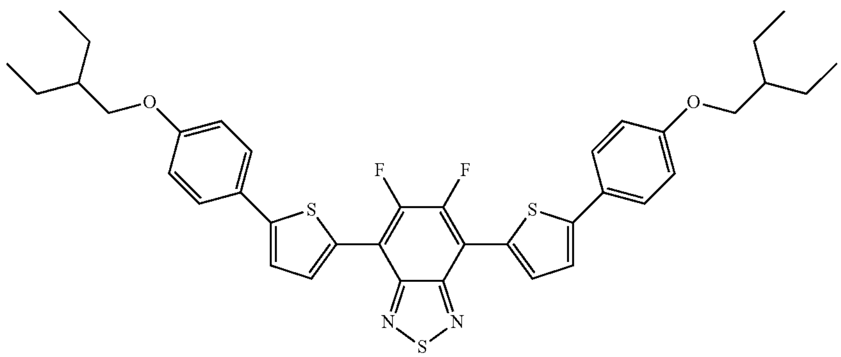 [SMILES: CCC(CC)COc1ccc(-c2ccc(-c3c(F)c(F)c(-c4ccc(-c5ccc(OCC(CC)CC)cc5)s4)c4nsnc34)s2)cc1] | 0.73 |
| (88) | 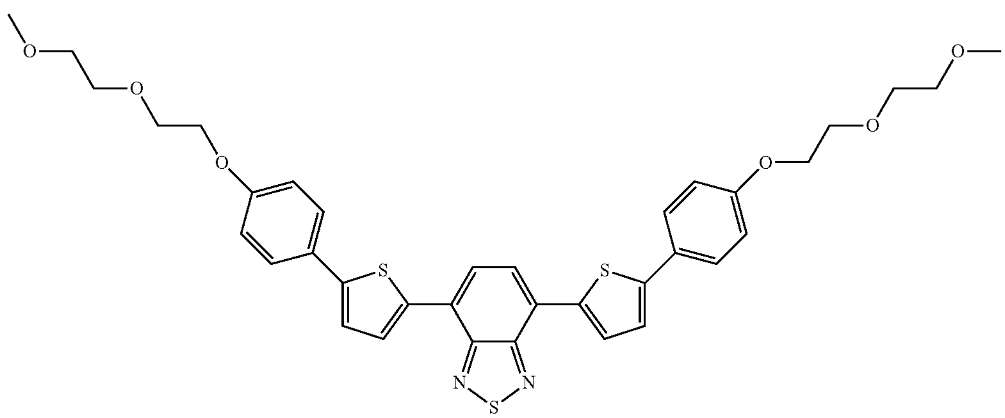 | 0.72 |
| (89) | 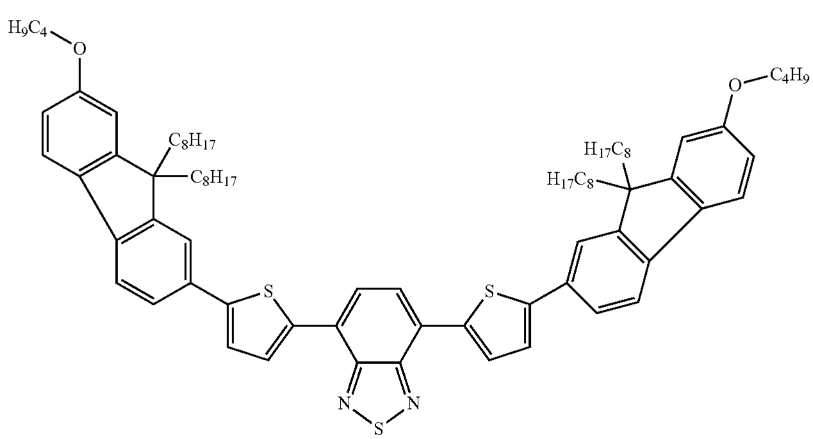 | 0.73 |

-continued
| | Compound | Degree of an-isotropy |
| --- | --- | --- |
| (90) | 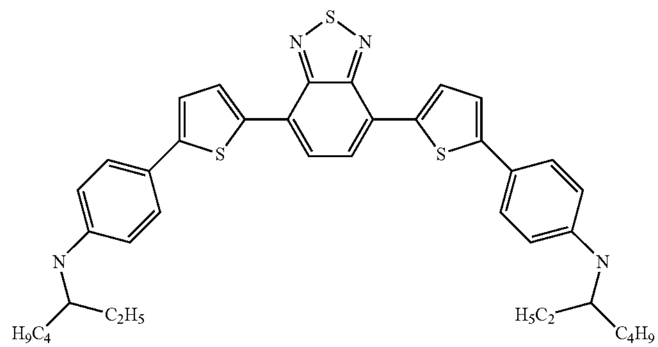 | 0.72 |
| (91) | 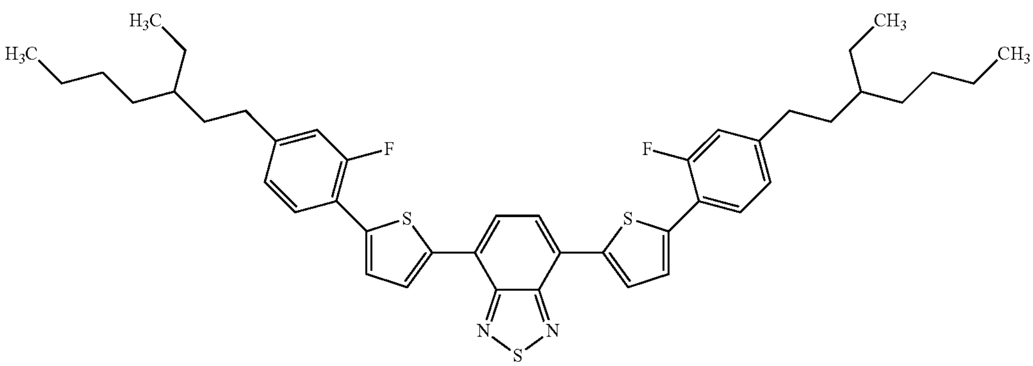 [SMILES: CCCCC(CC)CCc1ccc(-c2ccc(-c3ccc(-c4ccc(-c5ccc(CCC(CC)CCCC)cc5F)s4)c4nsnc34)s2)c(F)c1] | 0.72 |
| (92) | 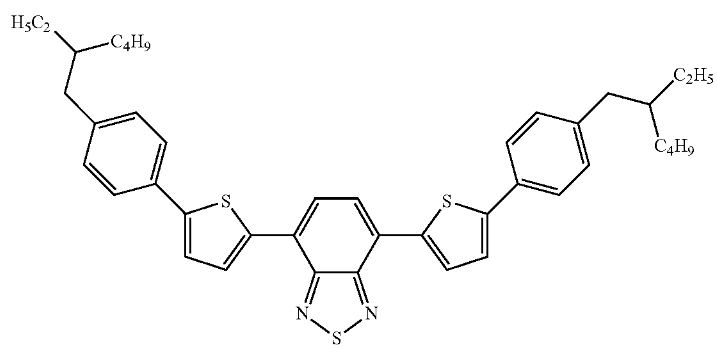 | 0.73 |
| (93) | 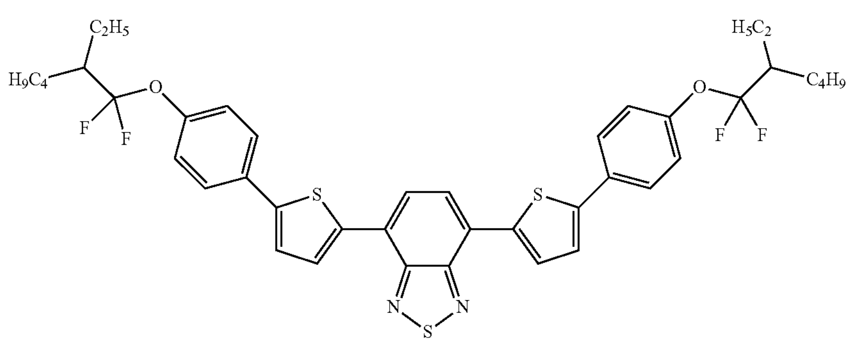 | 0.72 |

-continued
| | Compound | Degree of an-isotropy |
|---|---|---|
| (94) | 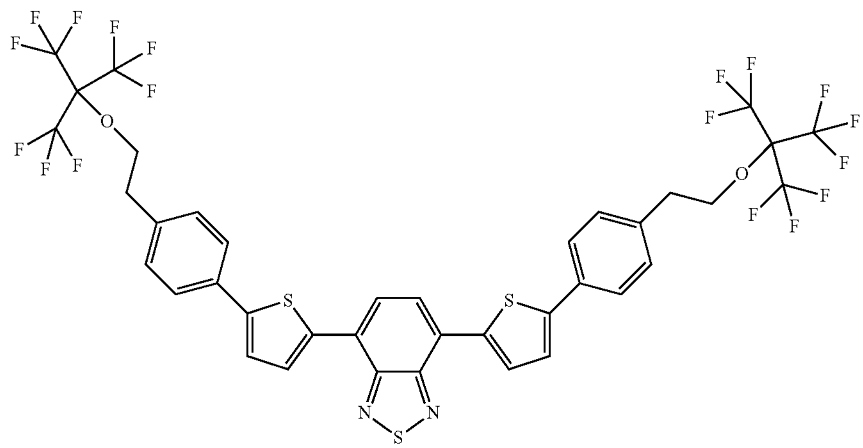 [SMILES: FC(F)(F)C(OCCc1ccc(-c2ccc(-c3ccc(-c4ccc(-c5ccc(CCOC(C(F)(F)F)(C(F)(F)F)C(F)(F)F)cc5)s4)c4nsnc34)s2)cc1)(C(F)(F)F)C(F)(F)F] | |
| (95) | 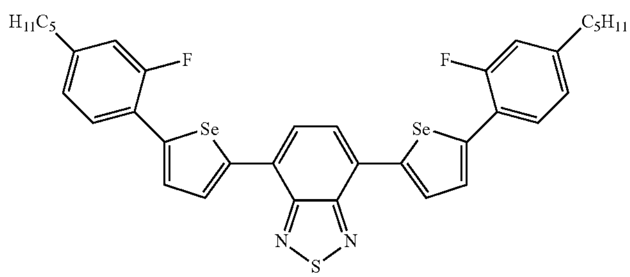 | 0.77 |
| (96) | 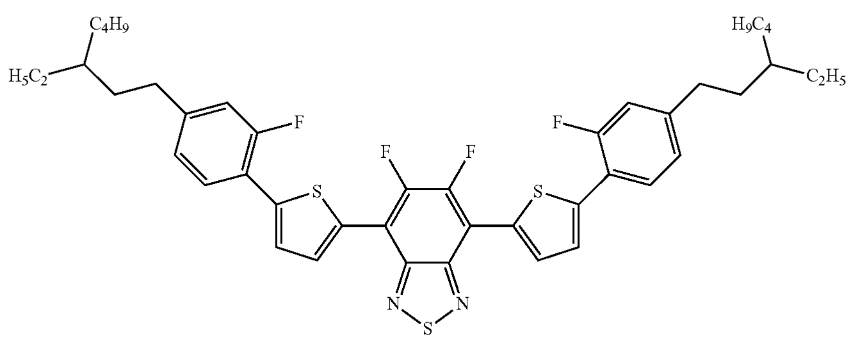 | 0.73 |
| (97) | 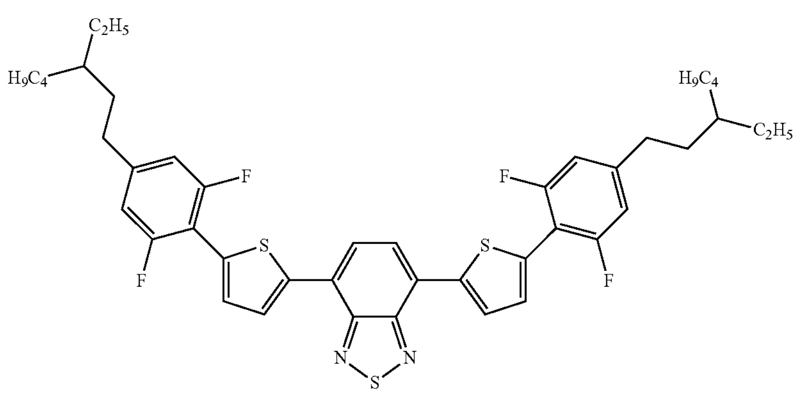 | 0.71 |

-continued
| | Compound | Degree of an-isotropy |
|---|---|---|
| (98) | 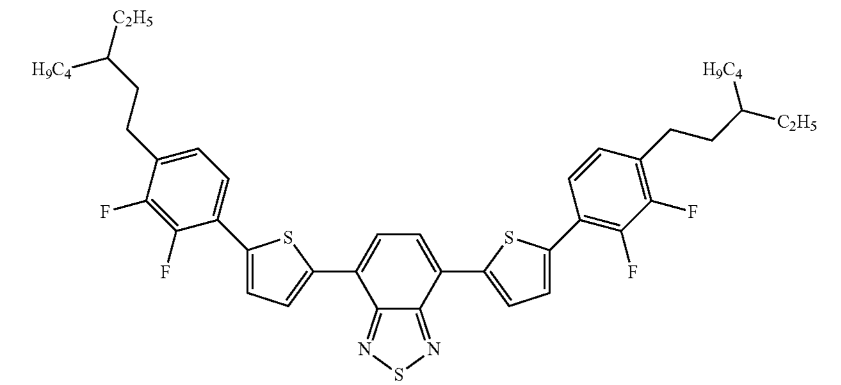 | |
| (99) | 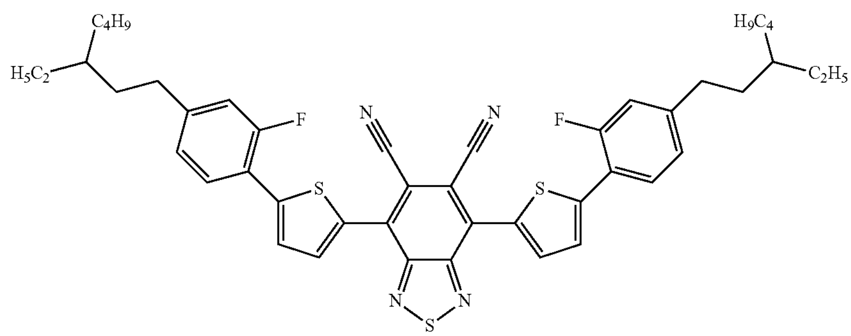 | 0.71 |
| (100) | 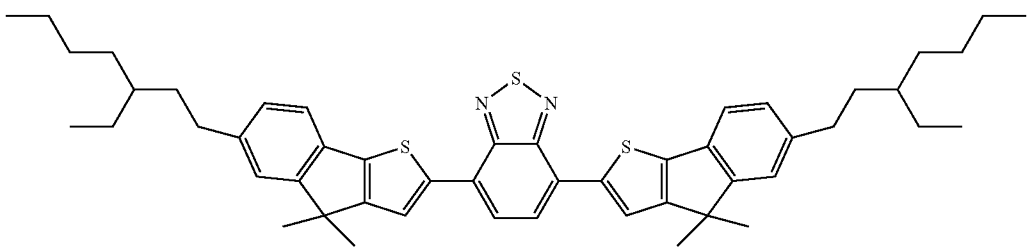 [SMILES: CCCCC(CC)CCc1ccc2c(c1)C(C)(C)c1cc(-c3ccc(-c4cc5c(s4)-c4ccc(CCC(CC)CCCC)cc4C5(C)C)c4nsnc34)sc1-2] | 0.70 |
| (101) | 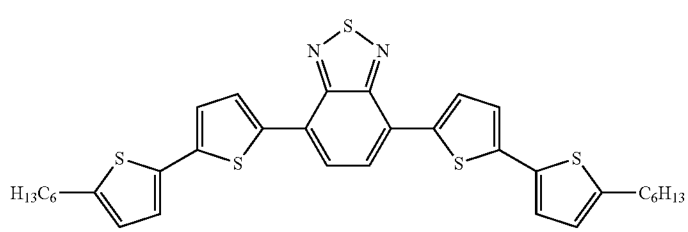 | 0.76 |
| (102) | 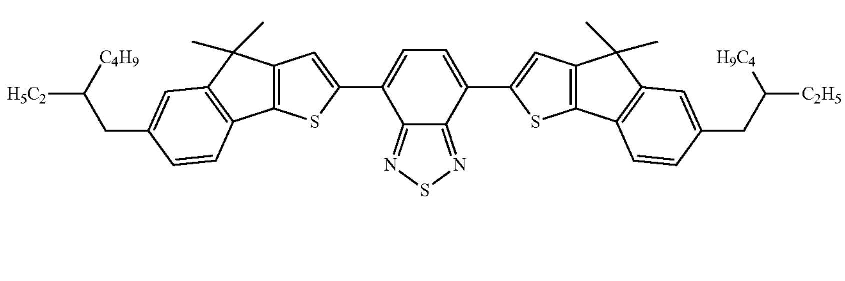 | 0.71 |

-continued
| | Compound | Degree of an-isotropy |
|---|---|---|
| (103) | 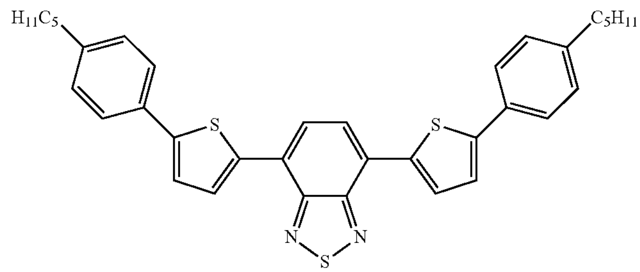 | 0.75 |
| (104) | 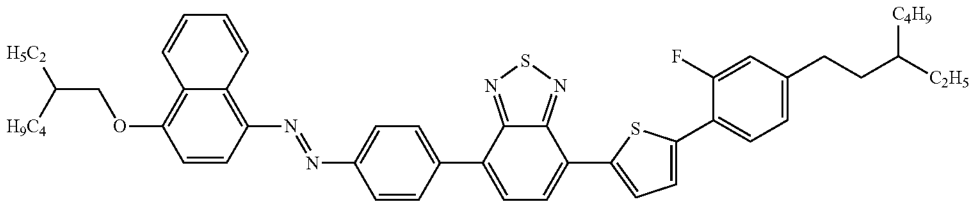 | 0.72 |
| (105) | 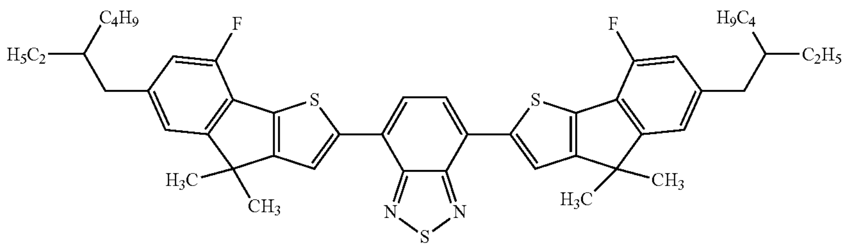 | 0.69 |
| (106) | 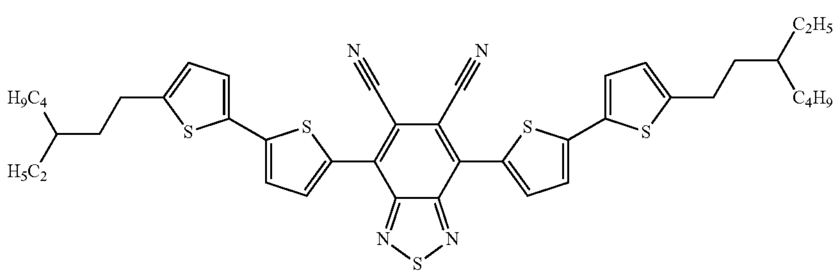 | 0.73 |
| (107) | 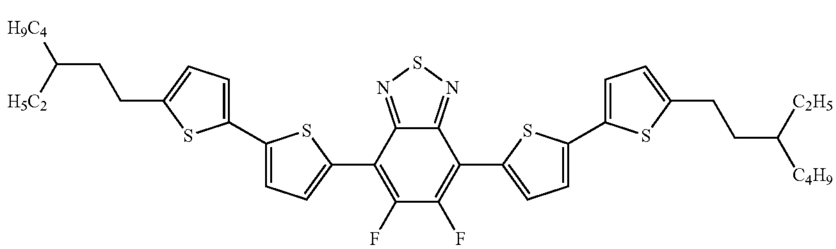 | 0.75 |
| (108) | 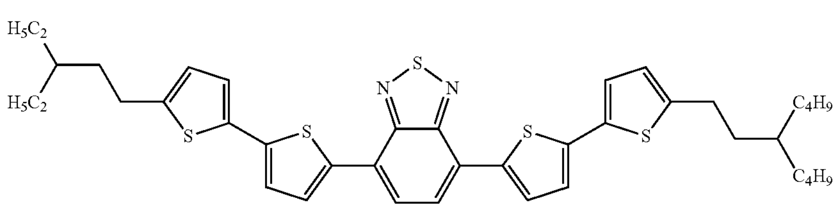 | 0.73 |

-continued
| | Compound | Degree of anisotropy |
|---|---|---|
| (109) | 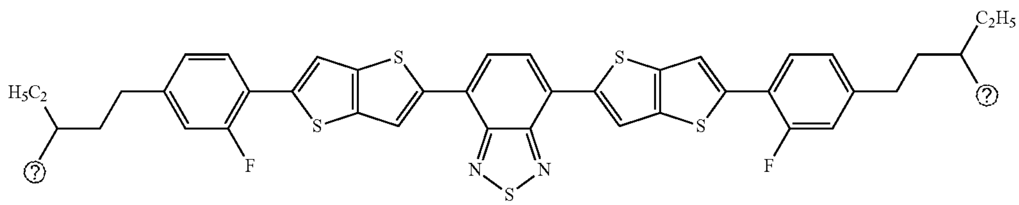 | 0.81 |
| (110) | 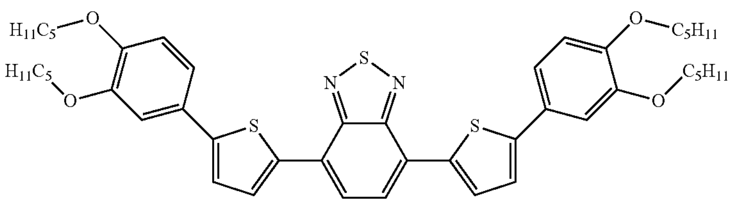 | 0.73 |
| (111) | 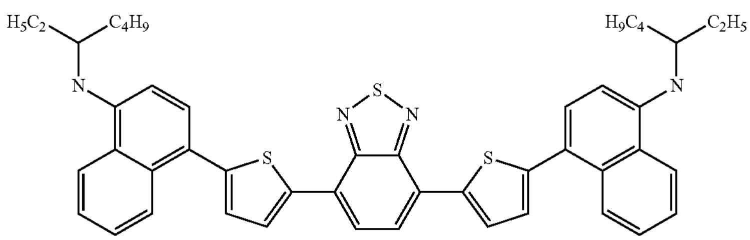 | 0.69 |
| (112) | 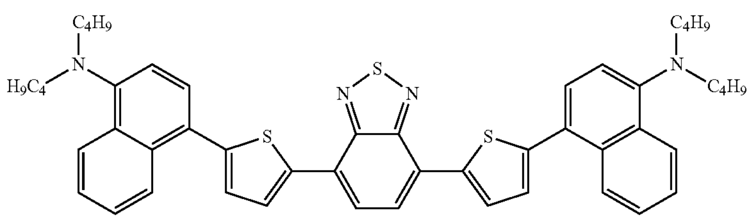 | 0.69 |
| (113) | 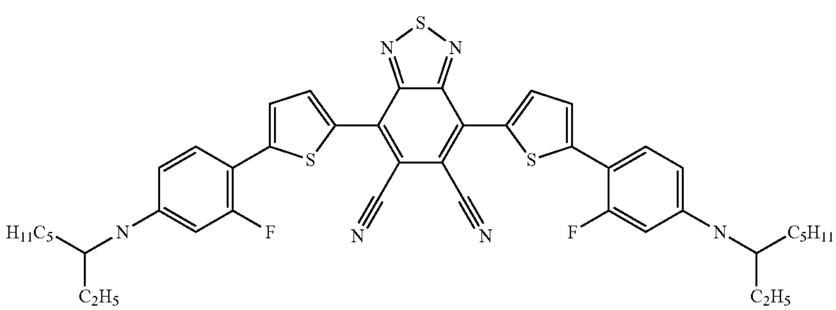 | 0.71 |
| (114) | 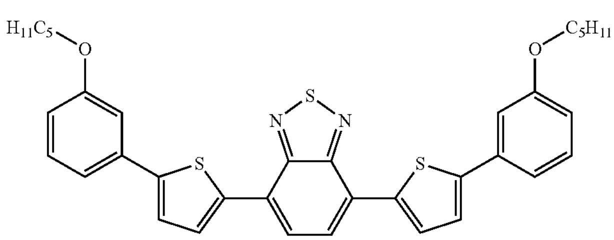 | 0.69 |

-continued
| | Compound | Degree of an-isotropy |
|---|---|---|
| (115) | 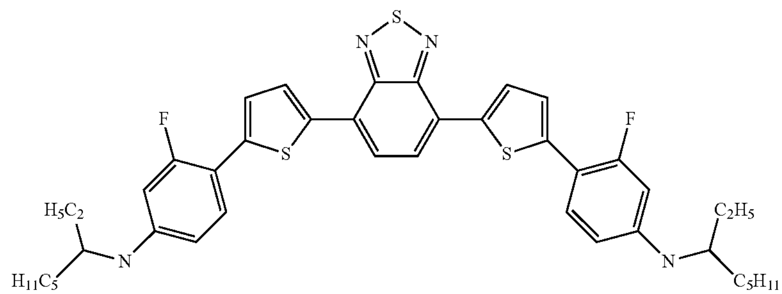 | 0.73 |
| (116) | 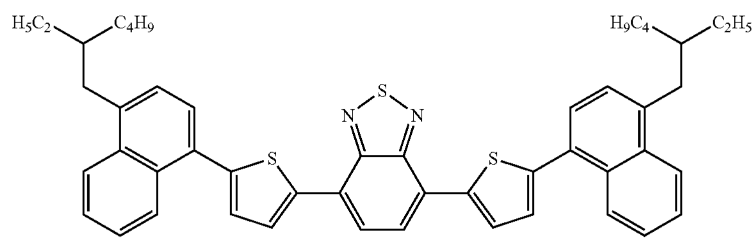 | 0.72 |
| (117) | 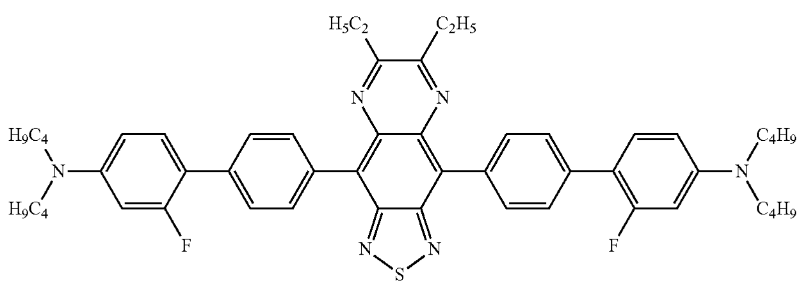 | 0.77 |
| (118) | 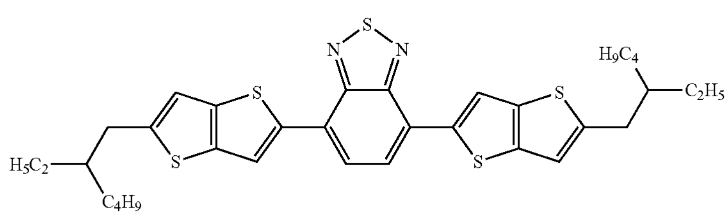 | 0.75 |
| (119) | 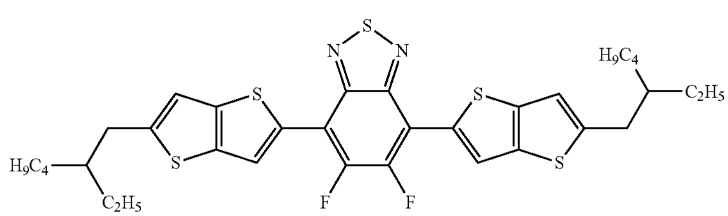 | 0.76 |
| (120) | 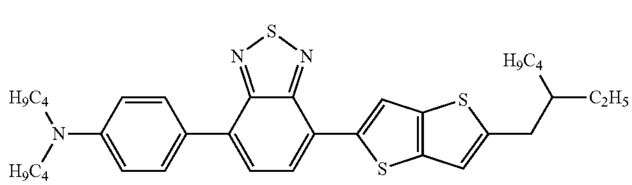 | 0.71 |

-continued
| | Compound | Degree of an-isotropy |
|---|---|---|
| (121) | 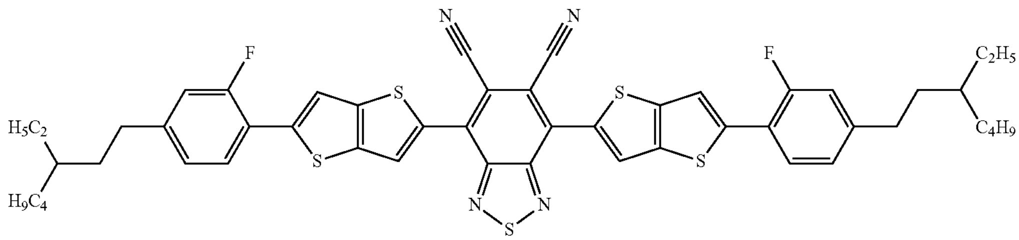 | |
| (122) | 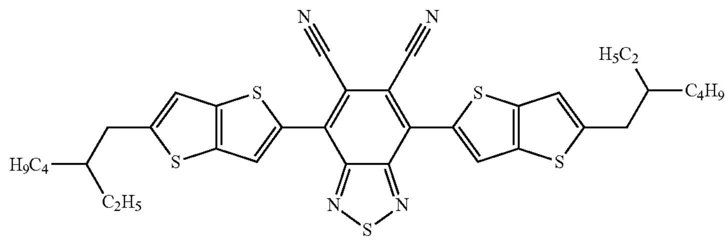 | 0.71 |
| (123) | 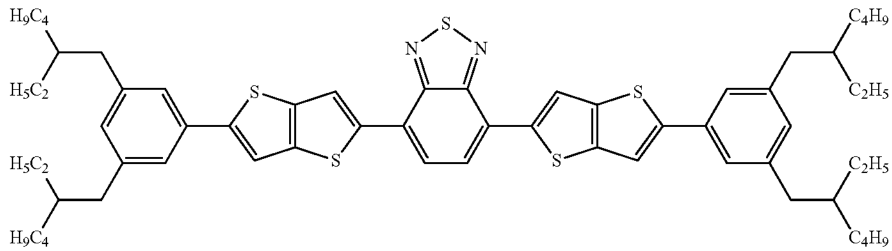 | 0.73 |
| (124) | 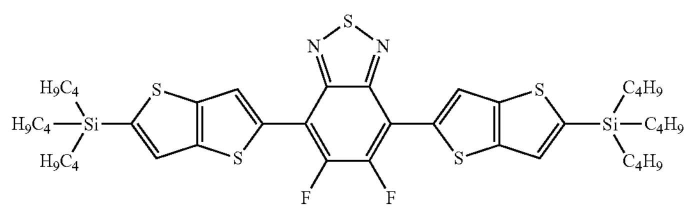 | 0.67 |
| (125) | 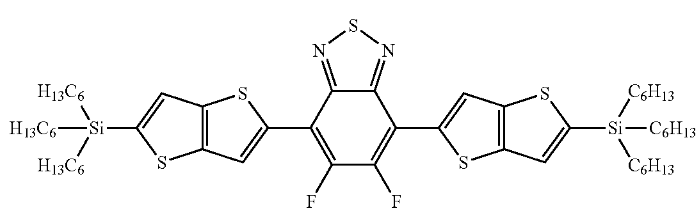 | 0.65 |
| (126) | 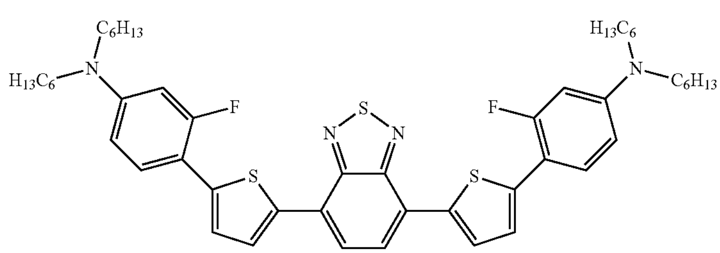 | 0.71 |

-continued
| | Compound | Degree of an-isotropy |
|---|---|---|
| (127) | 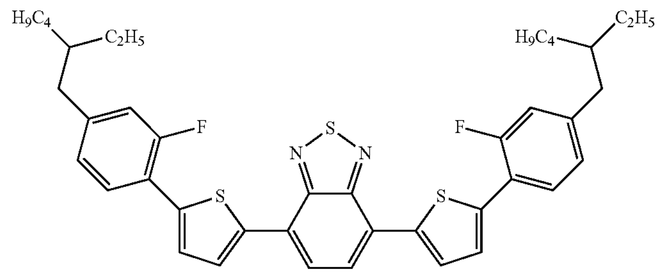 | 0.72 |
| (128) | 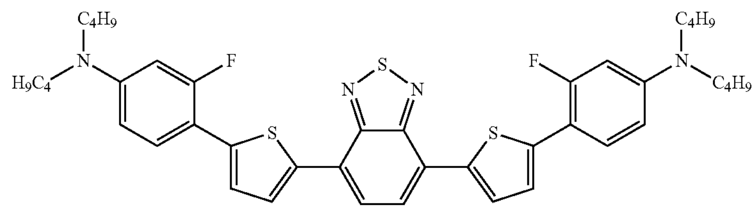 | 0.71 |
| (129) | 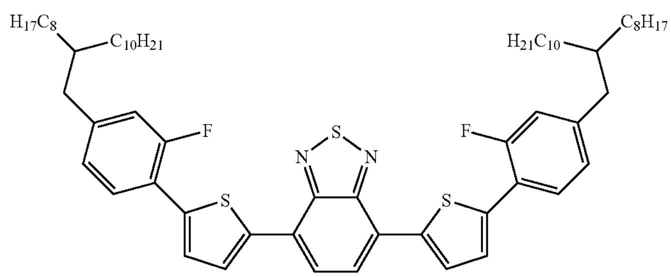 | 0.71 |
| (130) | 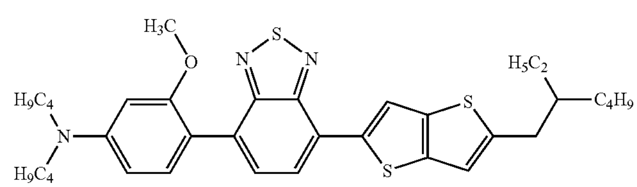 | |
| (131) | 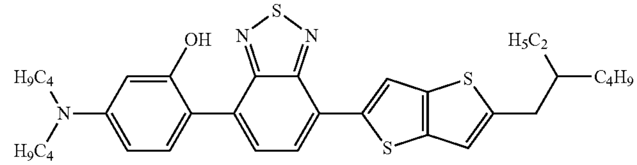 | 0.69 |
| (132) | 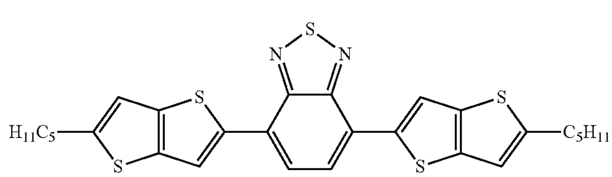 | |
| (133) | 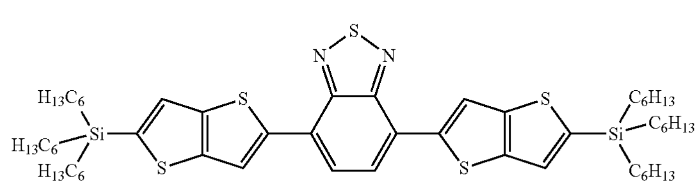 | 0.67 |

-continued
| | Compound | Degree of an-isotropy |
|---|---|---|
| (134) | 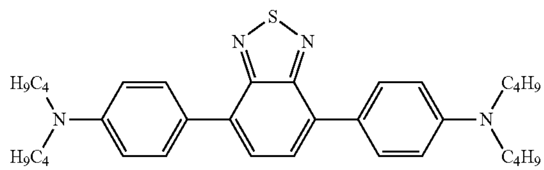 | 0.63 |
| (135) | 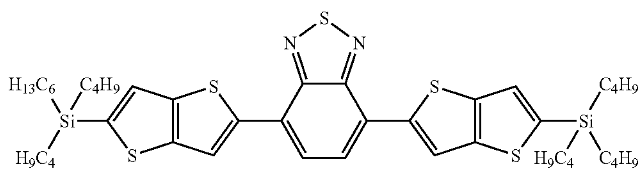 | 0.67 |
| (136) | 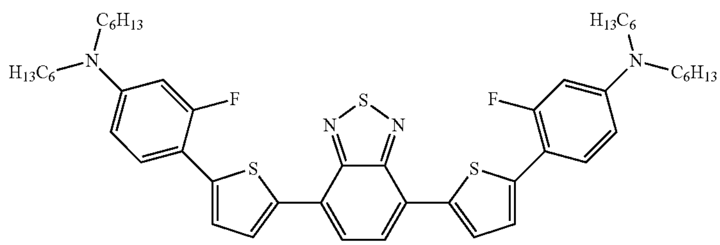 | 0.71 |
| (137) | 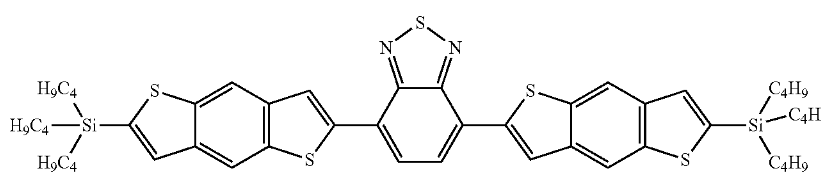 | 0.75 |
| (138) | 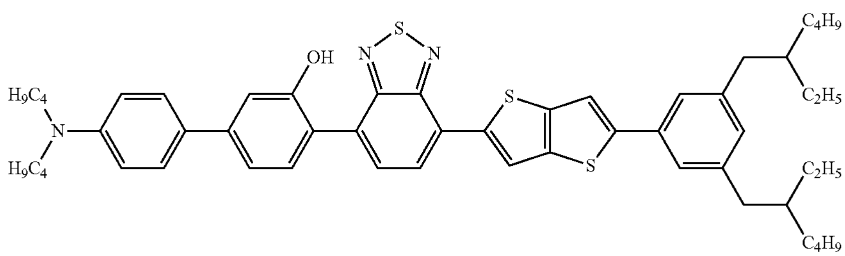 | 0.75 |
| (139) | 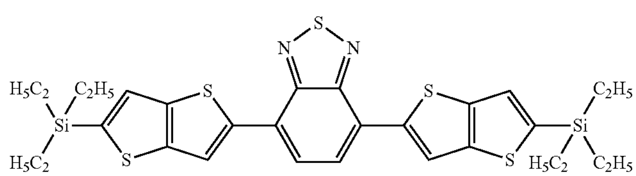 | 0.72 |
| (140) | 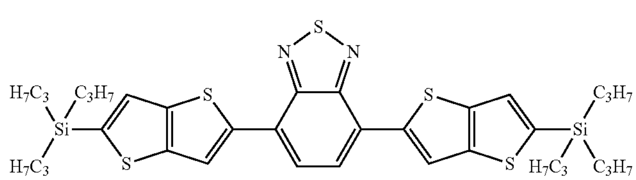 | 0.68 |

-continued
| | Compound | Degree of an-isotropy |
|---|---|---|
| (141) | 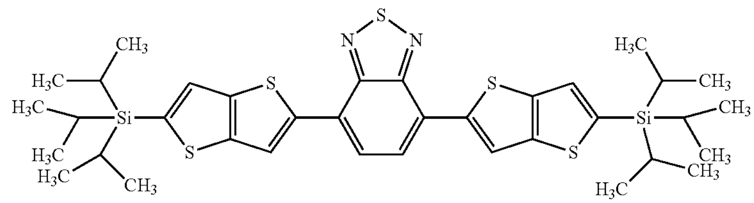 [SMILES: CC(C)[Si](c1cc2sc(-c3ccc(-c4cc5sc([Si](C(C)C)(C(C)C)C(C)C)cc5s4)c4nsnc34)cc2s1)(C(C)C)C(C)C] | 0.66 |
| (142) | 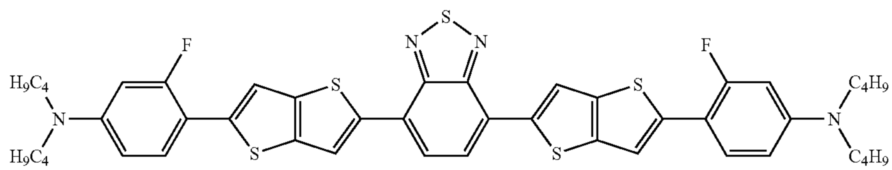 | 0.80 |
| (143) | 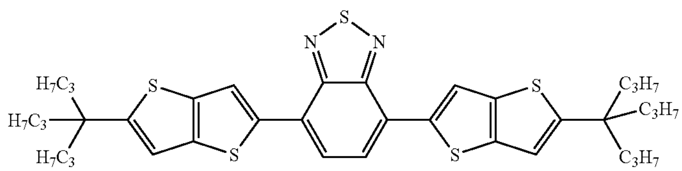 | 0.66 |
| (144) | 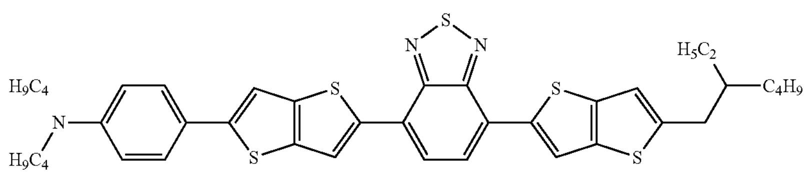 | 0.77 |
| (145) | 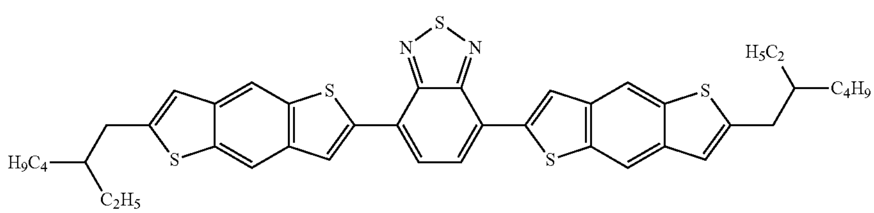 | 0.79 |
| (146) | 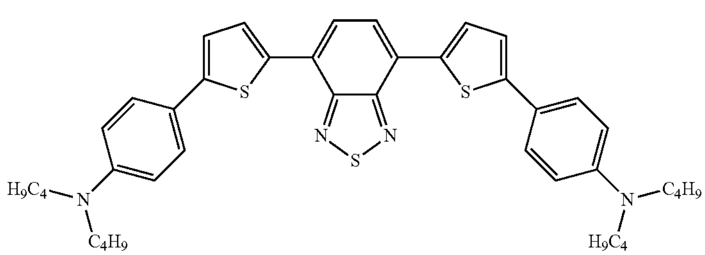 | 0.73 |
| (147) | 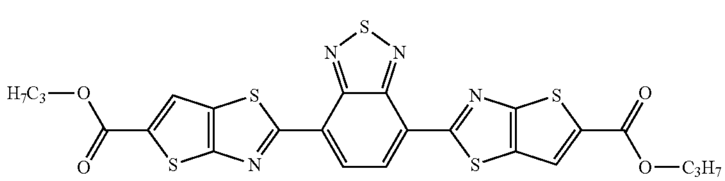 | |

-continued
| | Compound | Degree of an-isotropy |
|---|---|---|
| (148) | 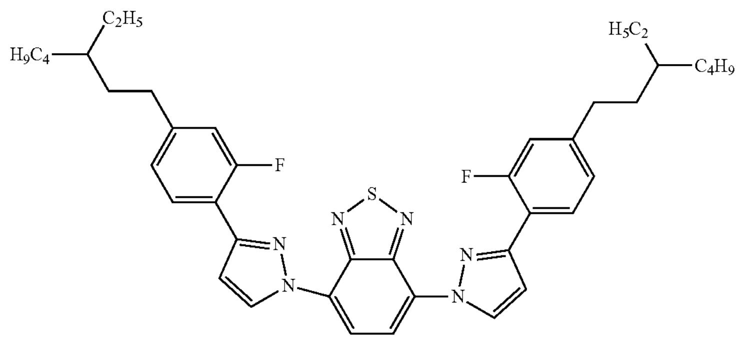 | 0.48 |
| (149) | 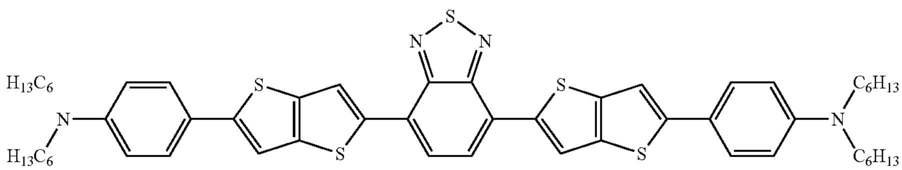 | 0.81 |
| (150) | 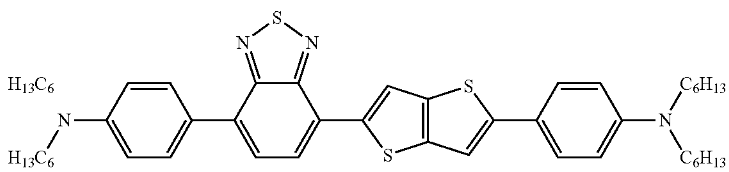 | 0.77 |
| (151) | 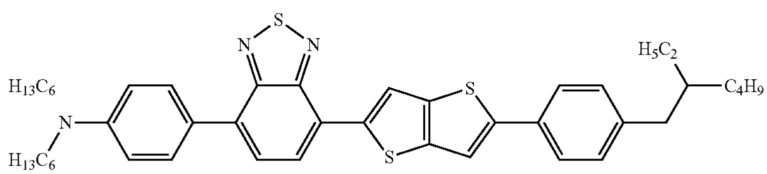 | 0.78 |
| (152) | 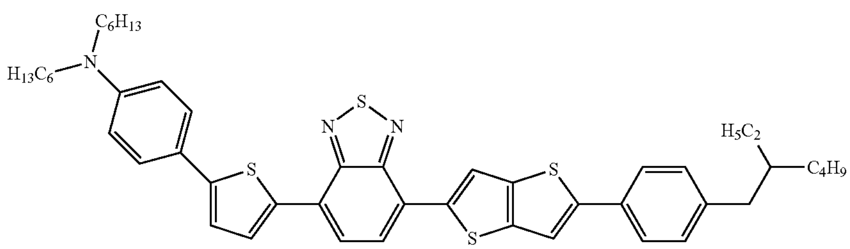 | 0.78 |
| (153) | 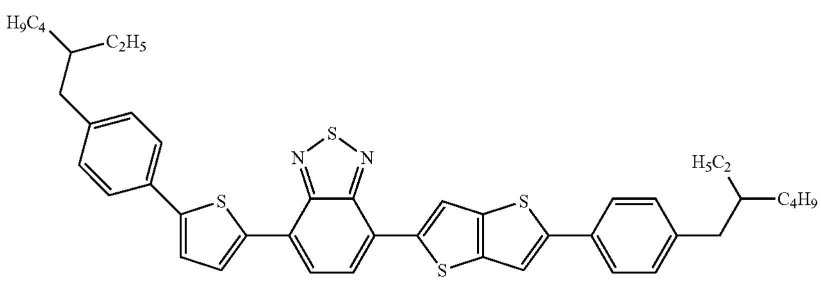 | |
| (154) | 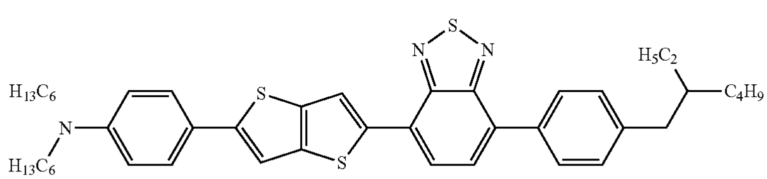 | 0.78 |

-continued
| | Compound | Degree of an-isotropy |
|---|---|---|
| (155) | 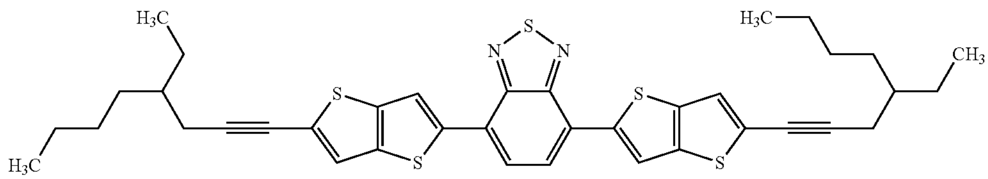 | 0.77 |
| (156) | 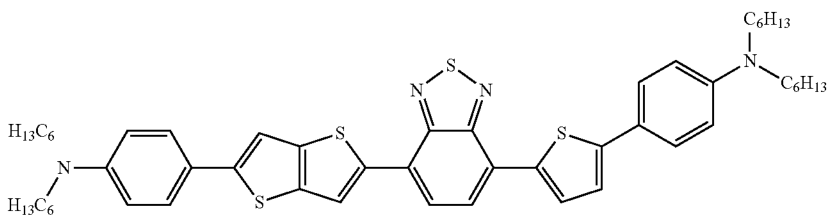 | 0.78 |
| (157) | 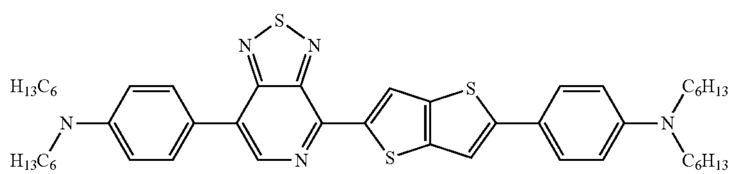 | 0.78 |
| (158) | 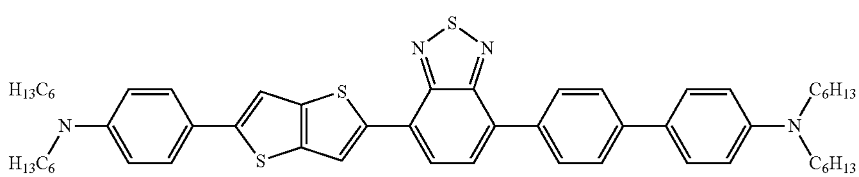 | 0.80 |
| (159) | 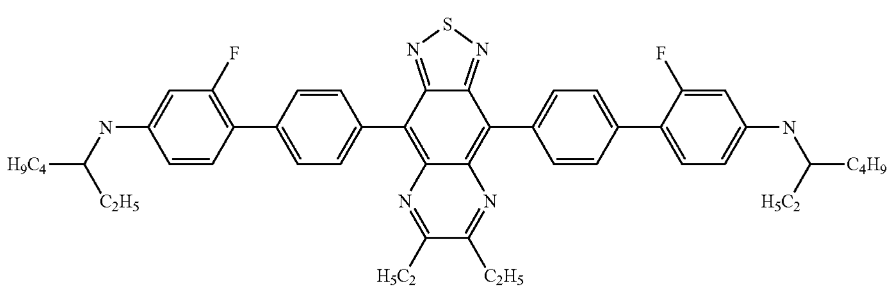 | 0.75 |
| (160) | 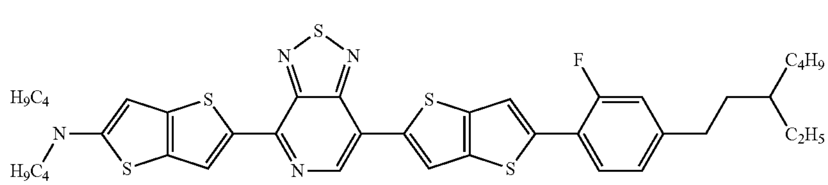 | 0.77 |
| (161) | 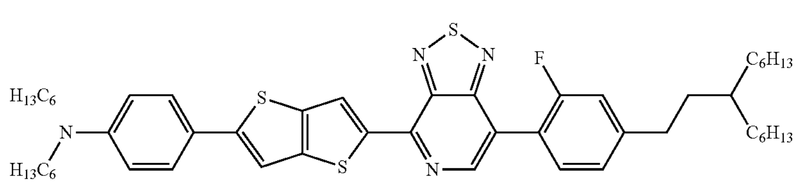 | 0.77 |

-continued
| | Compound | Degree of anisotropy |
|---|---|---|
| (162) | 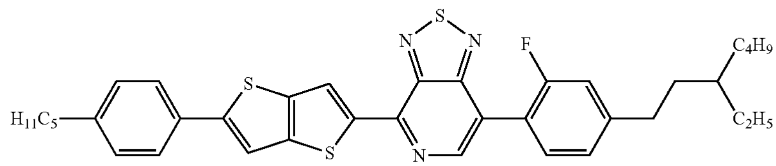 | 0.78 |
| (163) | 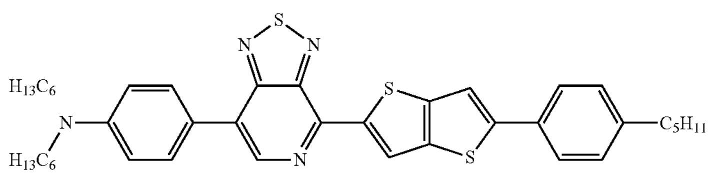 | 0.78 |
| (164) | 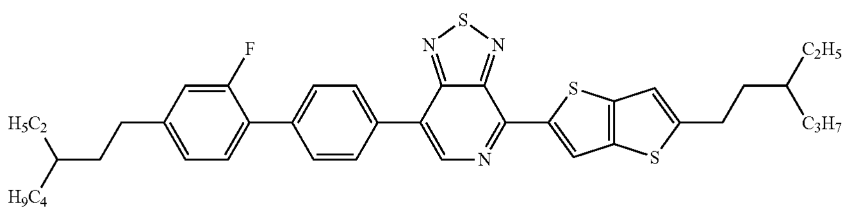 | |
| (165) | 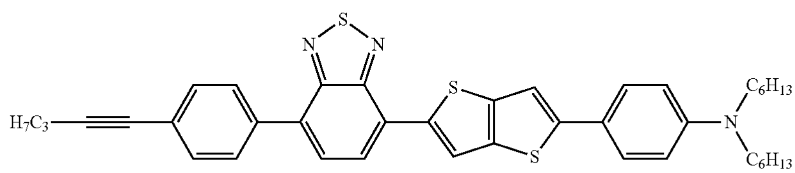 | |
| (166) | 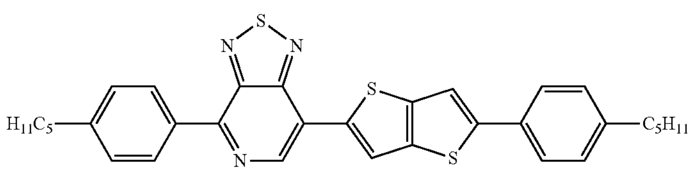 | |
| (167) | 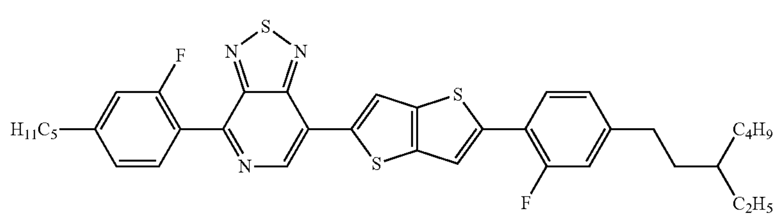 | |
| (168) | 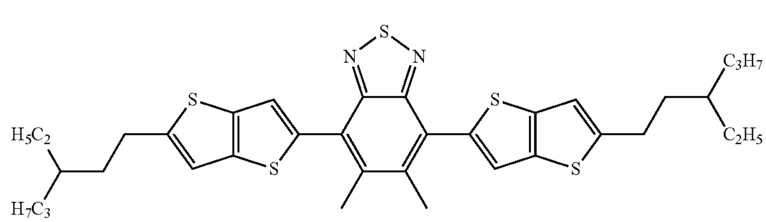 | |

-continued
| | Compound | Degree of anisotropy |
|---|---|---|
| (169) | 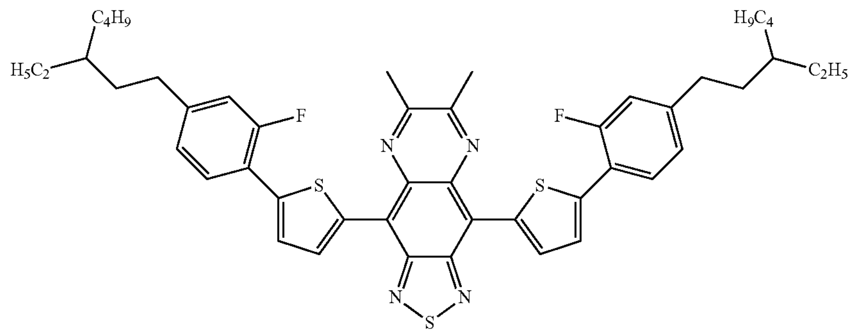 | 0.69 |
| (170) | 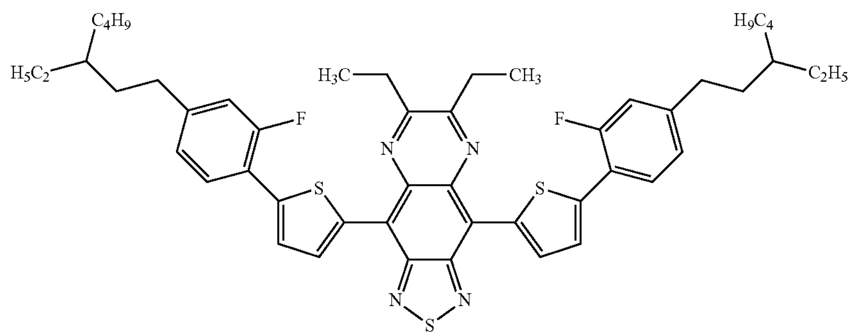 | 0.71 |
| (171) | 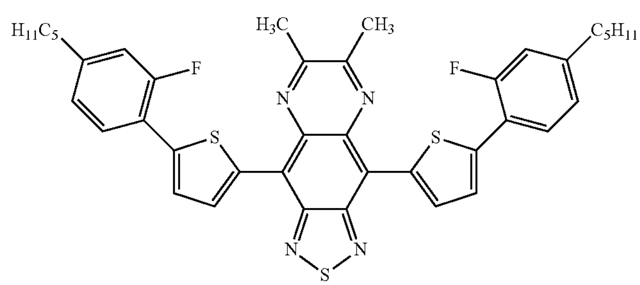 | 0.71 |
| (172) | 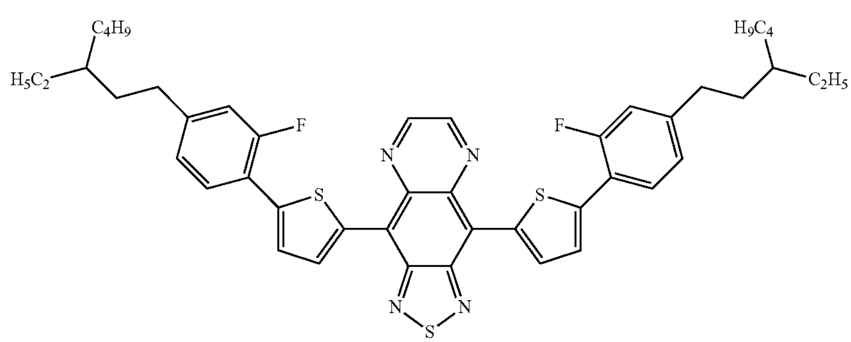 | 0.70 |

-continued
| | Compound | Degree of an-isotropy |
|---|---|---|
| (173) | 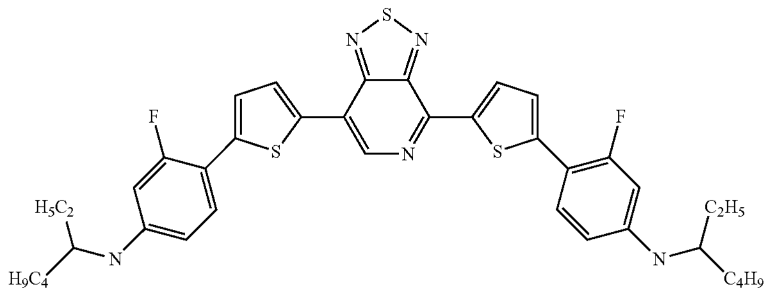 | 0.71 |
| (174) | 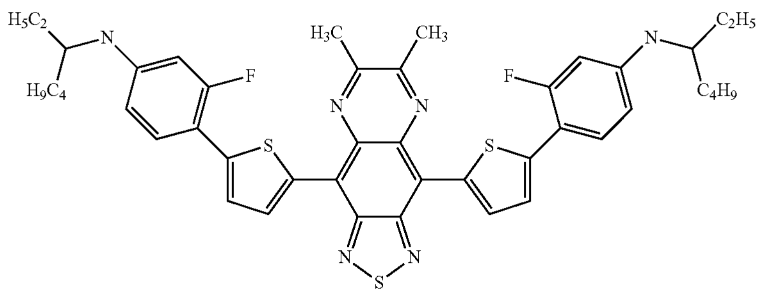 | 0.67 |
| (175) | 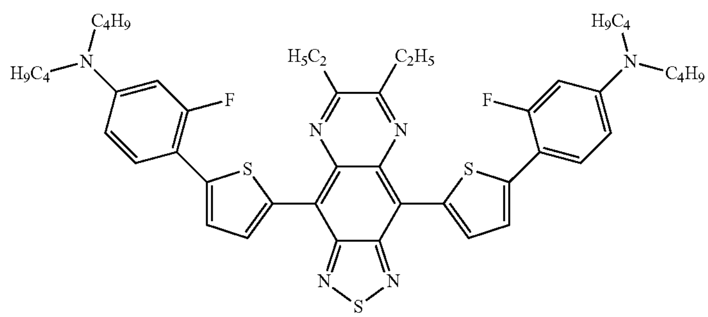 | 0.66 |
| (176) | 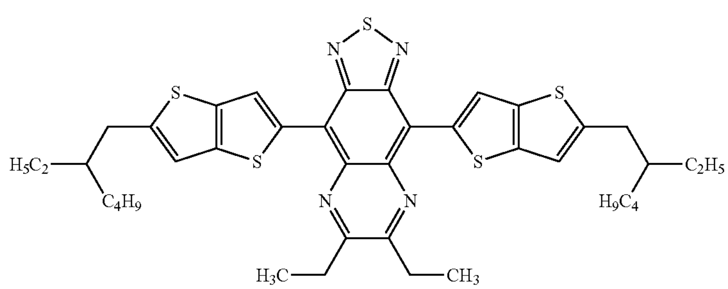 | 0.69 |
| (177) | 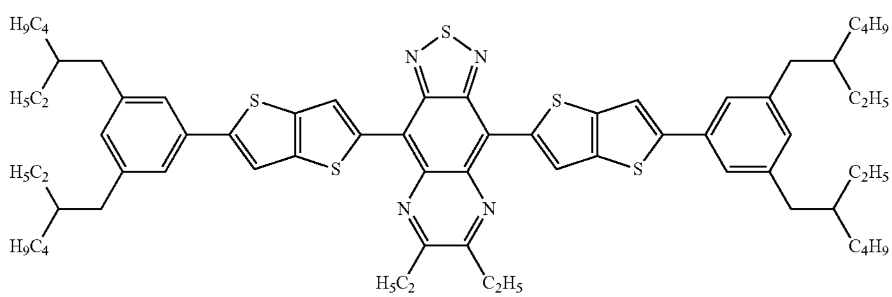 | 0.62 |

-continued
| | Compound | Degree of an-isotropy |
|---|---|---|
| (178) | 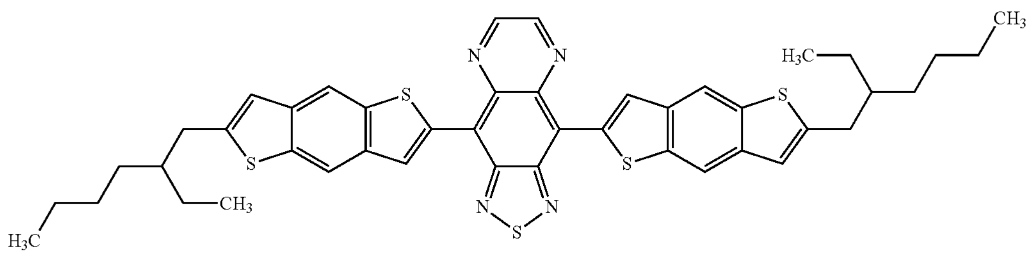 [SMILES: CCCCC(CC)Cc1cc2cc3sc(-c4c5nccnc5c(-c5cc6cc7sc(CC(CC)CCCC)cc7cc6s5)c5nsnc45)cc3cc2s1] | |
| (179) | 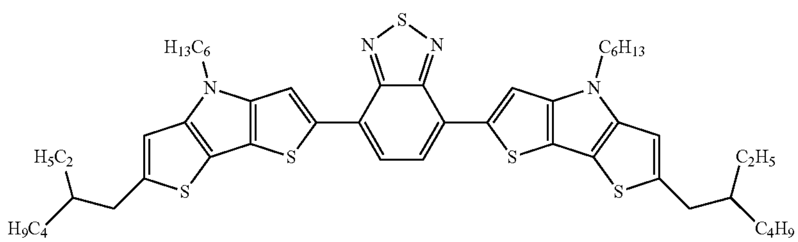 | 0.67 |
| (180) | 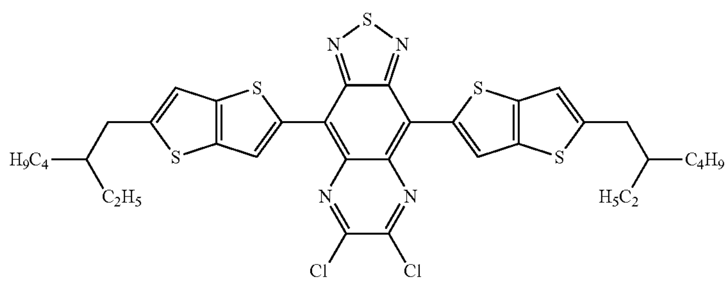 | |
| (181) | 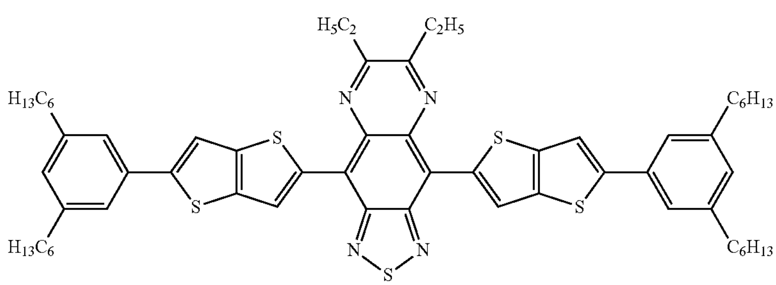 | |
| (182) | 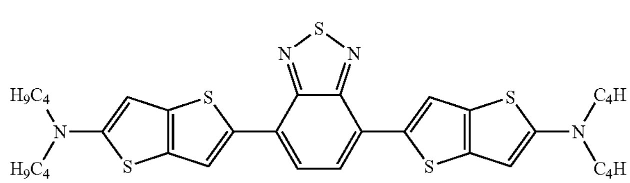 | 0.71 |
| (183) | 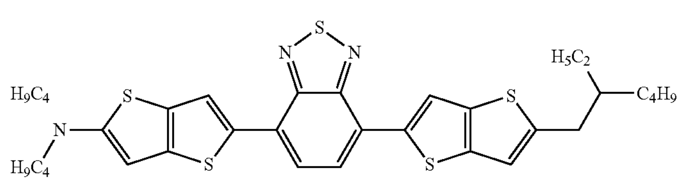 | 0.72 |

-continued
| | Compound | Degree of an-isotropy |
|---|---|---|
| (184) | 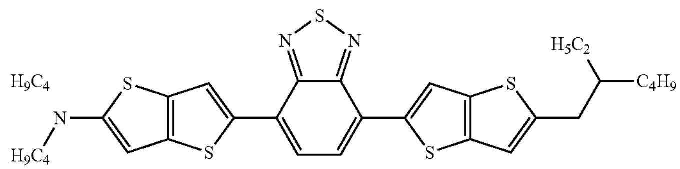 | 0.59 |
| (185) | 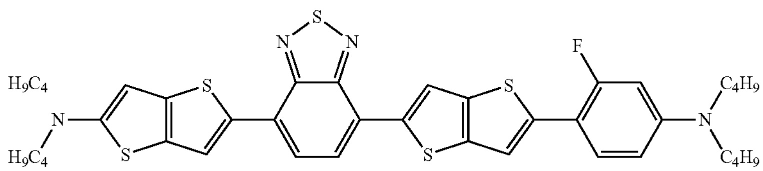 | 0.77 |
| (186) | 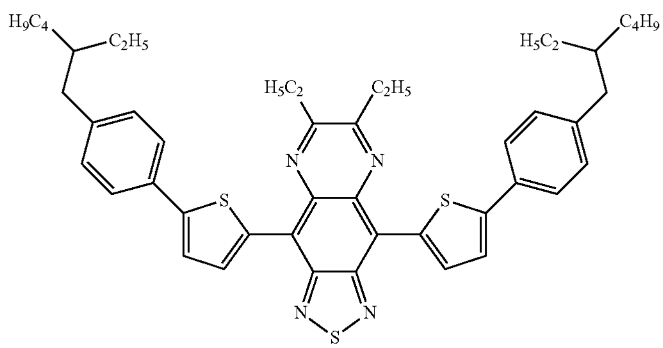 | 0.72 |
| (187) | 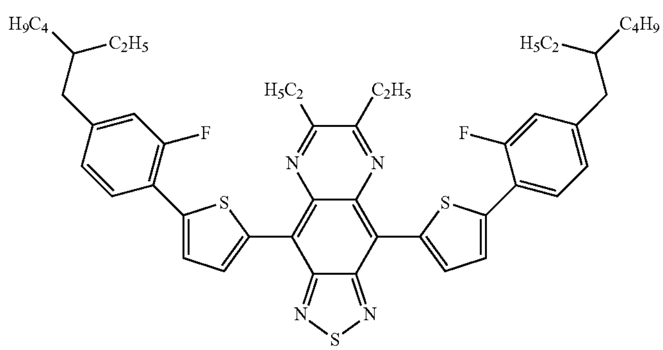 | 0.72 |
| (188) | 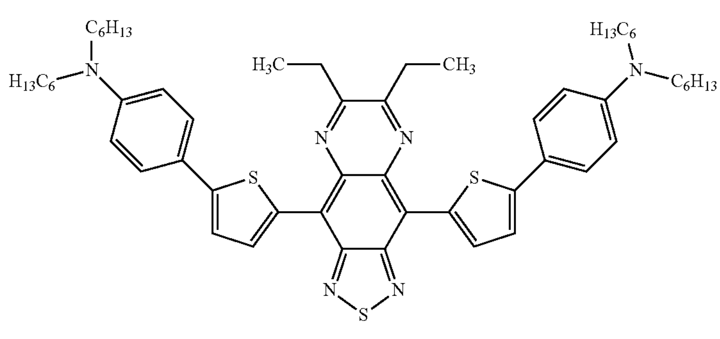 | 0.66 |

-continued
| | Compound | Degree of an-isotropy |
|---|---|---|
| (189) | 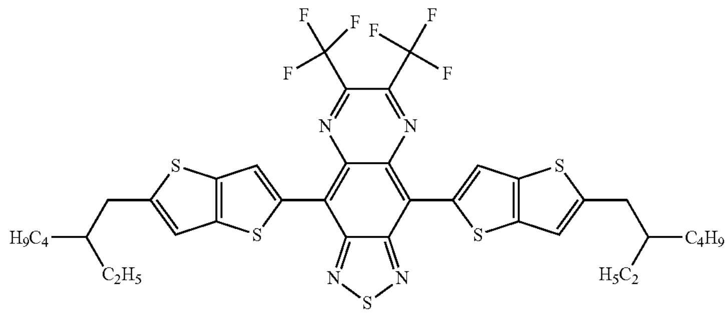 | 0.70 |
| (190) | 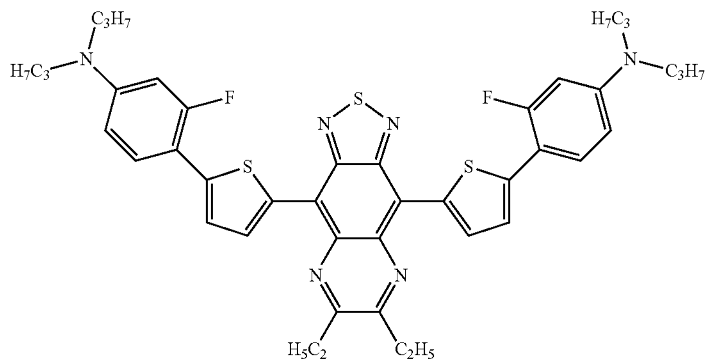 | 0.68 |
| (191) | 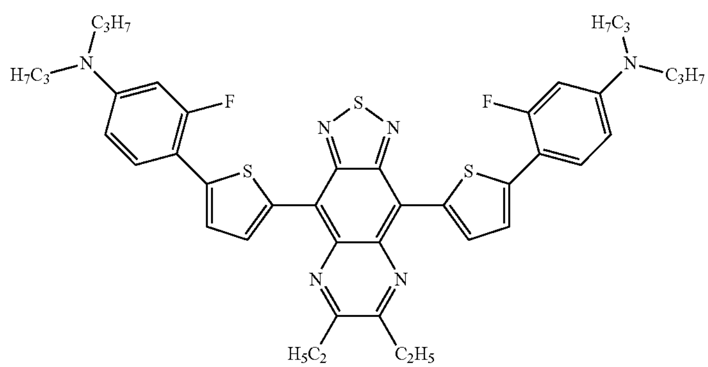 | 0.71 |
| (192) | 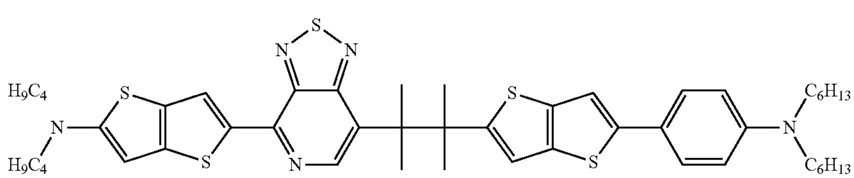 | 0.78 |
| (193) | 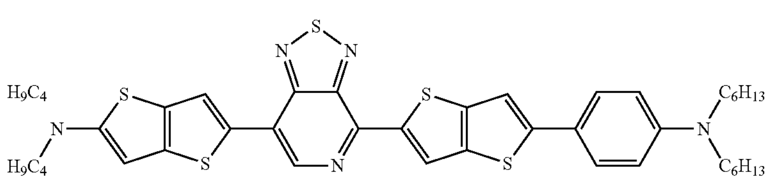 | 0.79 |
| (194) | 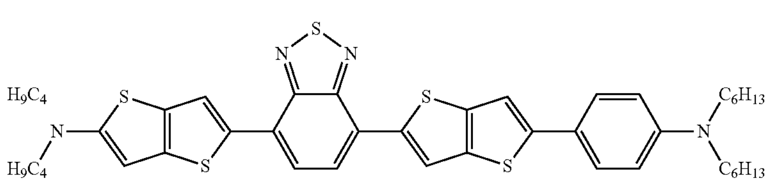 | 0.79 |

-continued
| | Compound | Degree of an-isotropy |
|---|---|---|
| (195) | 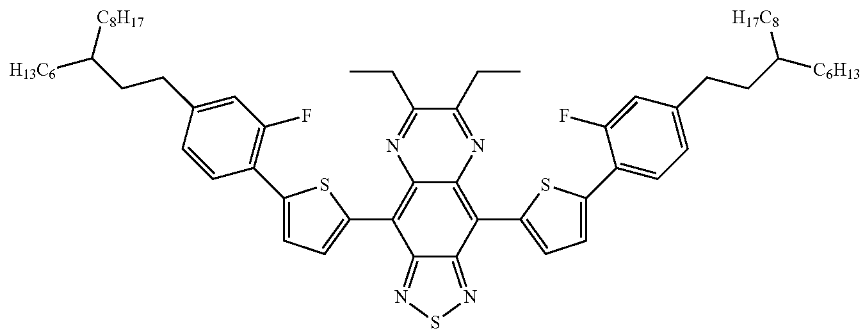 | 0.69 |
| (196) | 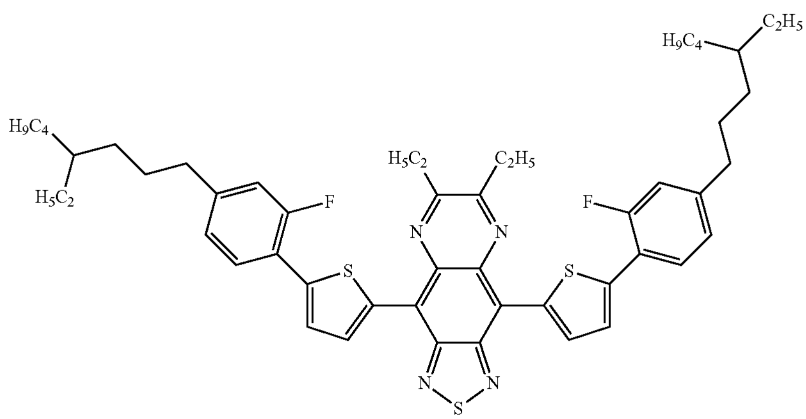 | 0.73 |
| (197) | 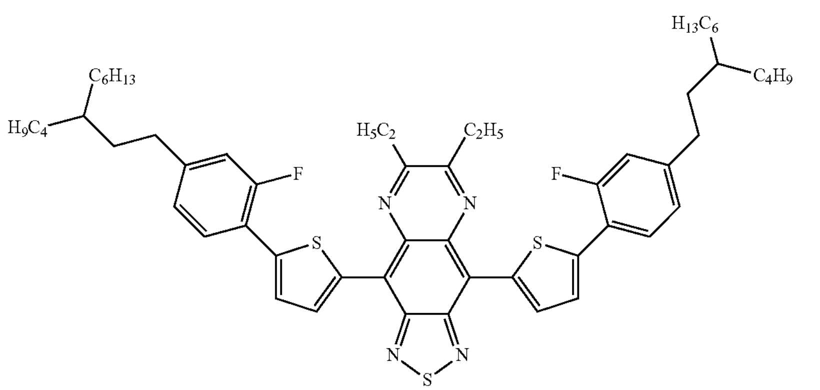 | 0.70 |
| (198) | 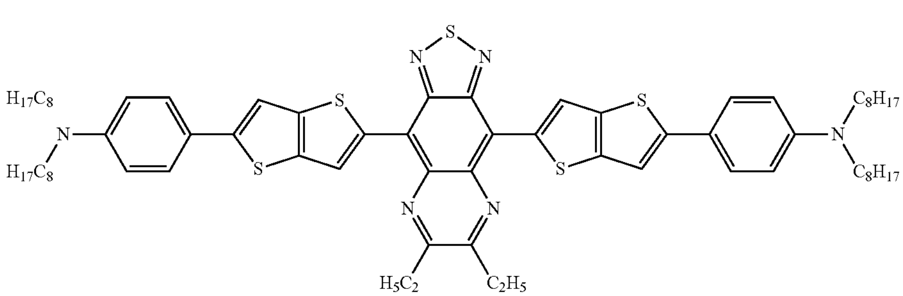 | 0.77 |

-continued
| | Compound | Degree of anisotropy |
|---|---|---|
| (199) | 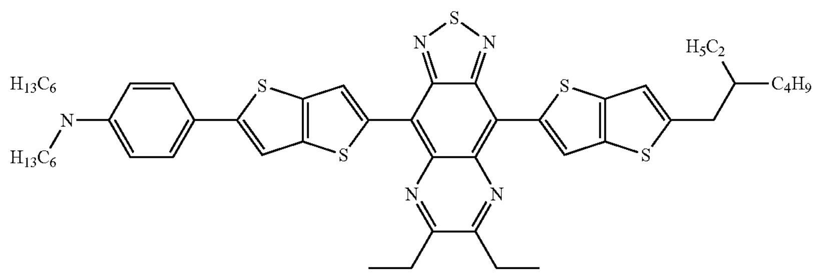 | 0.76 |
| (200) | 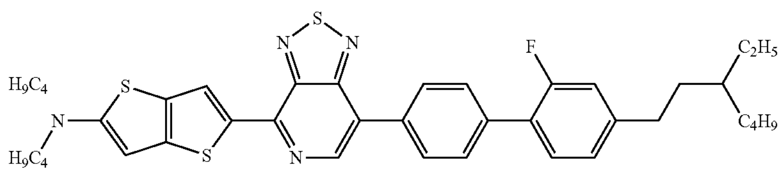 | 0.74 |
| (201) | 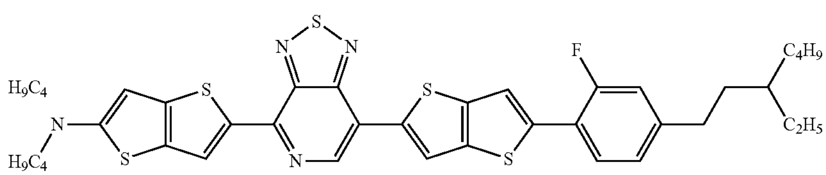 | 0.77 |
| (202) | 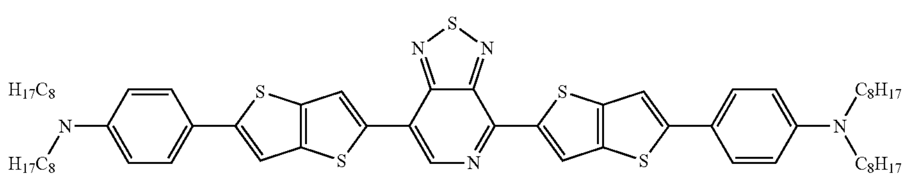 | 0.81 |
| (203) | 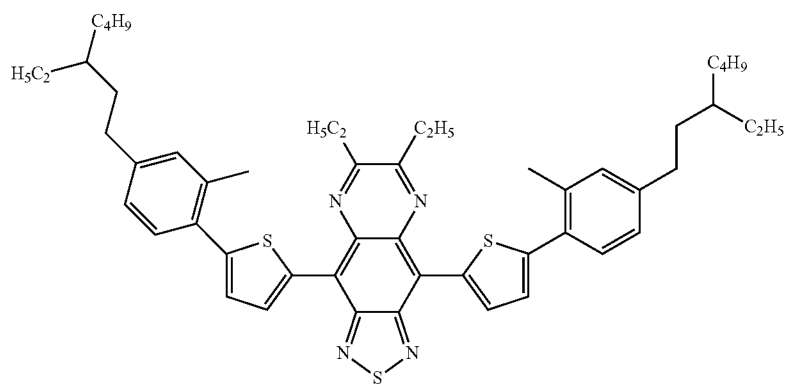 | 0.71 |
| (204) | 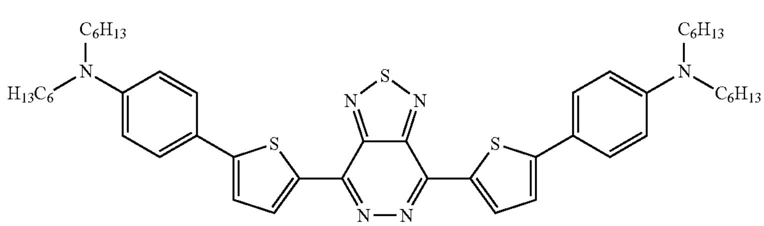 | 0.70 |

-continued
| | Compound | Degree of an-isotropy |
|---|---|---|
| (205) | 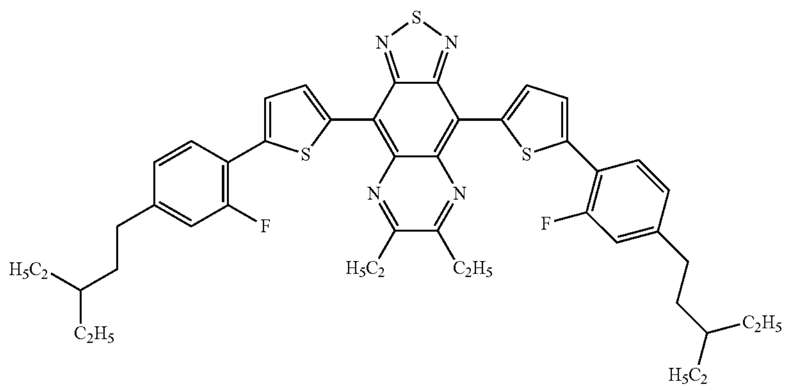 | |
| (206) | 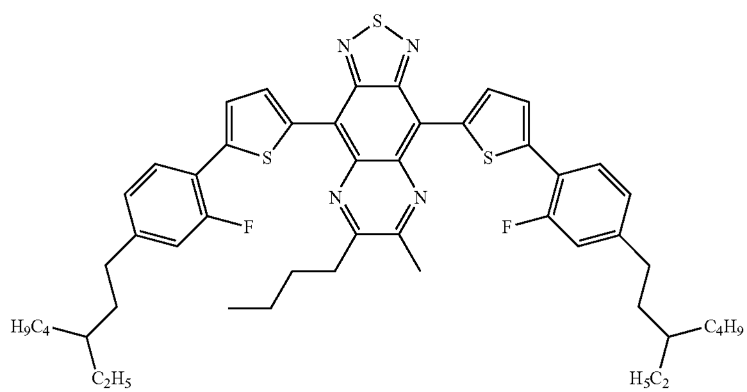 | |
| (207) | 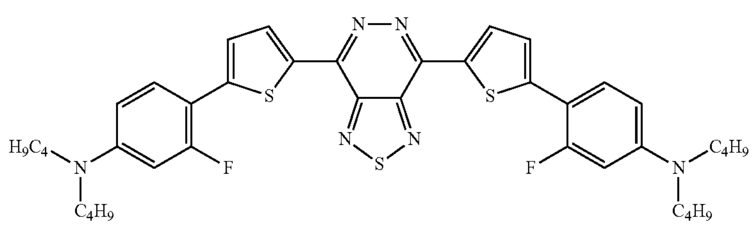 | 0.69 |
| (208) | 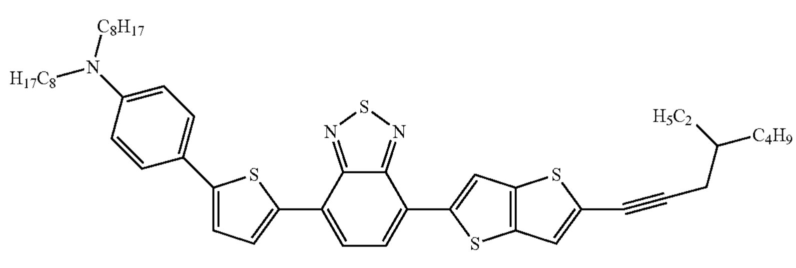 | |
| (209) | 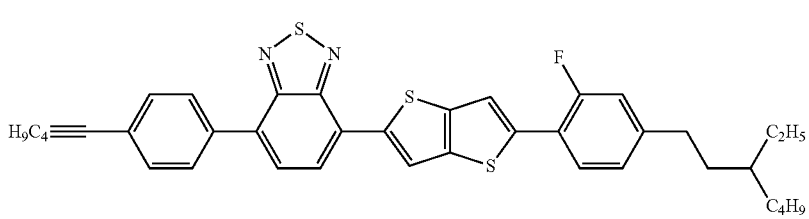 | |

-continued
| Compound | Degree of an-isotropy |
| --- | --- |
| (210) 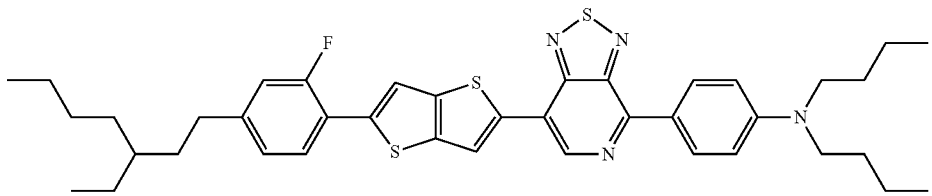 [SMILES: CCCCC(CC)CCc1ccc(-c2cc3sc(-c4cnc(-c5ccc(N(CCCC)CCCC)cc5)c5nsnc45)cc3s2)c(F)c1] | |
| (211) 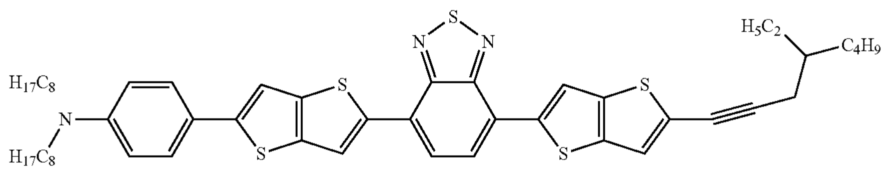 | 0.79 |
| (212) 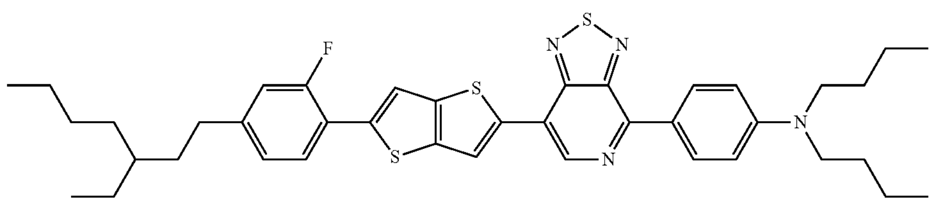 [SMILES: CCCCC(CC)CCc1ccc(-c2cc3sc(-c4cnc(-c5ccc(N(CCCC)CCCC)cc5)c5nsnc45)cc3s2)c(F)c1] | 0.74 |
| (213) 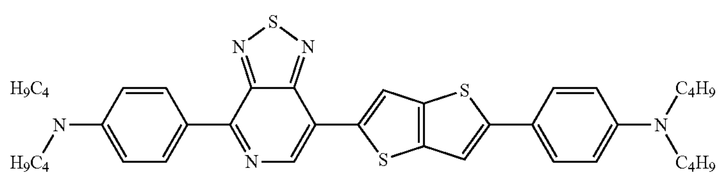 | 0.75 |
| (214) 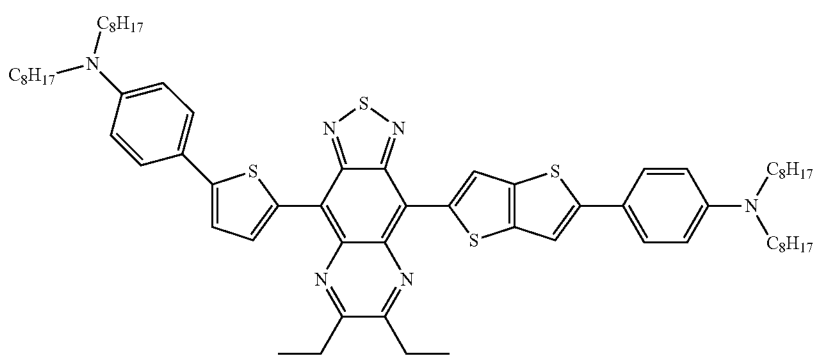 | |
| (215) 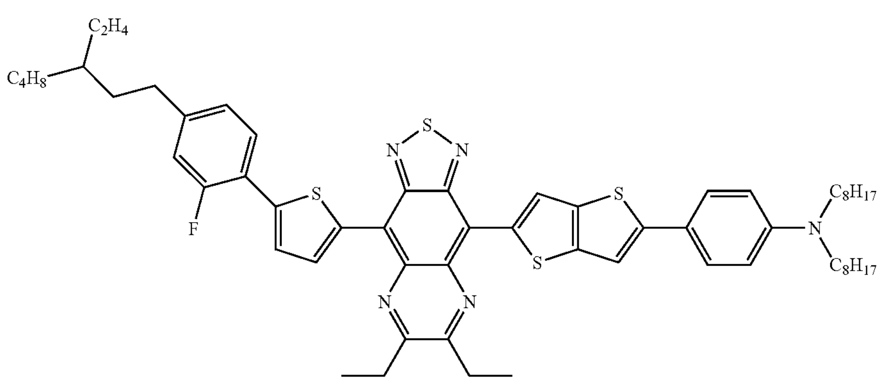 | |

-continued
| | Compound | Degree of an-isotropy |
|---|---|---|
| (216) | 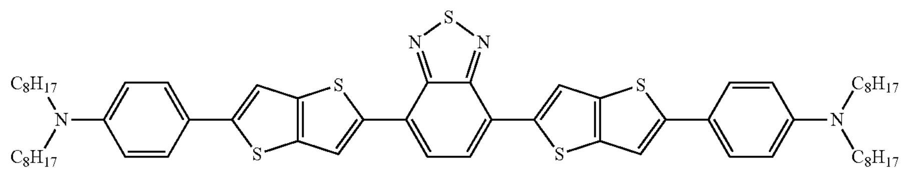 | |
| (217) | 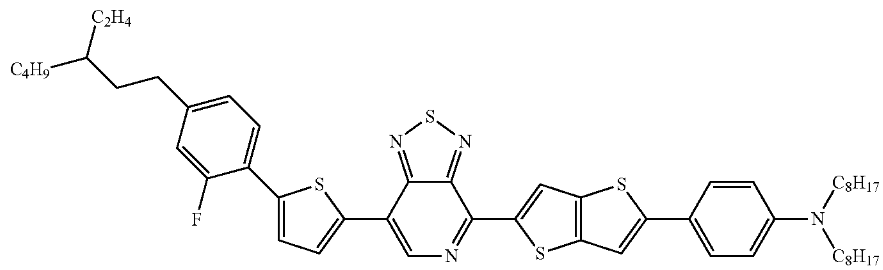 | |
| (218) | 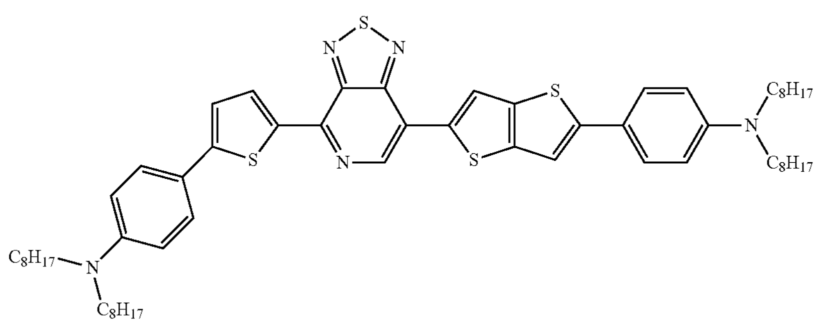 | |
| (219) | 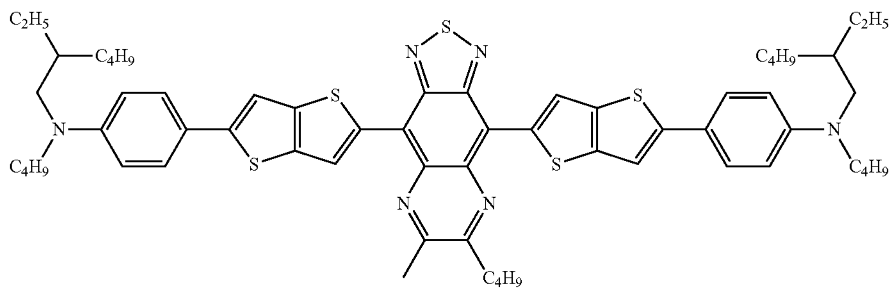 | |
| (220) | 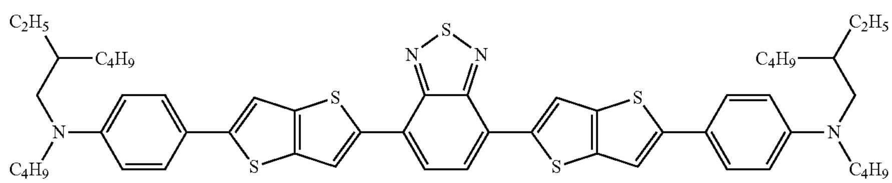 | |
| (221) | 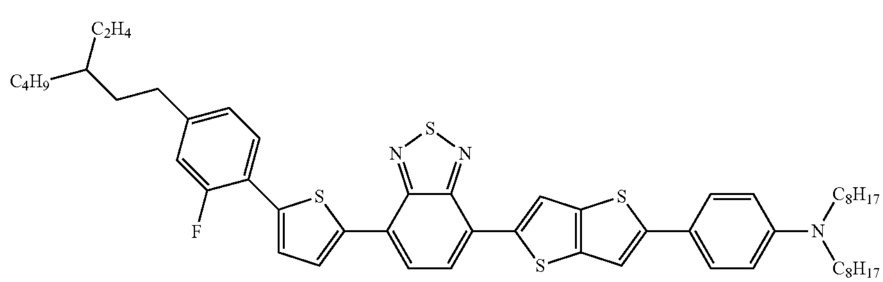 | |

-continued
| | Compound | Degree of an-isotropy |
|---|---|---|
| (222) | 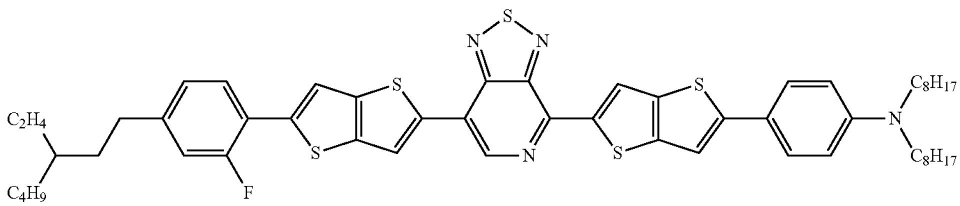 | |
| (223) | 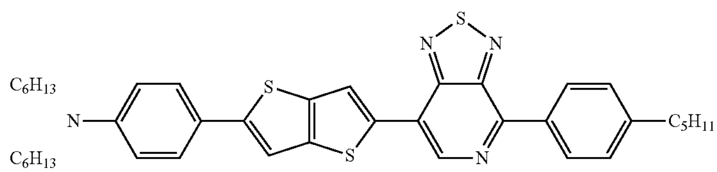 | |
| (224) | 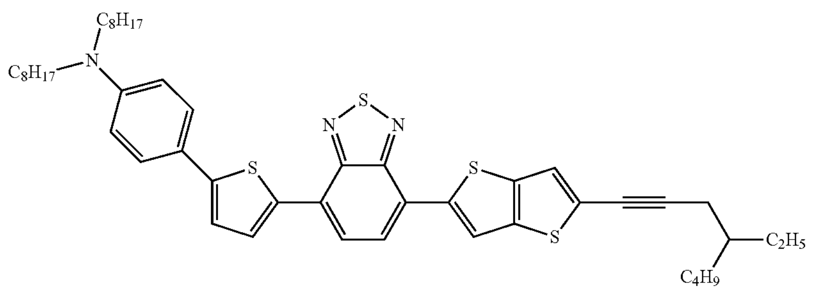 | |
| (225) | 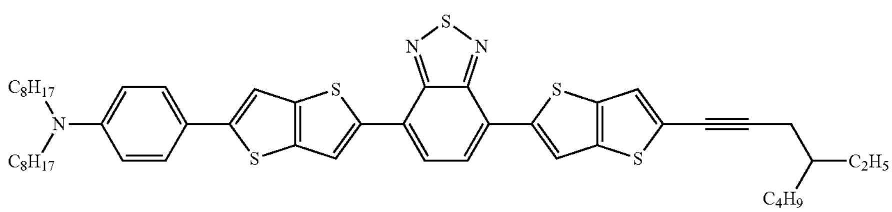 | |
| (226) | 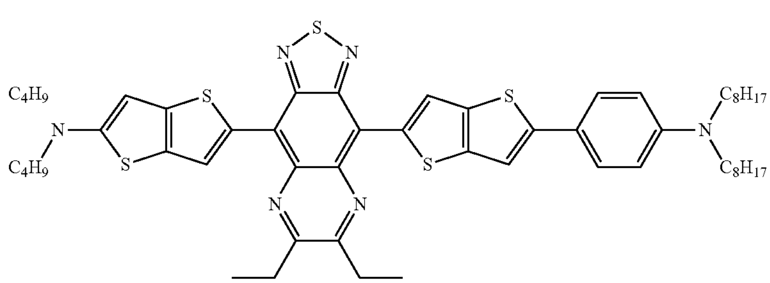 | |
| (227) | 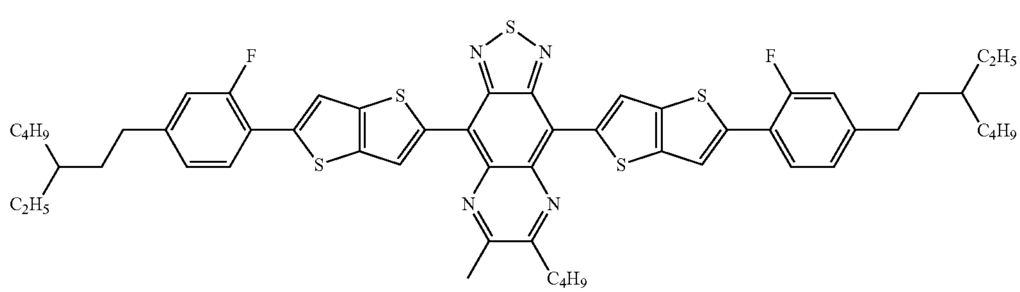 | |

-continued
| Compound | Degree of anisotropy |
|---|---|
| (228) 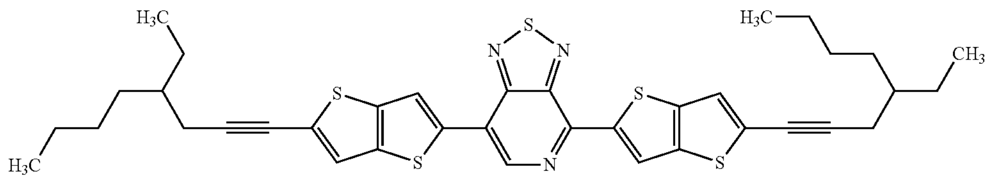 [SMILES: CCCCC(CC)CC#Cc1cc2sc(-c3cnc(-c4cc5sc(C#CCC(CC)CCCC)cc5s4)c4nsnc34)cc2s1] | |
| (229) 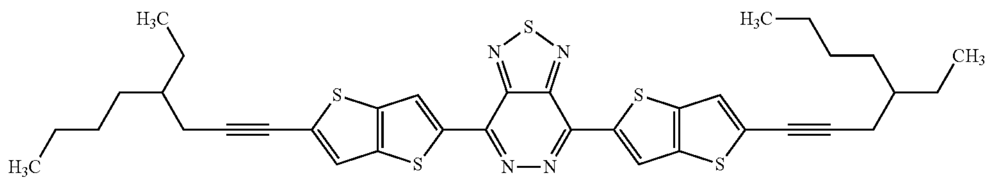 [SMILES: CCCCC(CC)CC#Cc1cc2sc(-c3nnc(-c4cc5sc(C#CCC(CC)CCCC)cc5s4)c4nsnc34)cc2s1] | |
| (230) 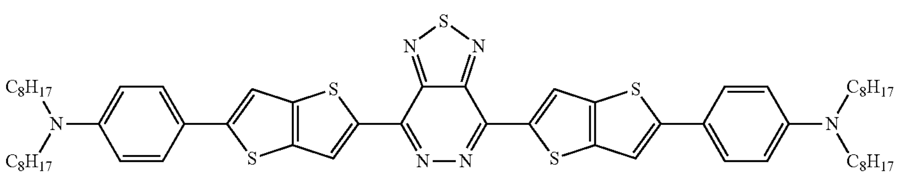 | |
| (231) 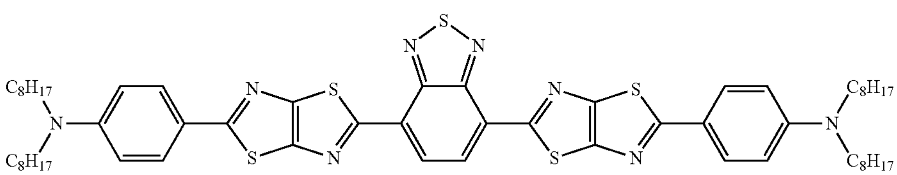 | |
| (232) 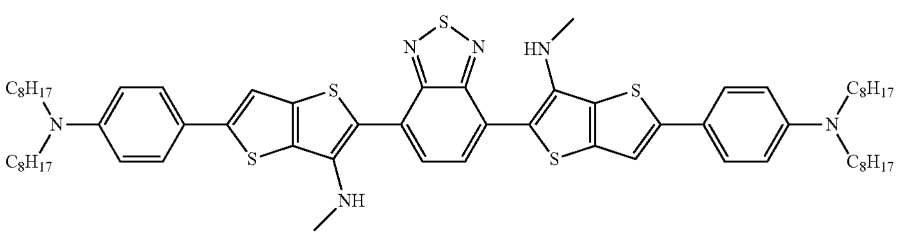 | |
| (233) 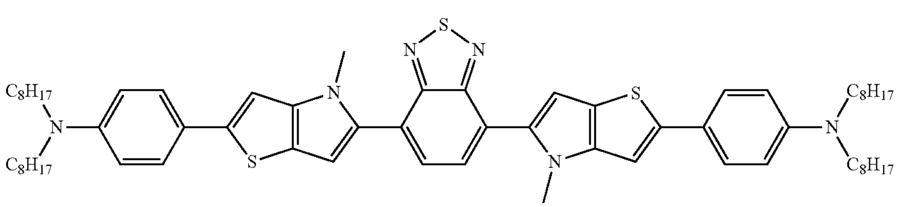 | |
| (234) 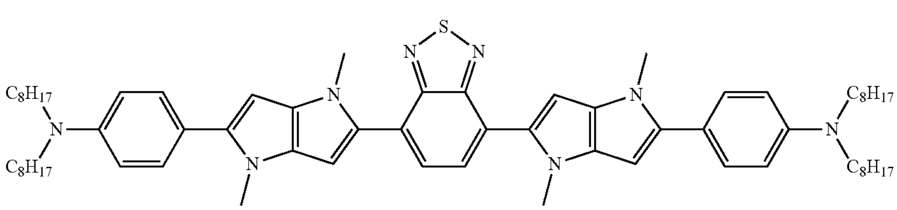 | |

-continued
| | Compound | Degree of an-isotropy |
|---|---|---|
| (235) | 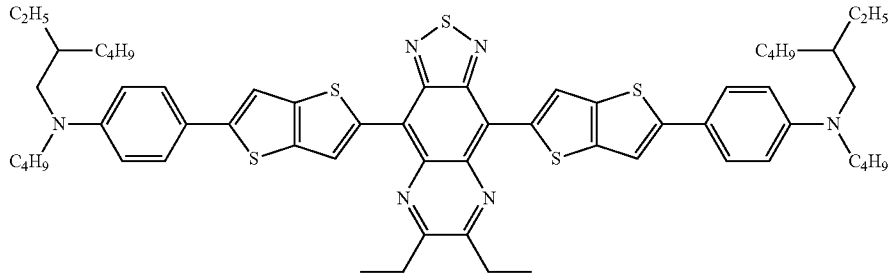 | |
| (236) | 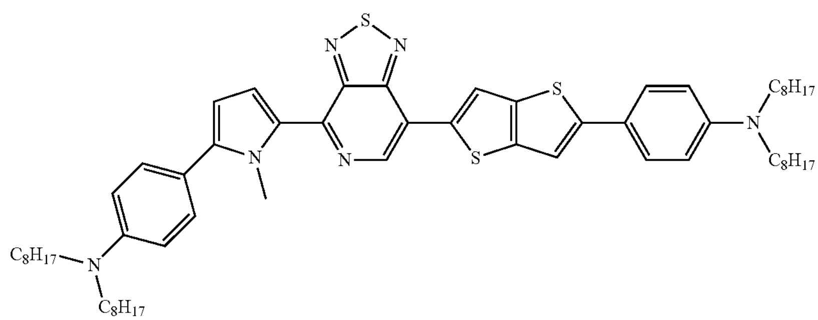 | |
| (237) | 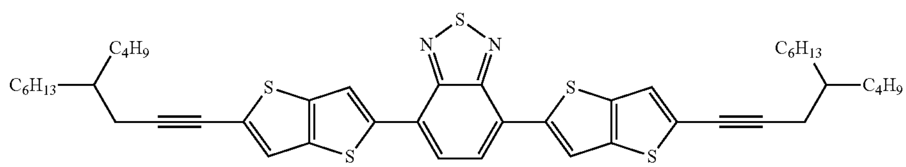 | |
| (238) | 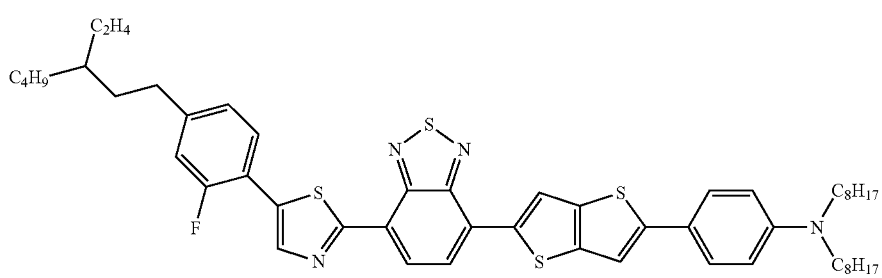 | |
| (239) | 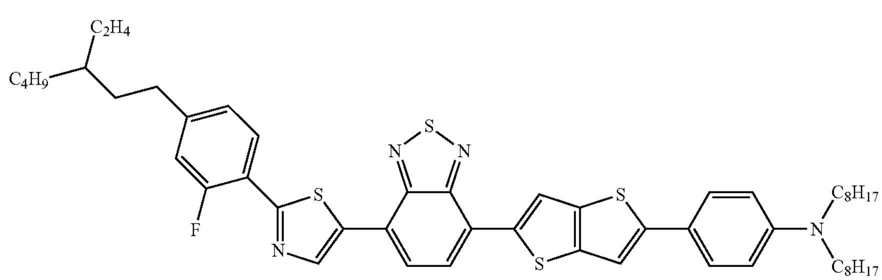 | |
| (240) | 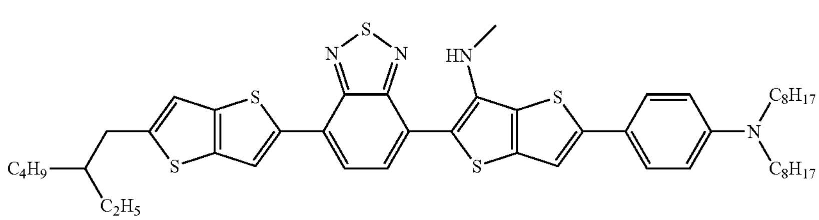 | |

-continued
| | Compound | Degree of an-isotropy |
|---|---|---|
| (241) | 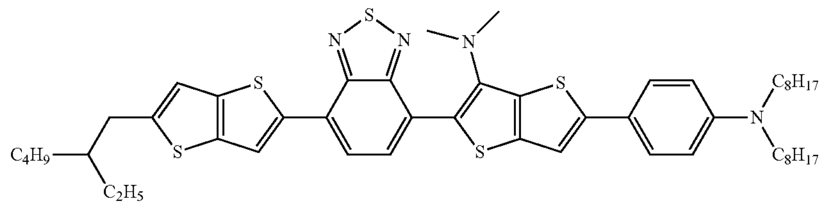 | |
| (242) | 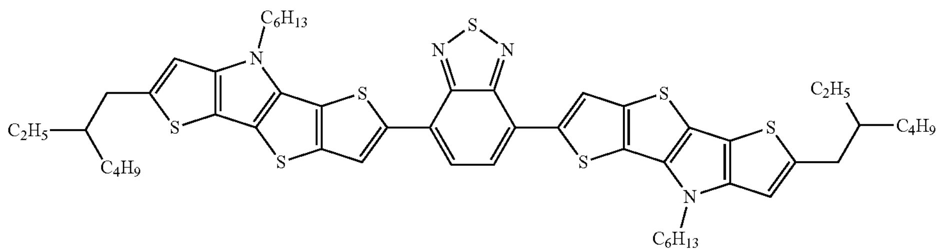 | |
| (243) | 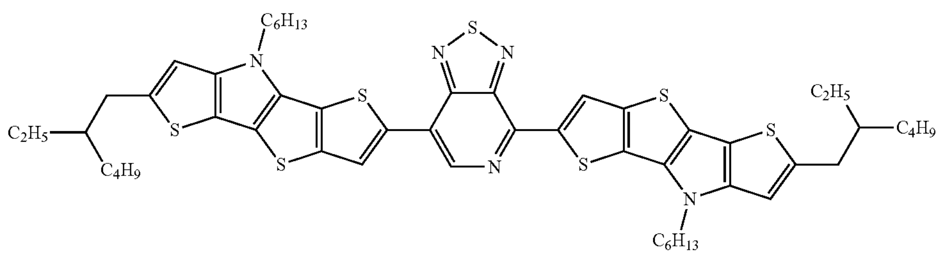 | |
| (244) | 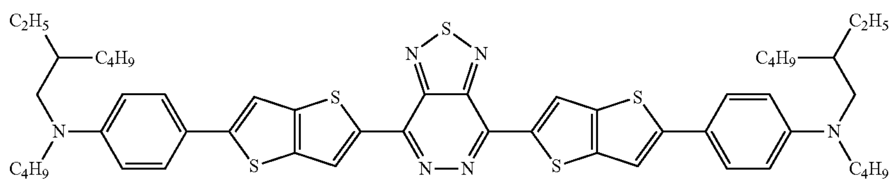 | |
| (245) | 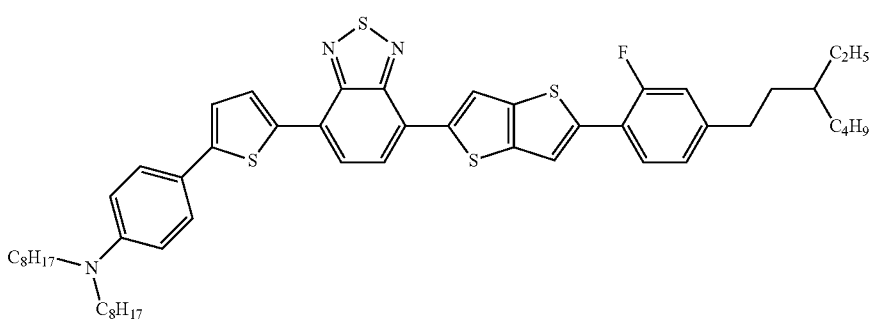 | |
| (246) | 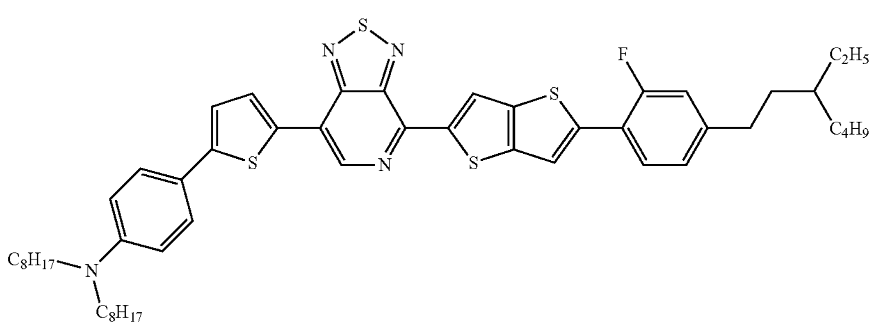 | |

-continued
| | Compound | Degree of an-isotropy |
|---|---|---|
| (247) | 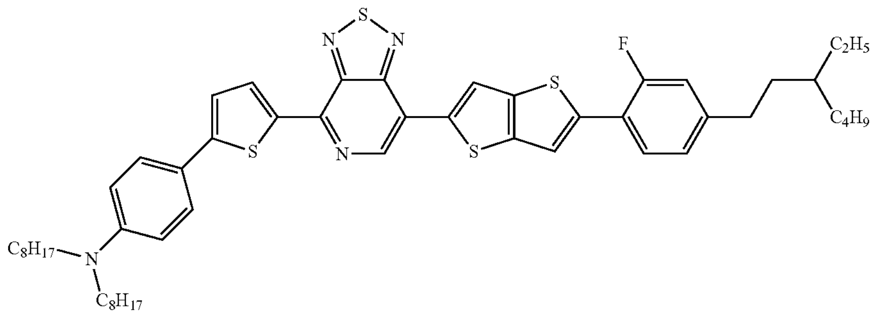 | |
| (248) | 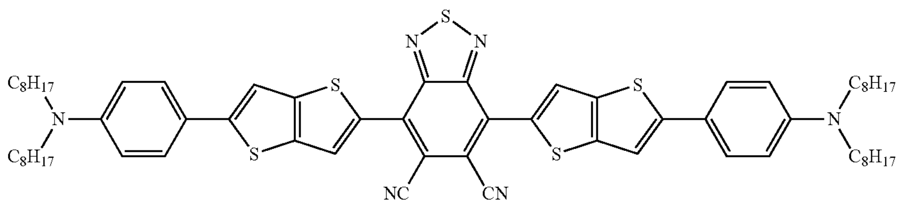 | |
| (249) | 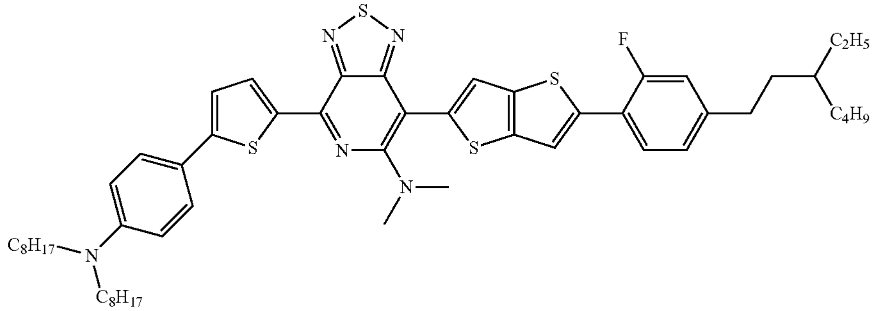 | |
| (250) | 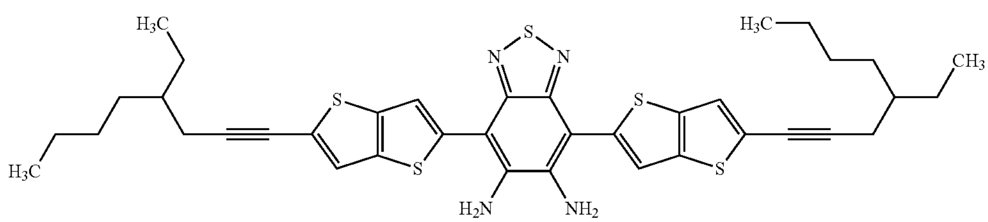 [SMILES: CCCCC(CC)CC#Cc1cc2sc(-c3c(N)c(N)c(-c4cc5sc(C#CCC(CC)CCCC)cc5s4)c4nsnc34)cc2s1] | |
| (251) | 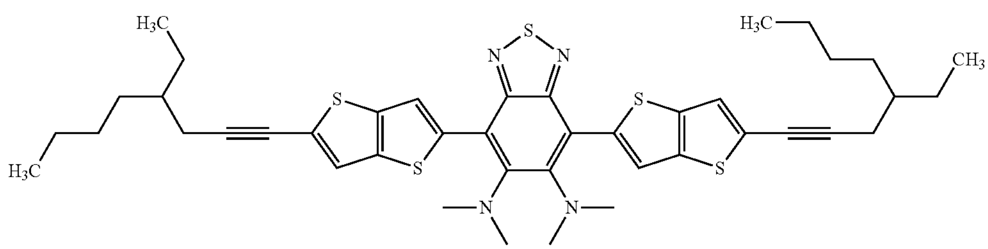 [SMILES: CCCCC(CC)CC#Cc1cc2sc(-c3c(N(C)C)c(N(C)C)c(-c4cc5sc(C#CCC(CC)CCCC)cc5s4)c4nsnc34)cc2s1] | |
| (252) | 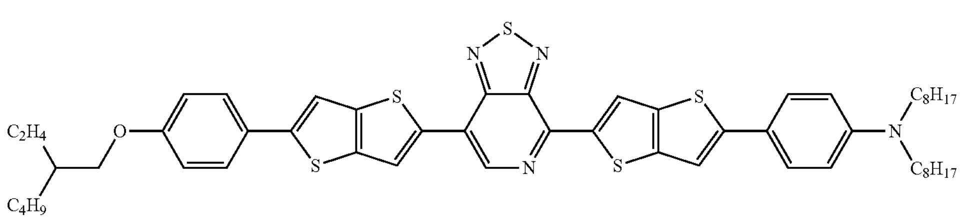 | |

-continued
| | Compound | Degree of an-isotropy |
|---|---|---|
| (253) | 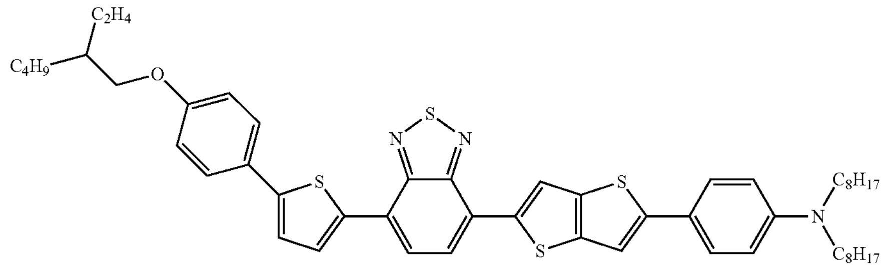 | |
| (254) | 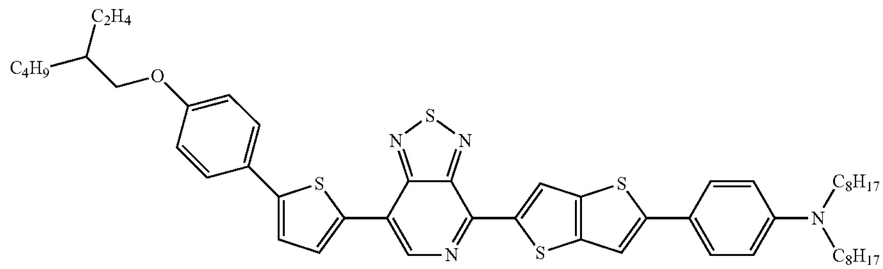 | |
| (255) | 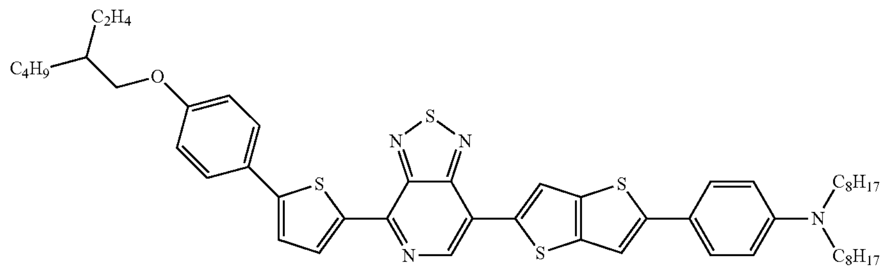 | |
| (256) | 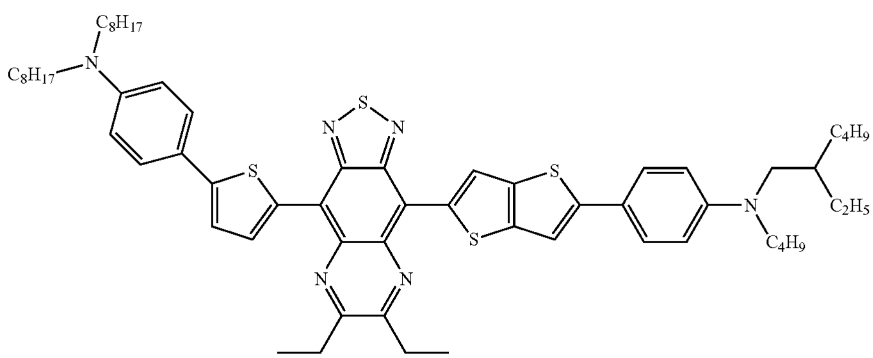 | |
| (257) | 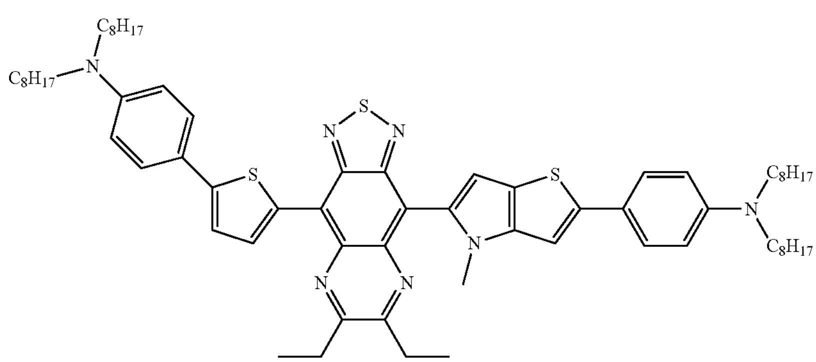 | |

-continued
| | Compound | Degree of an-isotropy |
|---|---|---|
| (258) | 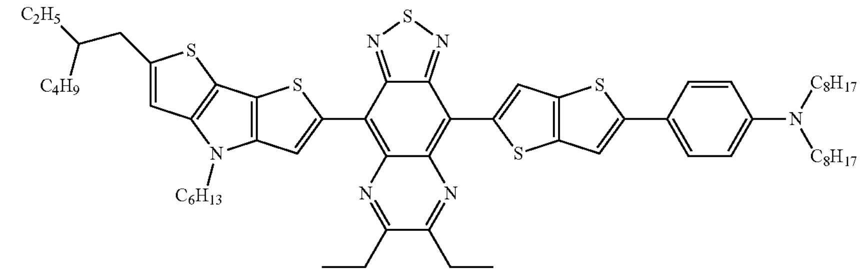 | |
| (259) | 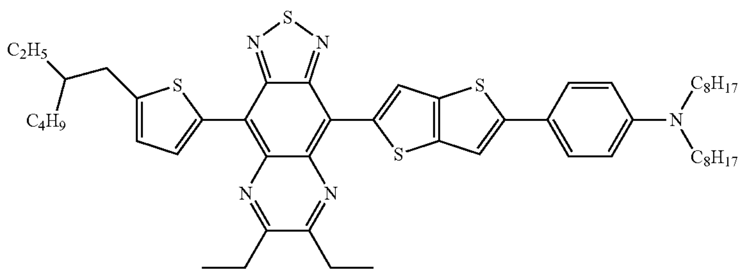 | |
| (260) | 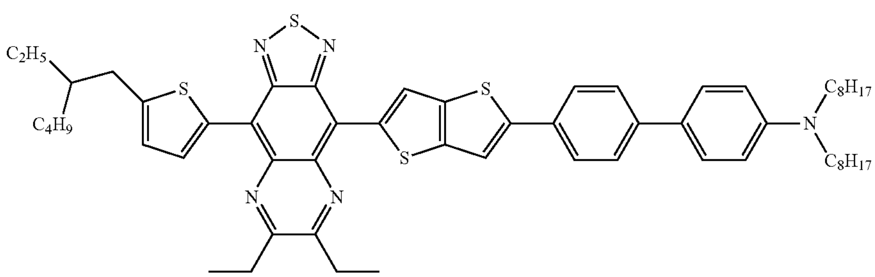 | |
| (261) | 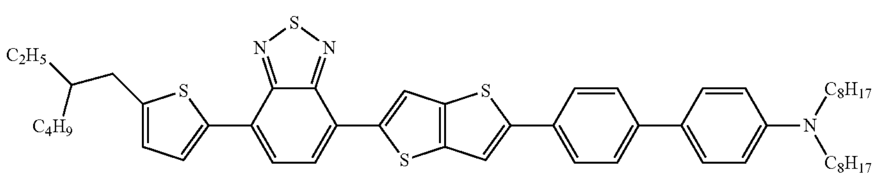 | |
| (262) | 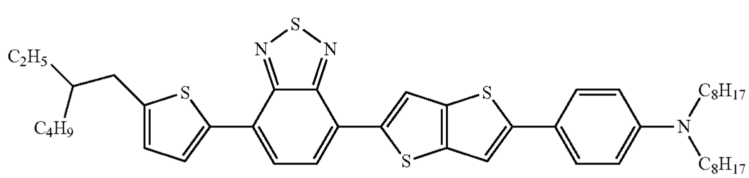 | |
| (263) | 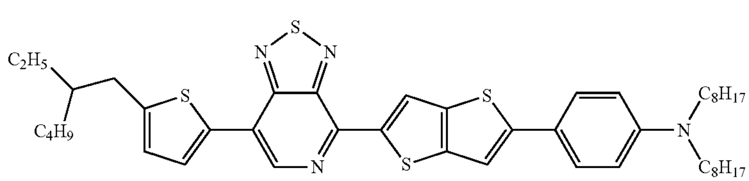 | |
| (264) | 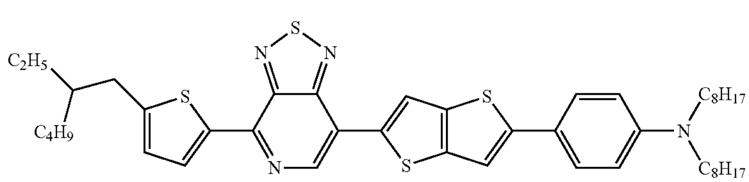 | |

-continued
| | Compound | Degree of an-isotropy |
|---|---|---|
| (265) | 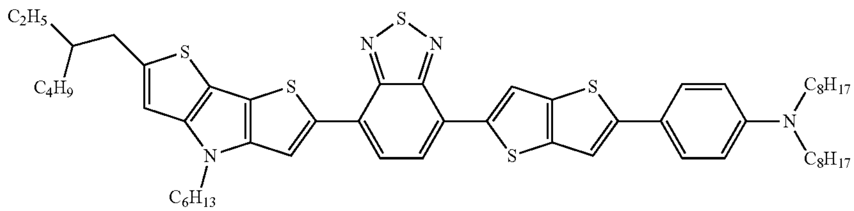 | |
| (266) | 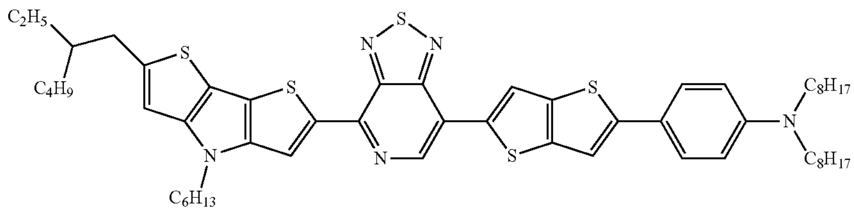 | |
| (267) | 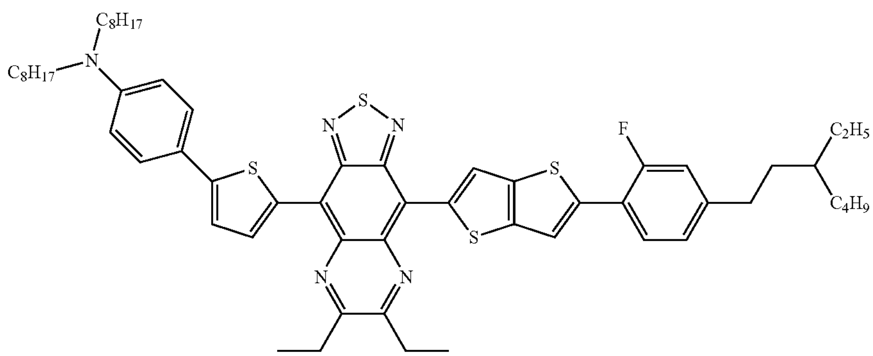 | |
| (268) | 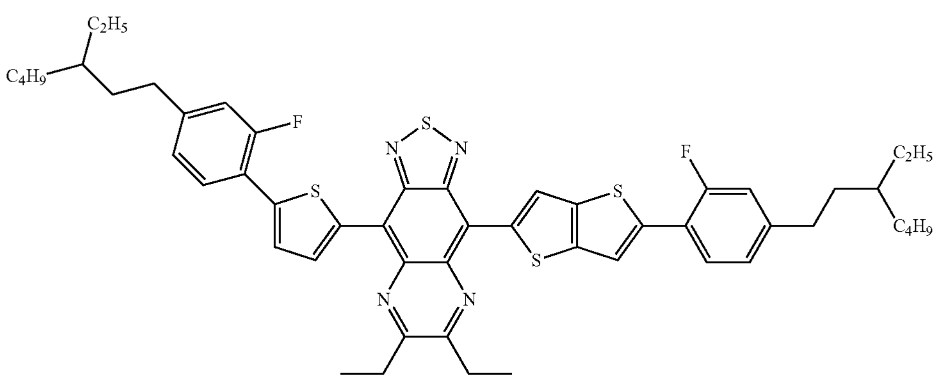 | |
| (269) | 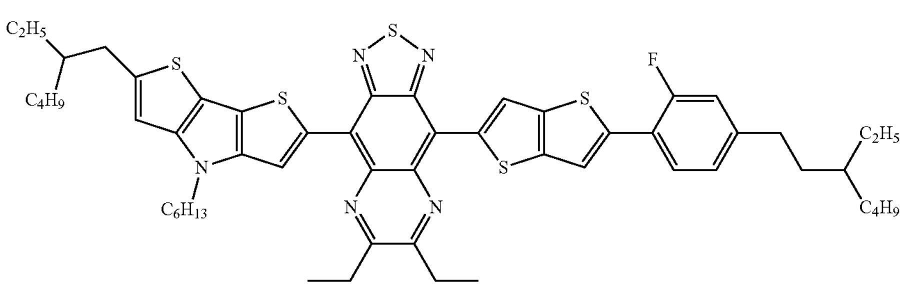 | |

-continued
| | Compound | Degree of an-isotropy |
|---|---|---|
| (270) | 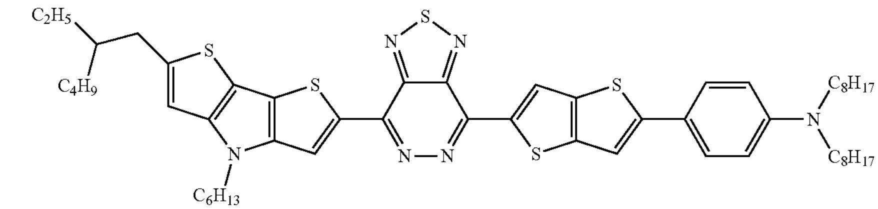 | |
| (271) | 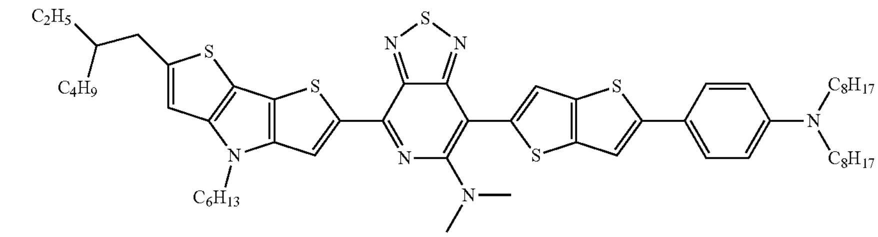 | |
| (272) | 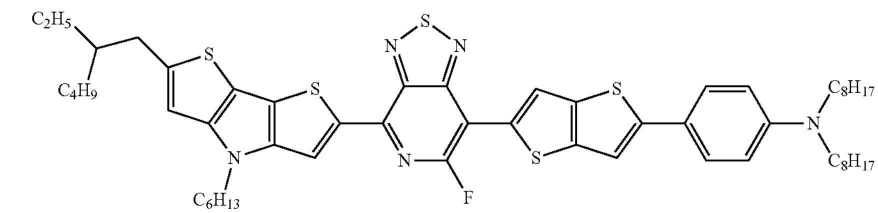 | |
| (273) | 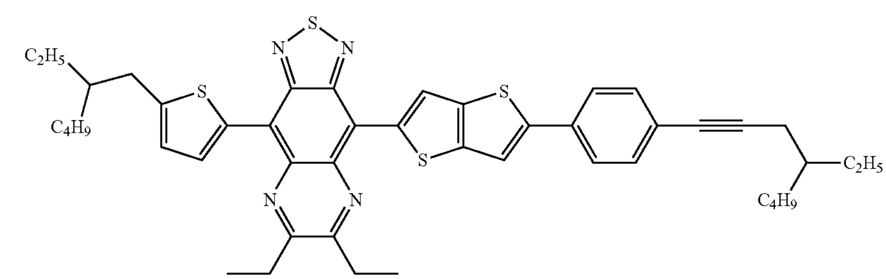 | |
| (274) | 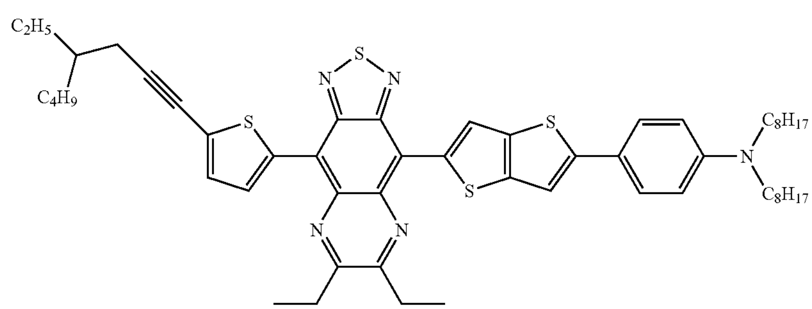 | |
| (275) | 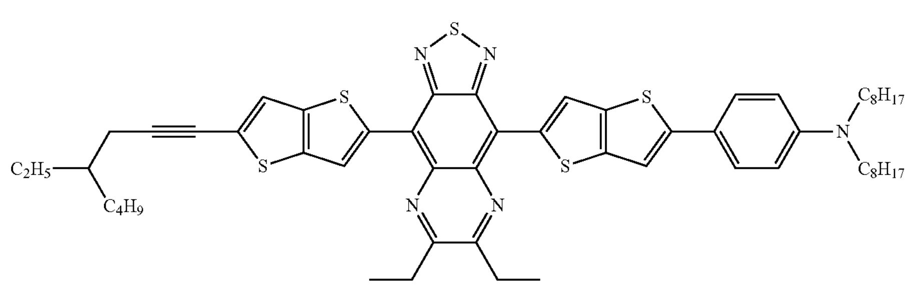 | |

-continued
| | Compound | Degree of an-isotropy |
| --- | --- | --- |
| (276) | 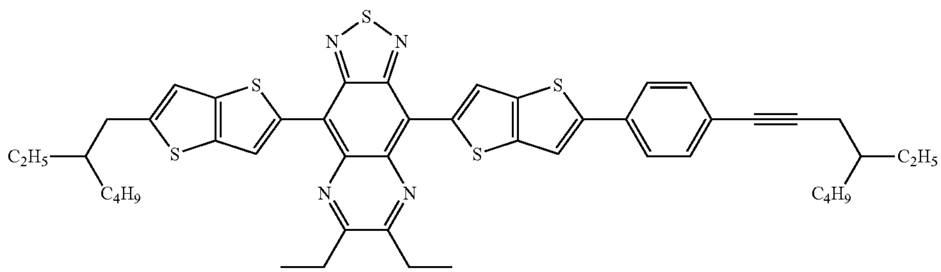 | |
| (277) | 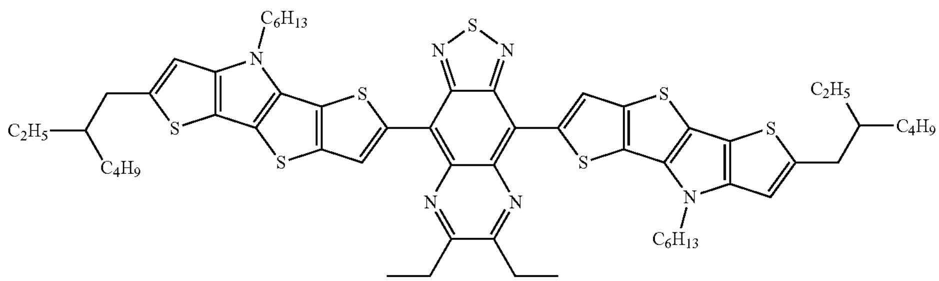 | |
| (278) | 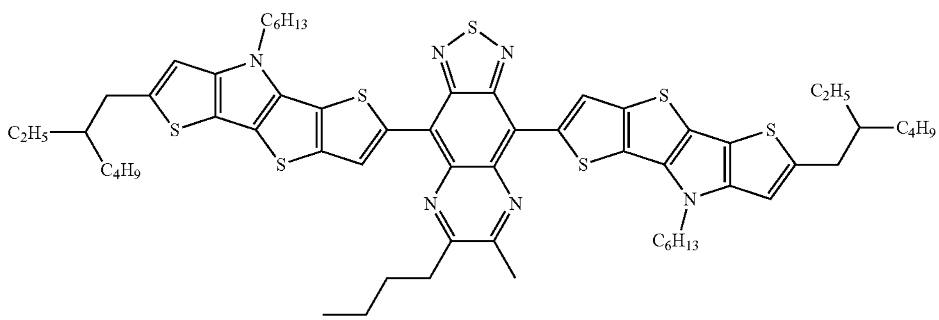 | |
| (279) | 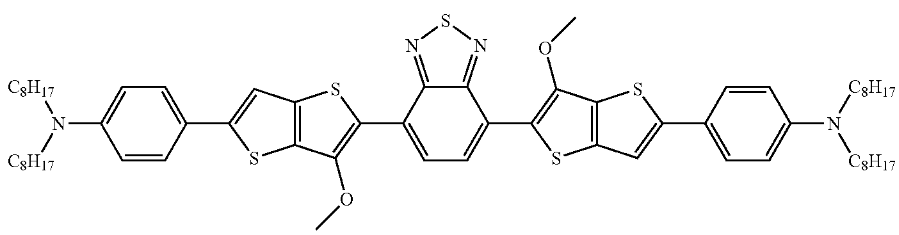 | |
| (280) | 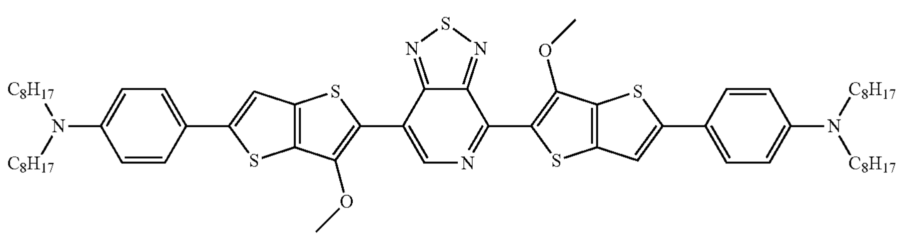 | |

-continued
| Compound | Degree of an-isotropy |
|---|---|
| (281) 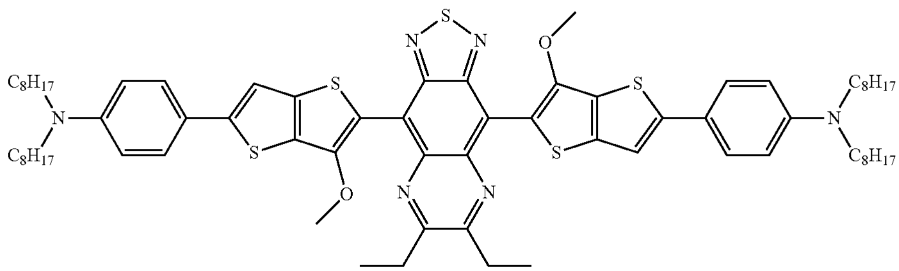 | |
| (282) 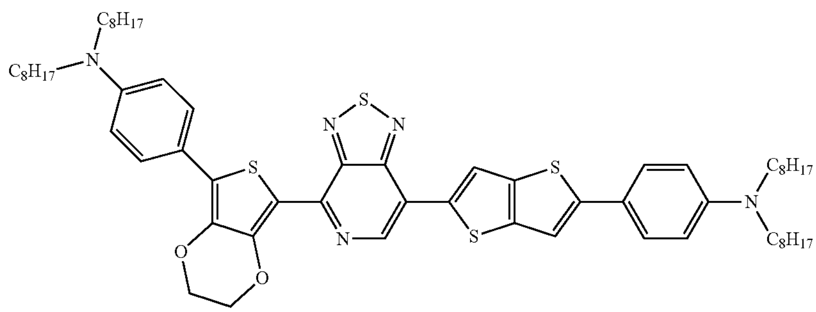 | |
| (283) 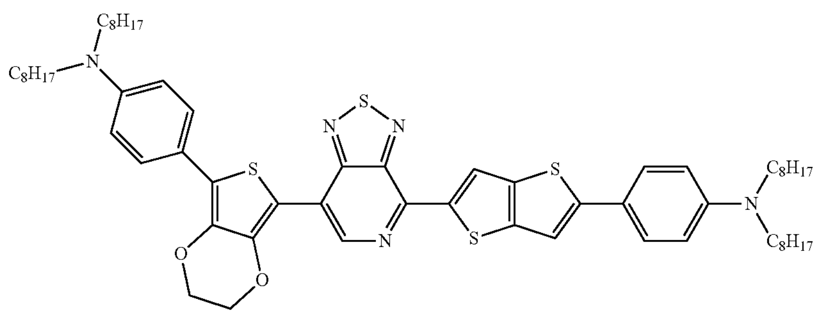 | |
| (284) 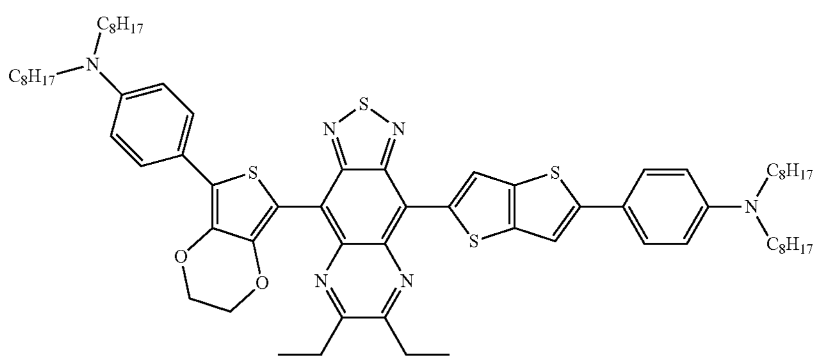 | |
| (285) 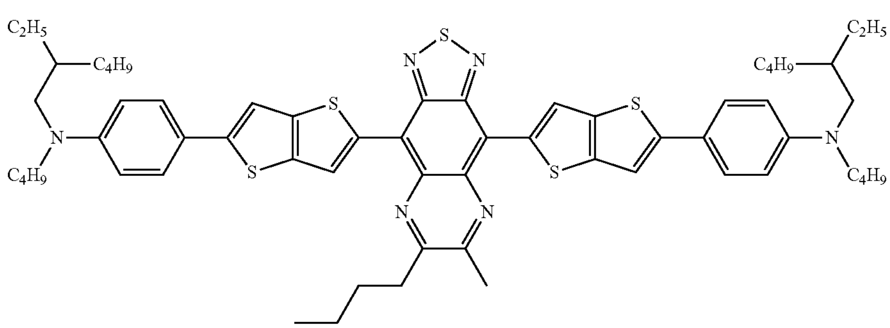 | |

-continued
| | Compound | Degree of anisotropy |
|---|---|---|
| (286) | 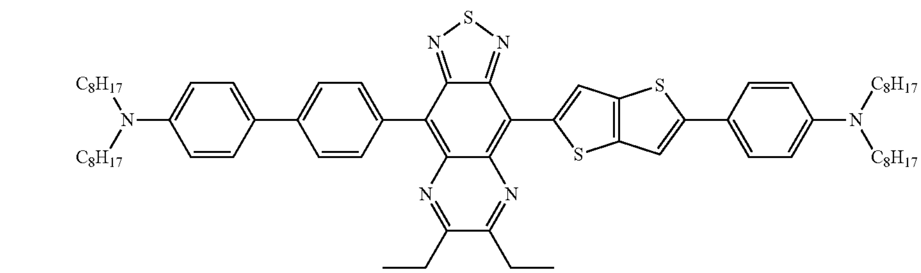 | |
| (287) | 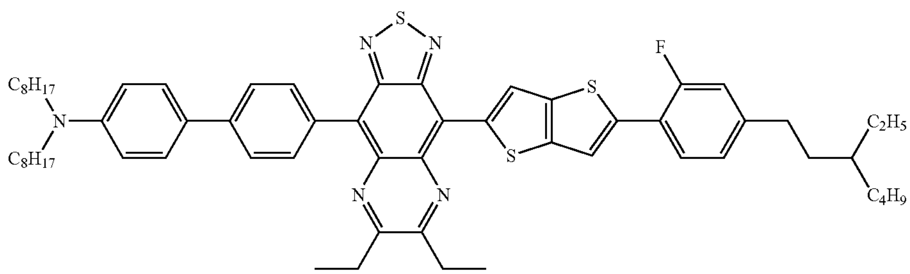 | |
| (288) | 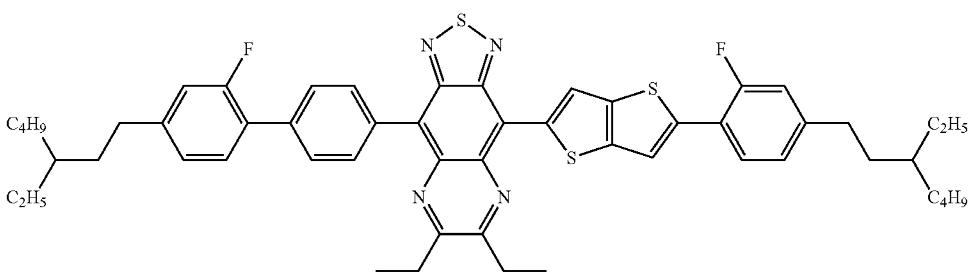 | |
| (289) | 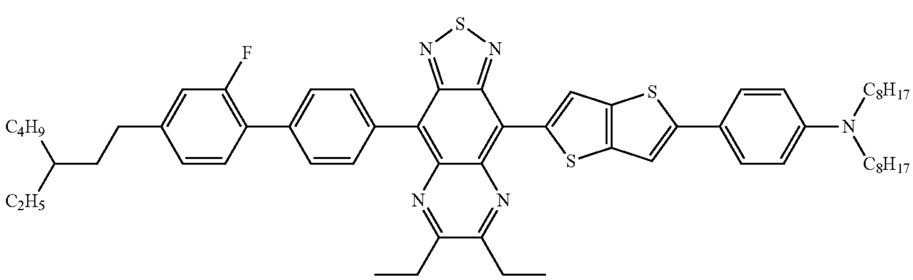 | |
| (290) | 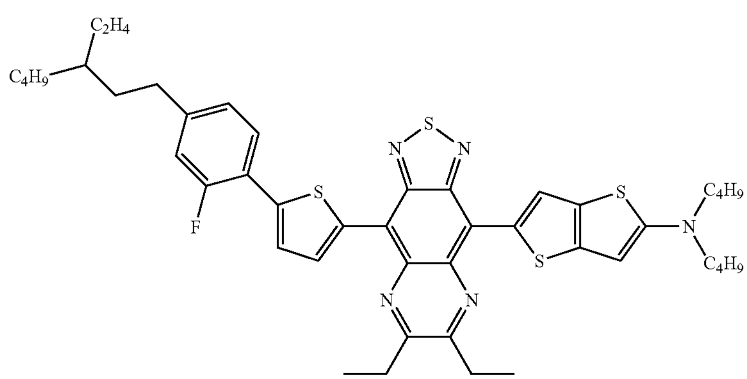 | |

-continued
| | Compound | Degree of anisotropy |
|---|---|---|
| (291) | 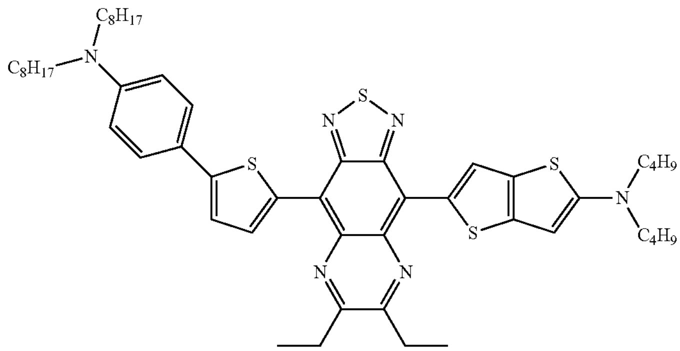 | |
| (292) | 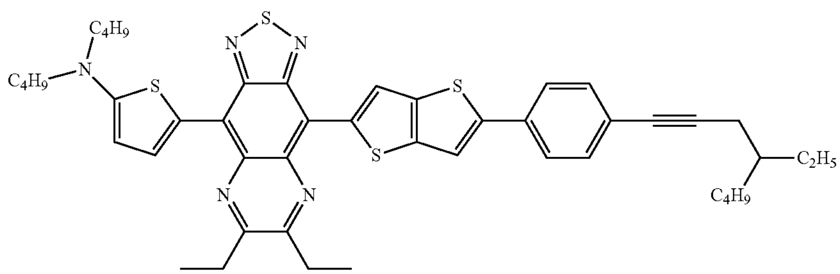 | |
| (293) | 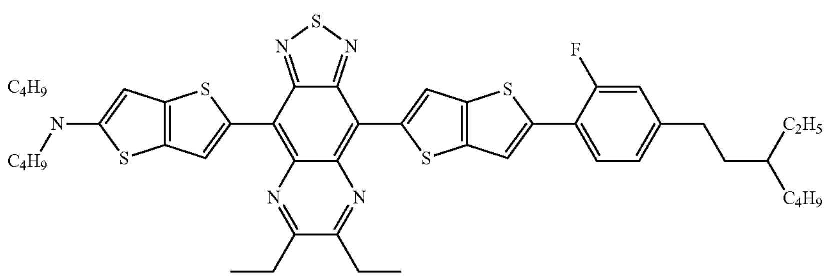 | |
| (294) | 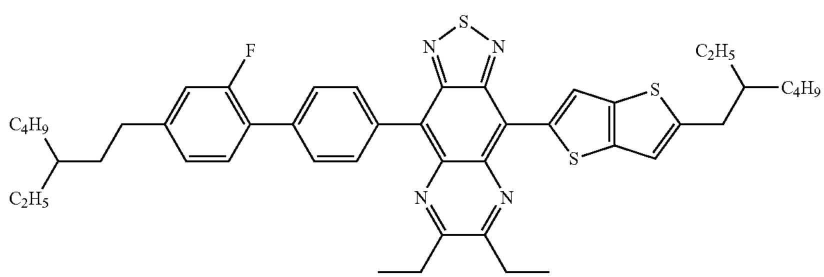 | |
| (295) | 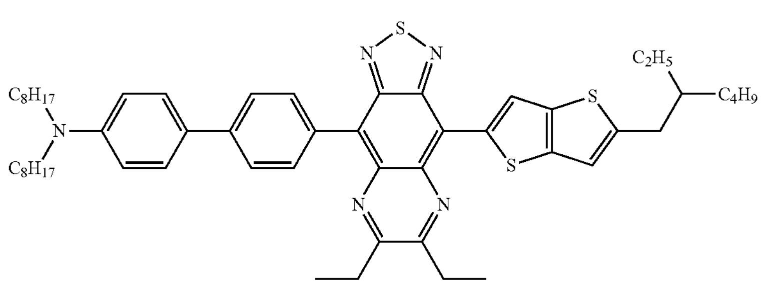 | |

-continued
| Compound | Degree of an-isotropy |
| --- | --- |
| (296) 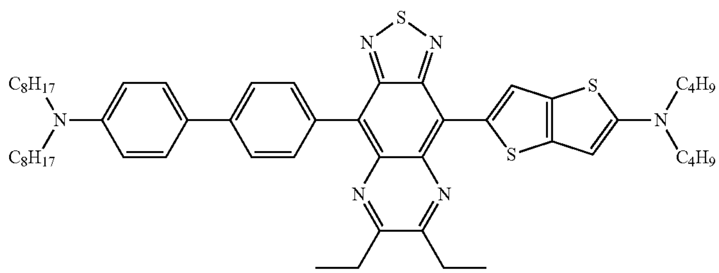 | |
| (297) 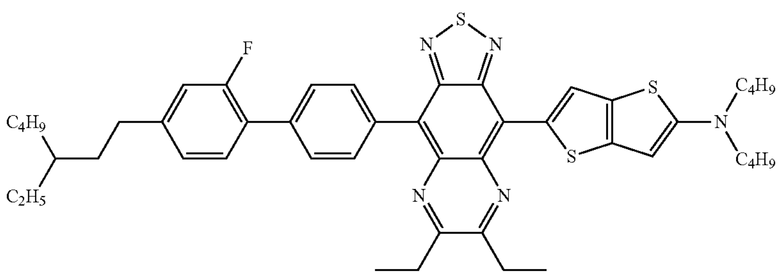 | |
| (298) 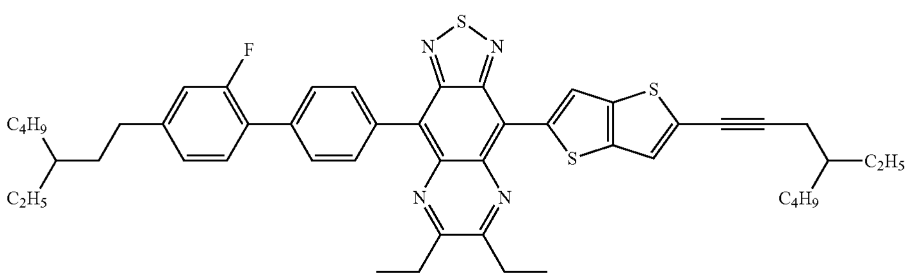 | |
| (299) 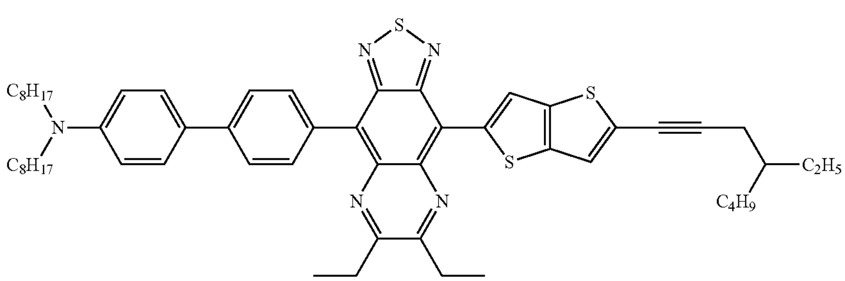 | |
| (300) 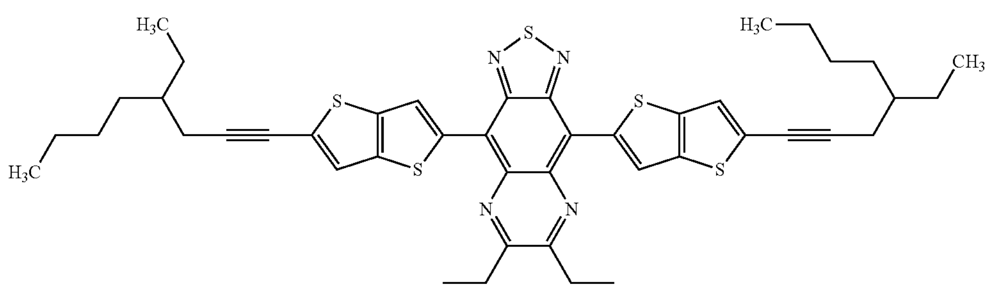 [SMILES: CCCCC(CC)CC#Cc1cc2sc(-c3c4nsnc4c(-c4cc5sc(C#CCC(CC)CCCC)cc5s4)c4nc(CC)c(CC)nc34)cc2s1] | |

-continued
| Compound | Degree of an-isotropy |
| --- | --- |
| (301) 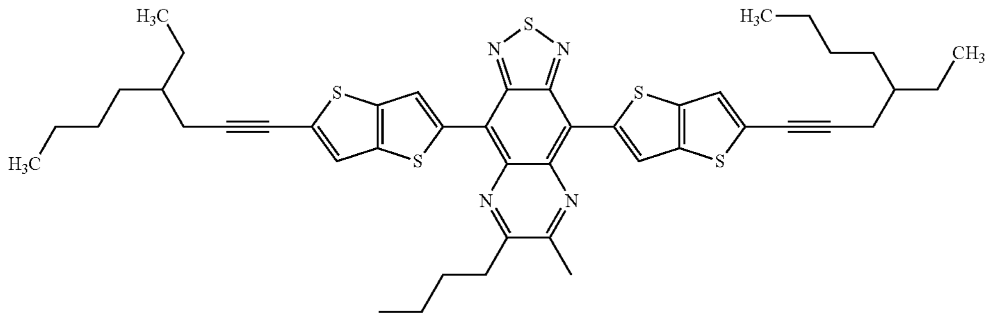 [SMILES: CCCCc1nc2c(-c3cc4sc(C#CCC(CC)CCCC)cc4s3)c3nsnc3c(-c3cc4sc(C#CCC(CC)CCCC)cc4s3)c2nc1C] | |
| (302) 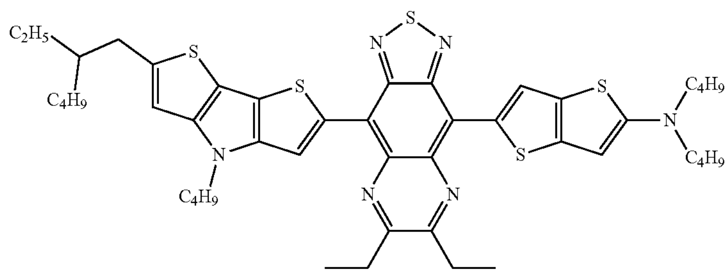 | |
| (303) 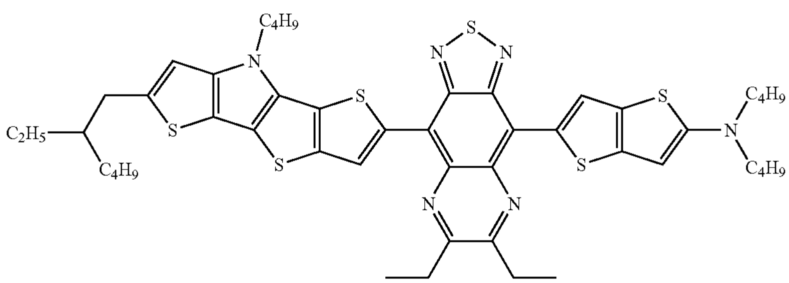 | |
| (304) 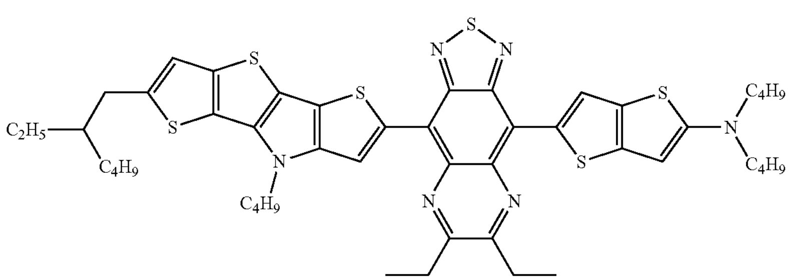 | |
| (305) 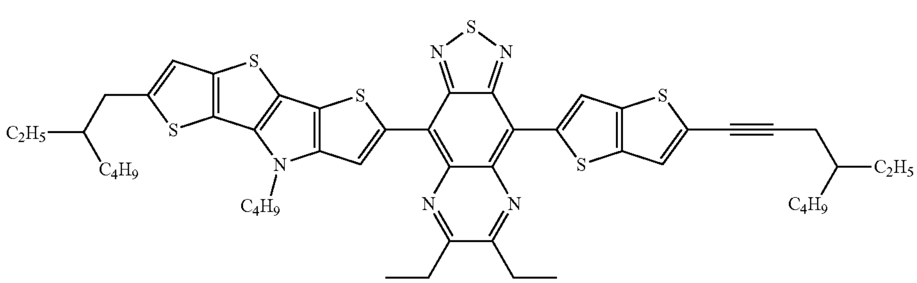 | |

-continued

| | Compound | Degree of an-isotropy |
|---|---|---|
| (306) | 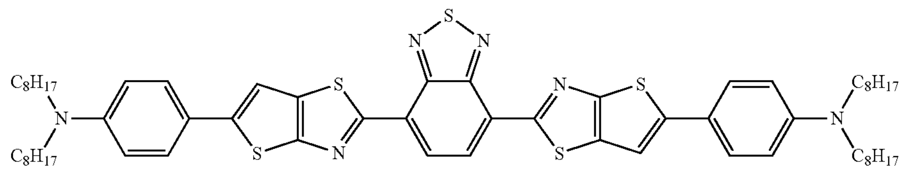 | |
| (307) | 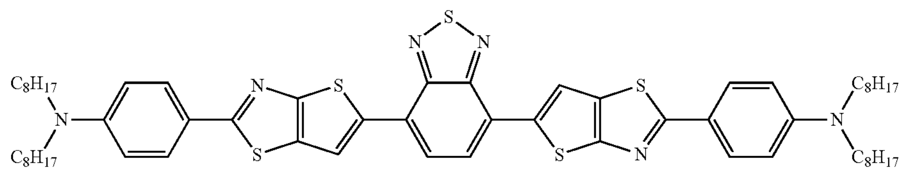 | |
| (308) | 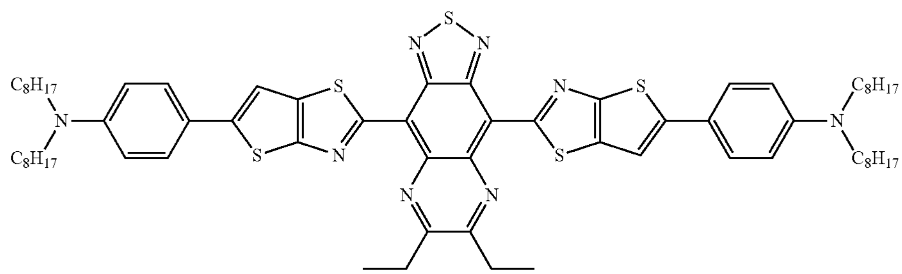 | |
| (309) | 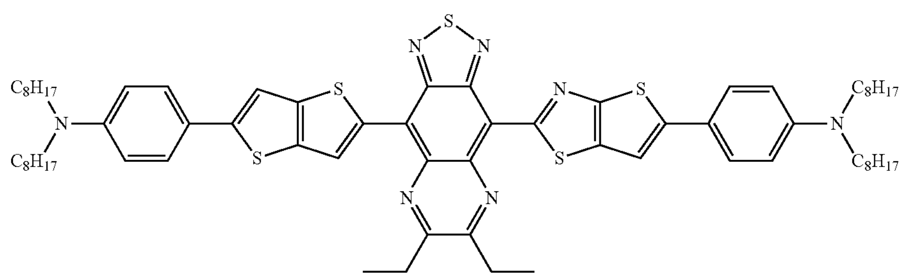 | |
| (310) | 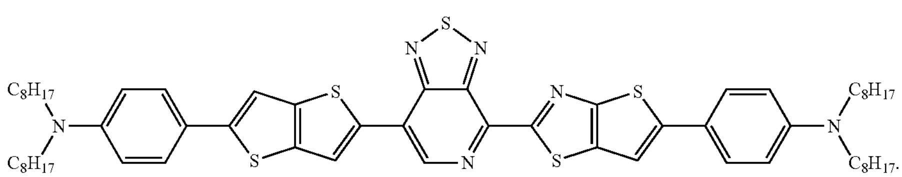 | |

The compounds of formulae I and II can be prepared by methods which are known per se or which are analogous to known processes, as described in the literature (for example in the standard works such as Houben-Weyl, Methoden der Organischen Chemie [Methods of Organic Chemistry], Georg-Thieme-Verlag, Stuttgart), under reaction conditions which are known and suitable for said reactions. Use may also be made here of variants which are known per se, but are not mentioned here in greater detail.

The compounds of formulae I and II preferably are positive dichroic dyes, i.e. dyes which have a positive degree of anisotropy R.

The degree of anisotropy R is determined for the LC mixture comprising the dye from the values of the extinction coefficients for parallel and perpendicular alignment of the molecules relative to the direction of the polarisation of the light.

According to the invention the degree of anisotropy R preferably is greater than 0.4, more preferably greater than 0.6, even more preferably greater than 0.7, and in particular greater than 0.8.

The absorption preferably reaches a maximum when the polarisation direction of the light is parallel to the direction of the longest molecular elongation of the compounds of formula I and II, and it preferably reaches a minimum when the polarisation direction of the light is perpendicular to the direction of the longest molecular elongation of the compounds of formula I and II.

The compounds of formulae I and II as contained in the composition according to the invention can favourably be used as guest compounds, in particular as dichroic dyes, in liquid-crystalline host mixtures.

It has surprisingly been found that the overall composition which contains the combination of dichroic dye compounds according to the invention can exhibit excellent solubility in liquid-crystalline media. This can ensure that meaningful and effective concentrations of the dyes in the LC media can be achieved which may favourably contribute to the obtainable contrast ratio and switching performance in the switchable devices.

Therefore, in an advantageous aspect of the invention a liquid-crystalline medium is provided which in addition to the composition according to the invention further comprises one or more mesogenic compounds.

Preferably, the compounds of the composition are present in the liquid-crystalline medium in solution.

In principle, a suitable host mixture is any dielectrically negative or positive LC mixture which is suitable for use in conventional VA, TN, STN, IPS or FFS displays.

Suitable LC mixtures are known in the art and are described in the literature. LC media for VA displays having negative dielectric anisotropy are described in for example EP 1 378 557 A1.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851, WO 96/28 521 and WO2012/079676.

Preferred embodiments of the liquid-crystalline media having negative or positive dielectric anisotropy according to the invention are indicated below.

The LC host mixture preferably is a nematic LC mixture, and preferably does not have a chiral LC phase.

In a preferred embodiment of the present invention the LC medium contains an LC host mixture with negative dielectric anisotropy. Accordingly, in preferred embodiments the mesogenic media according to the invention comprise components selected from the following items a) to w):

a) Mesogenic medium which comprises one or more compounds selected from the group of compounds of the formulae CY, PY and AC:

CY

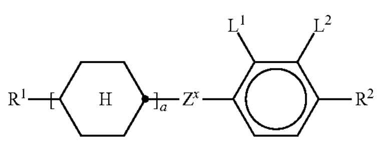

PY

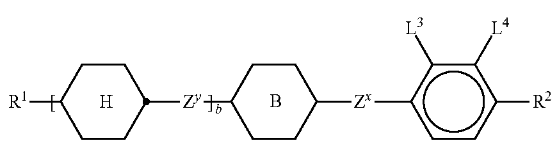

AC

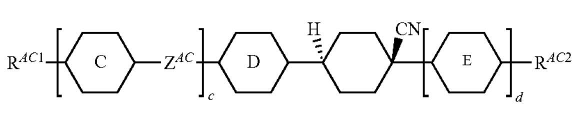

wherein a denotes 1 or 2, b denotes 0 or 1, c is 0, 1 or 2, d is 0 or 1,

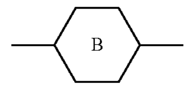

denotes

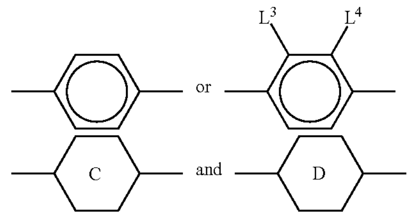

denote

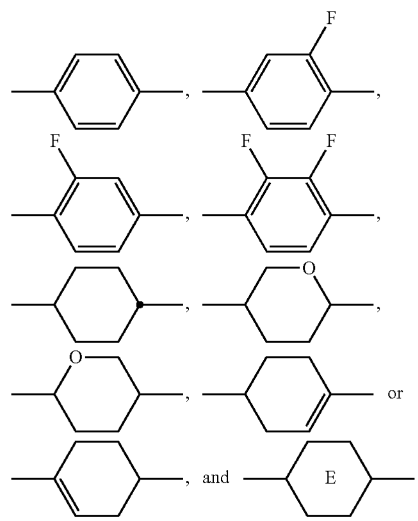

denotes

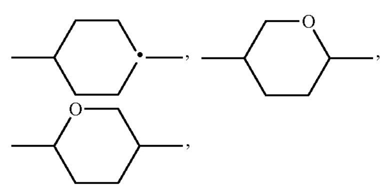

$R^1$ and $R^2$ $R^{AC1}$ and $R^{AC2}$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH═CH—, —$CF_2O$—, —$OCF_2$—, —$CH_2O$—, —OC $H_2$—, —CO—O—, —O—CO—, —$C_2F_4$—, —CF═CF—, —CH═CH—$CH_2O$— or a single bond, preferably a single bond, $L^{1-4}$ each, independently of one another, denote F, Cl, CN, $OCF_3$, $CF_3$, $CH_3$, $CH_2F$, $CHF_2$.

in which the individual radicals have the following meanings:

each, independently of one another, denote alkyl having 1 to 12 C atoms, in which, in addition, one or two non-adjacent $CH_2$ groups may be replaced by —O—, —CH═CH—, —CO—, —O—CO— or —CO—O— in such a way that O atoms are not linked directly to one another, $Z^{AC}$ denotes $—CH_2CH_2—$, —CH═CH—, $—CF_2O—$, $—OCF_2—$, $—CH_2O—$, $—OCH_2—$, —CO—O—, —O—CO—, $—C_2F_4—$, —CF═CF—, $—CH═CH—CH_2O—$ or a single bond, preferably a single bond, and Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

CY1

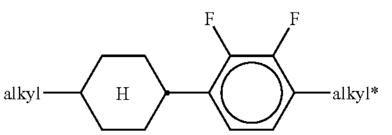

CY2

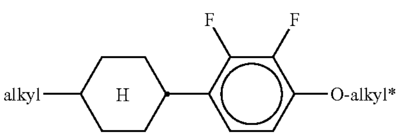

CY3

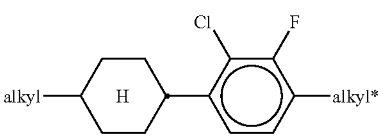

CY4

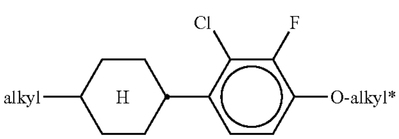

CY5

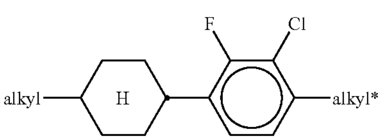

CY6

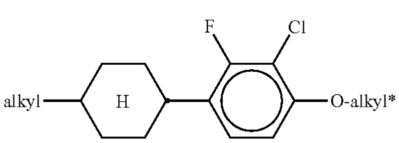

CY7

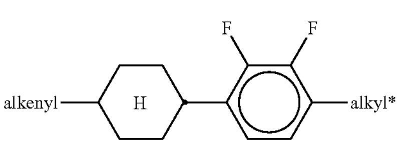

-continued

CY8

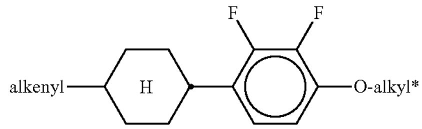

CY9

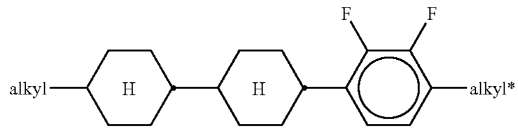

CY10

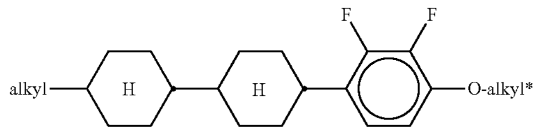

CY11

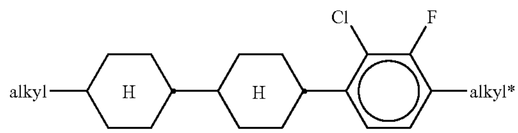

CY12

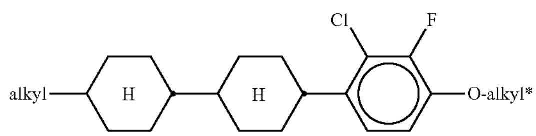

CY13

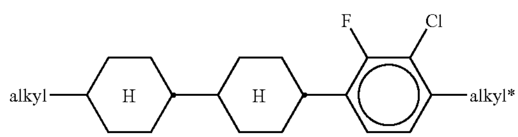

CY14

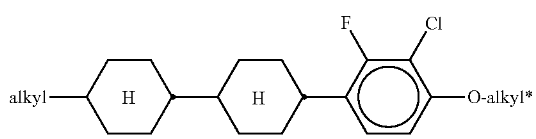

CY15

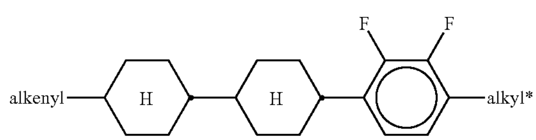

CY16

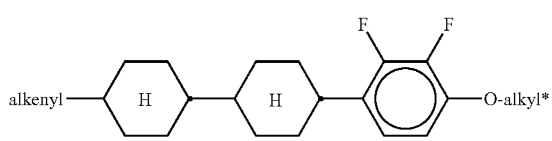

CY17

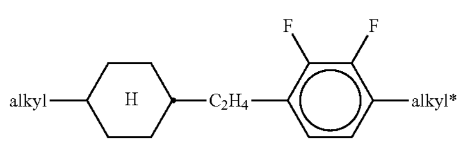

-continued

CY18

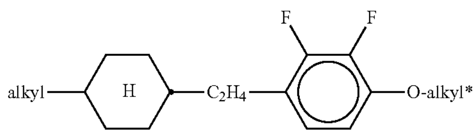

CY19

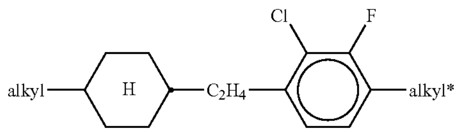

CY20

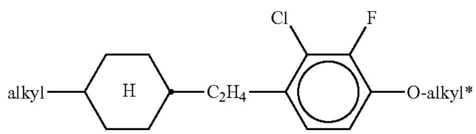

CY21

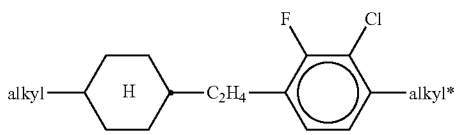

CY22

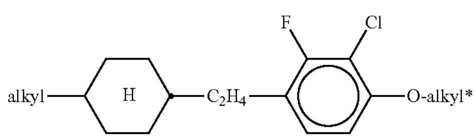

CY23

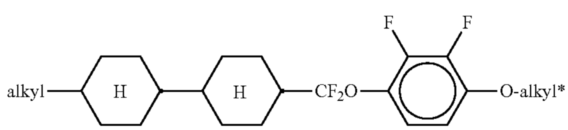

CY24

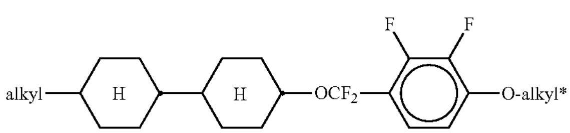

CY25

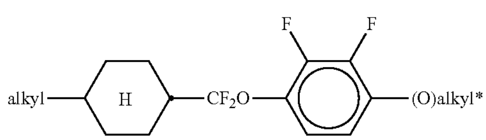

CY26

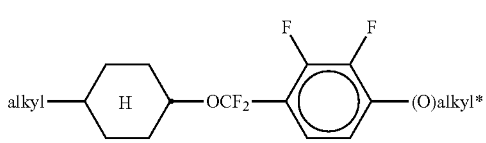

CY27

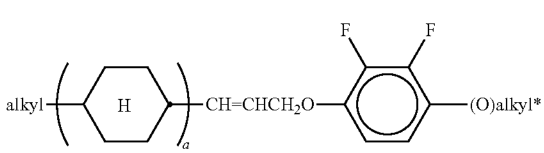

-continued

CY28

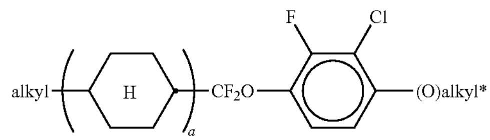

CY29

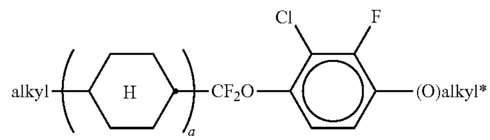

CY30

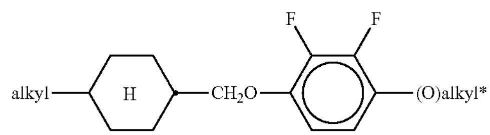

CY31

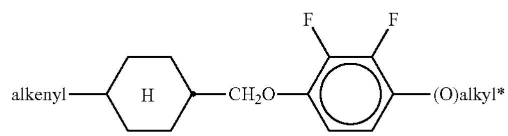

CY32

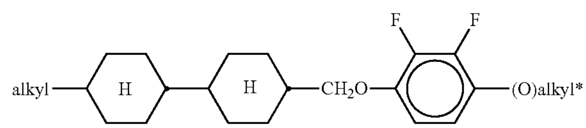

CY33

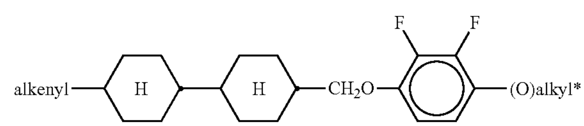

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH$—, $CH_2{=}CHCH_2CH_2$—, $CH_3$—$CH{=}CH$—, $CH_3$—$CH_2$—$CH{=}CH$—, $CH_3$—$(CH_2)_2$—$CH{=}CH$—, $CH_3$—$(CH_2)_3$—$CH{=}CH$— or $CH_3$—$CH{=}CH$—$(CH_2)_2$—.

The compounds of the formula PY are preferably selected from the group consisting of the following sub-formulae:

PY1

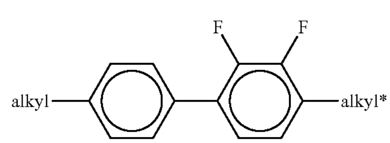

PY2

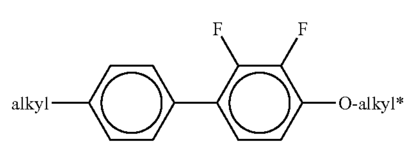

-continued

PY3

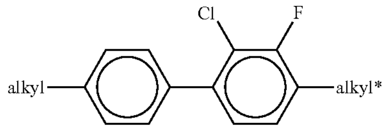

PY4

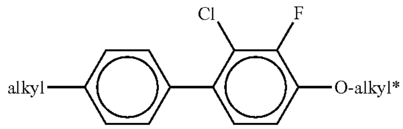

PY5

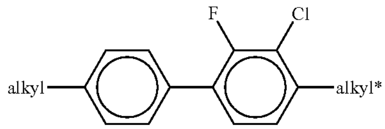

PY6

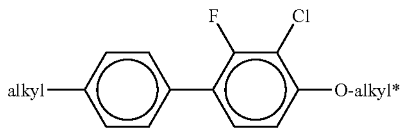

PY7

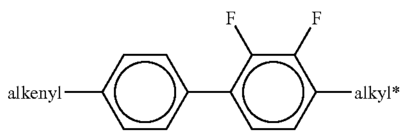

PY8

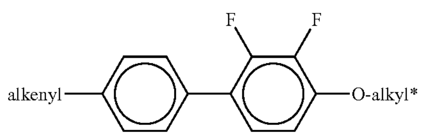

PY9

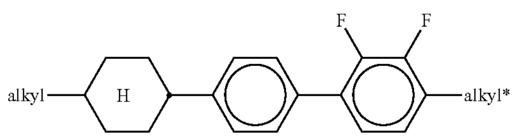

PY10

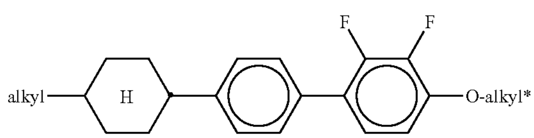

PY11

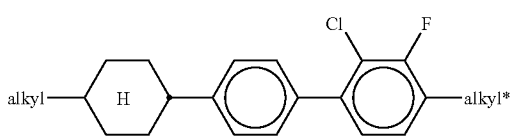

PY12

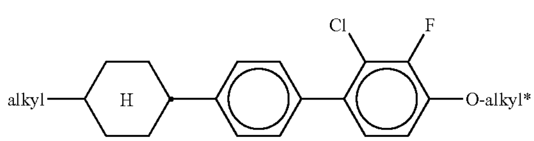

PY13

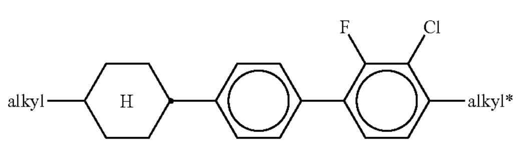

-continued

PY14

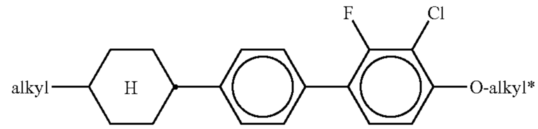

PY15

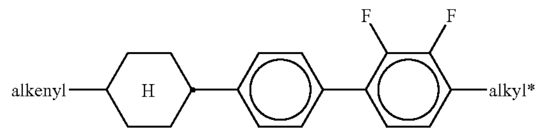

PY16

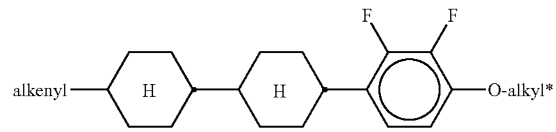

PY17

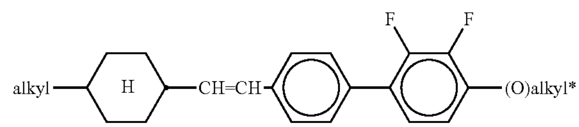

PY18

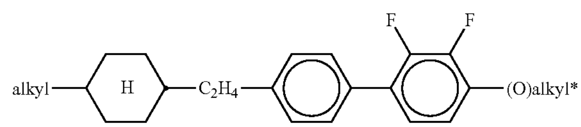

PY19

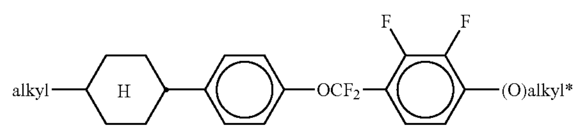

PY20

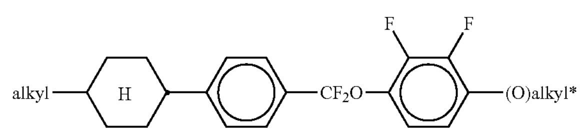

PY21

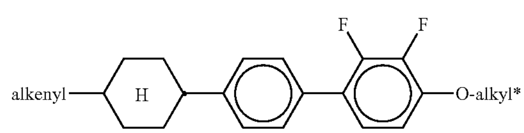

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

The compounds of the formula AC are preferably selected from the group of compounds of the following sub-formulae:

AC1

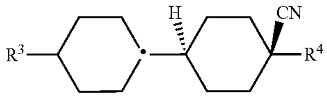

AC2

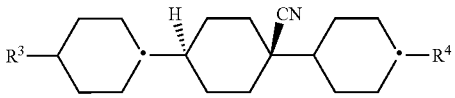

AC3

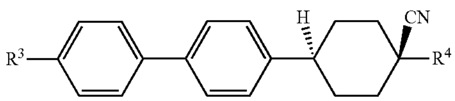

b) Mesogenic medium which additionally comprises one or more compounds of the following formula:

ZK

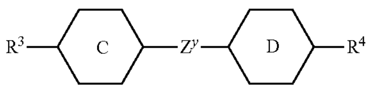

in which the individual radicals have the following meanings:

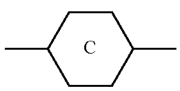

denotes

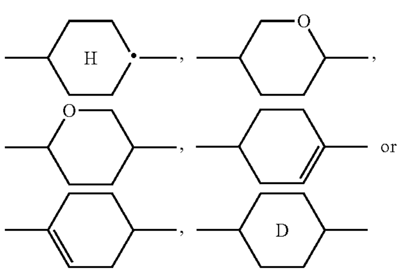

denotes

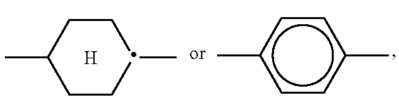

$R^3$ and $R^4$ each, independently of one another, denote alkyl having 1 to 12 C atoms, in which, in addition, one or two non-adjacent $CH_2$ groups may be replaced by —O—, —CH═CH—, —CO—, —O—CO— or —CO—O— in such a way that O atoms are not linked directly to one another, $Z^y$ denotes —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond.

The compounds of the formula ZK are preferably selected from the group consisting of the following sub-formulae:

ZK1

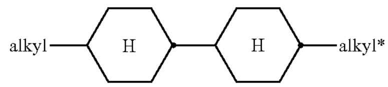

ZK2

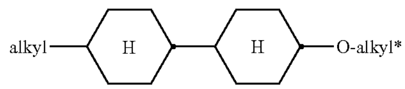

ZK3

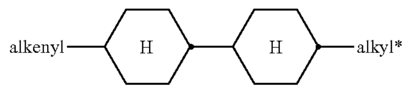

ZK4

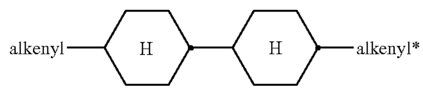

ZK5

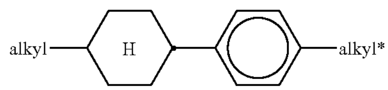

ZK6

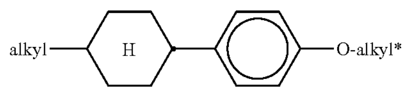

ZK7

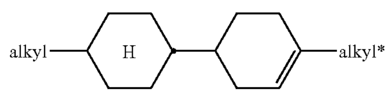

ZK8

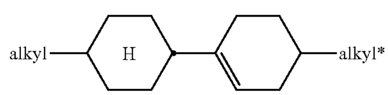

ZK9

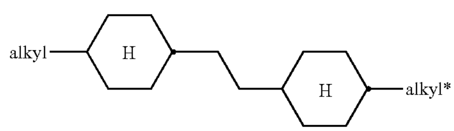

ZK10

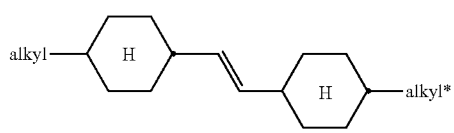

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Especially preferred are compounds of formula ZK1 and ZK3.

Particularly preferred compounds of formula ZK are selected from the following sub-formulae:

ZK1a

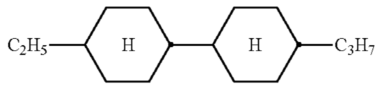

ZK1b

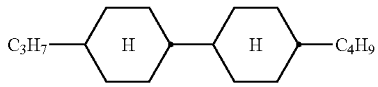

ZK1c

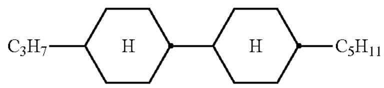

ZK3a

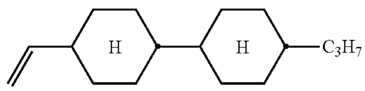

ZK3b

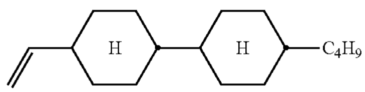

ZK3c

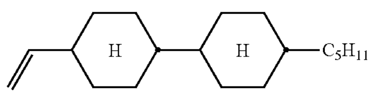

ZK3d

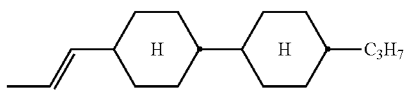

wherein the propyl, butyl and pentyl groups are straight-chain groups.

Most preferred are compounds of formula ZK1a and ZK3a.

c) Mesogenic medium which additionally comprises one or more compounds of the following formula:

DK

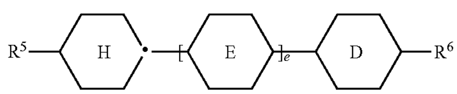

in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms,

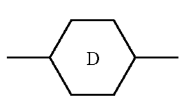

denotes

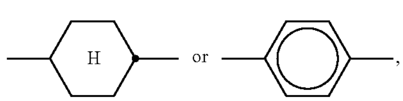

-continued

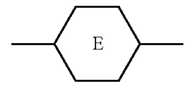

denotes

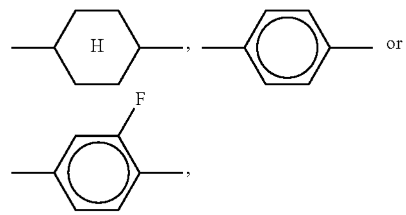

and e denotes 1 or 2.

The compounds of the formula DK are preferably selected from the group consisting of the following sub-formulae:

DK1

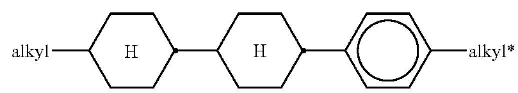

DK2

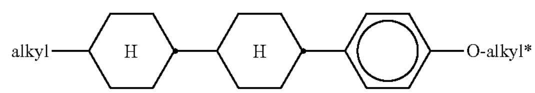

DK3

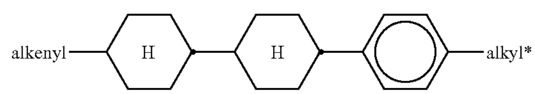

DK4

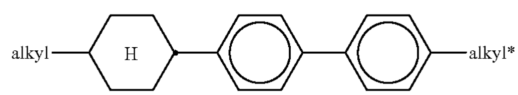

DK5

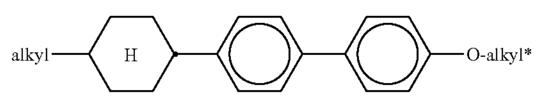

DK6

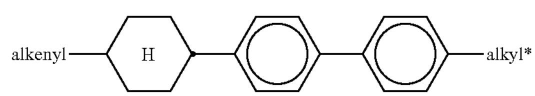

DK7

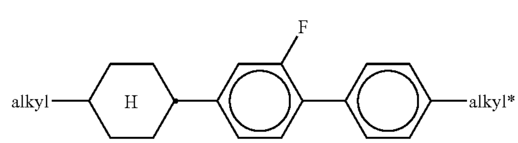

DK8

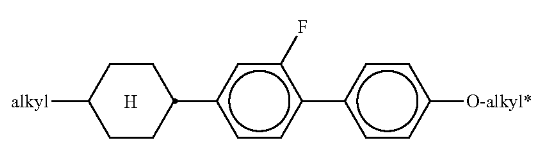

-continued

DK9

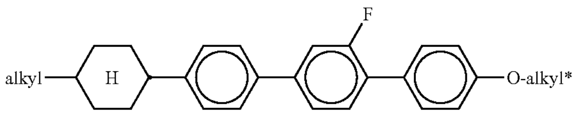

DK10

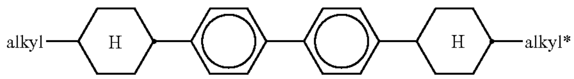

DK11

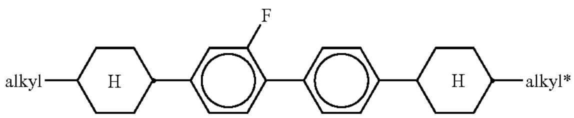

DK12

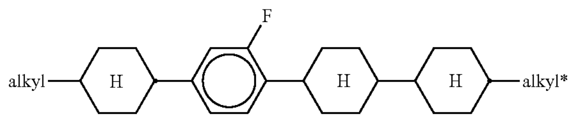

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Preference is given to compounds of the formulae DK1, DK4, DK7, DK9, DK10 and DK11.

d) Mesogenic medium which additionally comprises one or more compounds of the following formula:

LY

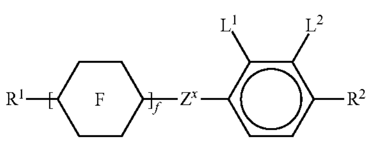

in which the individual radicals have the following meanings:

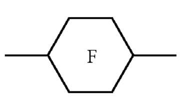

denotes

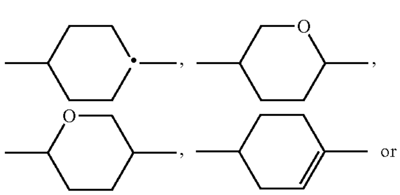

-continued

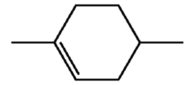

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, $Z^x$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1

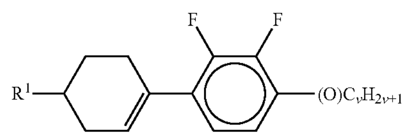

LY2

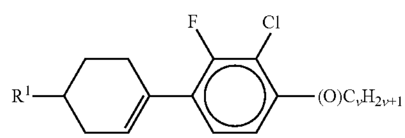

LY3

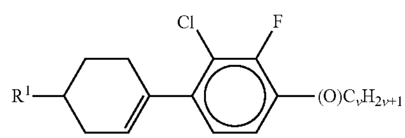

LY4

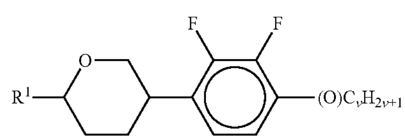

LY5

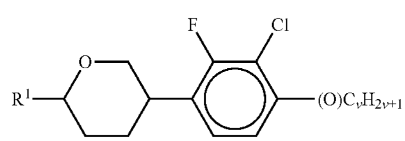

LY6

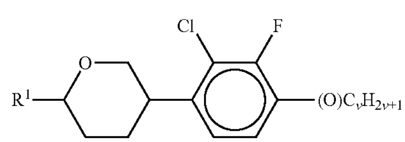

-continued

LY7

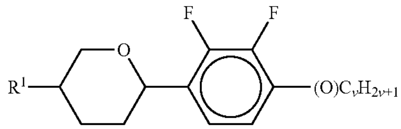

LY8

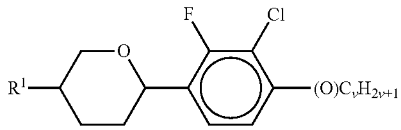

LY9

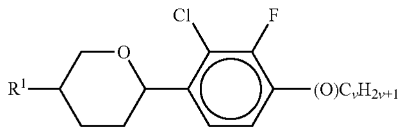

LY10

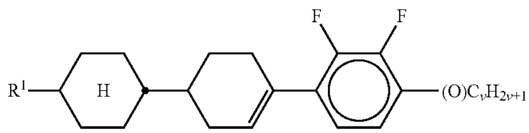

LY11

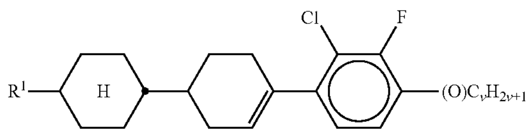

LY12

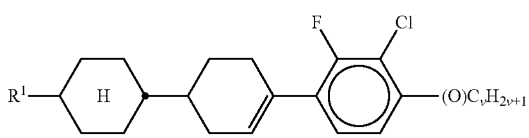

LY13

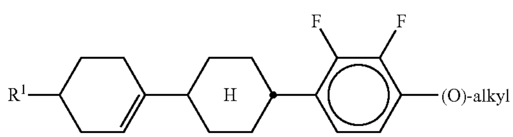

LY14

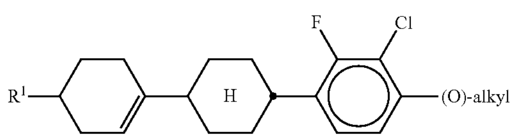

LY15

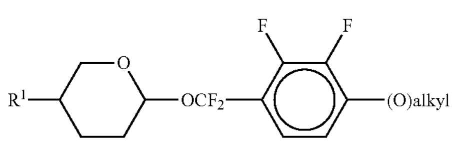

LY16

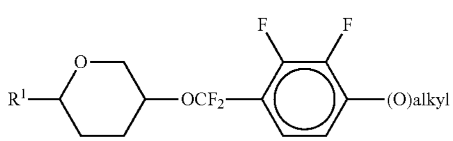

LY17

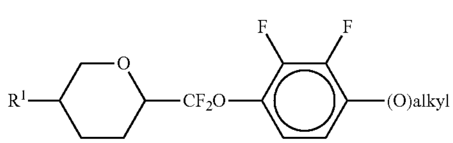

-continued

LY18

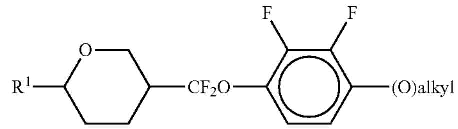

LY19

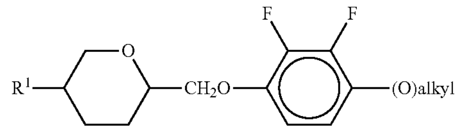

LY20

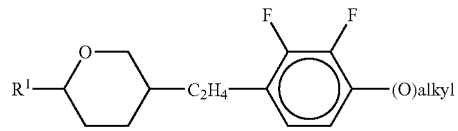

LY21

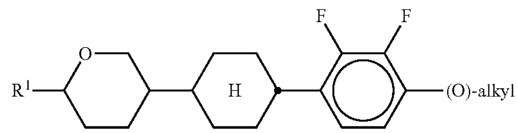

LY22

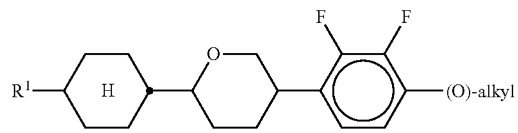

LY23

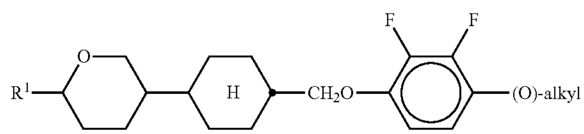

LY24

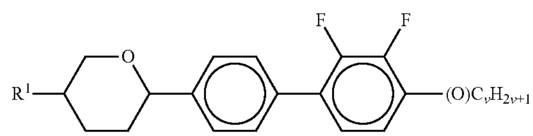

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

e) Mesogenic medium which additionally comprises one or more compounds selected from the group consisting of the following formulae:

G1

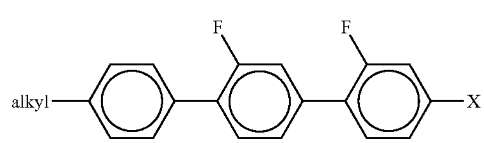

-continued

G2

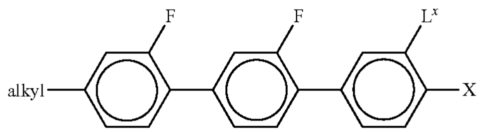

G3

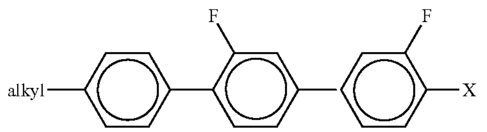

G4

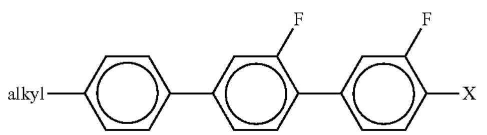

in which alkyl denotes $C_{1-6}$-alkyl, $L^x$ denotes H or F, and X denotes F, Cl, $OCF_3$, $OCHF_2$ or $OCH{=}CF_2$. Particular preference is given to compounds of the formula G1 in which X denotes F.

f) Mesogenic medium which additionally comprises one or more compounds selected from the group consisting of the following formulae:

Y1

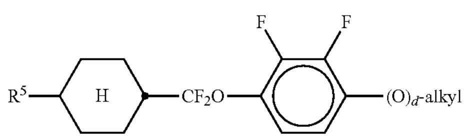

Y2

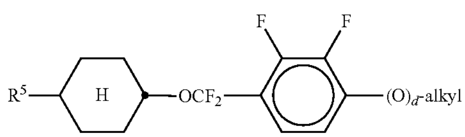

Y3

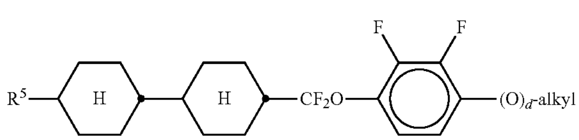

Y4

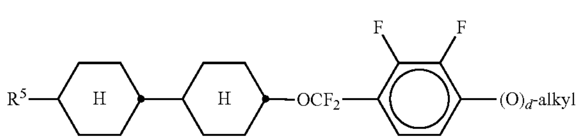

Y5

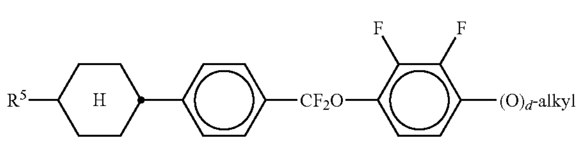

Y6

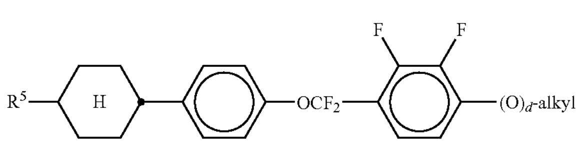

-continued

Y7

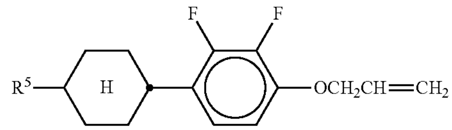

Y8

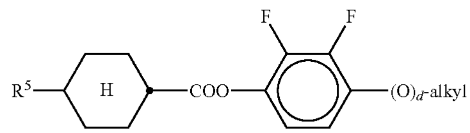

Y9

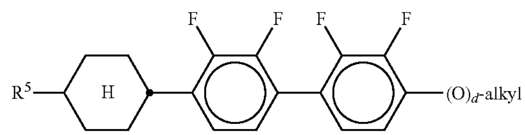

Y10

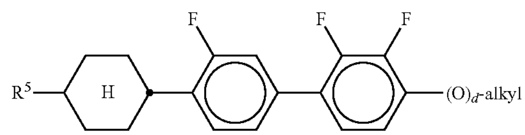

Y11

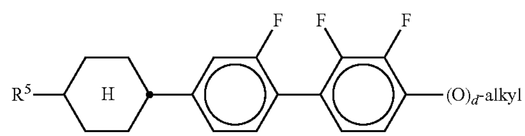

Y12

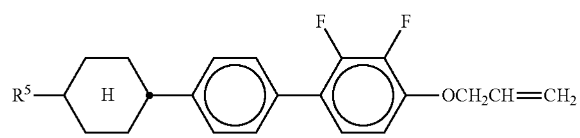

Y13

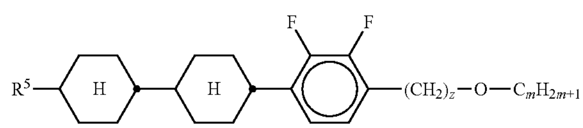

Y14

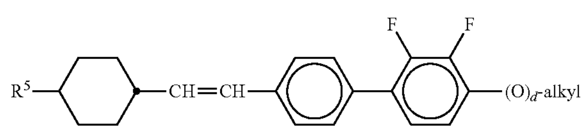

Y15

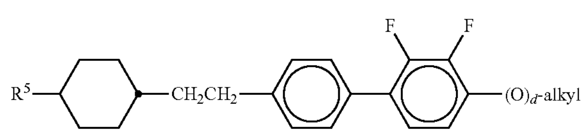

Y16

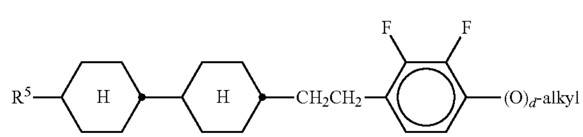

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) Mesogenic medium which additionally comprises one or more biphenyl compounds selected from the group consisting of the following formulae:

B1

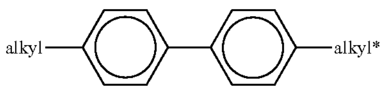

B2

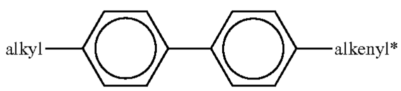

B3

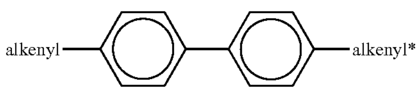

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

B1a

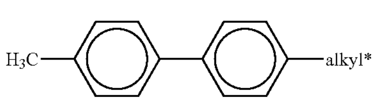

B2a

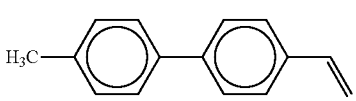

B2b

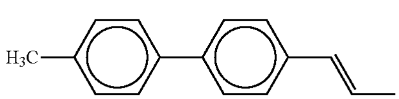

B2c

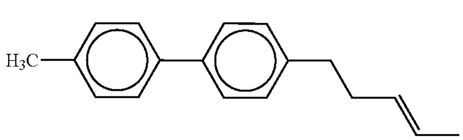

in which alkyl* denotes an alkyl radical having 1-6 C atoms. The medium according to the invention particularly preferably comprises one or more compounds of the formulae B1a and/or B2c.

h) Mesogenic medium which additionally comprises one or more terphenyl compounds of the following formula:

T

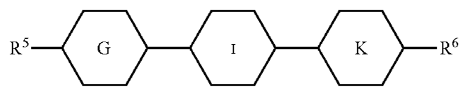

in which $R^5$ and $R^6$ each, independently of one another, have one of the meanings indicated above, and

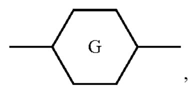

,

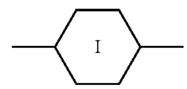

and

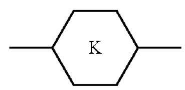

each, independently of one another, denote

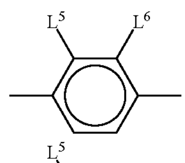

,

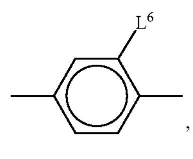

,

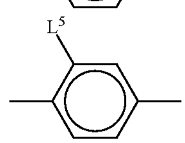

or

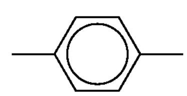

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

T3

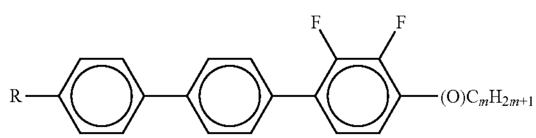

T4

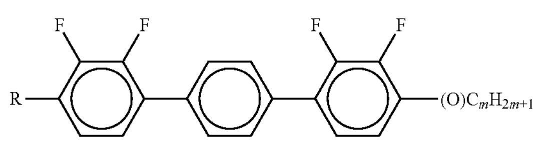

T5

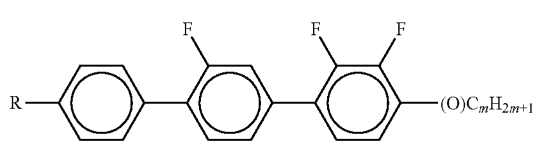

-continued
T6
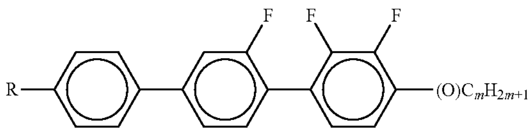
T7
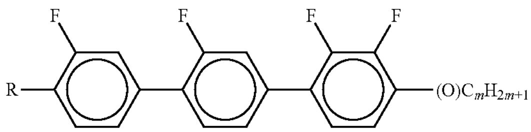
T8
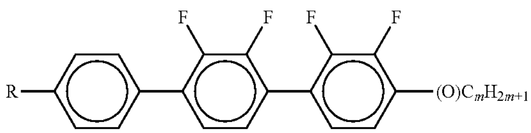
T9
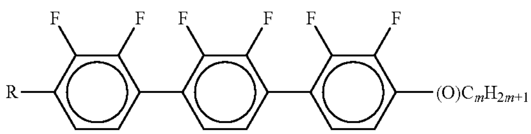
T10
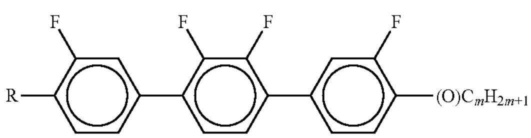
T11
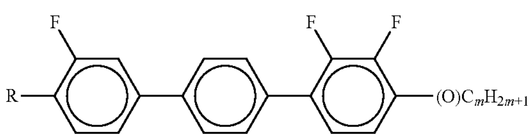
T12
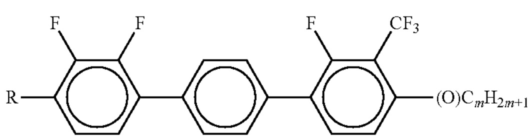
T13
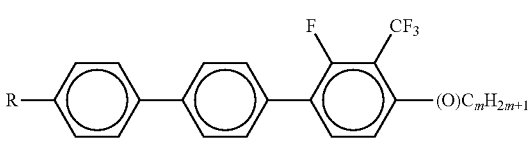
T14
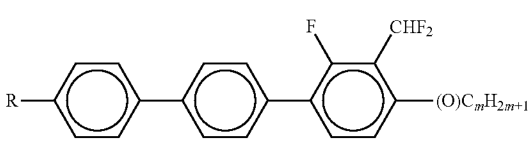
T15
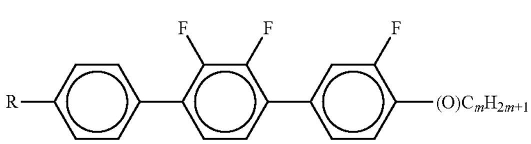
-continued
T16
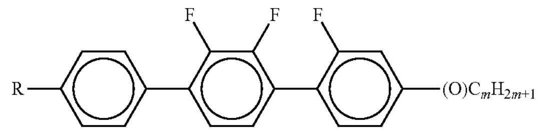
T17
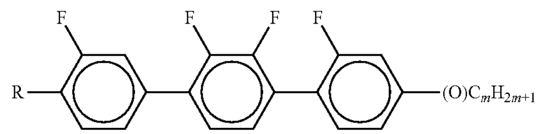
T18
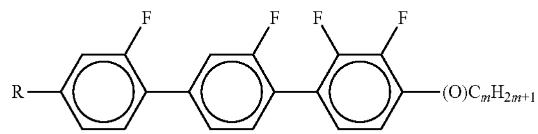
T19
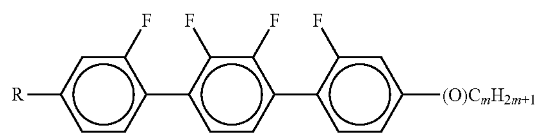
T20
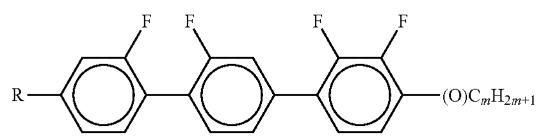
T21
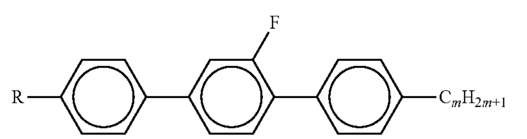
T22
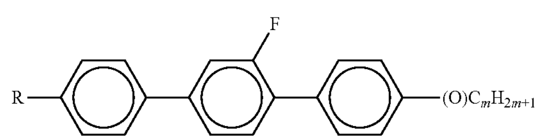
T23
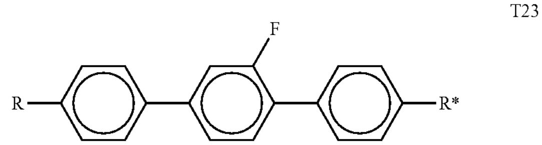
T24
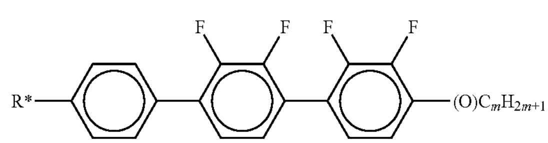
T25
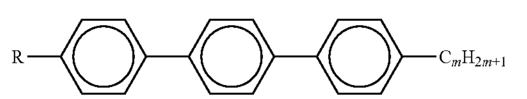

-continued

T26

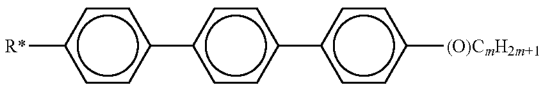

T27

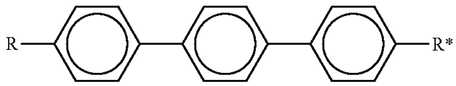

T28

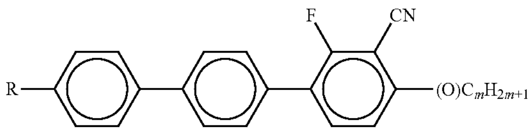

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

R preferably denotes methyl, ethyl, propyl, butyl, pentyl, hexyl, methoxy, ethoxy, propoxy, butoxy or pentoxy.

i) Mesogenic medium which additionally comprises one or more compounds of the following formula O:

O

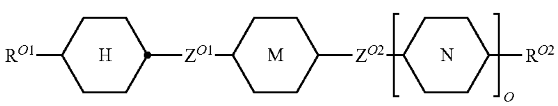

wherein

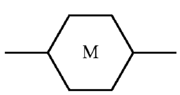

denotes

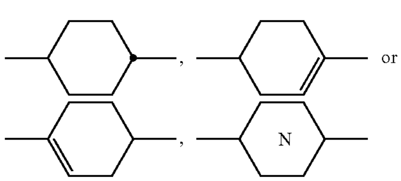

denotes

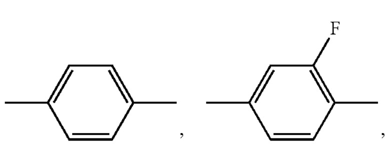

-continued

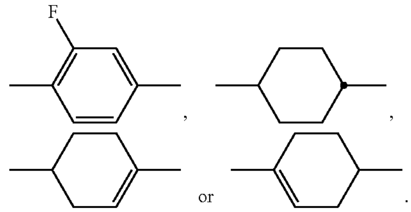

$R^{O1}$, $R^{O2}$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, $Z^{O1}$ denotes —$CH_2CH_2$—, —$CF_2CF_2$—, —C≡C— or a single bond, $Z^{O2}$ denotes $CH_2O$, —C(O)O—, —$CH_2CH_2$—, —$CF_2CF_2$—, or a single bond, is 1 or 2.

The compounds of the formula O are preferably selected from the group consisting of the following sub-formulae:

O1

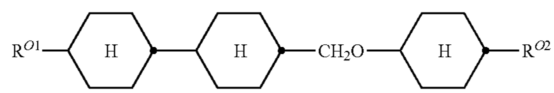

O2

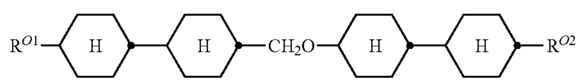

O3

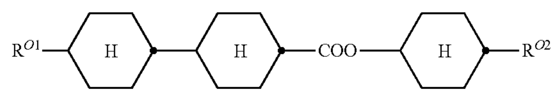

O4

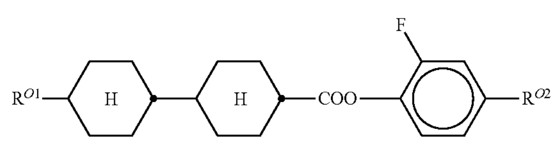

O5

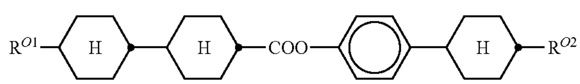

O6

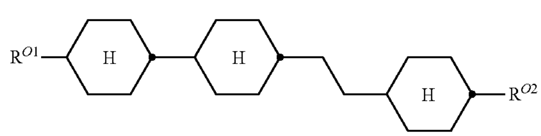

O7

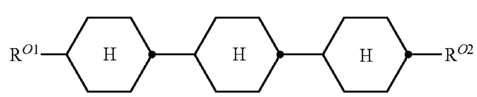

O8

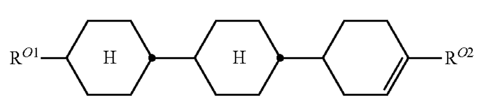

-continued

O9

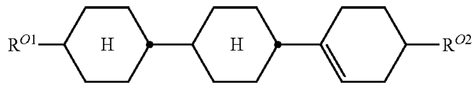

O10

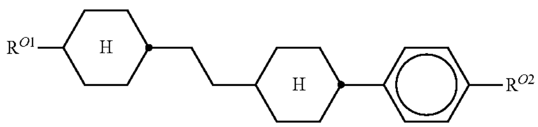

O11

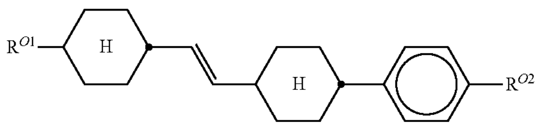

O12

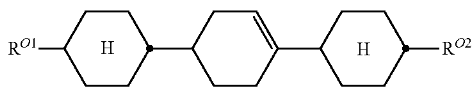

in which $R^{O1}$ and $R^{O2}$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O3, O4 and O5.

k) Mesogenic medium which additionally comprises one or more compounds of the following formula:

FI

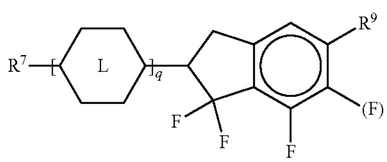

in which

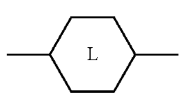

denotes

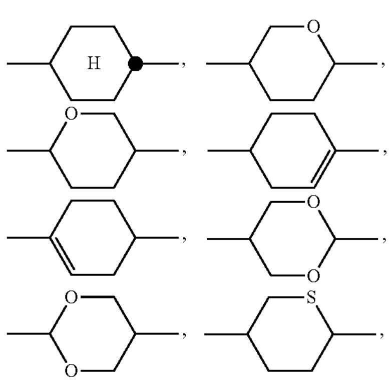

-continued

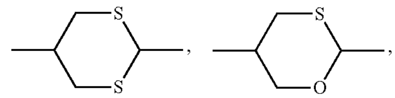

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

FI1

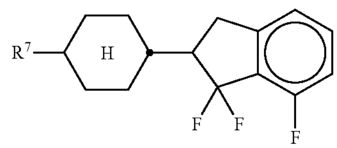

FI2

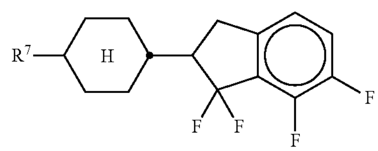

FI3

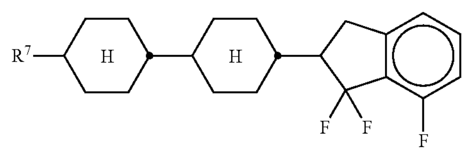

FI4

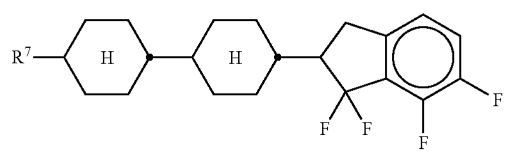

FI5

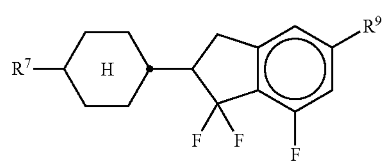

FI6

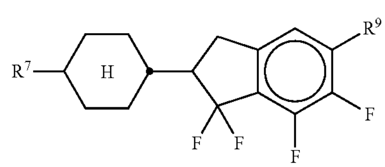

FI7

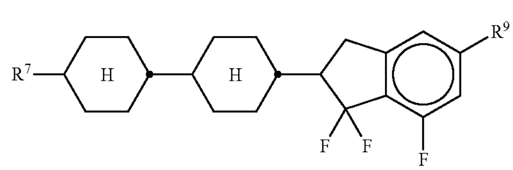

-continued

FI8

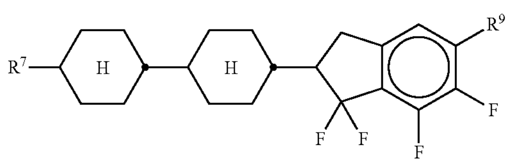

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

l) Mesogenic medium which additionally comprises one or more compounds selected from the group consisting of the following formulae:

VK1

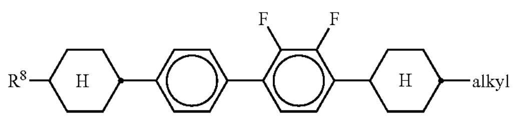

VK2

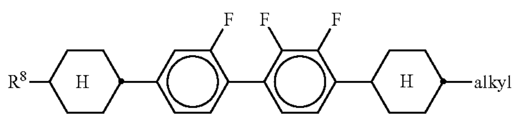

VK3

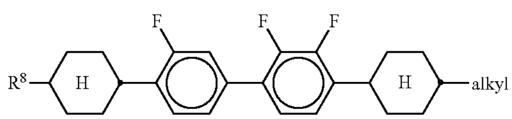

VK4

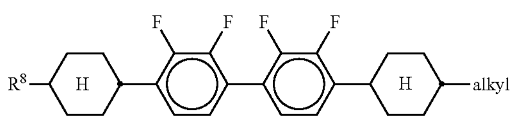

in which $R^8$ has the meaning indicated for $R^1$, and alkyl denotes a straight-chain alkyl radical having 1-6 C atoms.

m) Mesogenic medium which additionally comprises one or more compounds which contain a tetrahydronaphthyl or naphthyl unit, such as, for example, the compounds selected from the group consisting of the following formulae:

N1

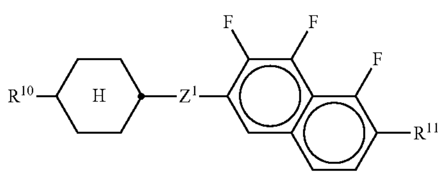

N2

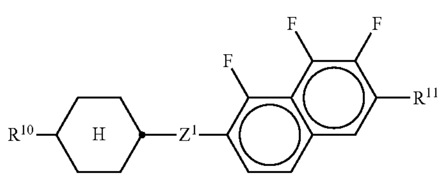

-continued

N3

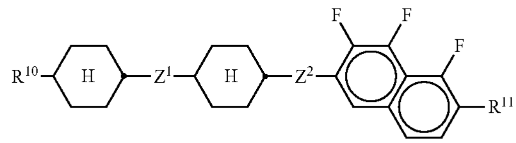

N4

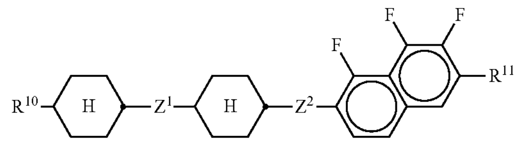

N5

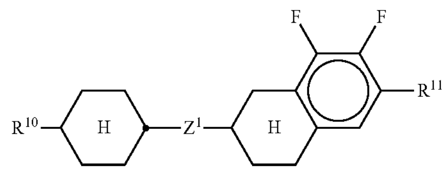

N6

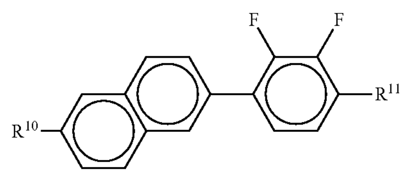

N7

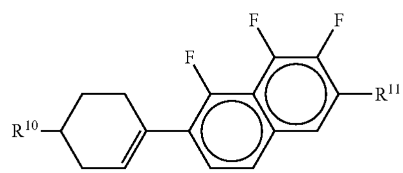

N8

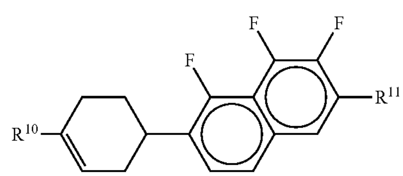

N9

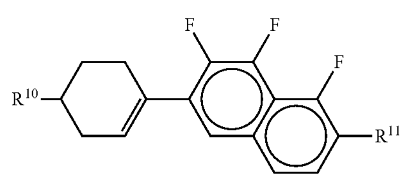

N10

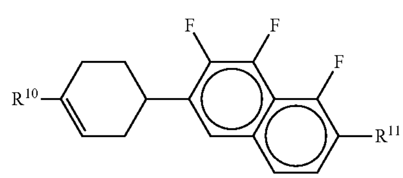

in which $R^{10}$ and $R^{11}$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH═CH—, —$(CH_2)_4$—, —$(CH_2)_3$O—, —O$(CH_2)_3$—, —CH═CH—$CH_2CH_2$—, —$CH_2CH_2$CH═CH—, —$CH_2$O—, —O$CH_2$—, —CO—O—, —O—CO—, —$C_2F_4$—, —CF═CF—, —CF═CH—, —CH═CF—, —$CH_2$— or a single bond.

n) Mesogenic medium which additionally comprises one or more difluorodibenzochromanes and/or chromanes of the following formulae:

BC

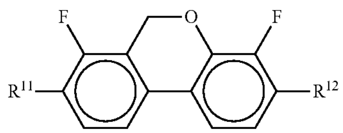

CR

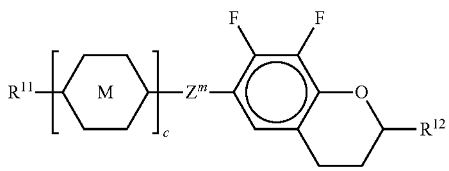

RC

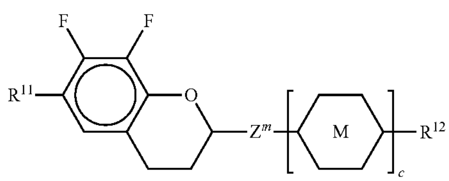

in which $R^{11}$ and $R^{12}$ each, independently of one another, have one of the meanings indicated above for $R^{11}$, ring M is trans-1,4-cyclohexylene or 1,4-phenylene, $Z^m$ —$C_2H_4$—, —$CH_2$O—, —O$CH_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

BC1

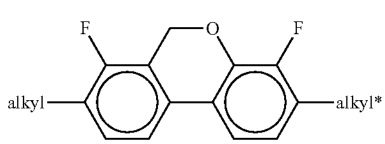

BC2

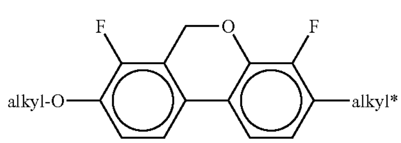

BC3

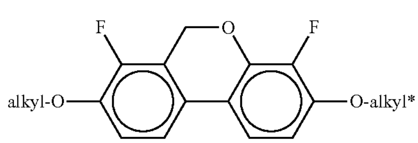

-continued

BC4

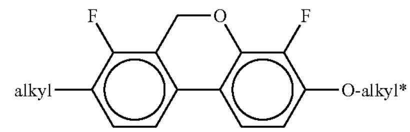

BC5

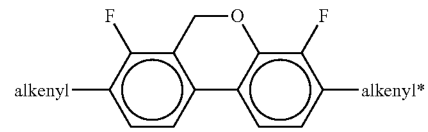

BC6

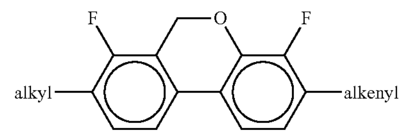

BC7

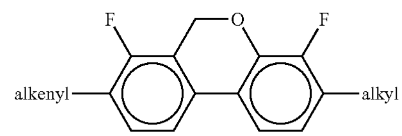

CR1

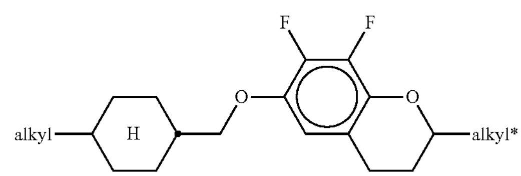

CR2

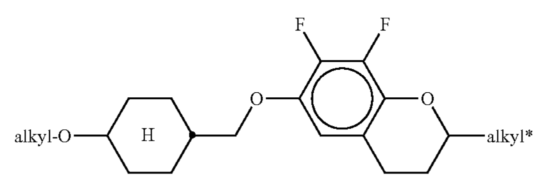

CR3

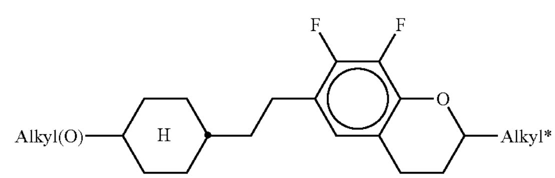

C4

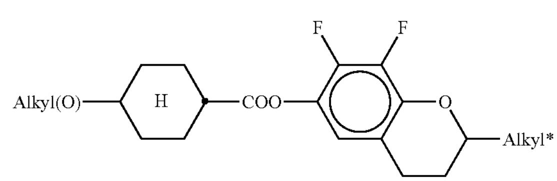

C5

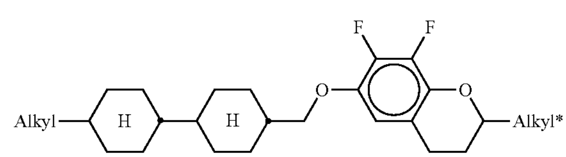

-continued

C6

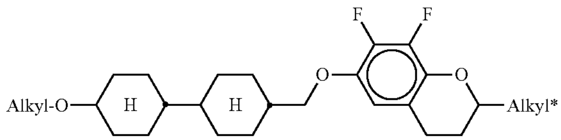

C7

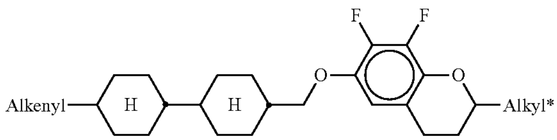

C8

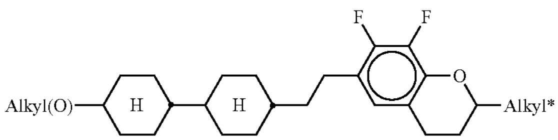

C9

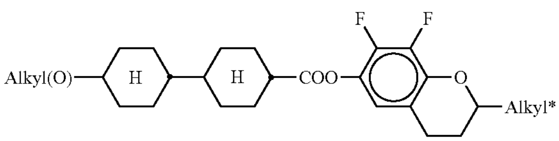

RC1

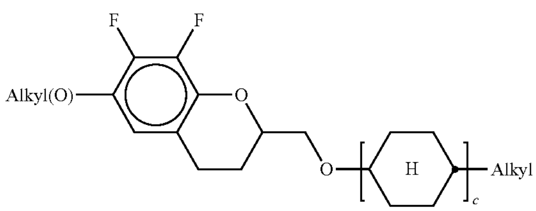

RC2

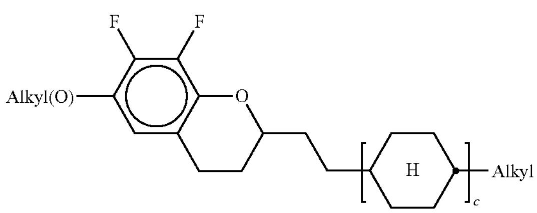

RC3

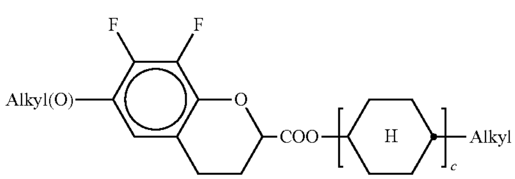

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Very particular preference is given to mixtures comprising one, two or three compounds of the formula BC-2.

o) Mesogenic medium which additionally comprises one or more fluorinated phenanthrenes and/or dibenzofurans of the following formulae:

PH

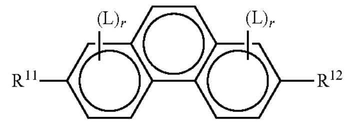

BF

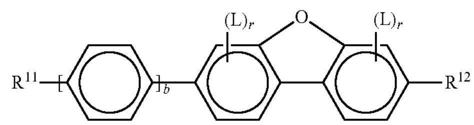

BSF

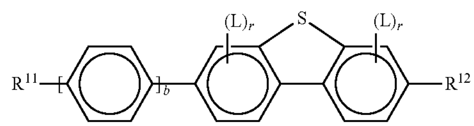

in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

PH1

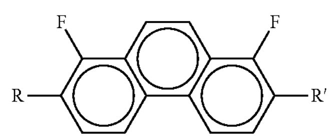

PH2

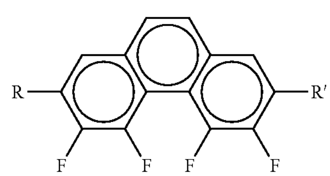

BF1

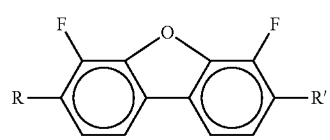

BF2

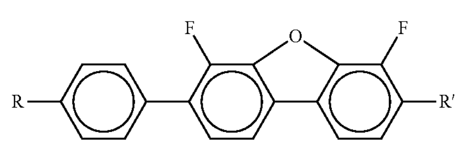

BSF1

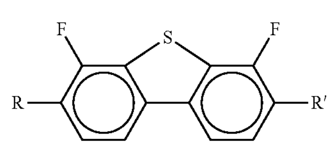

-continued

BSF2

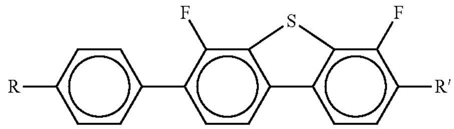

which R and R' each, independently of one another, denote a straight-chain alkyl or alkoxy radical having 1-7 C atoms.

p) Mesogenic medium which additionally comprises one or more monocyclic compounds of the following formula

Y

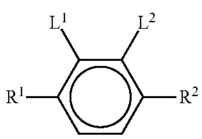

wherein $R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

Y1

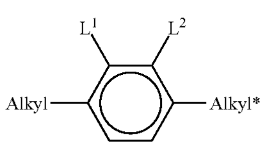

Y2

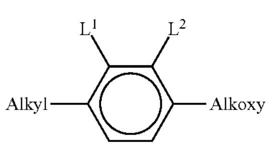

Y3

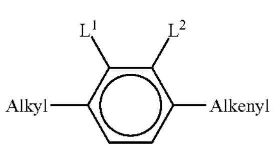

Y4

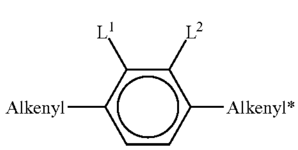

-continued

Y5

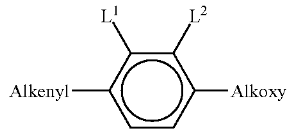

Y6

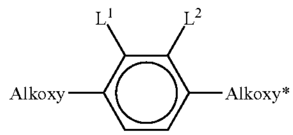

Y7

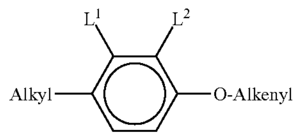

Y8

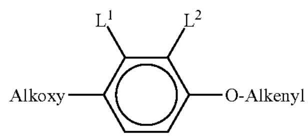

Y9

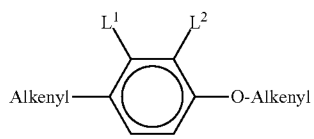

Y10

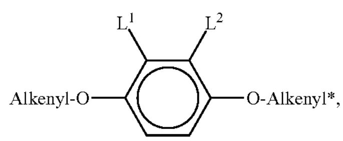

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred compounds of the formula Y are selected from the group consisting of the following sub-formulae:

Y6A

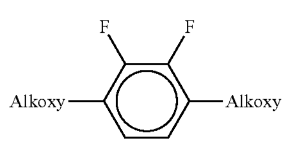

Y6B

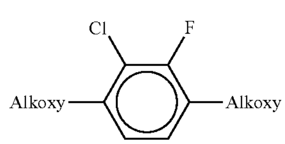

wherein Alkoxy preferably denotes straight-chain alkoxy with 3, 4, or 5 C atoms.

q) Mesogenic medium which comprises 1 to 15, preferably 3 to 12, compounds of the formulae CY1, CY2, PY1, PY2, AC1, AC2 and/or AC3. The proportion of these compounds in the mixture as a whole is preferably 20 to 99%, more preferably 30 to 95%, particularly preferably 40 to 90%. The content of these individual compounds is preferably in each case 2 to 20%.

r) Mesogenic medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

s) Mesogenic medium in which the proportion of compounds of the formulae CY, PY and ZK in the mixture as a whole is greater than 70%, preferably greater than 80%.

t) Mesogenic medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

u) Mesogenic medium which contains one or more, preferably 1, 2 or 3, compounds of formula T2. The content of these compounds in the mixture as a whole is preferably 1 to 20%.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the $\Delta n$ value of the mixture is to be $\geq 0.1$. Preferred mixtures comprise 2-20% by weight of one or more terphenyl compounds of the formula T, preferably selected from the group of compounds T1 to T22.

v) Mesogenic medium which contains one or more, preferably 1, 2 or 3, compounds of formula BF1 and/or BSF1. The total content of these compounds in the mixture as a whole is preferably 1 to 15%, preferably 2 to 10% particularly preferably 4 to 8%.

v) Preferred media comprise one or more compounds of formula O, preferably selected from the formulae O3, O4 and O5 in a total concentration of 2 to 25%, preferably 3 to 20%, particularly preferably 5 to 15%.

w) Preferred media comprise one or more compounds of formula DK, preferably selected from the formulae DK1, DK4, DK7, DK 9, DK10 and DK11. The total concentration of compounds of formulae DK9, DK10 and DK11 is preferably 2 to 25%, more preferably 3 to 20%, particularly preferably 5 to 15%.

In another preferred embodiment of the present invention the LC medium contains an LC host mixture with positive dielectric anisotropy. Accordingly, in further preferred embodiments the mesogenic media according to the invention comprise components selected from the following items aa) to zz):

aa) Mesogenic medium which comprises one or more compounds selected from the group of compounds of the formulae IIA to VIII as set forth below, in particular of the formulae IIA and III

IIA

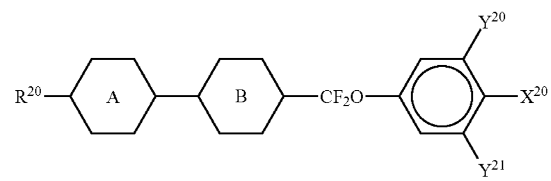

III

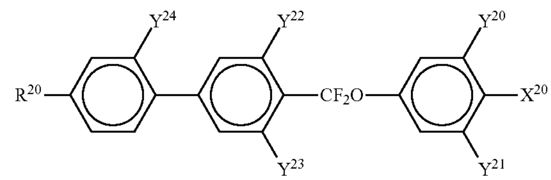

wherein $R^{20}$ each, identically or differently, denote a halogenated or unsubstituted alkyl or alkoxy radical having 1 to 15 C atoms, where, in addition, one or more $CH_2$ groups in these radicals may each be replaced, independently of one another, by —C≡C—, —$CF_2O$—, —CH═CH—,

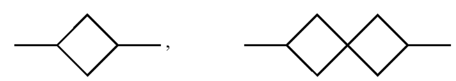

—O—, —CO—O— or —O—CO— in such a way that O atoms are not linked directly to one another, $X^{20}$ each, identically or differently, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $Y^{20-24}$ each, identically or differently, denote H or F;

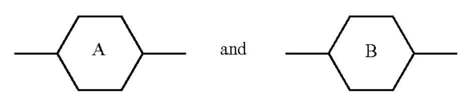

each, independently of one another, denote

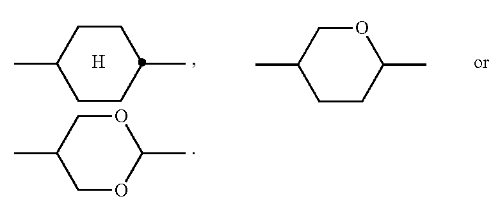

The compounds of the formula IIA are preferably selected from the following formulae:

IIAa

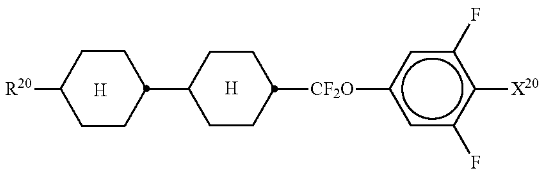

IIAb

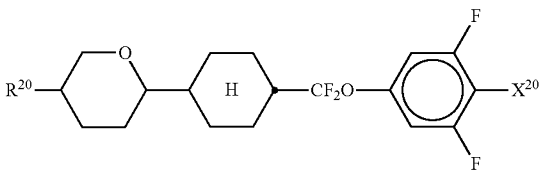

IIAc

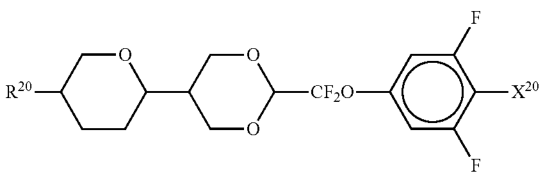

IIAd

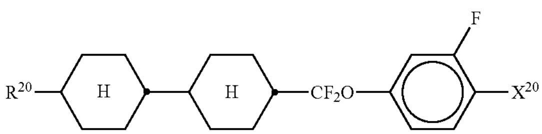

IIAe

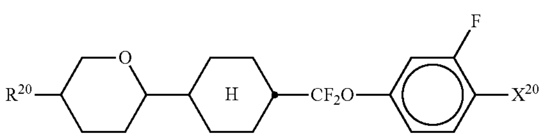

IIAf

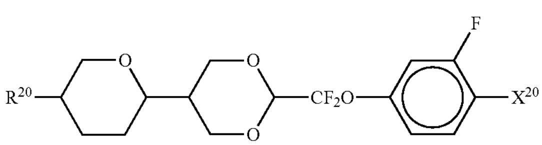

wherein $R^{20}$ and $X^{20}$ have the meanings indicated above. $R^{20}$ preferably denotes alkyl having 1 to 6 C atoms. $X^{20}$ preferably denotes F. Particular preference is given to compounds of the formulae IIAa and IIAb, in particular compounds of the formulae IIAa and IIAb wherein X denotes F.

The compounds of the formula III are preferably selected from the following formulae:

IIIa

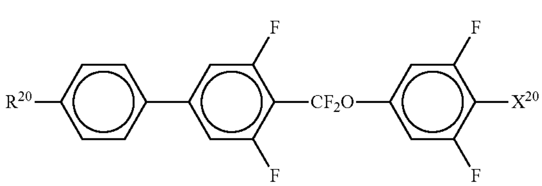

-continued

IIIb

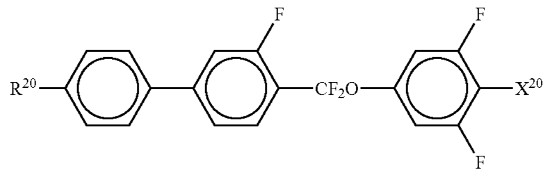

IIIc

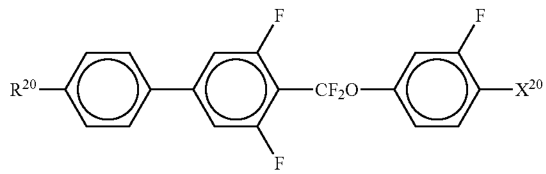

IIId

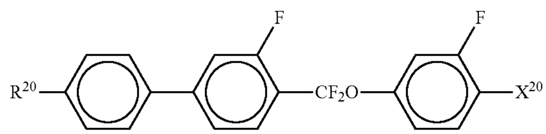

IIIe

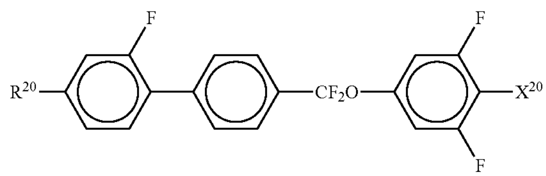

wherein $R^{20}$ and $X^{20}$ have the meanings indicated above. $R^{20}$ preferably denotes alkyl having 1 to 6 C atoms. $X^{20}$ preferably denotes F. Particular preference is given to compounds of the formulae IIIa and IIIe, in particular compounds of the formula IIIa;

bb) Mesogenic medium alternatively or additionally comprising one or more compounds selected from the following formulae:

IV

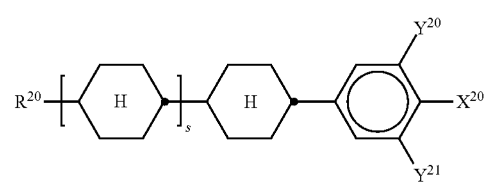

V

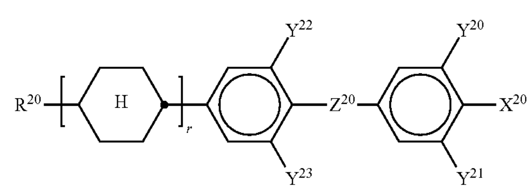

VI

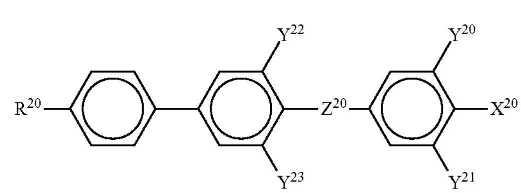

-continued

VII

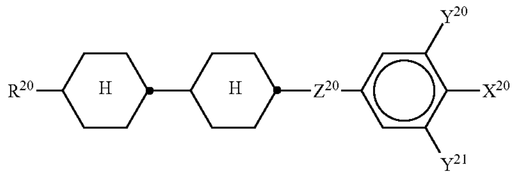

VIII

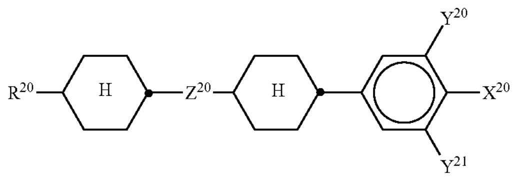

wherein $R^{20}$, $X^{20}$ and $Y^{20-23}$ have the meanings indicated above, and $Z^{20}$ denotes —$C_2H_4$—, —$(CH_2)_4$—, —CH═CH—, —CF═CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_2O$—, r denotes 0 or 1, and s denotes 0 or 1;

The compounds of the formula IV are preferably selected from the following formulae:

IVa

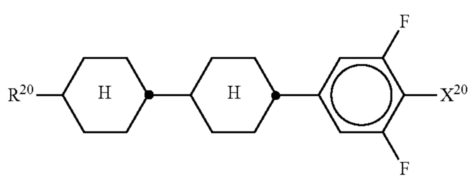

IVb

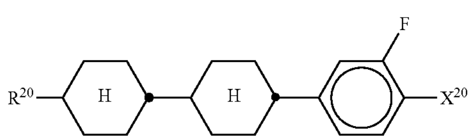

IVc

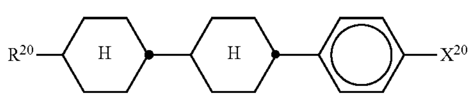

IVd

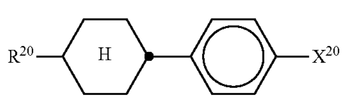

wherein $R^{20}$ and $X^{20}$ have the meanings indicated above.

$R^{20}$ preferably denotes alkyl having 1 to 6 C atoms. $X^{20}$ preferably denotes F, CN or $OCF_3$, furthermore OCF═$CF_2$ or Cl;

The compounds of the formula V are preferably selected from the following formulae:

Va

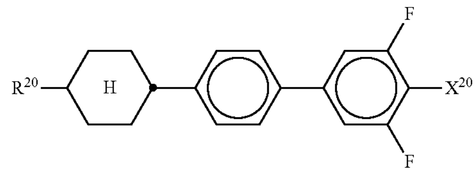

Vb

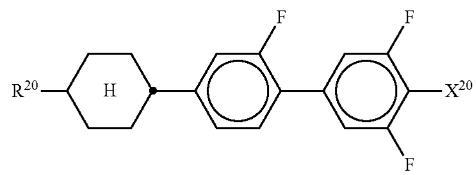

Vc

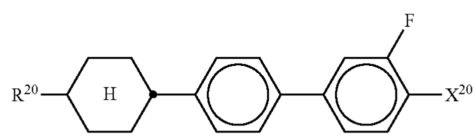

Vd

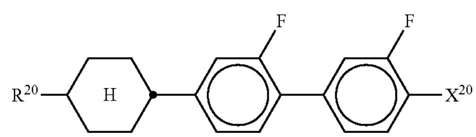

Ve

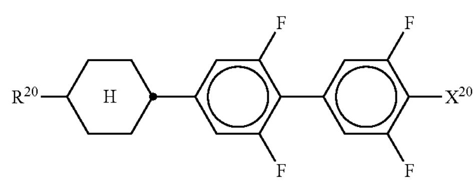

Vf

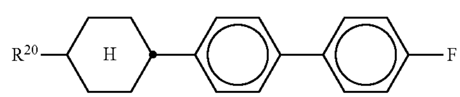

Vg

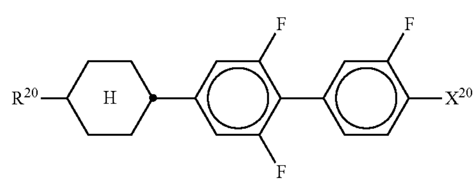

Vh

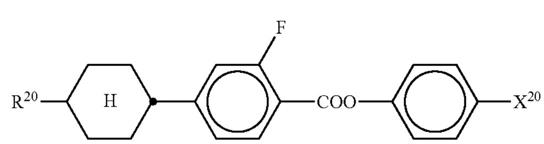

wherein $R^{20}$ and $X^{20}$ have the meanings indicated above.

$R^{20}$ preferably denotes alkyl having 1 to 6 C atoms. $X^{20}$ preferably denotes F and $OCF_3$, furthermore $OCHF_2$, $CF_3$, OCF═$CF_2$ and OCH═$CF_2$;

The compounds of the formula VI are preferably selected from the following formulae:

VIa

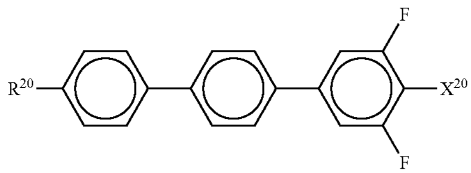

VIb

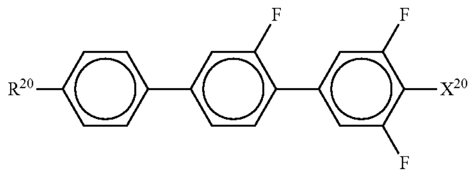

VIc

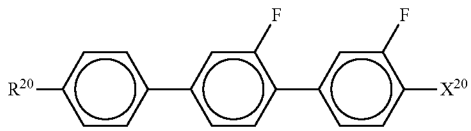

VId

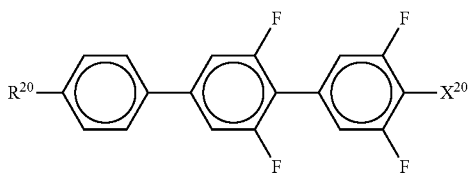

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $CF_3$, $CF{=}CF_2$, $OCHF_2$ and $OCH{=}CF_2$;

The compounds of the formula VII are preferably selected from the following formulae:

VIIa

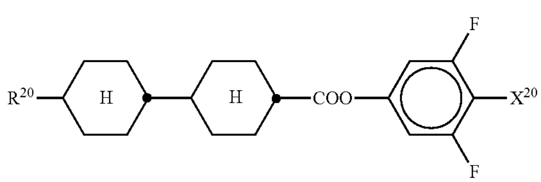

VIIb

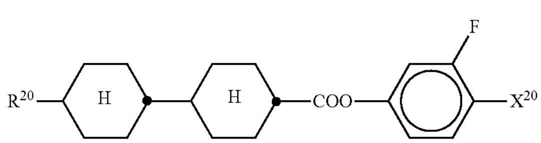

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $OCHF_2$ and $OCH{=}CF_2$.

cc) Mesogenic medium which additionally comprises one or more compounds selected from the formulae ZK1 to ZK10 given above. Especially preferred are compounds of formula ZK1 and ZK3.

Particularly preferred compounds of formula ZK are selected from the sub-formulae ZK1a, ZK1b, ZK1c, ZK3a, ZK3b, ZK3c and ZK3d.

dd) The mesogenic medium additionally comprises one or more compounds selected from the formulae DK1 to DK12 given above. Especially preferred compounds are DK1, DK4, DK7, DK 9, DK10 and DK11.

ee) The mesogenic medium additionally comprises one or more compounds selected from the following formula:

IX

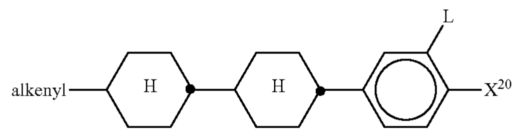

wherein $X^{20}$ has the meanings indicated above,

L denotes H or F, and

“alkenyl” denotes $C_{2-6}$-alkenyl.

ff) The compounds of the formulae DK-3a and IX are preferably selected from the following formulae:

DK3a

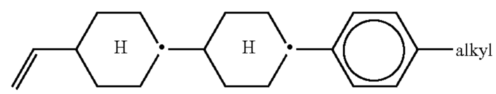

IXa

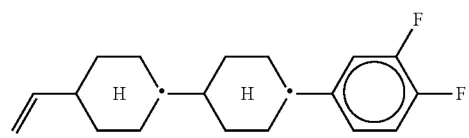

wherein “alkyl” denotes $C_{1-6}$-alkyl, preferably n-$C_3H_7$, n-$C_4H_9$ or n-$C_5H_{11}$, in particular n-$C_3H_7$.

gg) The medium additionally comprises one or more compounds selected from the formulae B1, B2 and B3 given above, preferably from the formula B2. The compounds of the formulae B1 to B3 are particularly preferably selected from the formulae B1a, B2a, B2b and B2c.

hh) The medium additionally comprises one or more compounds selected from the following formula:

X

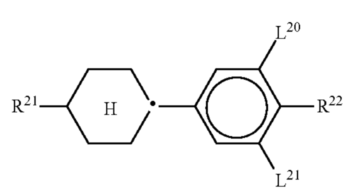

wherein $L^{20}$, $L^{21}$ denote H or F, and $R^{21}$ and $R^{22}$ each, identically or differently, denote n-alkyl, alkoxy, oxaalkyl, fluoroalkyl or alkenyl, each having up to 6 C atoms, and preferably each, identically or differently, denote alkyl having 1 to 6 C atoms.

ii) The medium comprises one or more compounds of the following formulae:

XI
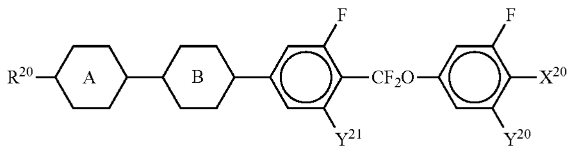
XII
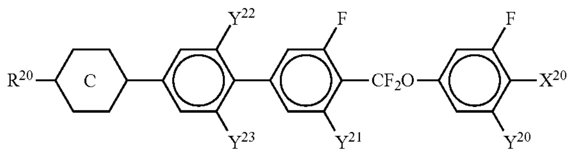
wherein $R^{20}$, $X^{20}$ and $Y^{20-23}$ have the meanings indicated in formula III, and
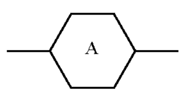 and 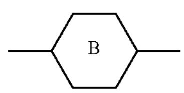
each, independently of one another, denote
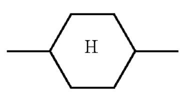, 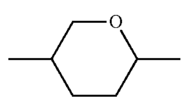 or
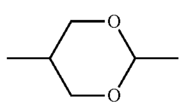 and 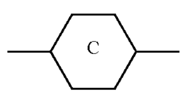
denotes
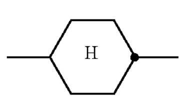, 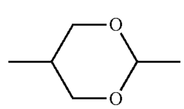,
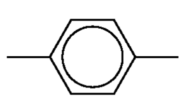, 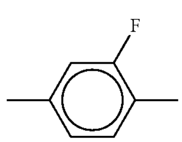 or
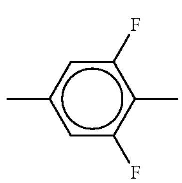
The compounds of the formulae XI and XII are preferably selected from the following formulae:
XIa
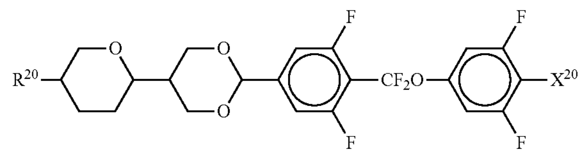
XIb
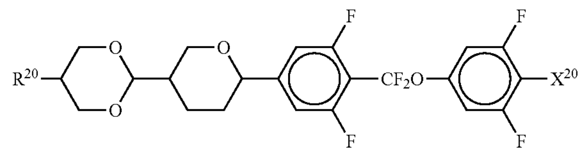
XIc
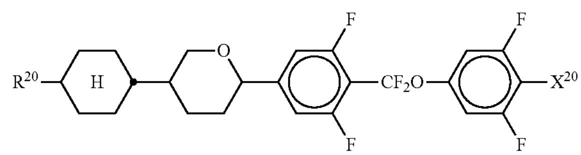
XId
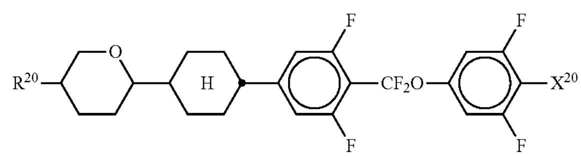
XIe
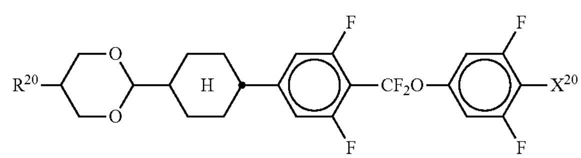
XIf
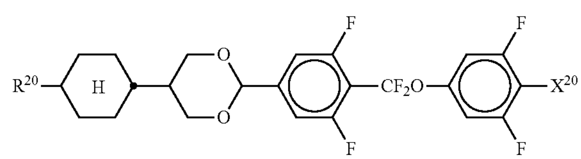
XIIa
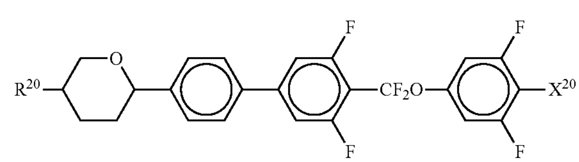
XIIb
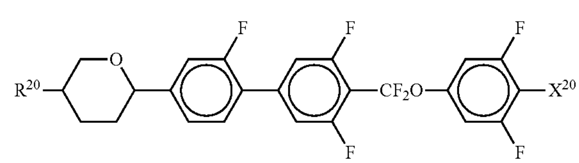
XIIc
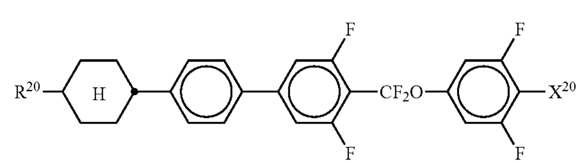

-continued

XIId

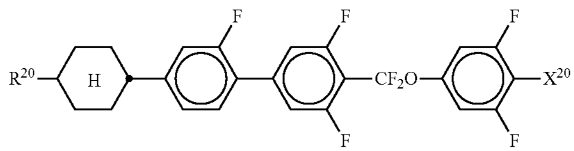

XIIe

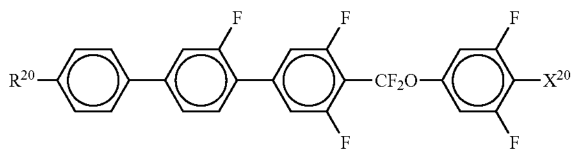

XIIf

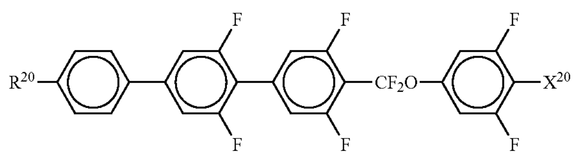

wherein $R^{20}$ and $X^{20}$ have the meaning indicated above and preferably $R^{20}$ denotes alkyl having 1 to 6 C atoms and $X^{20}$ denotes F. The mixture according to the invention particularly preferably comprises at least one compound of the formula XIIa and/or XIIe.

jj) The medium comprises one or more compounds of formula T given above, preferably selected from the group of compounds of the formulae T21 to T23 and T25 to T27.

Particular preference is given to compounds of the formulae T21 to T23. Very particular preference is given to the compounds of the formulae

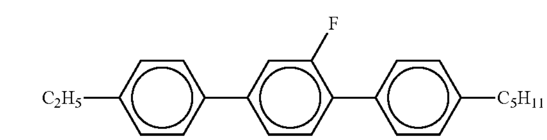

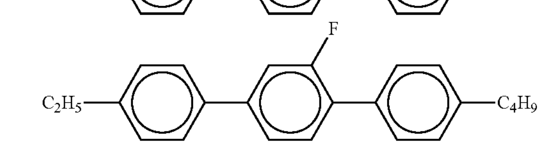

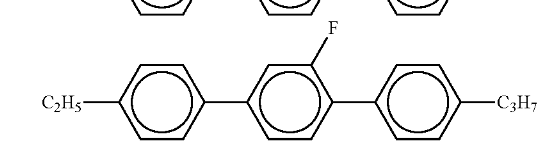

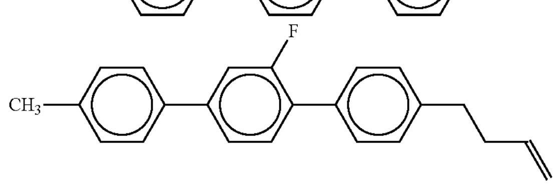

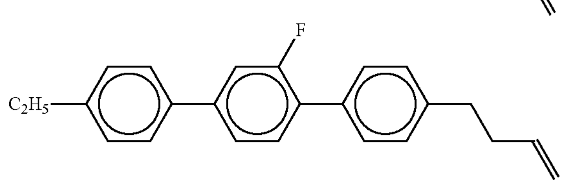

-continued

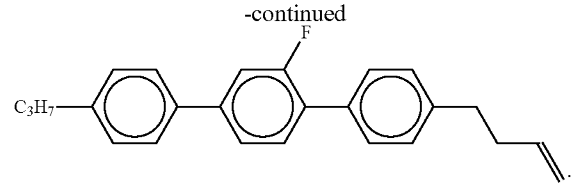

kk) The medium comprises one or more compounds selected from the group of formulae DK9, DK10 and DK11 given above.

ll) The medium additionally comprises one or more compounds selected from the following formulae:

XIII

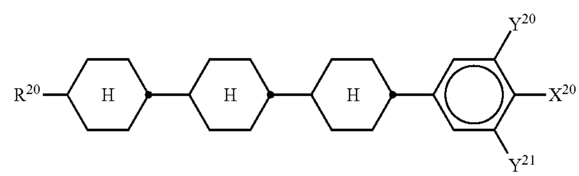

XIV

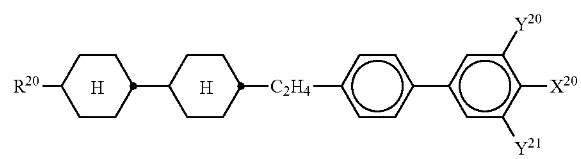

XV

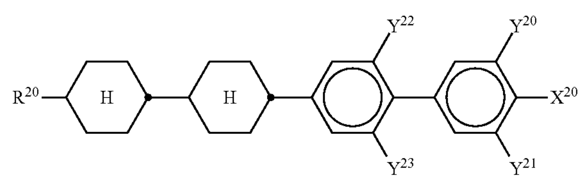

XVI

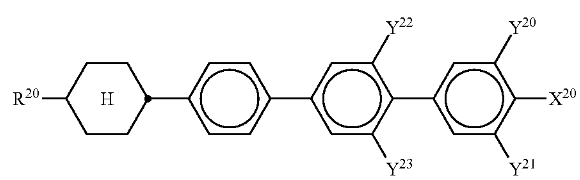

XVII

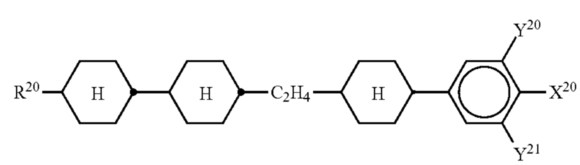

XVIII

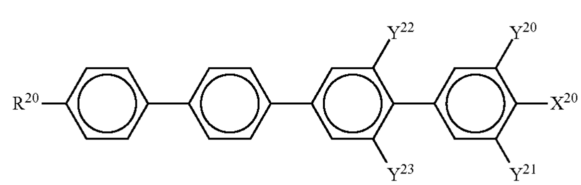

wherein $R^{20}$ and $X^{20}$ each, independently of one another, have one of the meanings indicated above, and $Y^{20-23}$ each, independently of one another, denote H or F. $X^{20}$ is preferably F, Cl, $CF_3$, $OCF_3$ or $OCHF_2$. $R^{20}$ preferably denotes alkyl, alkoxy, oxaalkyl, fluoroalkyl or alkenyl, each having up to 6 C atoms.

The mixture according to the invention particularly preferably comprises one or more compounds of the formula XVIII-a, XVIII-a

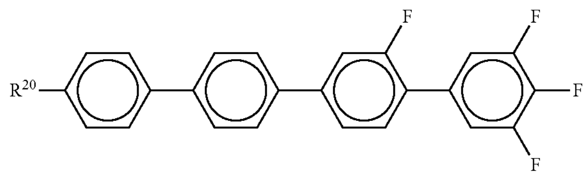

wherein $R^{20}$ has the meanings indicated above. $R^{20}$ preferably denotes straight-chain alkyl, in particular ethyl, n-propyl, n-butyl and n-pentyl and very particularly preferably n-propyl. The compound(s) of the formula XVIII, in particular of the formula XVIII-a, is (are) preferably employed in the mixtures according to the invention in amounts of 0.5-20% by weight, particularly preferably 1-15% by weight.

mm) The medium additionally comprises one or more compounds of the formula XIX,

XIX

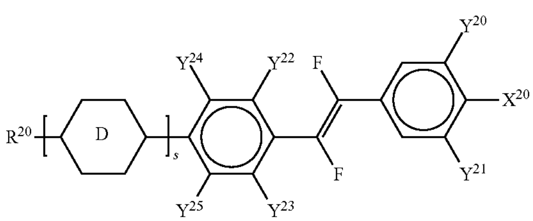

wherein $R^{20}$, $X^{20}$ and $Y^{20-25}$ have the meanings indicated in formula III, s denotes 0 or 1, and

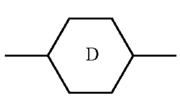

denotes

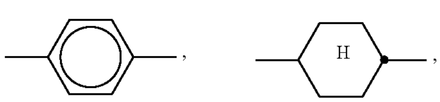

or

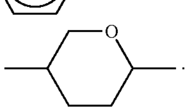

In the formula XIX, $X^{20}$ may also denote an alkyl radical having 1-6 C atoms or an alkoxy radical having 1-6 C atoms. The alkyl or alkoxy radical is preferably straight-chain.

$R^{20}$ preferably denotes alkyl having 1 to 6 C atoms. $X^{20}$ preferably denotes F;

The compounds of the formula XIX are preferably selected from the following formulae:

XIXa

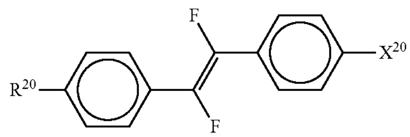

XIXb

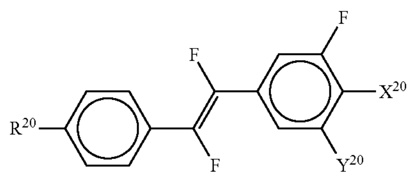

XIXc

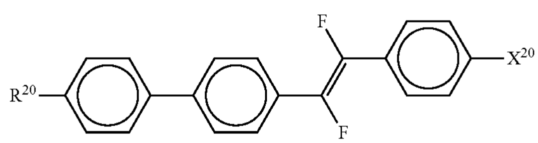

XIXd

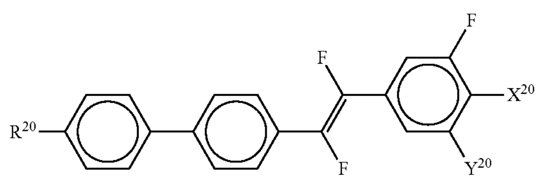

XIXe

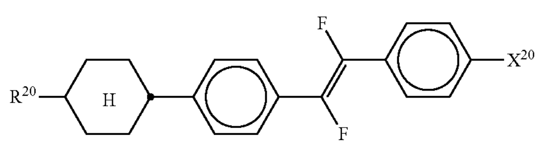

XIXf

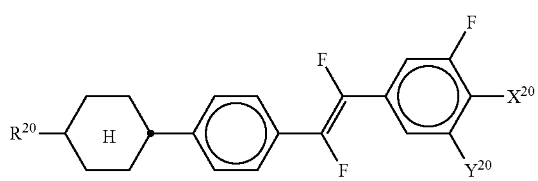

XIXg

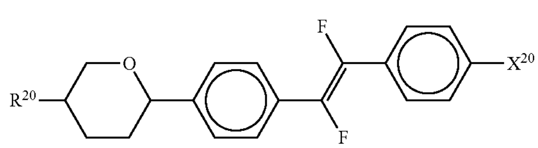

XIXh

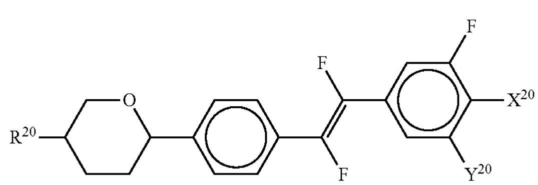

wherein $R^{20}$, $X^{20}$ and $Y^{20}$ have the meanings indicated above. $R^{20}$ preferably denotes alkyl having 1 to 6 C atoms. $X^{20}$ preferably denotes F, and $Y^{20}$ is preferably F;

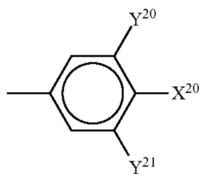

is preferably

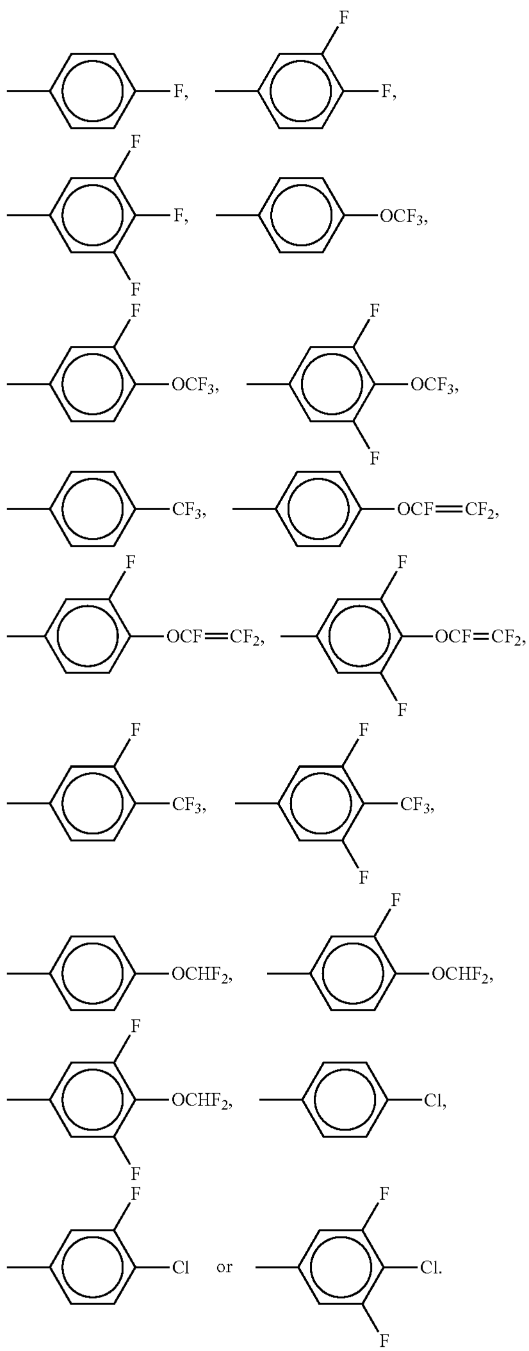

$R^{20}$ is straight-chain alkyl or alkenyl having 2 to 6 C atoms.

nn) The medium comprises one or more compounds of the formulae G1 to G4 given above, preferably selected from G1 and G2 wherein alkyl denotes $C_{1-6}$-alkyl, $L^x$ denotes H and X denotes F or Cl. In G2, X particularly preferably denotes Cl.

oo) The medium comprises one or more compounds of the following formulae:

XX

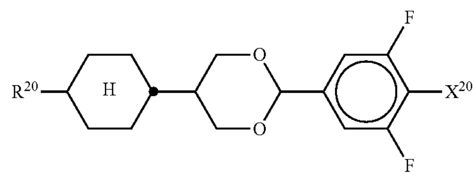

XXI

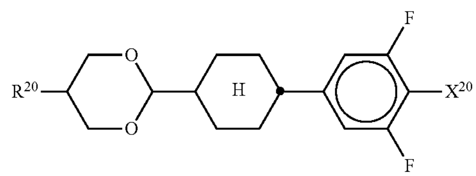

XXII

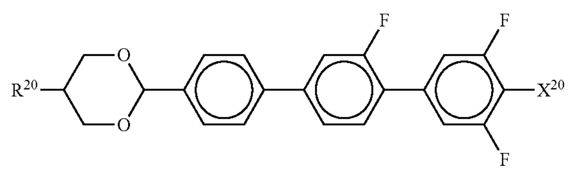

wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula XXII wherein $X^{20}$ preferably denotes F. The compound(s) of the formulae XX-XXII is (are) preferably employed in the mixtures according to the invention in amounts of 1-20% by weight, particularly preferably 1-15% by weight. Particularly preferred mixtures comprise at least one compound of the formula XXII.

pp) The medium comprises one or more compounds of the following pyrimidine or pyridine compounds of the formulae

M-1

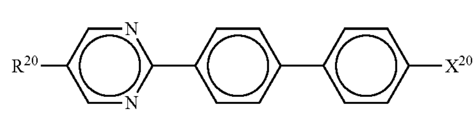

M-2

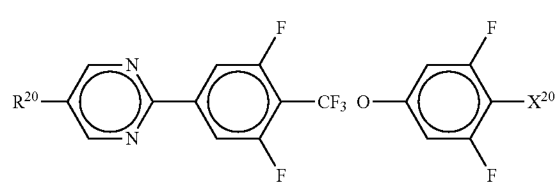

-continued

M-3

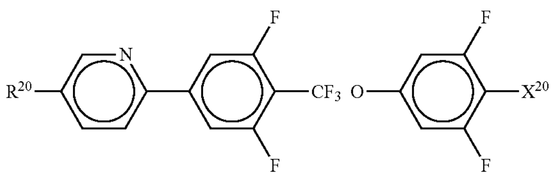

wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula M-1, wherein $X^{20}$ preferably denotes F. The compound(s) of the formulae M-1-M-3 is (are) preferably employed in the mixtures according to the invention in amounts of 1-20% by weight, particularly preferably 1-15% by weight.

qq) The medium comprises two or more compounds of the formula XII, in particular of the formula XIIa and/or XIIe.

rr) The medium comprises 2-30% by weight, preferably 3-20% by weight, particularly preferably 3-15% by weight, of compounds of the formula XII.

ss) Besides the compounds of the formulae XII, the medium comprises further compounds selected from the group of the compounds of the formulae IIA-XVIII.

tt) The proportion of compounds of the formulae IIA-XVIII in the mixture as a whole is 40 to 95%, preferably 50 to 90%, particularly preferably 55 to 88% by weight.

uu) The medium preferably comprises 10-40%, more preferably 12-30%, particularly preferably 15 to 25% by weight of compounds of the formulae IIA and/or III.

vv) The medium comprises 1-10% by weight, particularly preferably 2-7% by weight, of compounds of the formula XV and/or XVI.

ww) The medium comprises at least one compound of the formula XIIa and/or at least one compound of the formula XIIe and at least one compound of the formula IIIa and/or IIAa.

xx) Preferred media comprise one or more compounds of formula O, preferably selected from the formulae O3, O4 and O5 in a total concentration of 2 to 25%, preferably 3 to 20%, particularly preferably 5 to 15%.

yy) Preferred media comprise one or more compounds of formula DK, preferably selected from the formulae DK1, DK4, DK7, DK 9, DK10 and DK11. The total concentration of compounds of formulae DK9, DK10 and DK11 is preferably 2 to 25%, more preferably 3 to 20%, particularly preferably 5 to 15%.

zz) Preferred media comprise one or more compounds of formulae IV to VI, preferably selected from the group of compounds of formulae IVa, IVb, IVc, IVd, Va, Vc and VIb in a concentration of 10 to 80%, preferably 12 to 75% particularly preferably 15 to 70% by weight.

In case the medium has negative dielectric anisotropy, the value for the dielectric anisotropy ($\Delta\varepsilon$) is preferably in the range from −2.0 to −8.0, more preferably in the range from −3.0 to −6.0, and particularly preferably from −3.5 to −5.0.

In case the medium has positive dielectric anisotropy, the value for $\Delta\varepsilon$ is preferably in the range from 3.0 to 60.0, more preferably in the range from 5.0 to 30.0, and particularly preferably from 8.0 to 15.0.

The liquid-crystalline media in accordance with the present invention preferably have a clearing point of 70° C. or more, more preferably 80° C. or more, even more preferably 90° C. or more, still more preferably 105° C. or more, and particularly preferably 110° C. or more. In an embodiment the liquid-crystalline medium according to the invention has a clearing point in the range from 70° C. to 170° C.

The high clearing point as defined can be beneficial in terms of the performance and the reliability of the devices which use the liquid-crystalline medium. In particular, the medium can maintain its functional properties over a suitably broad temperature range and also at elevated temperatures. This can be particularly advantageous for the use in window elements for regulating the passage of sunlight, especially when the window elements are exposed to direct or prolonged irradiation by sunlight. The high clearing point can also contribute to a favourably high degree of order of the liquid-crystalline host molecules, and hence the dichroic dye guest molecules at typical working temperatures, which can increase the obtainable contrast between the switching states.

The clearing point, in particular the phase transition temperature between the nematic phase and the isotropic phase, can be measured and determined by commonly known methods, e.g. using a Mettler oven, a hot-stage under a polarizing microscope, or differential scanning calorimetry (DSC) analysis. According to the invention the clearing point is preferably determined using a Mettler oven.

The nematic phase of the media according to the invention preferably extends at least from −10° C. or less to 70° C. or more. An even broader nematic phase range is more preferred, in particular extending up to 85° C. or more, more preferably extending at least from −20° C. or less to 100° C. or more and particularly preferably extending from −30° C. or less to 110° C. or more.

In a preferred embodiment of the present invention the birefringence ($\Delta n$) of the liquid-crystalline media is in the range of 0.040 or more to 0.080 or less, more preferably in the range of 0.045 or more to 0.070 or less and most preferably in the range of 0.050 or more to 0.060 or less. In this embodiment, the dielectric anisotropy is positive or negative, preferably negative.

In another preferred embodiment of the present invention the $\Delta n$ of the liquid-crystalline media is in the range of 0.075 or more to 0.130 or less, more preferably in the range of 0.090 or more to 0.125 or less and most preferably in the range of 0.095 or more to 0.120 or less.

In yet another preferred embodiment of the present invention the $\Delta n$ of the liquid crystal media is in the range of 0.100 or more to 0.200 or less, more preferably in the range of 0.110 or more to 0.180 or less and most preferably in the range of 0.120 or more to 0.160 or less.

Each of the one or more compounds selected from the group of compounds of formula I and the one or more compounds selected from the group of compounds of formula II as set forth above and below is preferably present in the liquid-crystalline medium in a proportion of 0.005% by weight to 12.5% by weight, more preferably 0.01% by weight to 10% by weight, even more preferably 0.025% by weight to 7.5% by weight, yet even more preferably 0.05% by weight to 5% by weight, still even more preferably 0.1% by weight to 2.5% by weight and particularly preferably 0.25% by weight to 1% by weight, based on the overall weight of the entire medium.

Preferably, the one or more compounds selected from the group of compounds of formula I and the one or more compounds selected from the group of compounds of formula II are present in the liquid-crystalline medium overall in a total concentration which is in the range of 0.01% by weight to 30% by weight, more preferably 0.025% by weight to 25% by weight, even more preferably 0.05% by weight to 15% by weight, still even more preferably 0.1% by weight to 10% by weight and particularly preferably 0.5% by weight to 5% by weight.

The media preferably comprise two, three, four, five, six, seven or eight compounds of formula I and two, three, four, five, six, seven or eight compounds of formula II.

The LC medium according to the invention preferably is a nematic liquid crystal.

However, in an embodiment it is also possible to add chiral compounds, in particular one or more chiral dopants, to the LC medium to produce a chiral nematic or respectively cholesteric LC medium. Suitable chiral compounds and usual procedures in this regard are known in the art, and Table F lists particularly preferred chiral compounds that can be added to the LC medium.

The media according to the invention are prepared in a manner conventional per se. In general, the components are dissolved in one another, preferably at elevated temperature. The mixing is preferably carried out under inert gas, for example under nitrogen or argon. The dyes of formulae I and II and optionally further dichroic dyes are subsequently added, preferably at elevated temperature, more preferably at above 40° C. and particularly preferably at above 50° C. In general, the desired amount of the components used in smaller amount is dissolved in the components making up the principal constituent. It is also possible to mix solutions of the components in an organic solvent, for example in acetone, toluene, chloroform or methanol, and to remove the solvent again, for example by distillation, after mixing.

The invention furthermore relates to a process for the preparation of the liquid-crystalline media according to the invention.

The invention furthermore relates to the use of the LC medium comprising the composition according to the invention in a liquid-crystal device of the guest-host type, wherein the device in particular is a window component or a display. In the device the composition and medium according to the invention are preferably provided in one or more switching layers.

The invention furthermore relates to a liquid-crystal display of the guest-host type containing the LC medium according to the invention.

The invention furthermore relates to the use of the liquid-crystalline medium comprising the composition according to the invention in a device for regulating the passage of energy from an outside space into an inside space.

It is particularly preferred that the composition and the LC medium according to the invention, besides the compounds of formulae I and II, contain no further dyes, in particular no further dichroic dyes. This means that in this embodiment the composition and the LC medium include only dye compounds which conform to the formulae I and II as presently defined.

In a preferred embodiment the composition consists of one or more compounds of formula I and one or more compounds of formula II as defined herein.

However, in an alternative embodiment, in addition to the compounds of formulae I and II, the composition and the liquid-crystalline medium also comprise further dichroic dyes having a different structure to formulae I and II. In this case, the composition and the LC medium preferably comprise one, two, three or four further dyes, more preferably two or three further dyes and most preferably two further dyes having a different structure to formulae I and II.

With respect to the property of dichroism, the preferred properties described for the compounds of formulae I and II are also preferred for the optional further dichroic dyes.

The absorption spectra of the dichroic dyes of the composition, the LC medium and the LC medium in the switching layer preferably complement one another in such a way that the impression of a black colour arises for the eye. The dyes of the liquid-crystalline medium according to the invention preferably cover a large part, more preferably the entire part, of the visible spectrum. The precise way in which a mixture of dyes which appears black or grey to the eye can be prepared is known in the art and is described, for example, in M. Richter, Einführung in die Farbmetrik [Introduction to Colorimetry], 2nd Edition, 1981, ISBN 3-11-008209-8, Walter de Gruyter & Co.

The setting of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables, for example in the reference above. Different colour locations can be set by changing the proportions of the various dyes.

According to a preferred embodiment, the composition, the LC medium and the LC medium in the switching layer comprise one or more dichroic dyes which absorb light in the red and NIR region, i.e. at a wavelength of 600 nm to 2000 nm, preferably in the range from 600 nm to 1800 nm, particularly preferably in the range from 650 nm to 1300 nm.

In case the composition and the LC medium further contain at least one dichroic dye in addition to the compounds selected from the group of compounds of formulae I and II, the at least one further dichroic dye is preferably selected from azo dyes, anthraquinones, methine compounds, azomethine compounds, merocyanine compounds, naphthoquinones, tetrazines, perylenes, terrylenes, quaterrylenes, higher rylenes, pyrromethenes, thiadiazoles, nickel dithiolenes, (metal) phthalocyanines, (metal) naphthalocyanines and (metal) porphyrins. Of these, particular preference is given to azo dyes and thiadiazoles.

In an embodiment the further dichroic dyes are preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

Said dyes belong to the classes of dichroic dyes which are known in the art and have been described in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Lig. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191. Rylene dyes as described, for example, in EP 2166040, US 2011/0042651, EP 68427, EP 47027, EP 60895, DE 3110960 and EP 698649.
Examples of preferred further dichroic dyes which may be present in the composition, the LC medium and the switching layer of the device are shown below
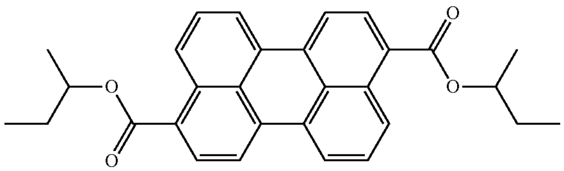
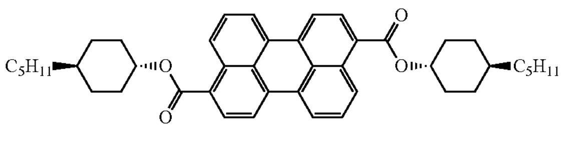
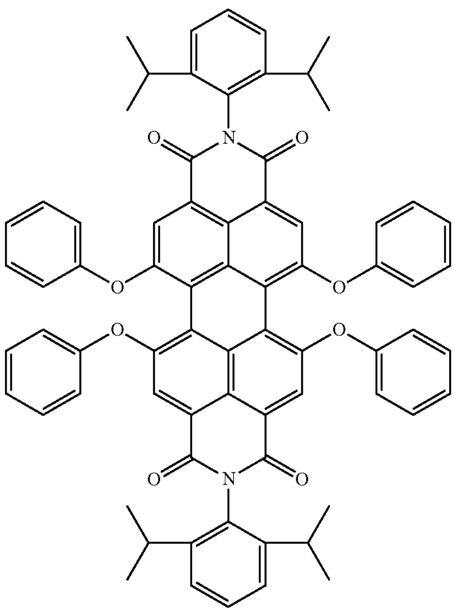
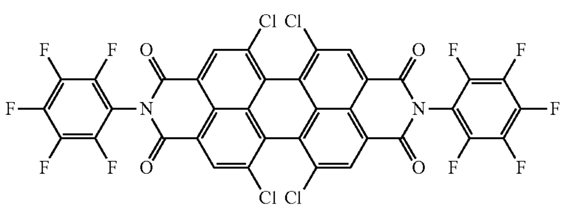
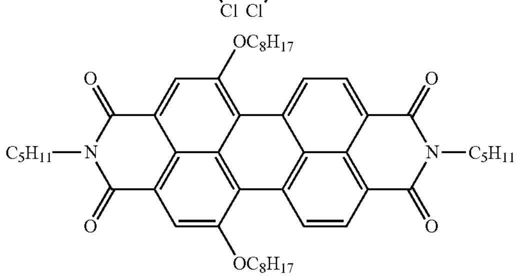
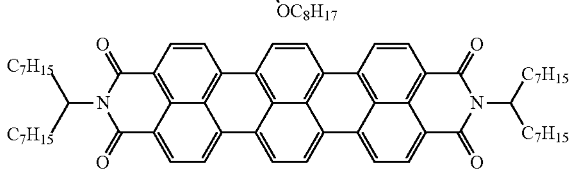

-continued
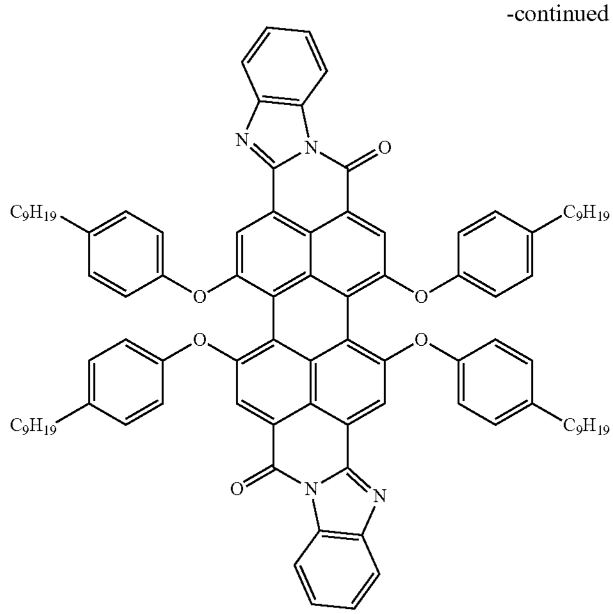
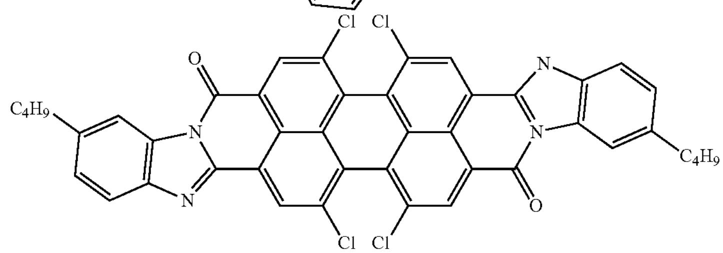
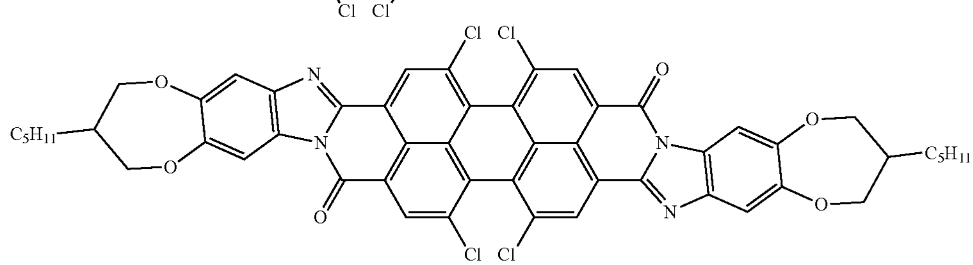
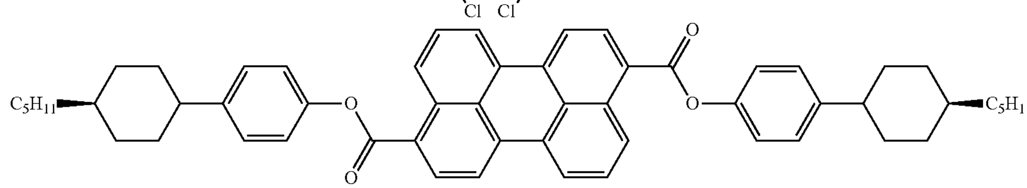
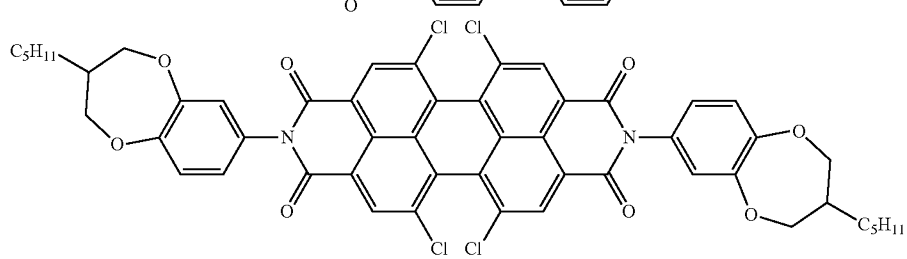
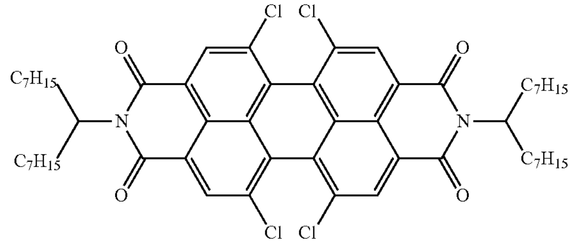

-continued
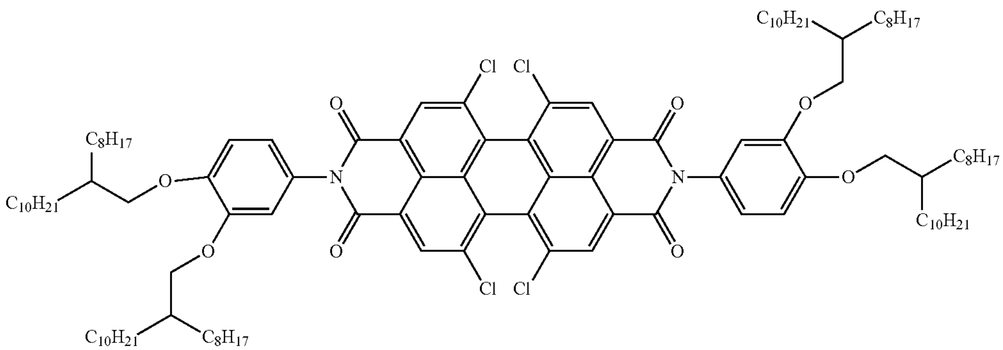
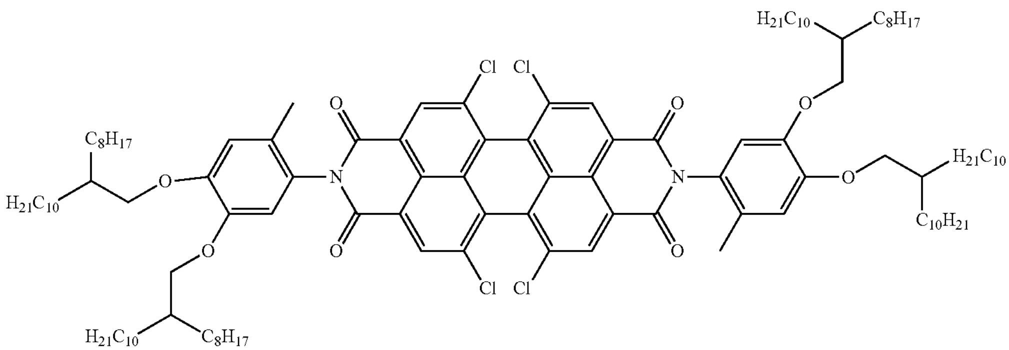
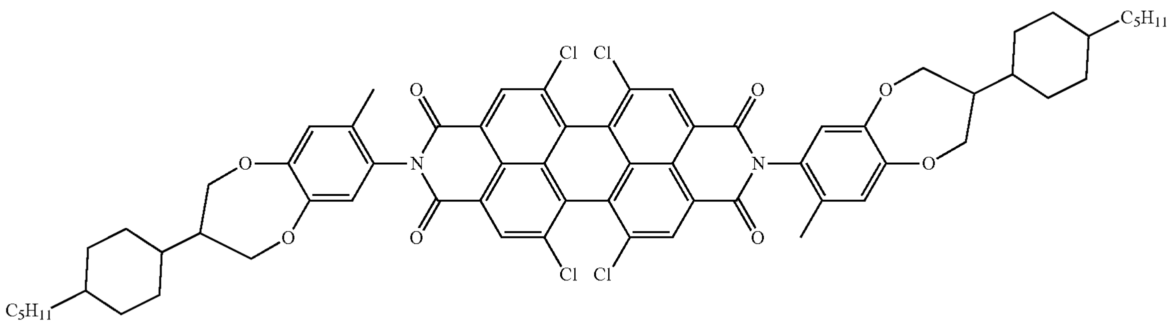
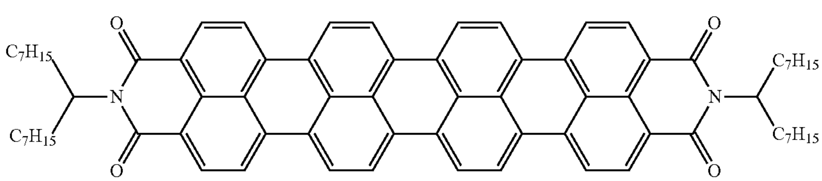
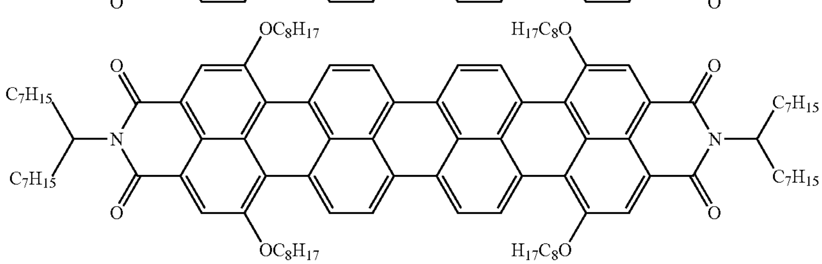
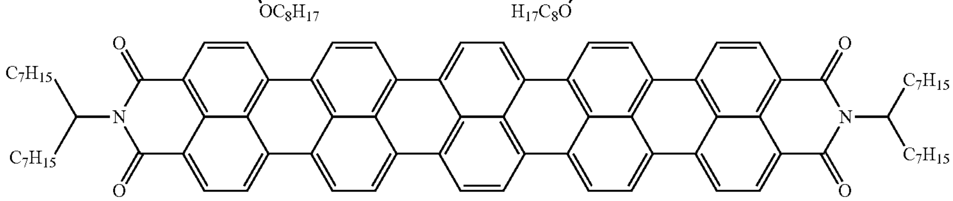

-continued
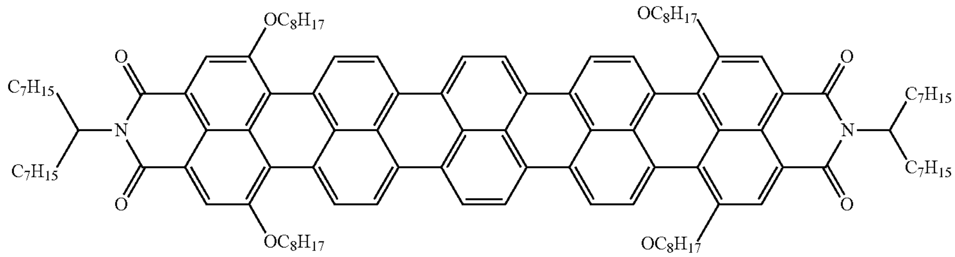
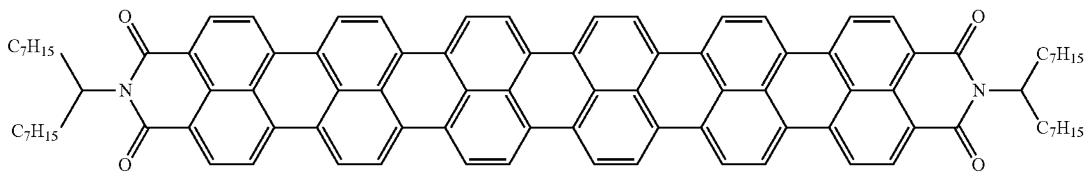
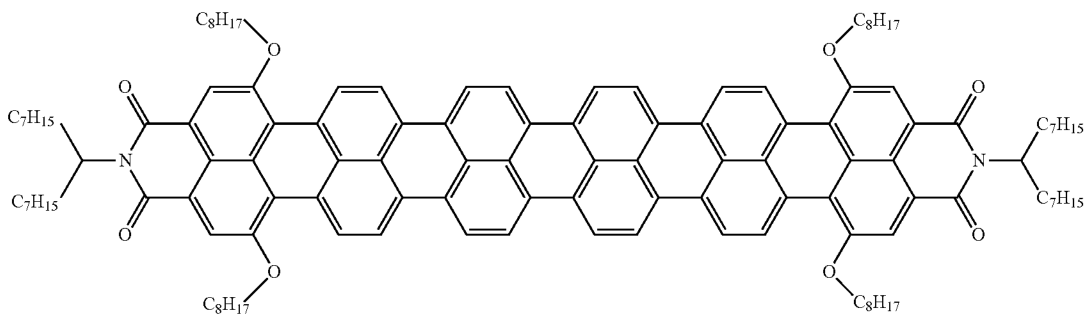
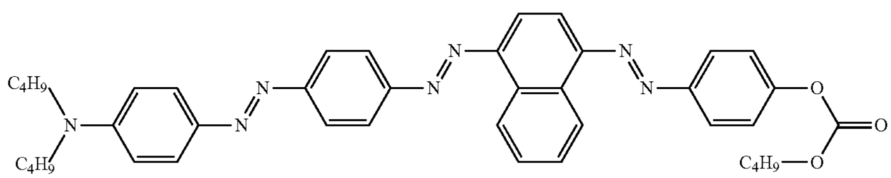
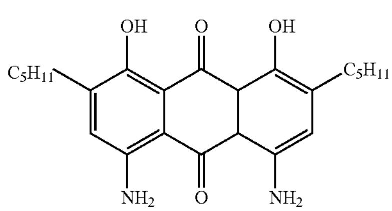
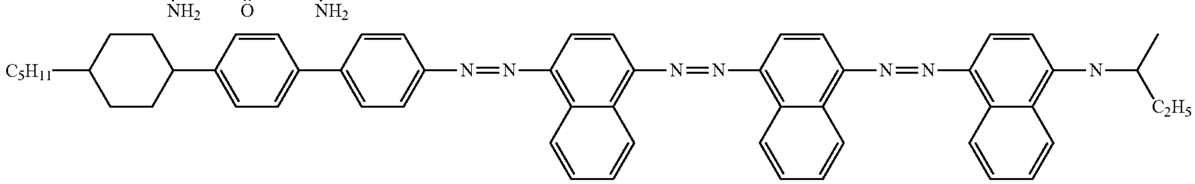
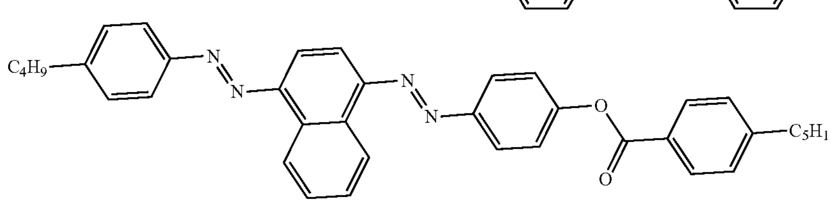

-continued

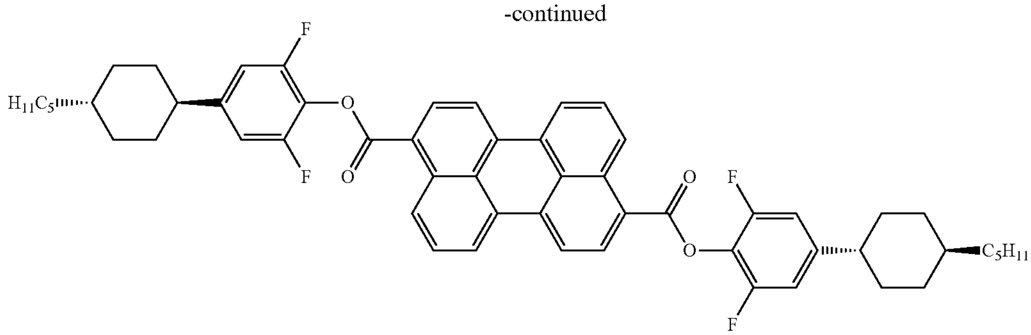

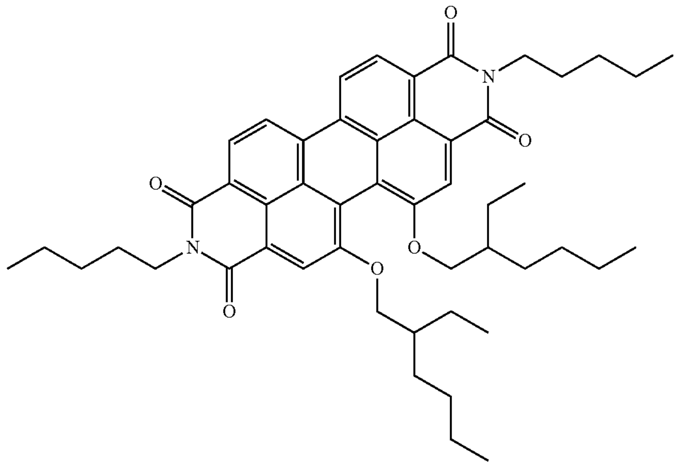

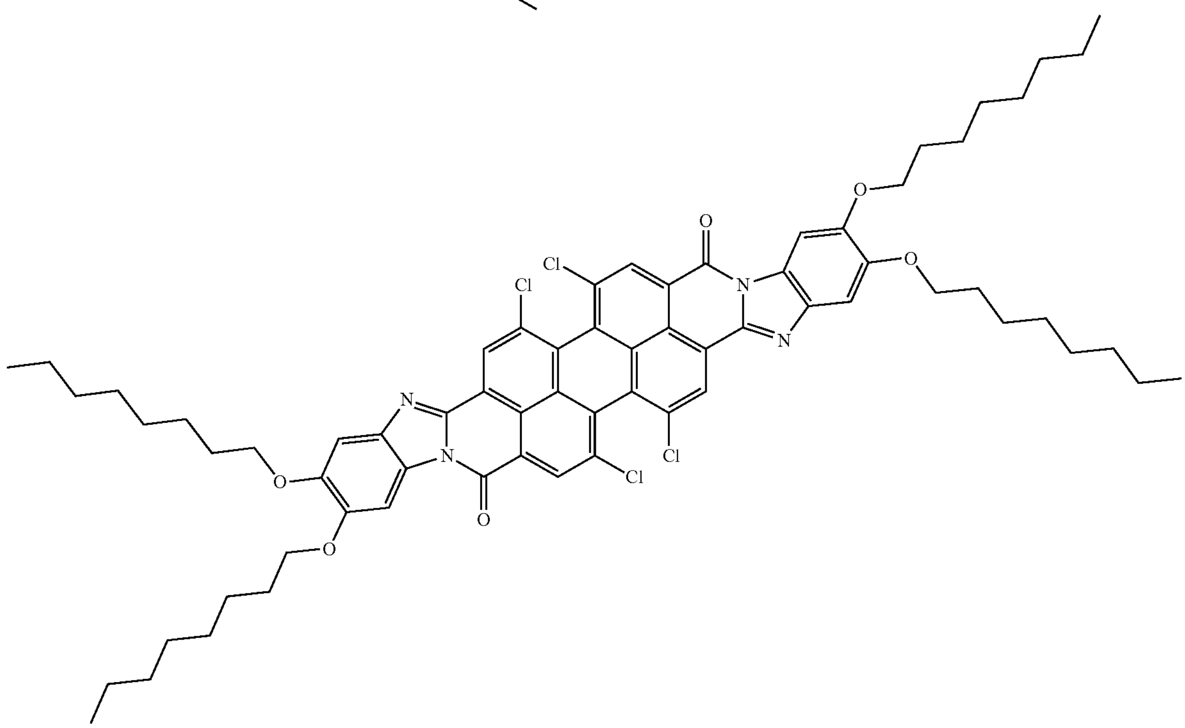

The composition and the liquid-crystalline medium according to the invention can in addition include suitable additives and auxiliary materials.

In an embodiment, the composition and the LC medium comprise one or more quencher compounds. This is particularly preferred if the composition and the medium comprise one or more fluorescent dyes.

Quencher compounds are compounds which quench fluorescence. The quencher compounds can take on the electronic excitation energy of adjacent molecules, such as, for example, fluorescent dyes, in the material and undergo a transition into an electronically excited state in the process. The fluorescent dye to be quenched is thus converted into the electronic ground state and is thus prevented from emitting fluorescence or under-going a subsequent reaction. The quencher compound itself returns to the ground state through radiation-free deactivation or by emission of light and is again available for further quenching.

The quencher compound may have various functions in the material. Firstly, the quencher compound may contribute to extending the lifetime of a dye system by deactivation of electronic excitation energy. Secondly, the quencher compound can eliminate additional colour effects.

The device according to the invention is preferably suitable for regulating the passage of energy in the form of sunlight from the environment into an inside space. The passage of energy to be regulated here takes place from the environment, i.e. an outside space, into an inside space.

The inside space here can be any desired space that is substantially sealed off from the environment, for example a building, a vehicle or a container.

The invention therefore furthermore relates to the use of the device for regulating the passage of energy from an outside space into an inside space.

However, the device can also be employed for aesthetic room design, for example for light and colour effects. For example, door and wall elements containing the device according to the invention in grey or in colour can be switched to transparent. Furthermore, the device may also comprise white or coloured flat backlighting which is modulated in brightness or yellow flat backlighting which is modulated in colour by means of a blue guest-host display. In case glass substrates are used in the device, one or both glass sides of the device according to the invention may be provided with roughened or structured glass for the coupling-out of light and/or for the generation of light effects.

In a further alternative use, the device is employed for regulating the incidence of light on the eyes, for example in protective goggles, visors or sunglasses, where the device keeps the incidence of light on the eyes low in one switching state and reduces the incidence of light to a lesser extent in another switching state.

The device according to the invention is preferably arranged in an opening in a relatively large two-dimensional structure, where the two-dimensional structure itself only allows slight passage of energy or none at all, and where the opening has relatively high energy transmissivity. The two-dimensional structure is preferably a wall or another boundary of an inside space to the outside. Furthermore, the two-dimensional structure preferably covers an area of at least equal size, particularly preferably an area at least twice as large as the opening in it in which the device according to the invention is disposed.

The device is preferably characterised in that it has an area of at least 0.05 $m^2$, preferably at least 0.1 $m^2$, particularly preferably at least 0.5 $m^2$ and very particularly preferably at least 1.0 $m^2$.

The device is preferably accommodated in an opening having relatively high energy transmissivity, as described above, in a building, a container, a vehicle or another substantially closed space. The device can generally be used for any desired inside spaces, particularly if they have only limited exchange of air with the environment and have light-transmitting boundary surfaces through which input of energy from the outside in the form of light energy can take place. The use of the device for inside spaces which are subjected to strong insolation through light-transmitting areas, for example through window areas, is particularly preferred.

The device according to the invention is switchable. Switching here is taken to mean a change in the passage of energy through the device. The device according to the invention is preferably electrically switchable, as described, for example, in WO 2009/141295 and in WO 2014/090373.

However, the device may also be thermally switchable, as described, for example, in WO 2010/118422. In this case, the switching preferably takes place by a transition from a nematic state to an isotropic state through a change in the temperature of the switching layer comprising the compounds of formula I and II in the liquid-crystalline medium. In the nematic state, the molecules of the liquid-crystalline medium are in ordered form, and thus also the compound(s) of formula I and II, for example aligned parallel to the surface of the device through the action of an alignment layer. In the isotropic state, the molecules are in disordered form, and thus also the compounds of formula I and II. The difference between ordered and disordered presence of the dichroic compounds causes a difference in the light transmissivity of the switching layer of the device according to the invention, in accordance with the principle that dichroic compounds have a higher or lower absorption coefficient depending on the alignment in relation to the polarization plane of the light.

In the case where the device is electrically switchable, it preferably comprises two or more electrodes, which are preferably installed on both sides of the switching layer. The electrodes preferably consist of ITO or a thin, preferably transparent metal and/or metal-oxide layer, for example silver or FTO (fluorine-doped tin oxide) or an alternative material known in the art for this use. The electrodes are preferably provided with electrical connections. The voltage is preferably provided by a battery, a rechargeable battery or an external power supply, in particular an external power supply.

The switching operation in the case of electrical switching takes place by a (re)alignment of the molecules of the liquid-crystalline medium by the application of voltage.

In a preferred embodiment, the device is converted from a state having high absorption, i.e. low light transmissivity, which is present without voltage, into a state having lower absorption, i.e. higher light transmissivity. The liquid-crystalline medium of the switching layer is preferably nematic in both states. The voltage-free state is preferably characterised in that the molecules of the liquid-crystalline medium, and thus the molecules of the compounds of formula I and II, are aligned parallel to the plane of the switching layer. This is preferably achieved by a correspondingly selected alignment layer. The state where voltage is applied is preferably characterised in that the molecules of the liquid-crystalline medium, and thus the molecules of the compounds of formula I and II, are perpendicular to the plane of the switching layer.

In an alternative embodiment, the device is switchable from a state having low absorption, i.e. high light transmissivity, which is present without voltage, into a state having higher absorption, i.e. lower light transmissivity. The liquid-crystalline medium of the switching layer is preferably nematic in both states. The voltage-free state is preferably characterised in that the molecules of the liquid-crystalline medium of the switching layer, and thus the molecules of the compounds of formula I and II, are aligned perpendicular to the plane of the switching layer. This is preferably achieved by a correspondingly selected alignment layer. The state where voltage is applied is preferably characterised in that the molecules of the liquid-crystalline medium of the switching layer, and thus the molecules of the compounds of formula I and II, are parallel to the plane of the switching layer.

The device according to the invention preferably has the following layer sequence, where further layers may additionally be present. The layers indicated below are preferably directly adjacent to one another in the device:

- substrate layer, preferably comprising glass or polymer
- electrically conductive transparent layer, preferably comprising ITO
- alignment layer
- switching layer comprising the composition according to the invention, preferably the LC medium comprising the composition,
- alignment layer
- electrically conductive transparent layer, preferably comprising ITO
- substrate layer, preferably comprising glass or polymer.

The device according to the invention preferably comprises one or more, particularly preferably two, alignment layers. The alignment layers are preferably directly adjacent to the two sides of the switching layer comprising the compound(s) of formula I and II.

The alignment layers used in the device according to the invention can be any desired layers known to the person skilled in the art for this purpose. Preference is given to polyimide layers, particularly preferably layers comprising rubbed polyimide. In an embodiment planar alignment is provided, where more preferably a slight pretilt angle may be set. In an alternative embodiment homeotropic alignment is provided, where more preferably high pretilt angles are set.

Furthermore, polymers obtained by an exposure process to polarised light can be used as alignment layer in order to achieve alignment of the compounds of the liquid-crystalline medium in accordance with an alignment axis, i.e. photoalignment.

The switching layer in the device according to the invention is furthermore preferably arranged between two substrate layers or enclosed thereby. The substrate layers can consist, for example, of glass or a polymer, preferably a light-transmitting polymer.

The device is preferably characterised in that it does not comprise a polymer-based polariser, particularly preferably does not comprise a polariser in the solid material phase and very particularly preferably does not comprise a polariser at all. Therefore, in a particularly preferred embodiment the device, in particular the device for regulating the passage of energy from an outside space into an inside space and the window element, does not include a polariser.

However, in accordance with an alternative embodiment, the device may also comprise one or more polarisers. The polarisers in this case are preferably linear polarisers. In this alternative it is preferred that the device includes only one polariser. If precisely one polariser is present, the Heilmeier-type guest-host arrangement is preferably used. Both absorptive and also reflective polarisers can optionally be employed. Preference is given to the use of polarisers which are in the form of thin optical films.

In a preferred embodiment, the device according to the invention is a constituent of a window, more preferably a window component comprising at least one glass surface, particularly preferably a component of an insulated glazing unit.

Window here is taken to mean in particular a structure in a building, a car, a commercial vehicle, a boat, a train, an airplane and so on which comprises a frame and at least one substrate or pane, e.g. a plastic substrate or a glass pane, surrounded by this frame. In a preferred embodiment, in particular for architectural applications, the window preferably comprises a heat-insulating frame and two or more glass panes, i.e. multipane insulating glass.

According to a preferred embodiment, the device according to the invention is applied directly to a glass surface of a window, e.g. by lamination, particularly preferably in the interspace between two glass panes of multipane insulating glass.

The invention furthermore relates to a window comprising a device according to the invention, preferably having the preferred features indicated above.

Owing to the electronic properties of the compositions according to the invention, these compositions are also suitable, besides the use as dye compositions, as organic semiconductors.

The invention therefore furthermore relates to the use of the compositions in organic electronic components, such as, for example, organic light-emitting diodes (OLEDs), organic field-effect transistors (OFETs), printed circuits, radio frequency identification elements (RFIDs), lighting elements, photovoltaic devices and optical sensors.

Owing to their coloured nature and good solubility in organic materials, the compositions according to the invention are eminently suitable as dye compositions. The invention therefore likewise relates to the use of the compositions for colouring a polymer.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | | | |
|---|---|---|---|
| C | 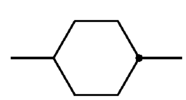 | C(CN) | 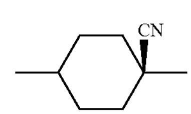 |

TABLE A-continued
| Ring elements | | | |
|---|---|---|---|
| P | 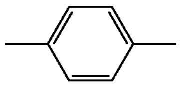 | P(F,CN) | 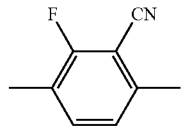 |
| D | 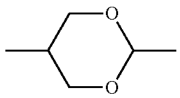 | Dl | 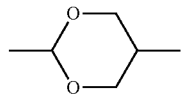 |
| A | 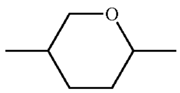 | Al | 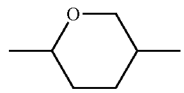 |
| G | 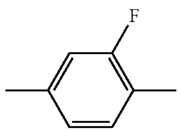 | Gl | 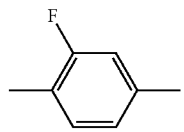 |
| U | 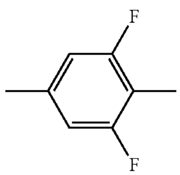 | Ul | 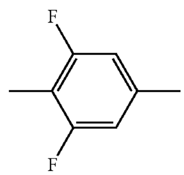 |
| Y | 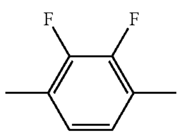 | | |
| M | 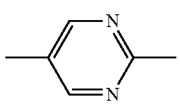 | Ml | 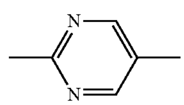 |
| N | 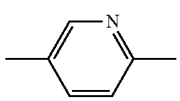 | Nl | 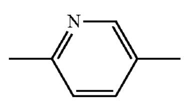 |
| Np | 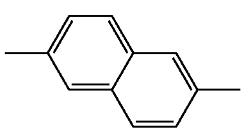 | dH | 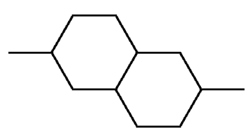 |
| N3f | 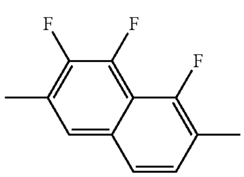 | N3f1 | 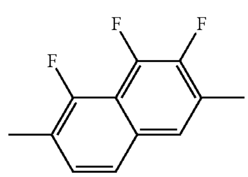 |
| tH | 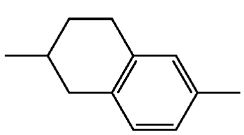 | tHl | 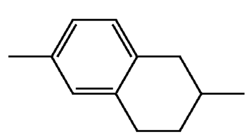 |

TABLE A-continued

| Ring elements | | | |
|---|---|---|---|
| tH2f | 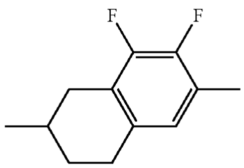 | tH2fl | 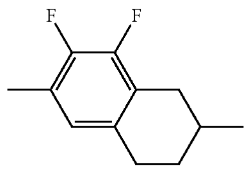 |
| K | 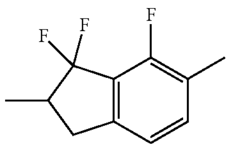 | Kl | 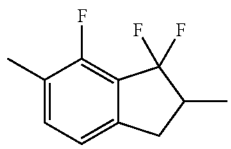 |
| L | 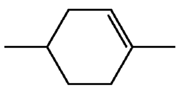 | Ll | 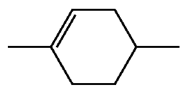 |
| F | 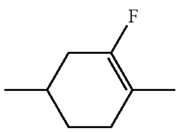 | Fl | 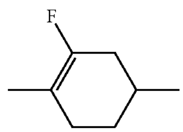 |
| Nf | 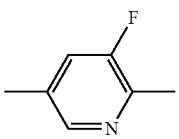 | Nfl | 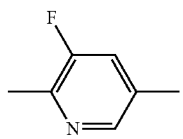 |
| B | 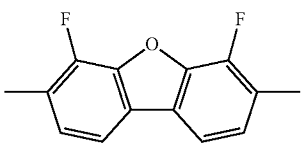 | | |

TABLE B

| Linking groups | | | |
|---|---|---|---|
| E | $—CH_2CH_2—$ | Z | —CO—O— |
| V | —CH=CH— | ZI | —O—CO— |
| X | —CF=CH— | O | $—CH_2—O—$ |
| XI | —CH=CF— | OI | $—O—CH_2—$ |

TABLE B-continued

| Linking groups | | | |
|---|---|---|---|
| B | —CF=CF— | Q | $—CF_2—O—$ |
| T | —C≡C— | QI | $—O—CF_2—$ |
| W | $—CF_2CF_2—$ | | |

TABLE C

| End groups | | | |
|---|---|---|---|
| Left-hand side | | Right-hand side | |
| Use alone | | | |
| -n- | $C_nH_{2n+1}—$ | -n | $—C_nH_{2n+1}$ |
| -nO- | $C_nH_{2n+1}—O—$ | -On | $—O—C_nH_{2n+1}$ |
| -V- | $CH_2{=}CH—$ | -V | $—CH{=}CH_2$ |
| -nV- | $C_nH_{2n+1}—CH{=}CH—$ | -nV | $—C_nH_{2n}—CH{=}CH_2$ |
| -Vn- | $CH_2{=}CH—CnH_{2n+1}—$ | -Vn | $—CH{=}CH—C_nH_{2n+1}$ |
| -nVm- | $C_nH_{2n+1}—CH{=}CH—C_mH_{2m}—$ | -nVm | $—C_nH_{2n}—CH{=}CH—C_mH_{2m+1}$ |
| -N- | N≡C— | -N | —C≡N |
| -S- | S=C=N— | -S | —N=C=S |
| -F- | F— | -F | —F |
| -Cl- | Cl— | -Cl | —Cl |
| -M- | $CFH_2—$ | -M | $—CFH_2$ |
| -D- | $CF_2H—$ | -D | $—CF_2H$ |
| -T- | $CF_3—$ | -T | $—CF_3$ |
| -MO- | $CFH_2O—$ | -OM | $—OCFH_2$ |
| -DO- | $CF_2HO—$ | -OD | $—OCF_2H$ |

TABLE C-continued

| End groups | | | |
|---|---|---|---|
| Left-hand side | | Right-hand side | |
| -TO- | $CF_3O$— | -OT | —$OCF_3$ |
| -OXF- | $CF_2$═CH—O— | -OXF | —O—CH═$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Use together with one another and with others | | | |
| - . . . A . . . - | —C≡C— | - . . . A . . . | —C≡C— |
| - . . . V . . . - | CH═CH— | - . . . V . . . | —CH═CH— |
| - . . . Z . . . - | —CO—O— | - . . . Z . . . | —CO—O— |
| - . . . ZI . . . - | —O—CO— | - . . . ZI . . . | —O—CO— |
| - . . . K . . . - | —CO— | - . . . K . . . | —CO— |
| - . . . W . . . - | —CF═CF— | - . . . W . . . | —CF═CF— |

in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

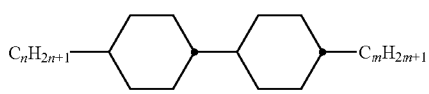

CC-n-m

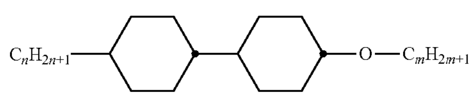

CC-n-Om

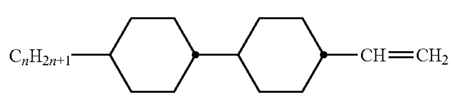

CC-n-V

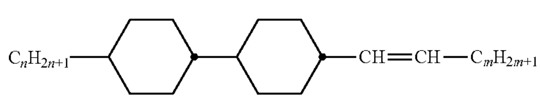

CC-n-Vm

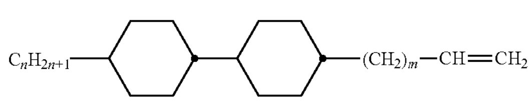

CC-n-mV

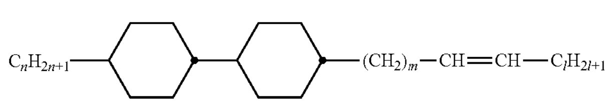

CC-n-mVl

TABLE D-continued
| Illustrative structures |
| --- |
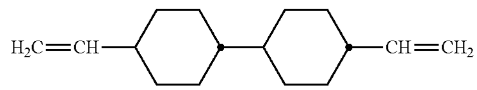
CC-V-V
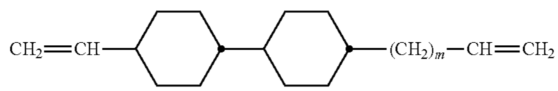
CC-V-mV
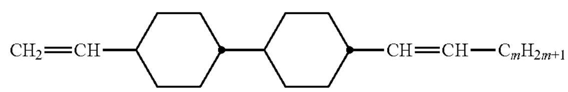
CC-V-Vm
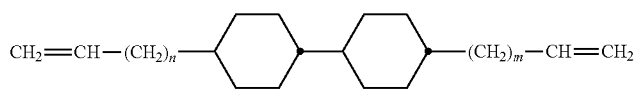
CC-Vn-mV
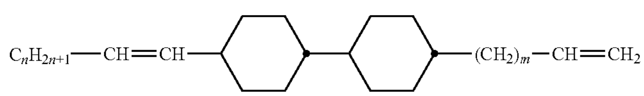
CC-nV-mV
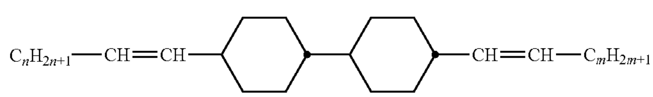
CC-nV-Vm
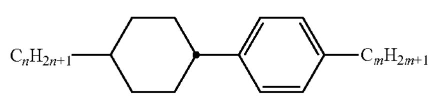
CP-n-m
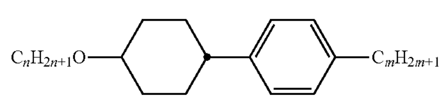
CP-nO-m
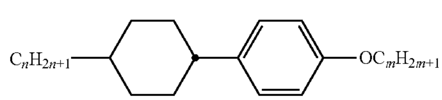
CP-n-Om
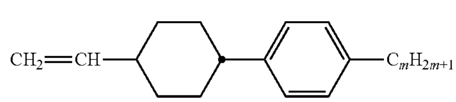
CP-V-m
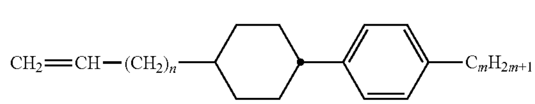
CP-Vn-m TABLE D-continued
| Illustrative structures |
| --- |
| 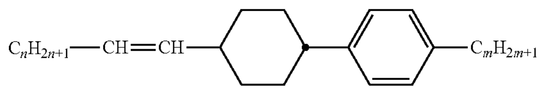 |
| CP-nV-m |
| 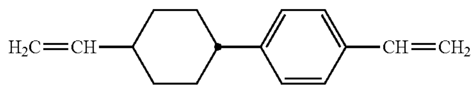 |
| CP-V-V |
| 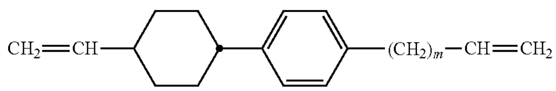 |
| CP-V-mV |
| 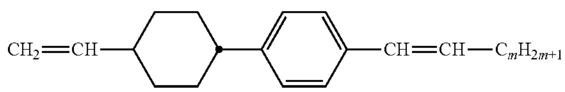 |
| CP-V-Vm |
| 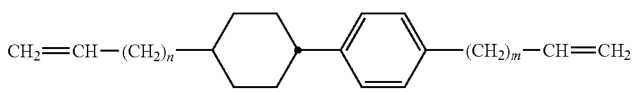 |
| CP-Vn-mV |
| 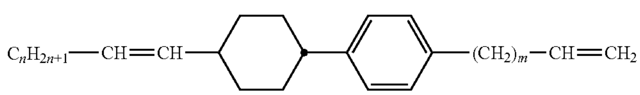 |
| CP-nV-mV |
| 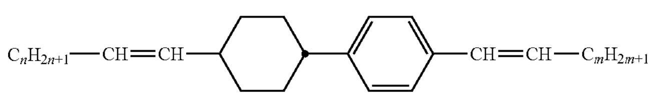 |
| CP-nV-Vm |
| 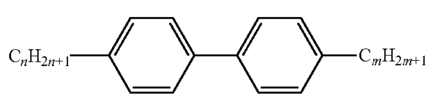 |
| PP-n-m |
| 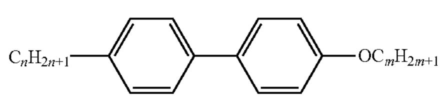 |
| PP-n-Om |
| 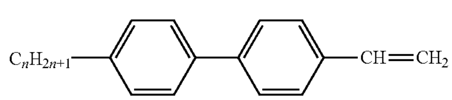 |
| PP-n-V |
| 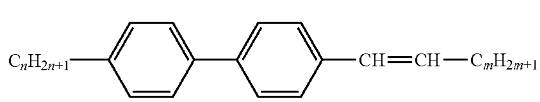 |
| PP-n-Vm |

TABLE D-continued
Illustrative structures
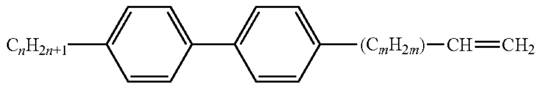
PP-n-mV
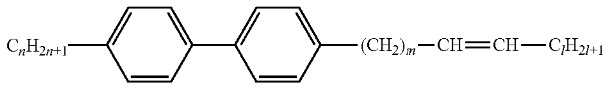
PP-n-mVl
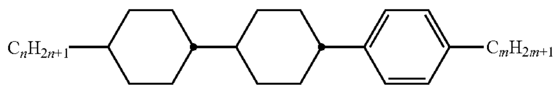
CCP-n-m
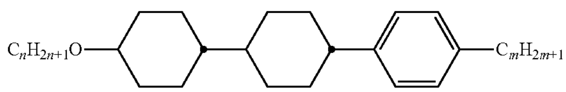
CCP-nO-m
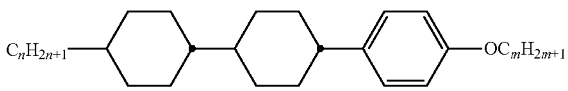
CCP-n-Om
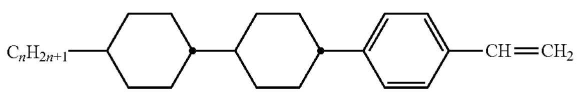
CCP-n-V
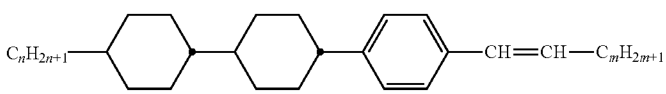
CCP-n-Vm
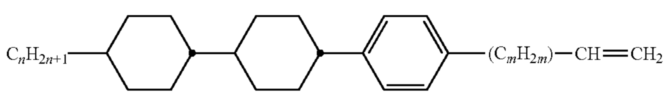
CCP-n-mV
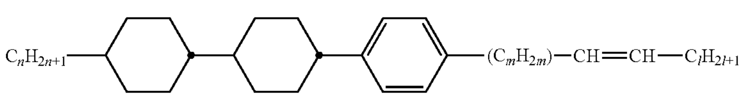
CCP-n-mVl
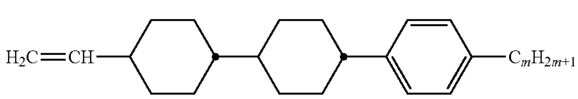
CCP-V-m
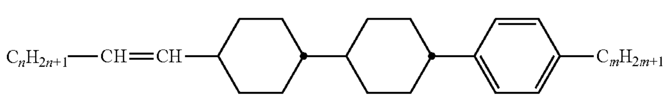
CCP-nV-m TABLE D-continued
| Illustrative structures |
| --- |
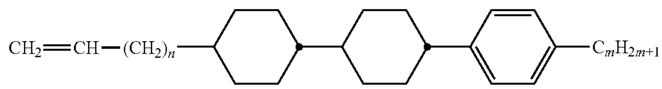
CCP-Vn-m
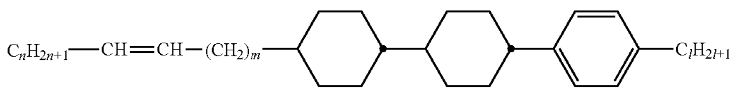
CCP-nVm-l
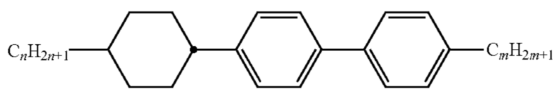
CPP-n-m
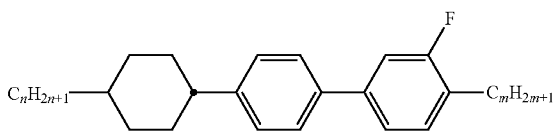
CPG-n-m
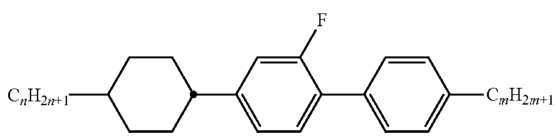
CGP-n-m
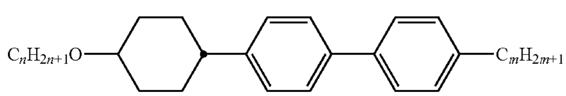
CPP-nO-m
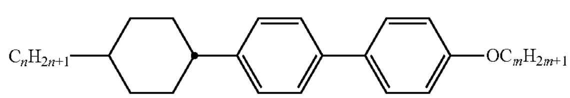
CPP-n-Om
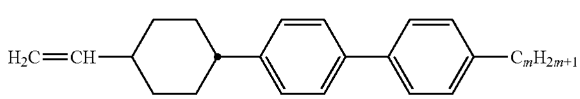
CPP-V-m
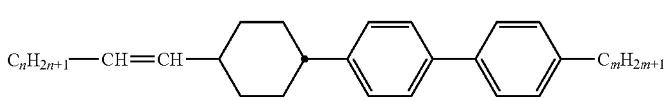
CPP-nV-m
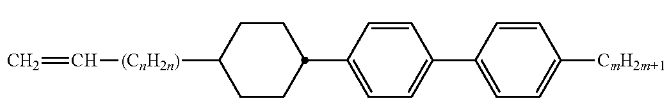
CPP-Vn-m TABLE D-continued
| Illustrative structures |
| --- |
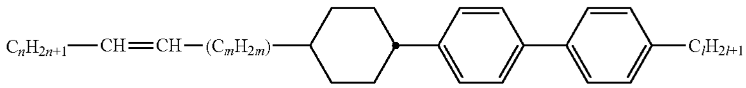
CPP-nVm-l
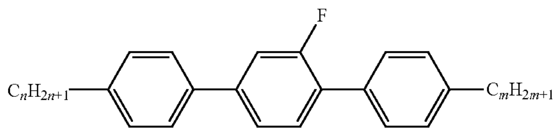
PGP-n-m
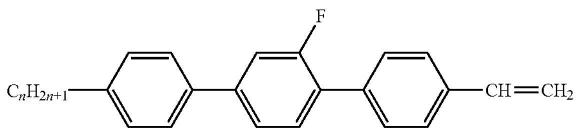
PGP-n-V
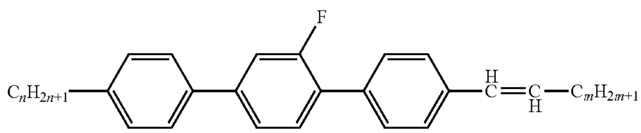
PGP-n-Vm
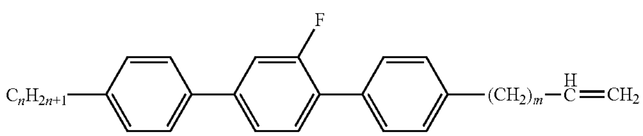
PGP-n-mV
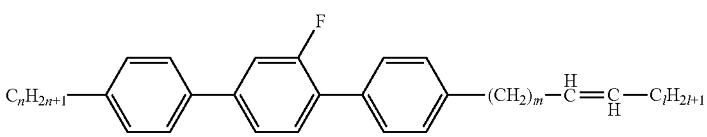
PGP-n-mVl
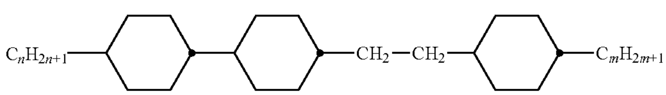
CCEC-n-m
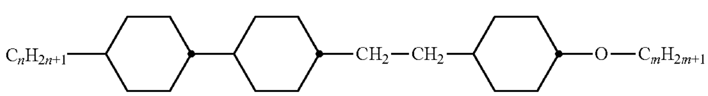
CCEC-n-Om
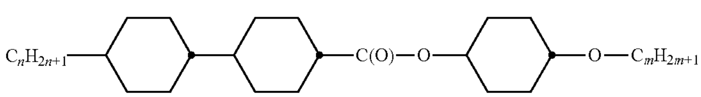
CCZC-n-Om
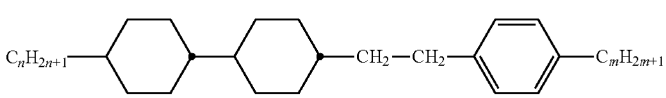
CCEP-n-m TABLE D-continued
| Illustrative structures |
| --- |
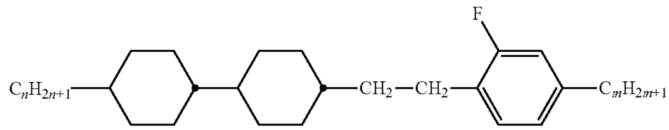
CCEGI-n-m
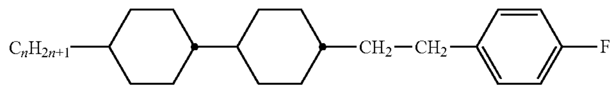
CCEP-n-F
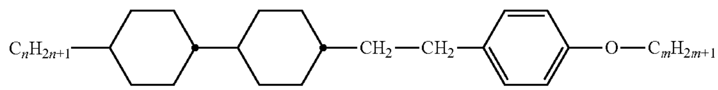
CCEP-n-Om
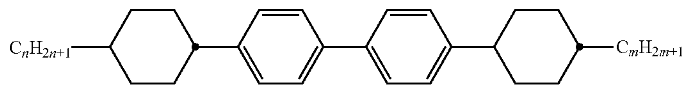
CPPC-n-m
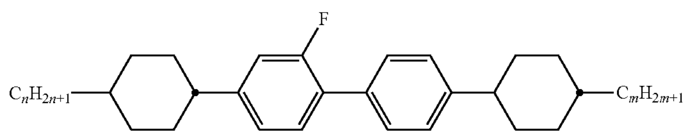
CGPC-n-m
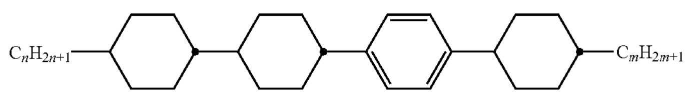
CCPC-n-m
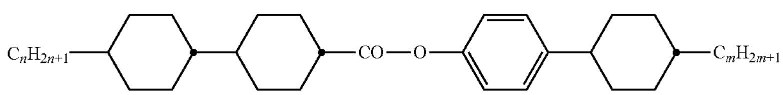
CCZPC-n-m
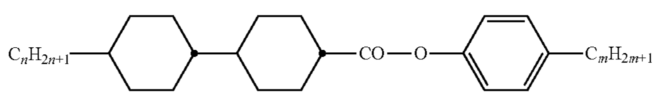
CCZP-n-m
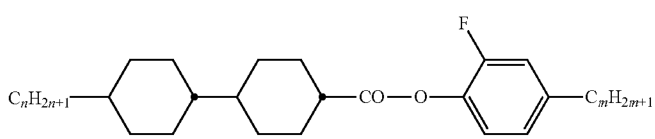
CCZGI-n-m
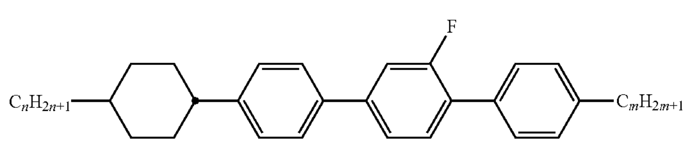
CPGP-n-m TABLE D-continued
| Illustrative structures |
|---|
| 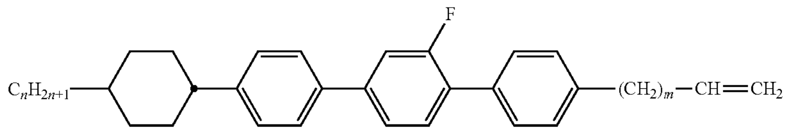 |
| CPGP-n-mV |
| 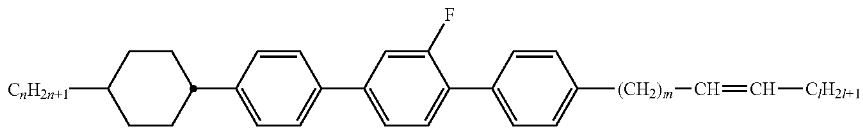 |
| CPGP-n-mVl |
| 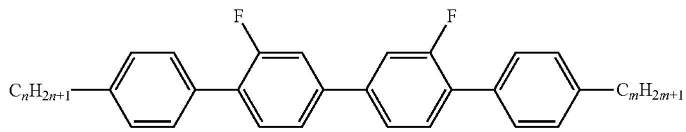 |
| PGIGP-n-m |
| 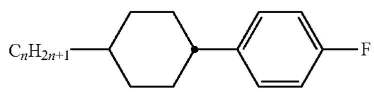 |
| CP-n-F |
| 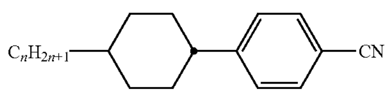 |
| CP-n-N |
| 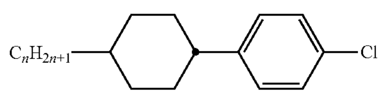 |
| CP-n-Cl |
| 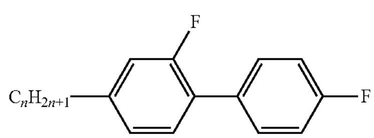 |
| GP-n-F |
| 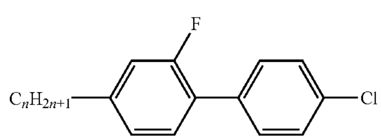 |
| GP-n-Cl |
| 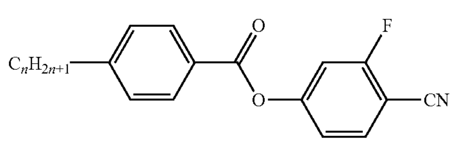 |
| PZG-n-N |

TABLE D-continued
| Illustrative structures |
| --- |
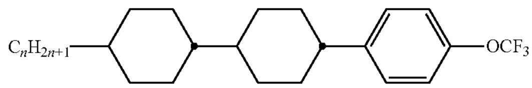
CCP-n-OT
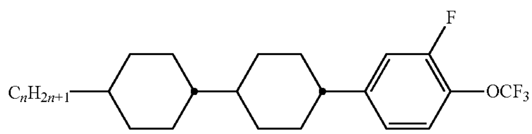
CCG-n-OT
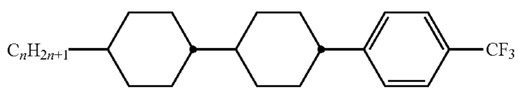
CCP-n-T
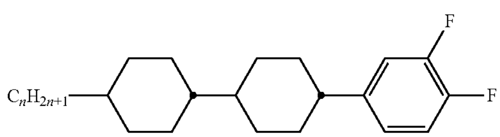
CCG-n-F
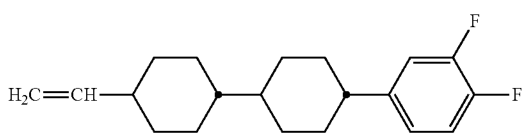
CCG-V-F
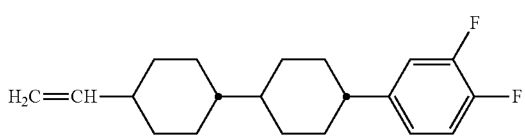
CCG-V-F
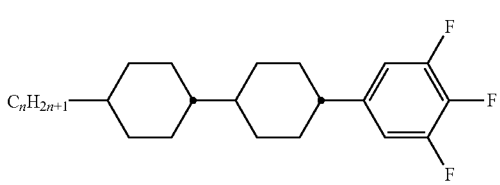
CCU-n-F
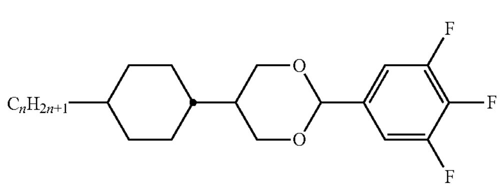
CDU-n-F TABLE D-continued
| Illustrative structures |
|---|
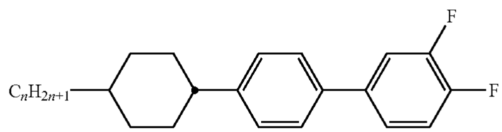
CPG-n-F
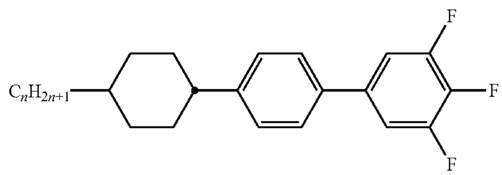
CPU-n-F
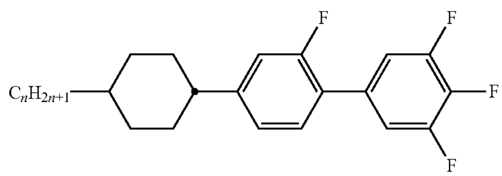
CGU-n-F
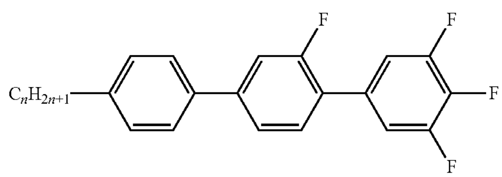
PGU-n-F
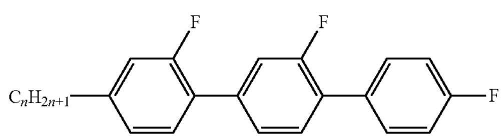
GGP-n-F
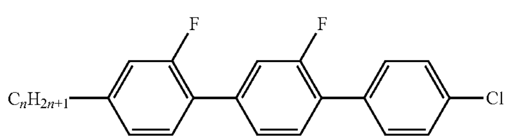
GGP-n-Cl
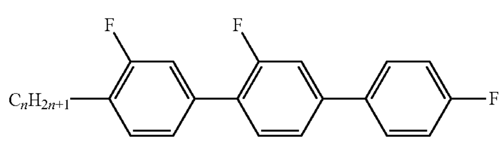
GIGIP-n-F
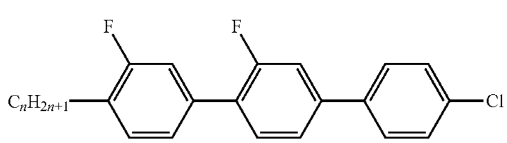
GIGIP-n-Cl TABLE D-continued
| Illustrative structures |
| --- |
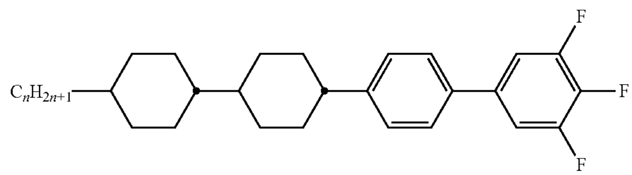
CCPU-n-F
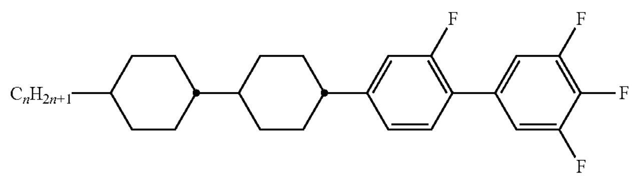
CCGU-n-F
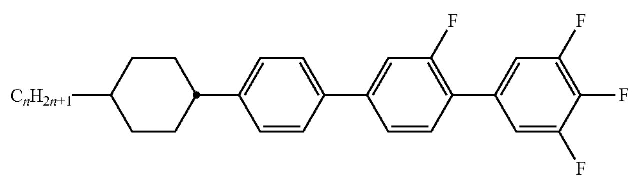
CPGU-n-F
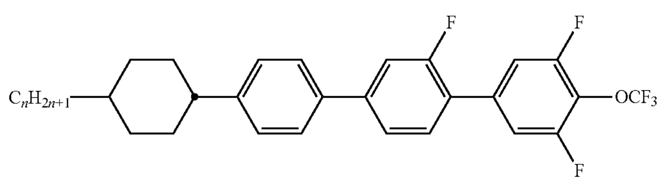
CPGU-n-OT
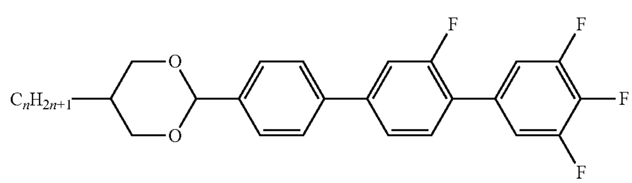
DPGU-n-F
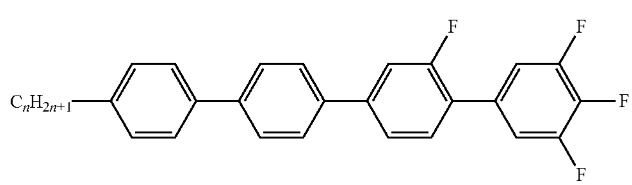
PPGU-n-F
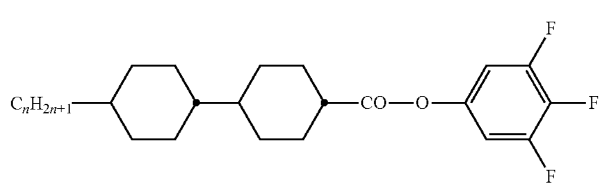
CCZU-n-F TABLE D-continued
Illustrative structures
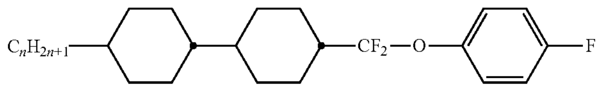
CCQP-n-F
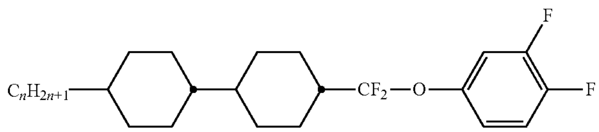
CCQG-n-F
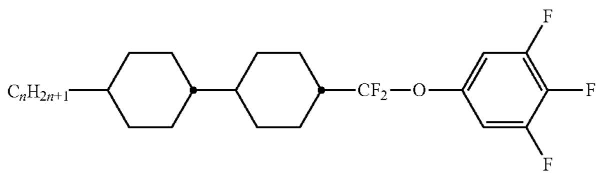
CCQU-n-F
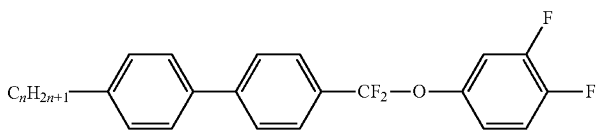
PPQG-n-F
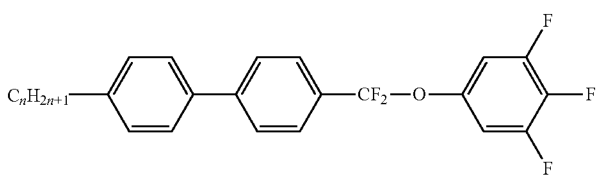
PPQU-n-F
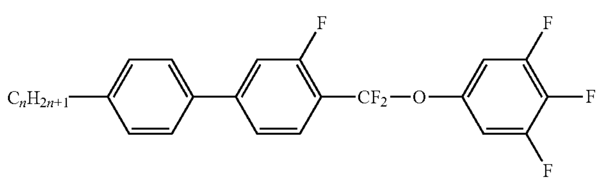
PGQU-n-F
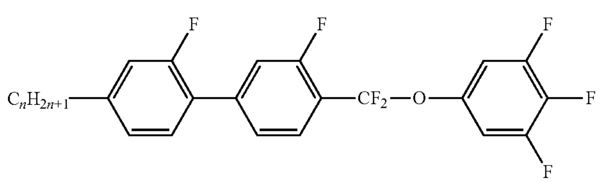
GGQU-n-F
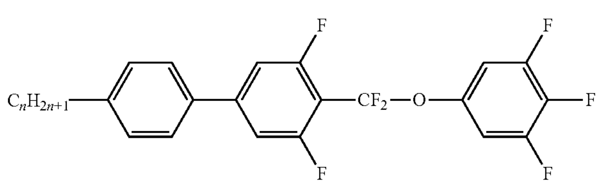
PUQU-n-F TABLE D-continued
| Illustrative structures |
|---|
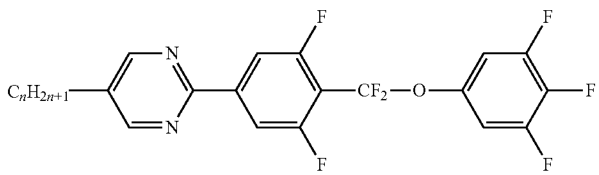
MUQU-n-F
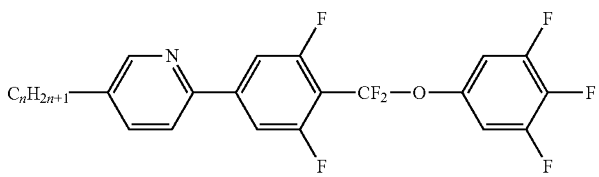
NUQU-n-F
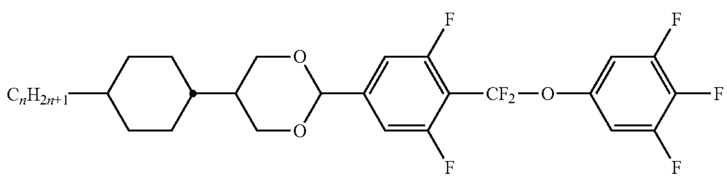
CDUQU-n-F
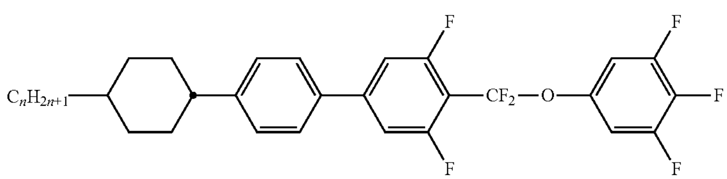
CPUQU-n-F
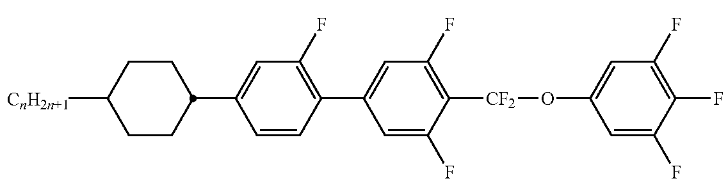
CGUQU-n-F
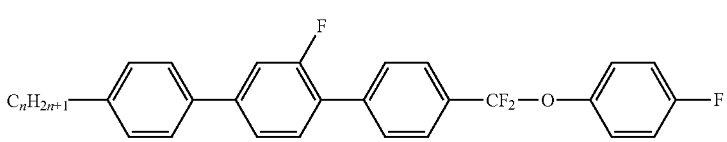
PGPQP-n-F
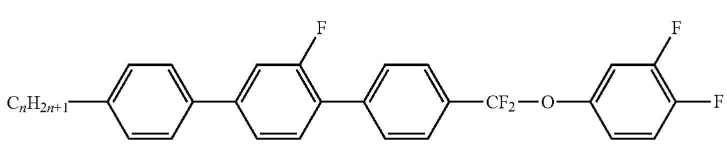
PGPQG-n-F TABLE D-continued
Illustrative structures
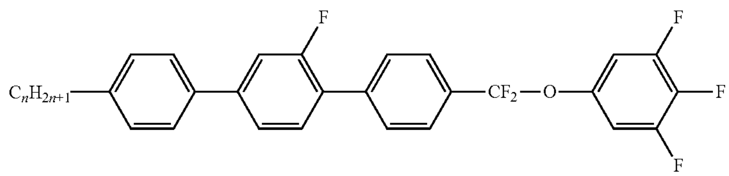
PGPQU-n-F
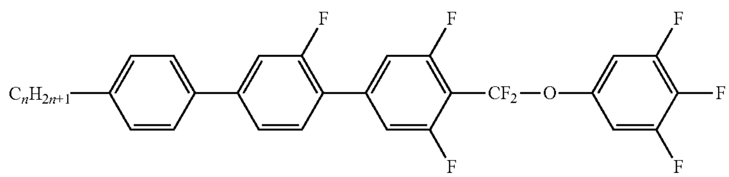
PGUQU-n-F
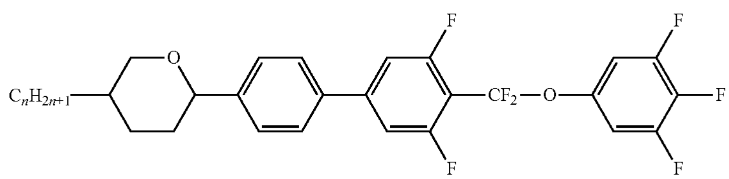
APUQU-n-F
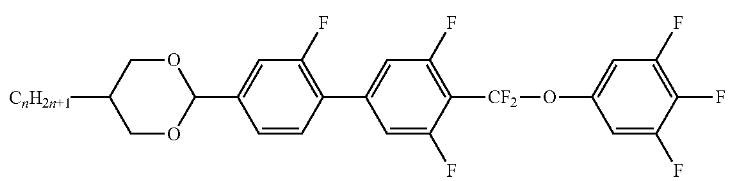
DGUQU-n-F
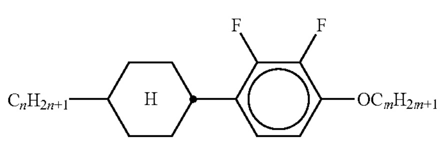
CY-n-Om
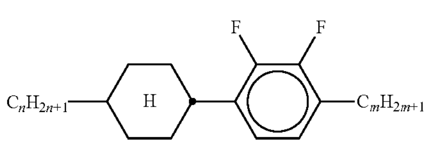
CY-n-m
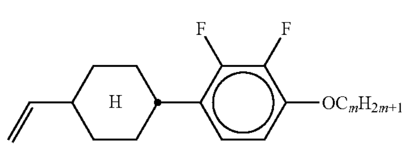
CY-V-Om TABLE D-continued
Illustrative structures
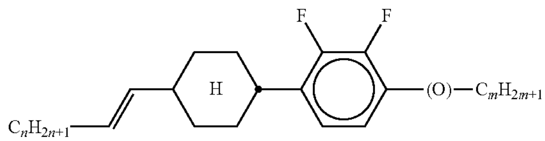
CY-nV-(O)m
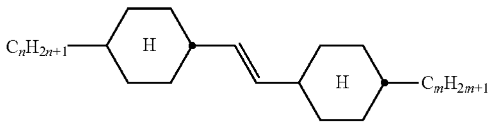
CVC-n-m
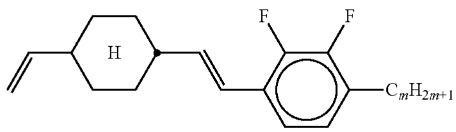
CVY-V-m
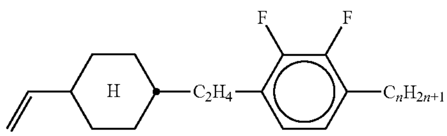
CEY-V-m
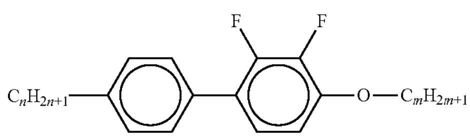
PY-n-(O)m
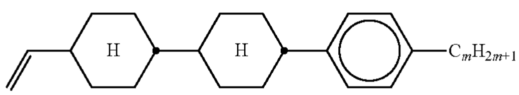
CCP-V-m
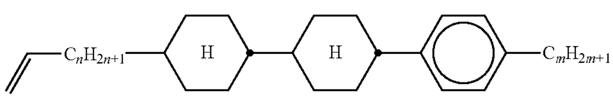
CCP-Vn-m
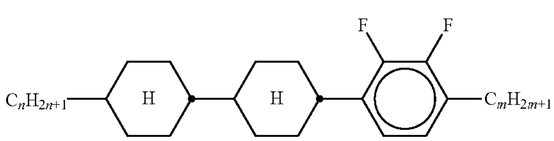
CCY-n-m
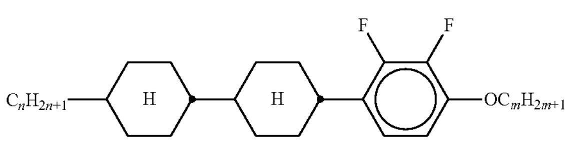
CCY-n-Om TABLE D-continued
Illustrative structures
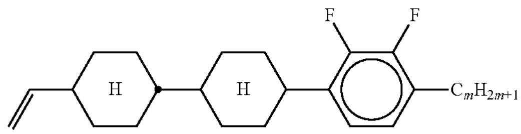
CCY-V-m
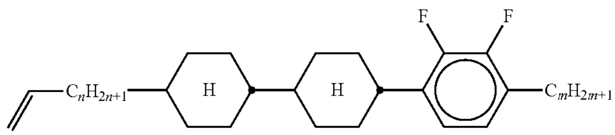
CCY-Vn-m
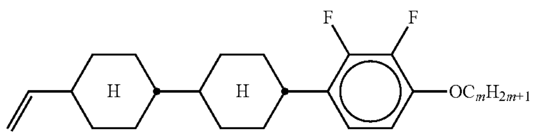
CCY-V-Om
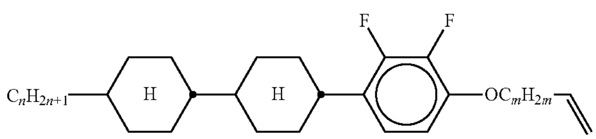
CCY-n-OmV
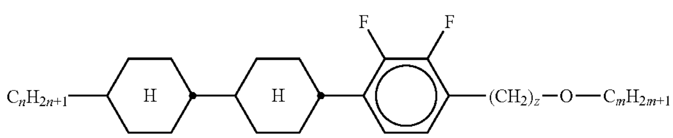
CCY-n-zOm
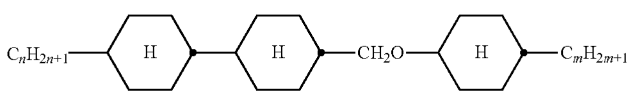
CCOC-n-m
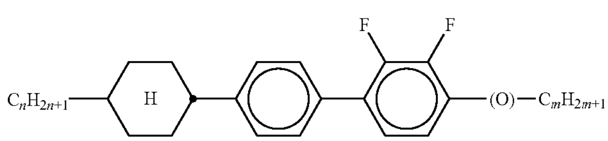
CPY-n-(O)m
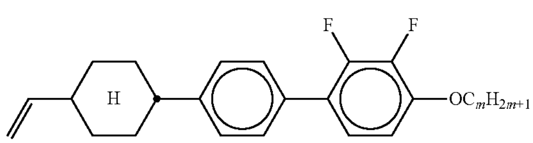
CPY-V-Om
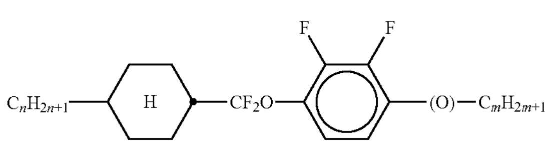
CQY-n-(O)m TABLE D-continued
| Illustrative structures |
| --- |
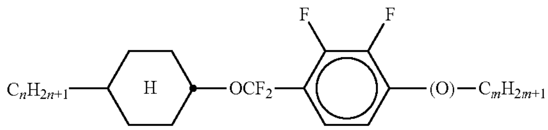
CQIY-n-(O)m
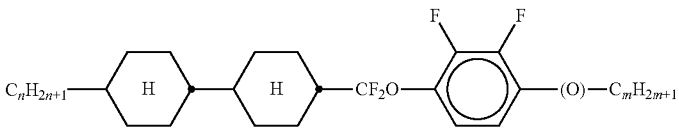
CCQY-n-(O)m
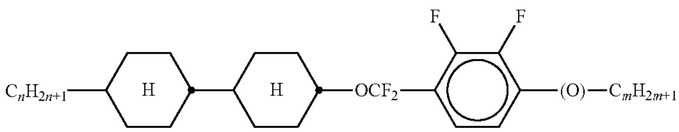
CCQIY-n-(O)m
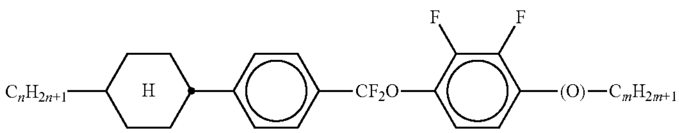
CPQY-n-(O)m
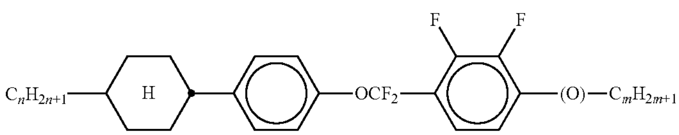
CPQIY-n-Om
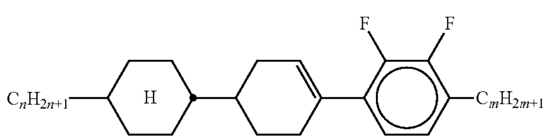
CLY-n-(O)m
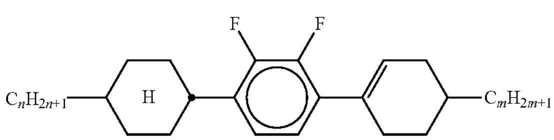
CYLI-n-m
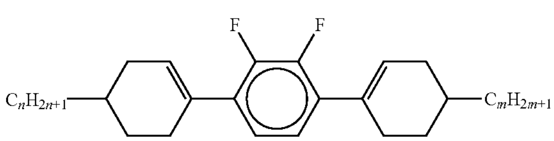
LYLI-n-m TABLE D-continued
| Illustrative structures |
|---|
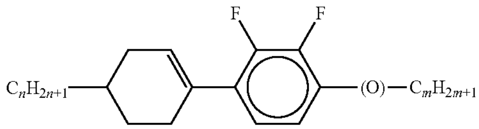
LY-n-(O)m
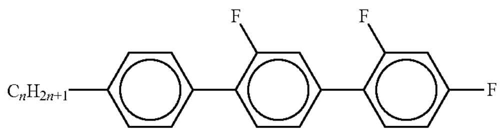
PGIGI-n-F
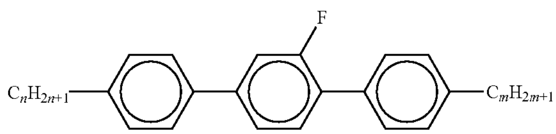
PGP-n-m
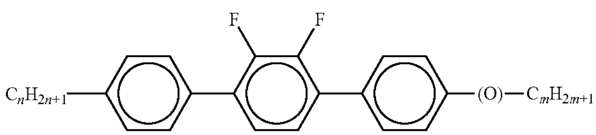
PYP-n-(O)m
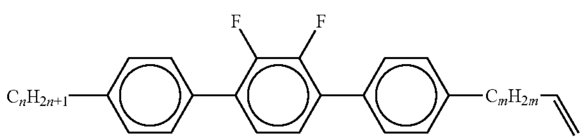
PYP-n-mV
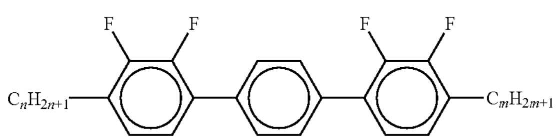
YPY-n-m
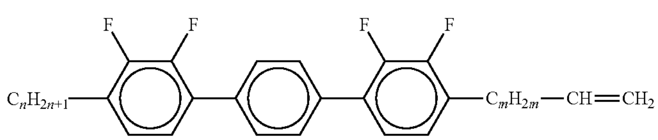
YPY-n-mV
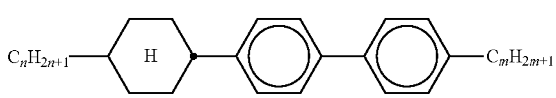
BCH-nm
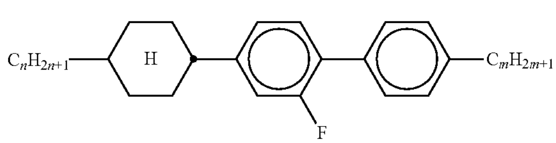
BCH-nmF TABLE D-continued
| Illustrative structures |
| --- |
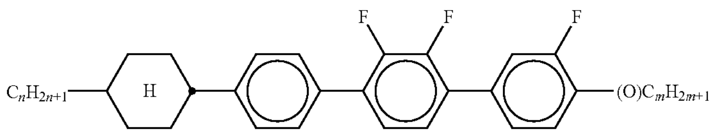
CPYP-n-(O)m
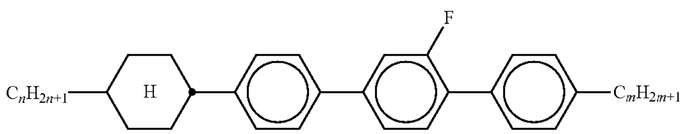
CPGP-n-m
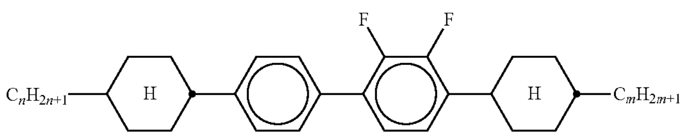
CPYC-n-m
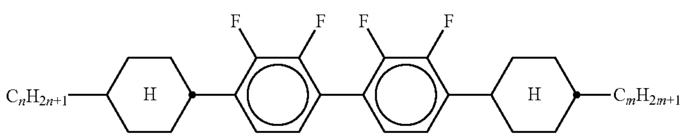
CYYC-n-m
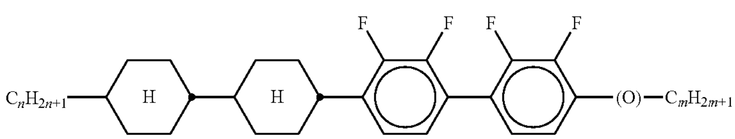
CCYY-n-m
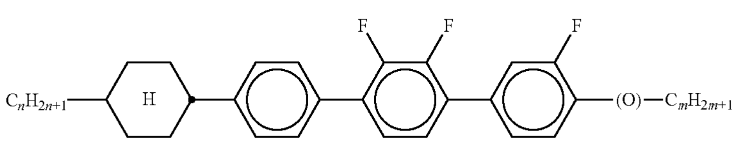
CPYG-n-(O)m
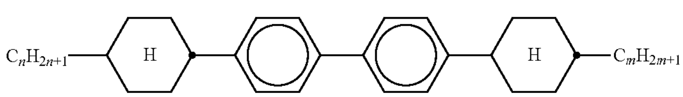
CBC-nm
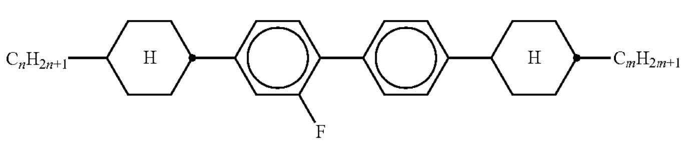
CBC-nmF TABLE D-continued
| Illustrative structures |
| --- |
| 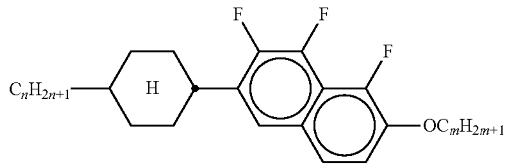 |
| CNap-n-Om |
| 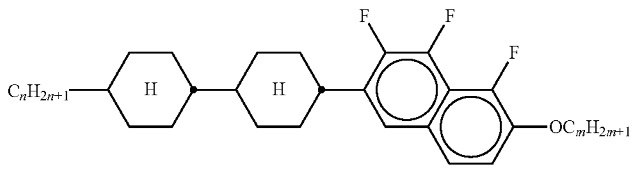 |
| CCNap-n-Om |
| 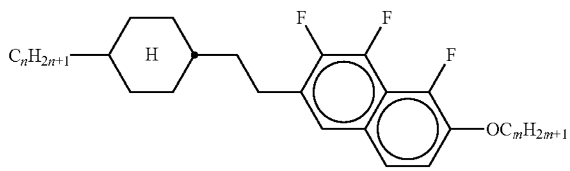 |
| CENap-n-Om |
| 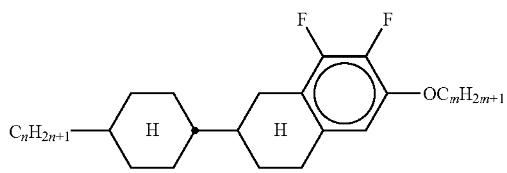 |
| CTNap-n-Om |
| 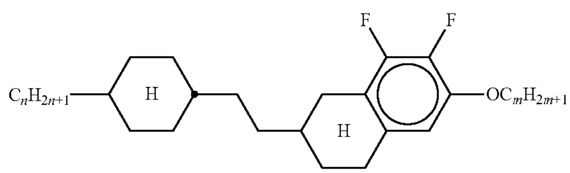 |
| CETNap-n-Om |
| 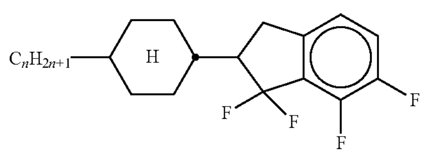 |
| CK-n-F |
| 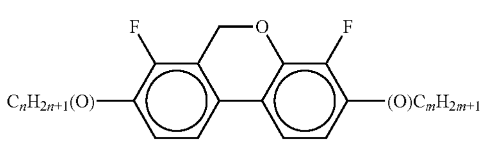 |
| DFDBC-n(O)-(O)m |

TABLE D-continued
| Illustrative structures |
| --- |
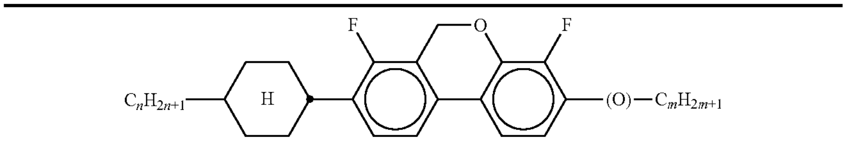
C-DFDBF-n-(O)m
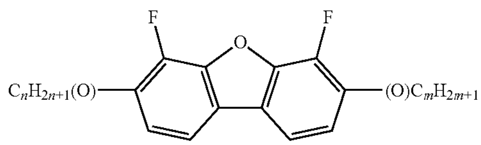
B-n(O)-(O)m
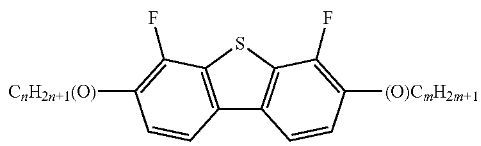
B(S)-n(O)-(O)m
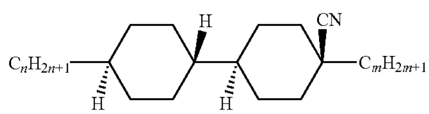
CC(CN)-n-m
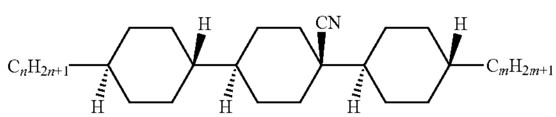
CC(CN)C-n-m
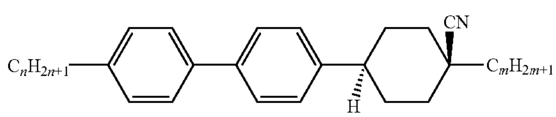
PPC(CN)-n-m
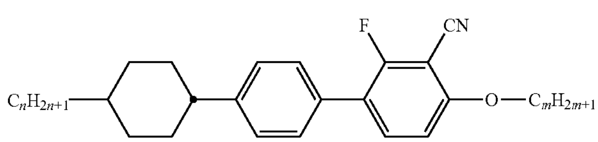
CPP(F,CN)-n-Om
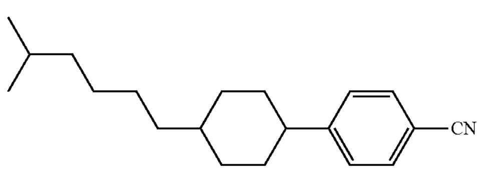 [SMILES: CC(C)CCCCC1CCC(c2ccc(C#N)cc2)CC1]
CP-i7-N
in which n, m and l preferably, independently of one another, denote 1 to 9, more preferably 1 to 7.
The following table, Table E, shows illustrative compounds which can optionally be used as stabilisers in the mesogenic media according to the present invention.

TABLE E
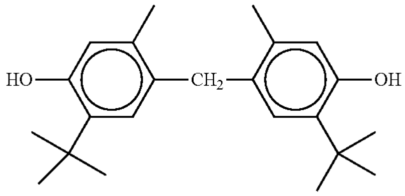
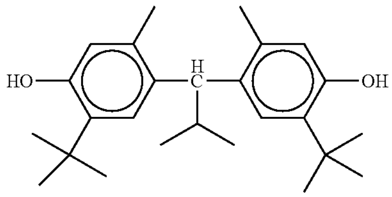
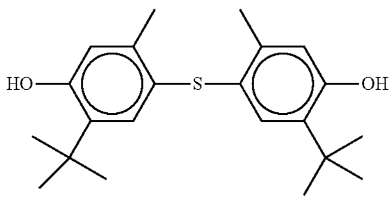
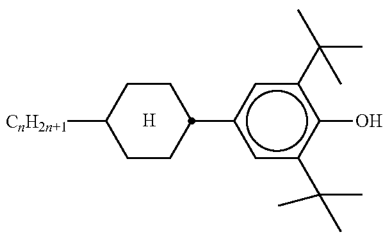
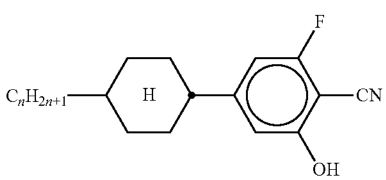
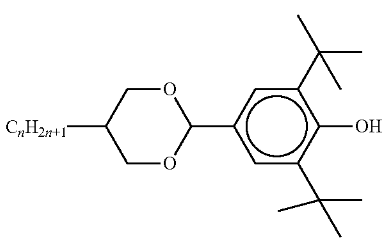
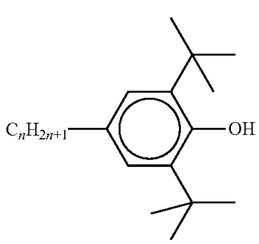

TABLE E-continued
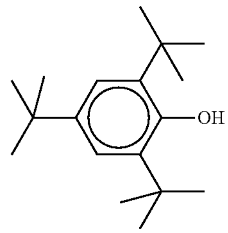
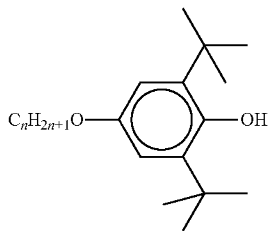
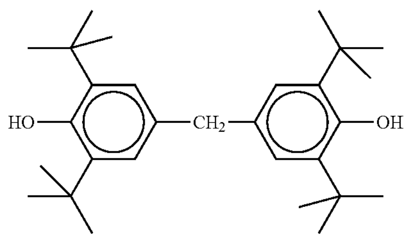
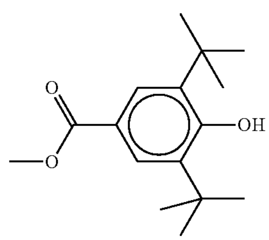
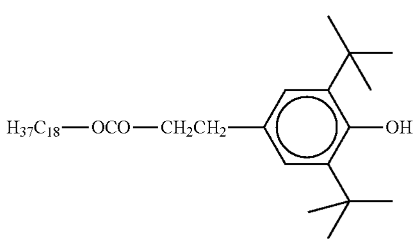
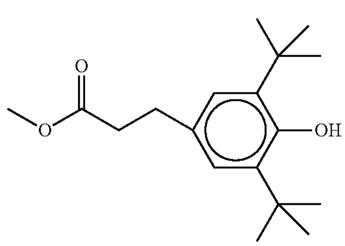

TABLE E-continued
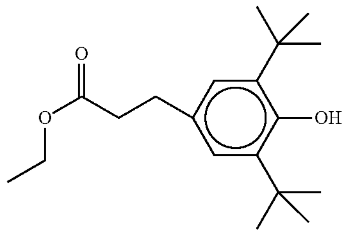
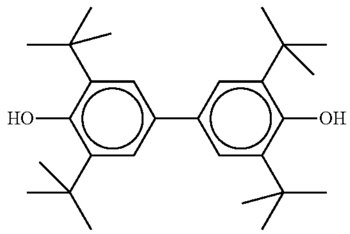
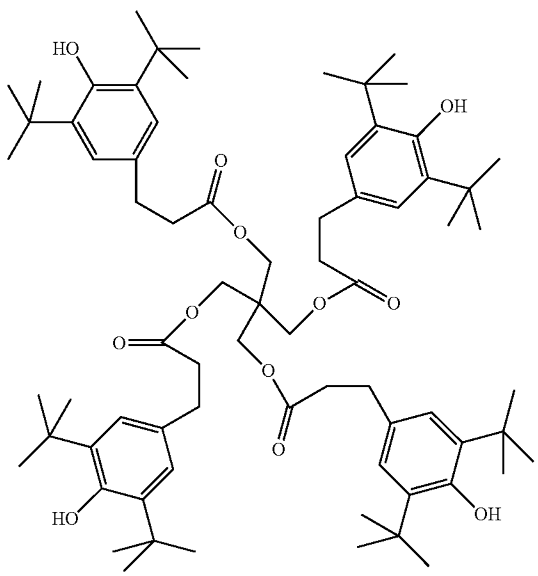 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
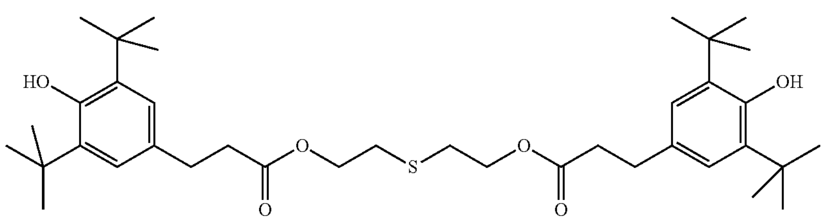 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
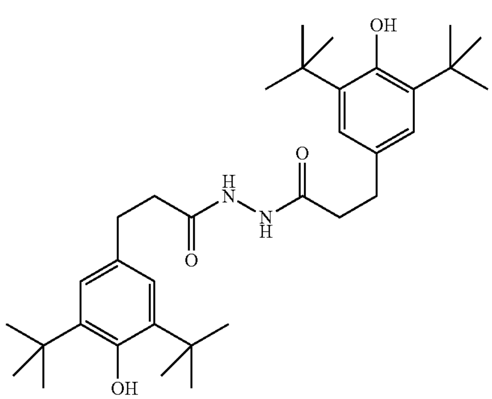 [SMILES: CC(C)(C)c1cc(CCC(=O)NNC(=O)CCc2cc(C(C)(C)C)c(O)c(C(C)(C)C)c2)cc(C(C)(C)C)c1O]

TABLE E-continued
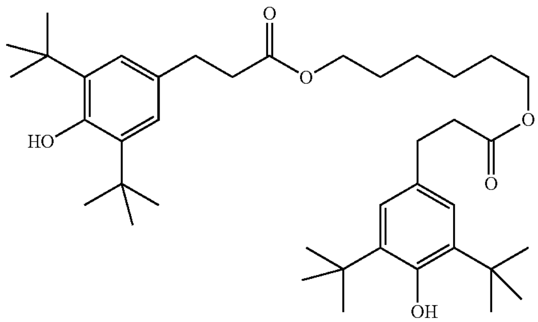 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
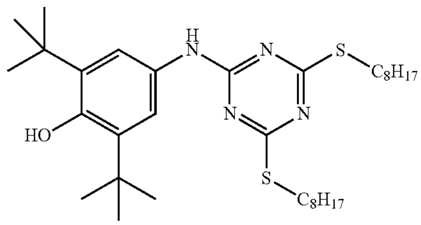
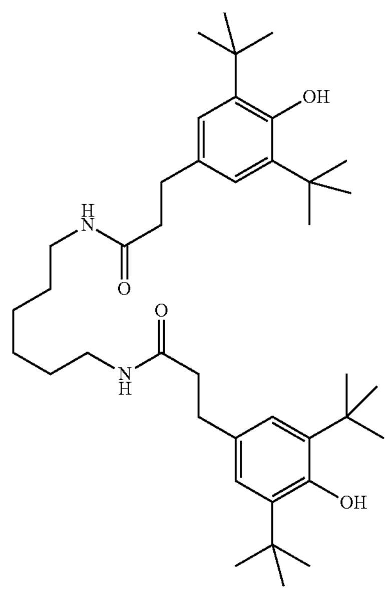 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
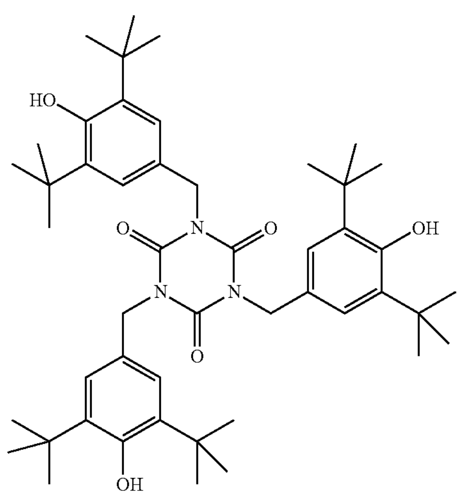 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE E-continued
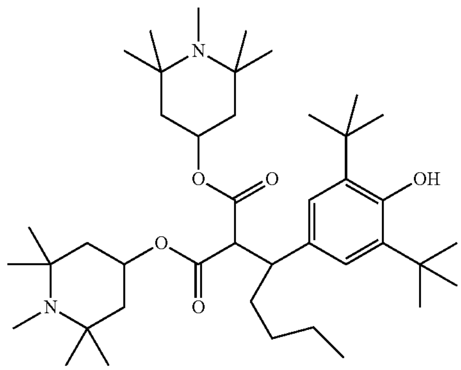 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
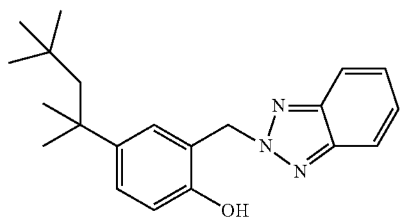 [SMILES: CC(C)(C)CC(C)(C)c1ccc(O)c(Cn2nc3ccccc3n2)c1]
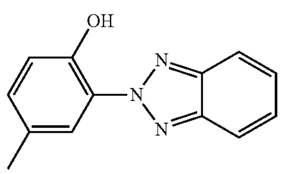 [SMILES: Cc1ccc(O)c(-n2nc3ccccc3n2)c1]
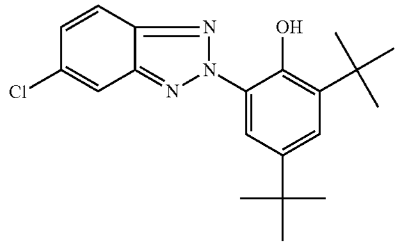 [SMILES: CC(C)(C)c1cc(-n2nc3ccc(Cl)cc3n2)c(O)c(C(C)(C)C)c1]
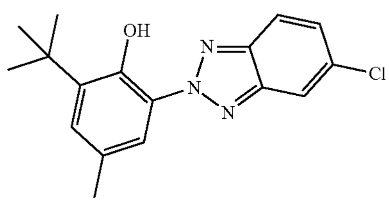 [SMILES: Cc1cc(-n2nc3ccc(Cl)cc3n2)c(O)c(C(C)(C)C)c1]
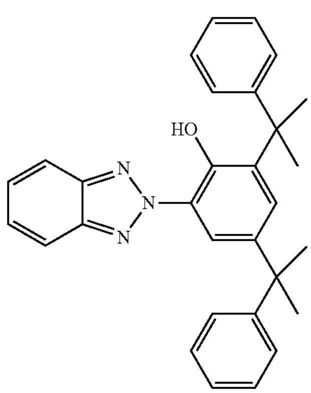 [SMILES: CC(C)(c1ccccc1)c1cc(-n2nc3ccccc3n2)c(O)c(C(C)(C)c2ccccc2)c1]

TABLE E-continued
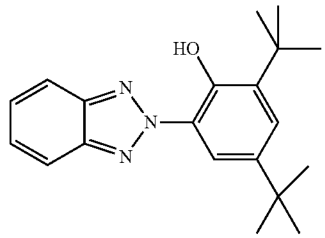 [SMILES: CC(C)(C)c1cc(-n2nc3ccccc3n2)c(O)c(C(C)(C)C)c1]
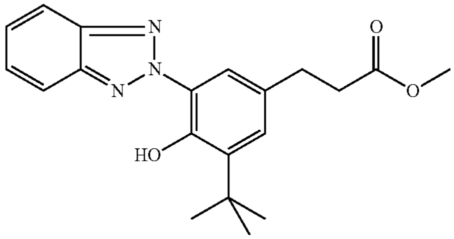 [SMILES: COC(=O)CCc1cc(-n2nc3ccccc3n2)c(O)c(C(C)(C)C)c1]
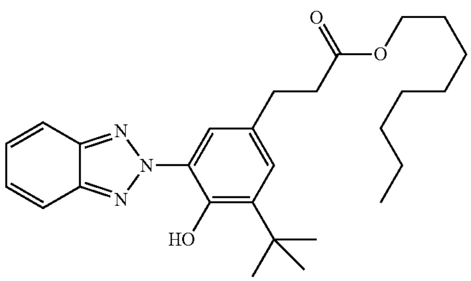 [SMILES: CCCCCCCCOC(=O)CCc1cc(-n2nc3ccccc3n2)c(O)c(C(C)(C)C)c1]
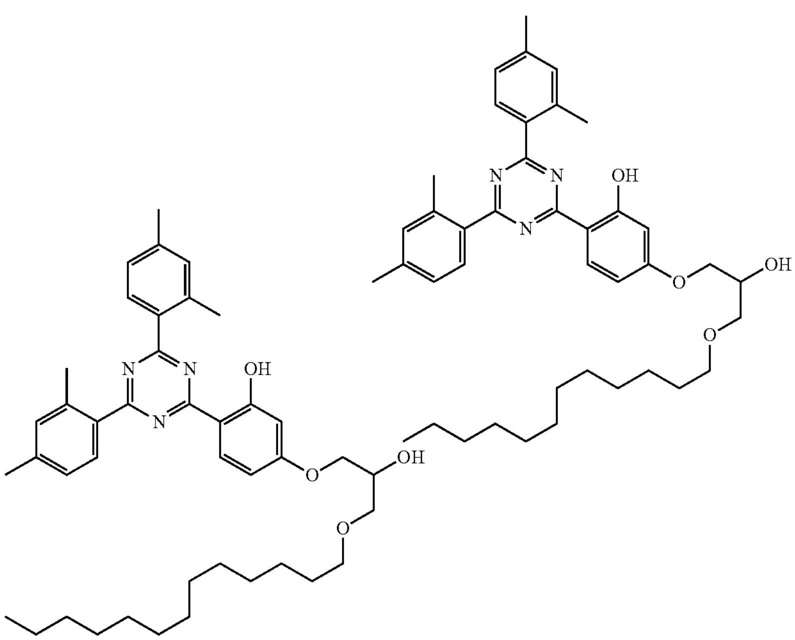

TABLE E-continued
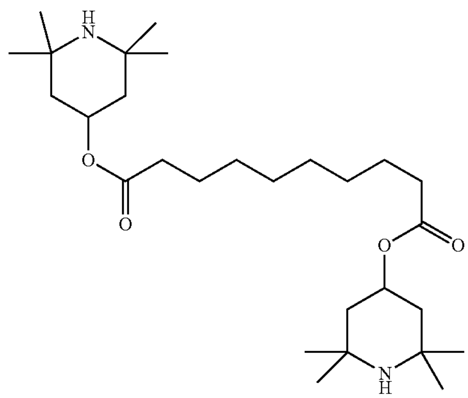
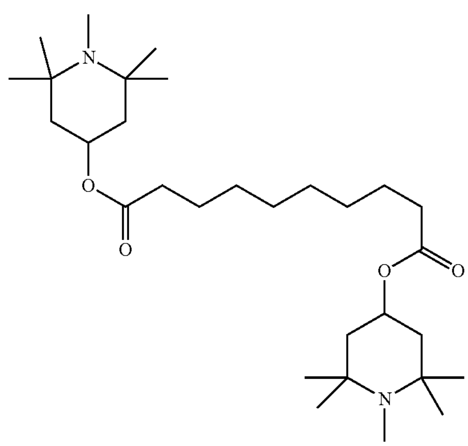
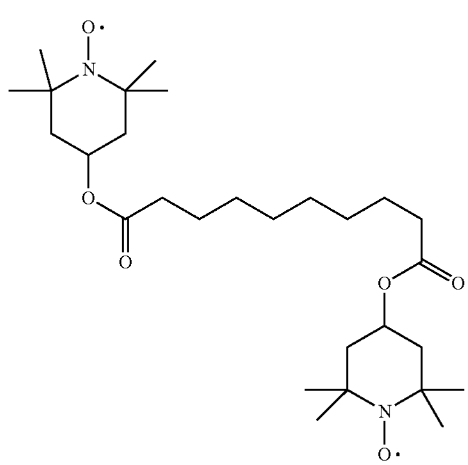

TABLE E-continued
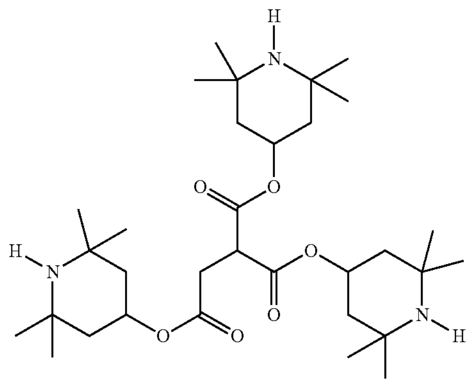 [SMILES: CC1(C)CC(OC(=O)CC(C(=O)OC2CC(C)(C)NC(C)(C)C2)C(=O)OC2CC(C)(C)NC(C)(C)C2)CC(C)(C)N1]
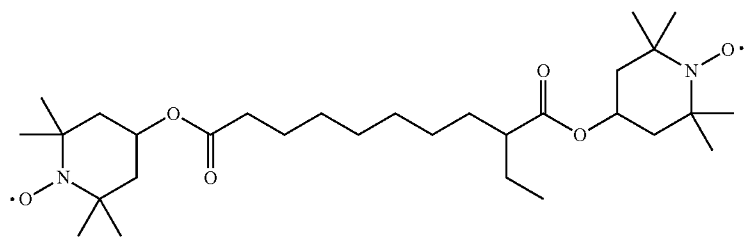
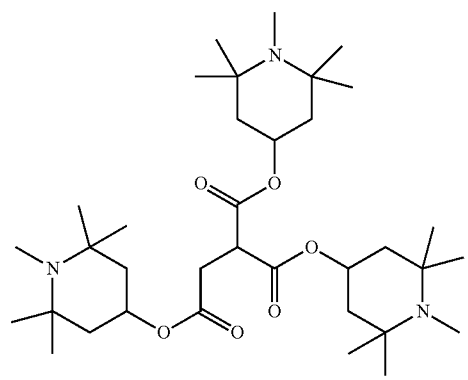
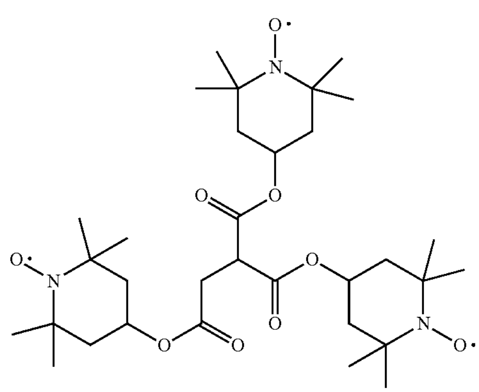

TABLE E-continued

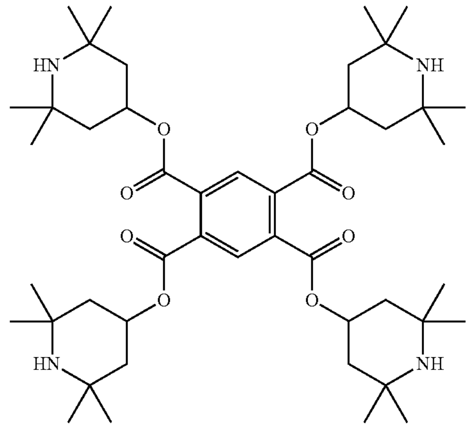

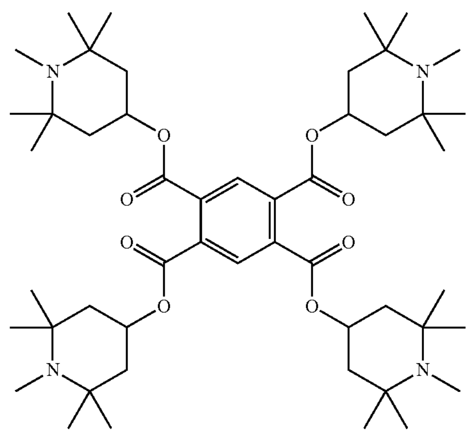

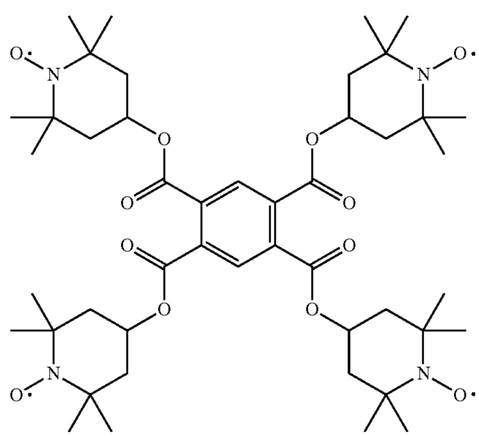

Table E shows possible stabilisers which can be added to the LC media according to the invention, wherein n denotes an integer from 1 to 12, preferably 1, 2, 3, 4, 5, 6, 7 or 8.

The LC media preferably comprise 0 to 10% by weight, in particular 1 ppm to 5% by weight, particularly preferably 10 ppm to 1% by weight, of stabilisers.

Table F below shows illustrative compounds which can preferably be used as chiral dopants in the mesogenic media according to the present invention.

TABLE F
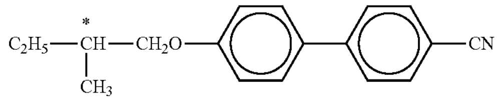
C 15
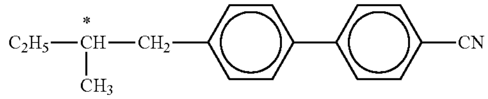
CB 15
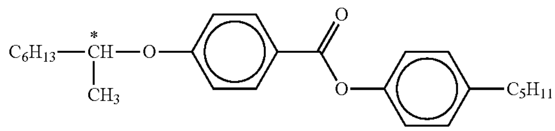
CM 21
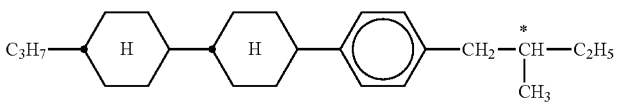
CM 44
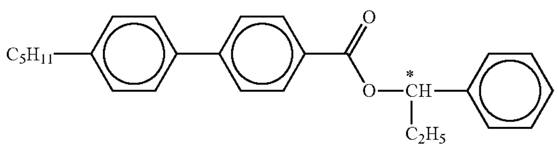
CM 45
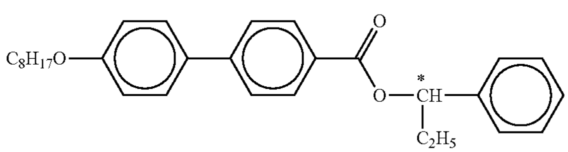
CM 47
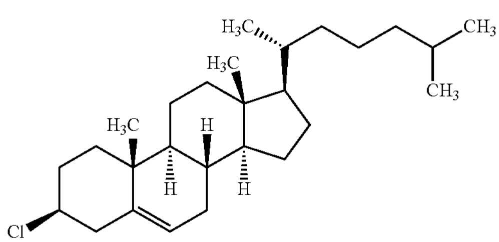
CC
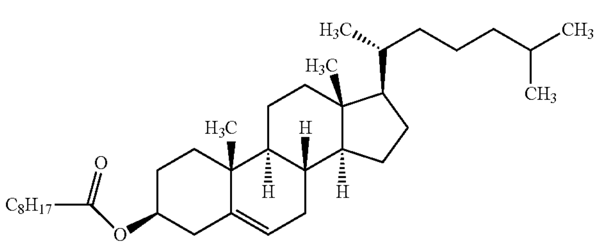
CN TABLE F-continued

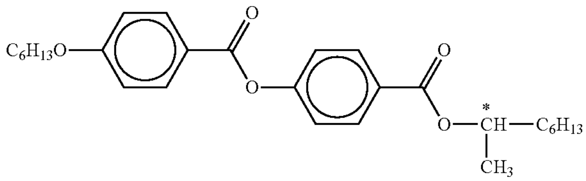

R/S-811

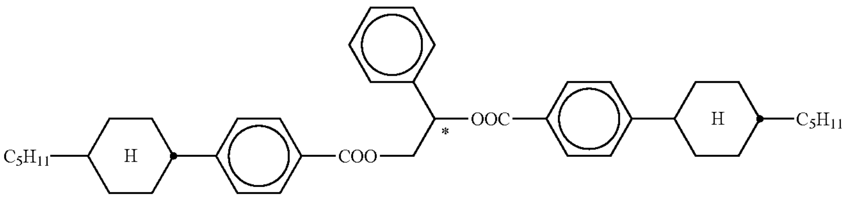

R/S-1011

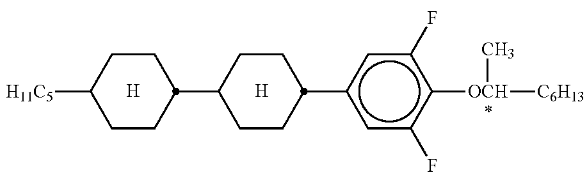

R/S-2011

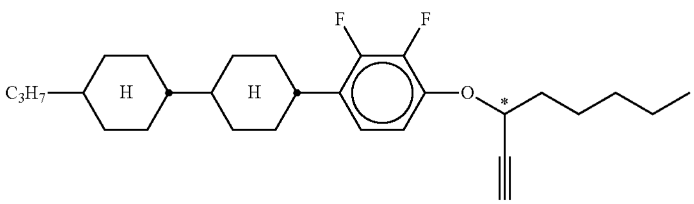

R/S-3011

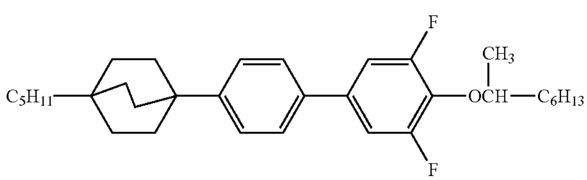

R/S-4011

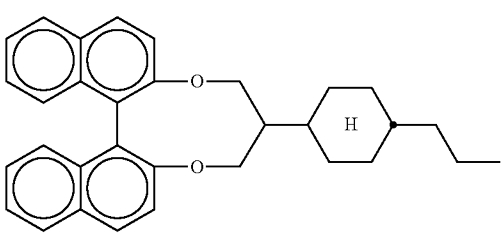

R/S-5011

In an embodiment of the present invention, the mesogenic media comprise one or more compounds selected from the group of compounds from Table F.

The mesogenic media according to the present invention preferably comprise two or more, preferably four or more, compounds selected from the group of compounds from the above Tables D, E and F.

The liquid-crystal media according to the present invention preferably comprise seven or more, preferably eight or more, individual compounds selected from the group of compounds from Table D, preferably three or more, particularly preferably four or more having different formulae selected from the formulae shown in Table D.

The LC media according to the invention may also comprise compounds in which, for example, H, N, O, Cl or F have been replaced by the corresponding isotopes.

All percent data and amount ratios given herein are percent by weight unless explicitly indicated otherwise.

All physical properties are determined in accordance with "Merck Liquid Crystals, Physical Properties of Liquid Crystals", Status November 1997, Merck KGaA, Germany, and apply for a temperature of 20° C., unless explicitly indicated otherwise. The value of Δn is determined at 589 nm, and the value of Δε is determined at 1 kHz, unless explicitly indicated otherwise in each case. $n_e$ and $n_o$ are in each case the refractive indices of the extraordinary and ordinary light beam under the conditions indicated above.

The degree of anisotropy R is determined from the value for the extinction coefficient E(p) (extinction coefficient of the mixture in the case of parallel alignment of the molecules to the polarisation direction of the light) and the value for the extinction coefficient of the mixture E(s) (extinction coefficient of the mixture in the case of perpendicular alignment of the molecules to the polarisation direction of the light), in each case at the wavelength of the maximum of the absorption band of the dye in question. If the dye has a plurality of absorption bands, typically the strongest absorption band is selected. The alignment of the molecules of the mixture is achieved by an alignment layer, as known in the art. In order to eliminate influences by the liquid-crystalline medium, other absorptions or reflections, each measurement is carried out against an identical mixture comprising no dye, and the value obtained is subtracted.

The measurement is carried out using linear-polarised light whose vibration direction is either parallel to the alignment direction (determination of E(p)) or perpendicular to the alignment direction (determination of E(s)). This can be achieved by a linear polariser, where the polariser is rotated with respect to the device in order to achieve the two different polarisation directions. The measurement of E(p) and E(s) is thus carried out via the rotation of the polarisation direction of the incident polarised light.

The degree of anisotropy R is calculated from the resultant values for E(s) and E(p) in accordance with the formula $$R=[E(p)-E(s)]/[E(p)+2*E(s)],$$

as indicated, inter alia, in "Polarized Light in Optics and Spectroscopy", D. S. Kliger et al., Academic Press, 1990. A detailed description of the method for the determination of the degree of anisotropy of liquid-crystalline media comprising a dichroic dye is also given in B. Bahadur, Liquid Crystals—Applications and Uses, Vol. 3, 1992, World Scientific Publishing, Section 11.4.2.

The following examples are merely illustrative of the present invention and they should not be considered as limiting the scope of the invention in any way. The examples and modifications or other equivalents thereof will become apparent to those skilled in the art in the light of the present disclosure.

EXAMPLES

In the Examples, $V_o$ denotes threshold voltage, capacitive [V] at 20° C., $n_e$ denotes extraordinary refractive index at 20° C. and 589 nm, $n_o$ denotes ordinary refractive index at 20° C. and 589 nm, Δn denotes optical anisotropy at 20° C. and 589 nm, $\varepsilon_{\parallel}$ denotes dielectric permittivity parallel to the director at 20° C. and 1 kHz, $\varepsilon_{\perp}$ denotes dielectric permittivity perpendicular to the director at 20° C. and 1 kHz, Δε denotes dielectric anisotropy at 20° C. and 1 kHz, cl.p., T(N,I) denotes clearing point [° C.], $\gamma_1$ denotes rotational viscosity measured at 20° C. [mPa·s], determined by the rotation method in a magnetic field, $K_1$ denotes elastic constant, "splay" deformation at 20° C. [pN], $K_2$ denotes elastic constant, "twist" deformation at 20° C. [pN], $K_3$ denotes elastic constant, "bend" deformation at 20° C. [pN], The term "threshold voltage" for the present invention relates to the capacitive threshold ($V_0$), unless explicitly indicated otherwise. In the Examples, as is generally usual, the optical threshold can also be indicated for 10% relative contrast ($V_{10}$).

Reference Example 1

A liquid-crystal base mixture B-1 is prepared and characterized with respect to its general physical properties, having the composition and properties as indicated in the following table.

| | | | |
|---|---|---|---|
| CPG-3-F | 8.00% | clearing point [° C.]: | 114 |
| CPG-5-F | 8.00% | Δn [589 nm, 20° C.]: | 0.130 |
| CPU-5-F | 14.00% | $n_e$ [589 nm, 20° C.]: | 1.62 |
| CPU-7-F | 11.00% | Δε [1 kHz, 20° C.]: | 10.0 |
| CP-5-N | 18.00% | $\varepsilon_{\perp}$ [1 kHz, 20° C.]: | 4.0 |
| CP-7-N | 13.00% | | |
| CCGU-3-F | 7.00% | | |
| CC-3-O3 | 2.00% | | |
| CBC-33F | 4.00% | | |
| CBC-53F | 4.00% | | |
| CBC-55F | 3.00% | | |
| CCZPC-3-3 | 3.00% | | |
| CCZPC-3-4 | 3.00% | | |
| CCZPC-3-5 | 2.00% | | |
| | Σ 100.00% | | |

Reference Example 2

A liquid-crystal base mixture B-2 is prepared and characterized with respect to its general physical properties, having the composition and properties as indicated in the following table.

| | | | |
|---|---|---|---|
| CPG-3-F | 5.00% | clearing point [° C.]: | 114.5 |
| CPG-5-F | 5.00% | Δn [589 nm, 20° C.]: | 0.135 |
| CPU-3-F | 15.00% | $n_e$ [589 nm, 20° C.]: | 1.63 |
| CPU-5-F | 15.00% | Δε [1 kHz, 20° C.]: | 11.3 |
| CP-3-N | 16.00% | $\varepsilon_{\perp}$ [1 kHz, 20° C.]: | 4.2 |
| CP-5-N | 16.00% | $K_1$ [pN, 20° C.]: | 13.4 |
| CCGU-3-F | 7.00% | $K_3$ [pN, 20° C.]: | 18.5 |
| CBC-33F | 4.00% | $V_0$ [V, 20° C.]: | 1.15 |
| CBC-53F | 4.00% | | |
| CBC-55F | 4.00% | | |
| CCZPC-3-3 | 3.00% | | |
| CCZPC-3-4 | 3.00% | | |
| CCZPC-3-5 | 3.00% | | |
| | Σ 100.00% | | |

A host mixture H-2 is prepared by mixing 99.97% of mixture B-2 with 0.03% of the compound of formula

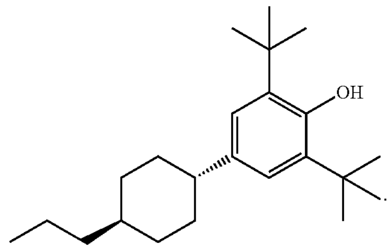 [SMILES: CCC[C@H]1CC[C@H](c2cc(C(C)(C)C)c(O)c(C(C)(C)C)c2)CC1]

A mixture C-2 is prepared by mixing 99.95% of mixture H-2 with 0.05% of the compound of formula S-811 as described in Table F above.

Reference Example 3

A liquid-crystal base mixture B-3 is prepared and characterized with respect to its general physical properties, having the composition and properties as indicated in the following table.

| | |
|---|---|
| CPG-3-F | 8.00% |
| CPG-5-F | 8.00% |
| CPU-5-F | 14.00% |
| CPU-7-F | 11.00% |
| CP-3-N | 18.00% |
| CP-7-N | 13.00% |
| CCGU-3-F | 7.00% |
| CC-3-O3 | 2.00% |
| CBC-33F | 4.00% |
| CBC-53F | 4.00% |
| CBC-55F | 3.00% |
| CCZPC-3-3 | 3.00% |
| CCZPC-3-4 | 3.00% |
| CCZPC-3-5 | 2.00% |
| | Σ 100.00% |

Reference Example 4

A liquid-crystal base mixture B-4 is prepared and characterized with respect to its general physical properties, having the composition and properties as indicated in the following table.

| | | | |
|---|---|---|---|
| CCU-1-F | 5.00% | clearing point [° C.]: | 85 |
| CCU-2-F | 8.00% | Δn [589 nm, 20° C.]: | 0.071 |
| CCU-3-F | 10.00% | $n_e$ [589 nm, 20° C.]: | 1.55 |
| CCQU-3-F | 11.00% | Δε [1 kHz, 20° C.]: | 4.2 |
| CCQU-5-F | 9.00% | $ε_⊥$ [1 kHz, 20° C.]: | 3.2 |
| CCZC-3-3 | 3.00% | | |
| CCZC-4-5 | 3.00% | | |
| CCZPC-3-5 | 3.00% | | |
| CC-3-O1 | 11.00% | | |
| CP-3-O1 | 12.00% | | |
| CC-3-V1 | 6.00% | | |
| CCP-V-1 | 10.00% | | |
| CC-5-V | 9.00% | | |
| | Σ 100.00% | | |

Reference Example 5

A liquid-crystal base mixture B-5 is prepared and characterized with respect to its general physical properties, having the composition and properties as indicated in the following table.

| | | | |
|---|---|---|---|
| PGIGI-3-F | 10.00% | clearing point [° C.]: | 105 |
| CPG-2-F | 6.00% | Δn [589 nm, 20° C.]: | 0.160 |
| CPG-3-F | 7.00% | $n_e$ [589 nm, 20° C.]: | 1.66 |
| CPG-5-F | 5.00% | Δε [1 kHz, 20° C.]: | 11.4 |
| CPU-5-F | 10.00% | $ε_⊥$ [1 kHz, 20° C.]: | 4.3 |
| CPG-7-F | 10.00% | | |
| PGU-3-F | 4.00% | | |
| PGU-5-F | 7.00% | | |
| CCGU-3-F | 8.00% | | |
| CPP-3-2 | 4.00% | | |
| CBC-33F | 3.00% | | |
| CBC-53F | 3.00% | | |
| CBC-55F | 3.00% | | |
| CPGU-3-OT | 5.00% | | |
| CP-5-N | 15.00% | | |
| | Σ 100.00% | | |

Reference Example 6

A liquid-crystal host mixture B-6 is prepared and characterized with respect to its general physical properties, having the composition and properties as indicated in the following table.

| | | | |
|---|---|---|---|
| CP-5-N | 15.00% | clearing point [° C.]: | 92 |
| CP-7-N | 14.00% | Δn [589 nm, 20° C.]: | 0.163 |
| CPG-2-F | 6.00% | $n_e$ [589 nm, 20° C.]: | 1.67 |
| CPG-3-F | 6.00% | | |
| CPG-5-F | 5.00% | | |
| PGU-2-F | 9.00% | | |
| PGU-3-F | 9.00% | | |
| PGU-5-F | 9.00% | | |
| CPP-3-2 | 7.00% | | |
| CBC-33F | 3.00% | | |
| CBC-53F | 3.00% | | |
| CBC-55F | 3.00% | | |
| CBC-33 | 4.00% | | |
| PGIGI-3-F | 7.00% | | |
| | Σ 100.00% | | |

Reference Example 7

A liquid-crystal base mixture B-7 is prepared and characterized with respect to its general physical properties, having the composition and properties as indicated in the following table.

| | | | |
|---|---|---|---|
| CP-1V-N | 10.00% | clearing point [° C.]: | 113 |
| PZG-3-N | 4.00% | Δn [589 nm, 20° C.]: | 0.297 |
| PZG-4-N | 13.00% | $n_e$ [589 nm, 20° C.]: | 1.82 |
| PTP-1-O2 | 4.00% | Δε [1 kHz, 20° C.]: | 13.6 |
| PTP-2-O1 | 5.00% | $ε_⊥$ [1 kHz, 20° C.]: | 4.5 |
| PTP-3-O1 | 5.00% | | |
| CPTP-3-O1 | 4.00% | | |
| PPTUI-3-2 | 20.00% | | |
| PPTUI-3-4 | 35.00% | | |
| | Σ 100.00% | | |

A host mixture H-7 is prepared by mixing 98.41% of mixture B-7 with 1.59% of the compound of formula R-5011 as described in Table F above.

Reference Example 8

A liquid-crystal base mixture B-8 is prepared and characterized with respect to its general physical properties, having the composition and properties as indicated in the following table.

| | | | |
|---|---|---|---|
| CC(CN)-4-7 | 14.00% | clearing point [° C.]: | 114.6 |
| CC(CN)-5-5 | 14.00% | Δn [589 nm, 20° C.]: | 0.045 |
| CC(CN)-3-3 | 6.00% | $n_e$ [589 nm, 20° C.]: | 1.52 |
| CCZC-3-3 | 3.00% | Δε [1 kHz, 20° C.]: | −5.2 |
| CCZC-3-5 | 3.00% | $\varepsilon_\perp$ [1 kHz, 20° C.]: | 8.5 |
| CCZC-4-3 | 3.00% | | |
| CCZC-4-5 | 3.00% | | |
| CC-3-O1 | 11.00% | | |
| CC-5-O1 | 4.00% | | |
| CC-5-O2 | 4.00% | | |
| CC(CN)C-3-5 | 10.00% | | |
| CC(CN)C-5-5 | 12.00% | | |
| CC(CN)C-5-3 | 10.00% | | |
| CCZPC-3-3 | 3.00% | | |
| | Σ 100.00% | | |

Reference Example 9

A liquid-crystal base mixture B-9 is prepared and characterized with respect to its general physical properties, having the composition and properties as indicated in the following table.

| | | | |
|---|---|---|---|
| CY-3-O2 | 9.00% | clearing point [° C.]: | 110.5 |
| CY-3-O4 | 9.00% | Δn [589 nm, 20° C.]: | 0.132 |
| CY-5-O2 | 12.00% | $n_e$ [589 nm, 20° C.]: | 1.62 |
| CY-5-O4 | 8.00% | Δε [1 kHz, 20° C.]: | −4.9 |
| CCY-3-O2 | 5.00% | $\varepsilon_\perp$ [1 kHz, 20° C.]: | 8.8 |
| CCY-3-O3 | 5.00% | $K_1$ [pN, 20° C.]: | 16.8 |
| CCY-4-O2 | 5.00% | $K_3$ [pN, 20° C.]: | 20.4 |
| CPY-2-O2 | 7.00% | $V_0$ [V, 20° C.]: | 2.14 |
| CPY-3-O2 | 6.00% | | |
| PYP-2-3 | 12.00% | | |
| CCP-V-1 | 6.00% | | |
| CCZPC-3-3 | 3.00% | | |
| CCZPC-3-4 | 3.00% | | |
| CBC-33F | 5.00% | | |
| CBC-53F | 5.00% | | |
| | Σ 100.00% | | |

A host mixture H-9 is prepared by mixing 99.97% of mixture B-9 with 0.03% of the compound of formula

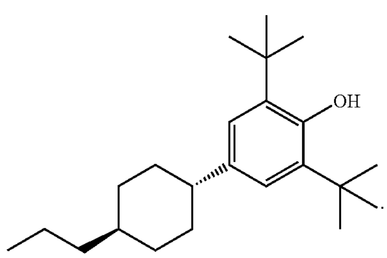 [SMILES: CCC[C@H]1CC[C@H](c2cc(C(C)(C)C)c(O)c(C(C)(C)C)c2)CC1]

Reference Example 10

A liquid-crystal base mixture B-10 is prepared and characterized with respect to its general physical properties, having the composition and properties as indicated in the following table.

| | | | |
|---|---|---|---|
| CY-3-O4 | 25.00% | clearing point [° C.]: | 75.4 |
| CCY-3-O2 | 6.00% | Δn [589 nm, 20° C.]: | 0.100 |
| CCY-3-O3 | 7.00% | $n_e$ [589 nm, 20° C.]: | 1.58 |
| CPY-2-O2 | 8.00% | Δε [1 kHz, 20° C.]: | −3.0 |
| CPY-3-O2 | 8.00% | $\varepsilon_\perp$ [1 kHz, 20° C.]: | 6.4 |
| PYP-2-3 | 3.00% | $K_1$ [pN, 20° C.]: | 12.8 |
| CC-3-V1 | 9.00% | $K_3$ [pN, 20° C.]: | 14.4 |
| CC-3-V | 25.00% | $V_0$ [V, 20° C.]: | 2.32 |
| BCH-32 | 9.00% | | |
| | Σ 100.00% | | |

Reference Example 11

A liquid-crystal base mixture B-11 is prepared and characterized with respect to its general physical properties, having the composition and properties as indicated in the following table.

| | | | |
|---|---|---|---|
| CC-3-O1 | 10.00% | clearing point [° C.]: | 74.5 |
| CC-3-4 | 8.00% | Δn [589 nm, 20° C.]: | 0.107 |
| CC-3-5 | 7.00% | $n_e$ [589 nm, 20° C.]: | 1.59 |
| CCP-3-1 | 11.00% | Δε [1 kHz, 20° C.]: | −3.3 |
| CCY-3-O2 | 11.00% | $\varepsilon_\perp$ [1 kHz, 20° C.]: | 7.0 |
| CPY-3-O2 | 10.00% | | |
| CY-3-O2 | 12.00% | | |
| PY-1-O2 | 8.00% | | |
| PY-3-O2 | 12.00% | | |
| CC-3-V1 | 6.00% | | |
| BCH-32 | 5.00% | | |
| | Σ 100.00% | | |

Reference Example 12

A liquid-crystal base mixture B-12 is prepared and characterized with respect to its general physical properties, having the composition and properties as indicated in the following table.

| | | | |
|---|---|---|---|
| CY-3-O2 | 12.00% | clearing point [° C.]: | 91.5 |
| CY-5-O2 | 12.00% | Δn [589 nm, 20° C.]: | 0.078 |
| CCY-3-O2 | 13.00% | $n_e$ [589 nm, 20° C.]: | 1.55 |
| CCY-5-O2 | 13.00% | Δε [1 kHz, 20° C.]: | −3.7 |
| CCY-3-1 | 8.00% | $\varepsilon_\perp$ [1 kHz, 20° C.]: | 7.1 |
| CCZC-3-3 | 4.00% | | |
| CCZC-3-5 | 3.00% | | |
| CCZC-4-3 | 3.00% | | |
| CC-3-4 | 6.00% | | |
| CC-3-5 | 6.00% | | |
| CC-3-O3 | 8.00% | | |
| CC-5-O1 | 4.00% | | |
| CC-5-O2 | 4.00% | | |
| CP-3-O2 | 4.00% | | |
| | Σ 100.00% | | |

Reference Example 13

A liquid-crystal base mixture B-13 is prepared and characterized with respect to its general physical properties, having the composition and properties as indicated in the following table.

| | | | |
|---|---|---|---|
| APUQU-2-F | 6.00% | clearing point [° C.]: | 79.5 |
| APUQU-3-F | 6.00% | Δn [589 nm, 20° C.]: | 0.110 |
| CC-3-V | 44.50% | $n_e$ [589 nm, 20° C.]: | 1.59 |
| CCP-V-1 | 12.50% | Δε [1 kHz, 20° C.]: | 11.6 |
| CPGU-3-OT | 5.00% | $\varepsilon_\perp$ [1 kHz, 20° C.]: | 3.6 |

-continued

| | | | |
|---|---|---|---|
| DPGU-4-F | 2.00% | | |
| PGP-2-2V | 1.50% | | |
| PGUQU-3-F | 4.50% | | |
| PGUQU-4-F | 8.00% | | |
| PUQU-3-F | 10.00% | | |
| | Σ 100.00% | | |

Reference Example 14

A liquid-crystal base mixture B-14 is prepared and characterized with respect to its general physical properties, having the composition and properties as indicated in the following table.

| | | | |
|---|---|---|---|
| CPG-3-F | 7.00% | clearing point [° C.]: | 113.8 |
| CPG-5-F | 7.00% | Δn [589 nm, 20° C.]: | 0.118 |
| CPU-5-F | 12.00% | $n_e$ [589 nm, 20° C.]: | 1.61 |
| CPU-7-F | 12.00% | | |
| CP-7-N | 11.00% | | |
| CP-8-N | 6.00% | | |
| CP-9-N | 6.00% | | |
| CCGU-3-F | 7.00% | | |
| CC-3-O3 | 6.00% | | |
| CC-5-O1 | 6.00% | | |
| CBC-33F | 4.00% | | |
| CBC-53F | 4.00% | | |
| CBC-55F | 4.00% | | |
| CCZPC-3-3 | 3.00% | | |
| CCZPC-3-4 | 3.00% | | |
| CCZPC-3-5 | 2.00% | | |
| | Σ 100.00% | | |

Reference Example 15

A liquid-crystal base mixture B-15 is prepared and characterized with respect to its general physical properties, having the composition and properties as indicated in the following table.

| | | | |
|---|---|---|---|
| CPG-3-F | 8.00% | clearing point [° C.]: | 108 |
| CPG-5-F | 8.00% | Δn [589 nm, 20° C.]: | 0.125 |
| CPU-5-F | 14.00% | $n_e$ [589 nm, 20° C.]: | 1.61 |
| CPU-7-F | 11.00% | | |
| CP-i7-N | 18.00% | | |
| CP-7-N | 13.00% | | |
| CCGU-3-F | 7.00% | | |
| CC-3-O3 | 2.00% | | |
| CBC-33F | 4.00% | | |
| CBC-53F | 4.00% | | |
| CBC-55F | 3.00% | | |
| CCZPC-3-3 | 3.00% | | |
| CCZPC-3-4 | 3.00% | | |
| CCZPC-3-5 | 2.00% | | |
| | Σ 100.00% | | |

Reference Example 16

A liquid-crystal base mixture B-16 is prepared and characterized with respect to its general physical properties, having the composition and properties as indicated in the following table.

| | | | |
|---|---|---|---|
| CPG-2-F | 4.00% | clearing point [° C.]: | 121 |
| CPG-3-F | 8.00% | Δn [589 nm, 20° C.]: | 0.124 |
| CPG-5-F | 7.00% | $n_e$ [589 nm, 20° C.]: | 1.62 |
| CPU-5-F | 10.00% | | |
| CPU-7-F | 10.00% | | |
| CP-6-N | 10.00% | | |
| CP-7-N | 12.00% | | |
| CCGU-3-F | 9.00% | | |
| CC-3-O3 | 5.00% | | |
| CC-5-O1 | 4.00% | | |
| CBC-33F | 4.00% | | |
| CBC-53F | 4.00% | | |
| CBC-55F | 4.00% | | |
| CCZPC-3-3 | 3.00% | | |
| CCZPC-3-4 | 3.00% | | |
| CCZPC-3-5 | 3.00% | | |
| | Σ 100.00% | | |

Reference Example 17

A liquid-crystal base mixture B-17 is prepared and characterized with respect to its general physical properties, having the composition and properties as indicated in the following table.

| | | | |
|---|---|---|---|
| CPG-2-F | 3.00% | clearing point [° C.]: | 114.5 |
| CPG-3-F | 8.00% | Δn [589 nm, 20° C.]: | 0.121 |
| CPG-5-F | 8.00% | $n_e$ [589 nm, 20° C.]: | 1.61 |
| CPU-5-F | 10.00% | | |
| CPU-7-F | 10.00% | | |
| CP-6-N | 10.00% | | |
| CP-7-N | 12.00% | | |
| CCGU-3-F | 7.00% | | |
| CC-3-O3 | 6.00% | | |
| CC-5-O1 | 6.00% | | |
| CBC-33F | 4.00% | | |
| CBC-53F | 4.00% | | |
| CBC-55F | 4.00% | | |
| CCZPC-3-3 | 3.00% | | |
| CCZPC-3-4 | 3.00% | | |
| CCZPC-3-5 | 2.00% | | |
| | Σ 100.00% | | |

Reference Example 18

The respective properties of the individual compounds of formulae I-1, I-2, I-3, I-4, II-1, II-4 and II-5 are determined.

The following Table shows the determined degree of anisotropy for the compounds.

| Compound | Degree of anisotropy |
|---|---|
| I-1 | 0.77 |
| I-2 | 0.73 |
| I-3 | 0.73 |
| I-4 | 0.73 |
| II-1 | 0.71 |
| II-4 | 0.66 |
| II-5 | 0.65 |

Each of the compounds of formulae I-1, I-2, I-3, I-4, II-1, II-4 and II-5 on their own have adequate solubility in base mixture B-1 shown in Reference Example 1 and in base mixture B-8 shown in Reference Example 8.

For each of the compounds of formulae I-1, I-2, I-3, I-4, II-1, II-4 and II-5 the stability against exposure to light in the base mixtures B-1 and B-8 over time is investigated using a Suntest CPS+ from MTS-Atlas at black standard temperatures of 42° C. and 70° C. All compounds individually exhibit adequate stability, however the compounds of formulae II-1, II-4 and II-5 individually show a somewhat lesser stability compared to the performance of the respective compounds of formulae I-1, I-2, I-3 and I-4.

Comparative Example 1

A mixture CM-1 is prepared by mixing 99.007% of mixture H-2 as described in Reference Example 2 above with 0.195% of the compound of formula I-1, 0.064% of the compound of formula

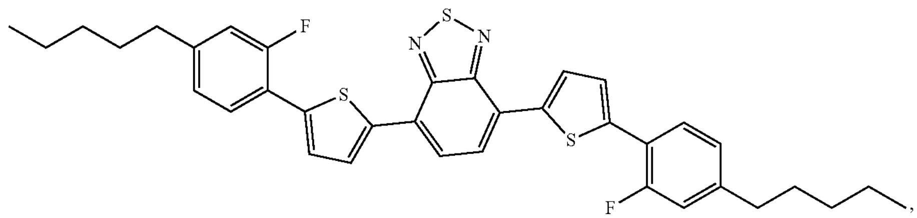 [SMILES: CCCCCc1ccc(-c2ccc(-c3ccc(-c4ccc(-c5ccc(CCCCC)cc5F)s4)c4nsnc34)s2)c(F)c1]

0.100% of the compound of formula

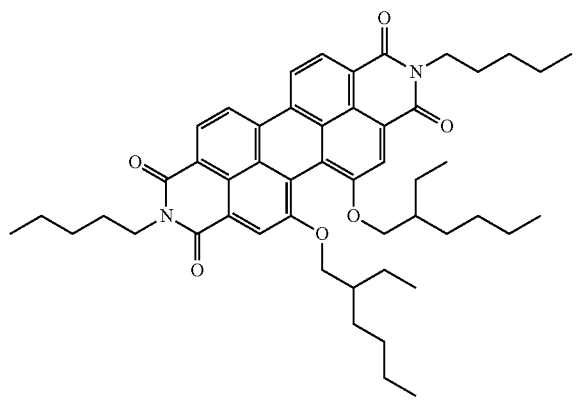 [SMILES: CCCCCN1C(=O)c2ccc3c4ccc5c6c(cc(OCC(CC)CCCC)c(c7c(OCC(CC)CCCC)cc(c2c37)C1=O)c64)C(=O)N(CCCCC)C5=O]

and 0.634% of the compound of formula

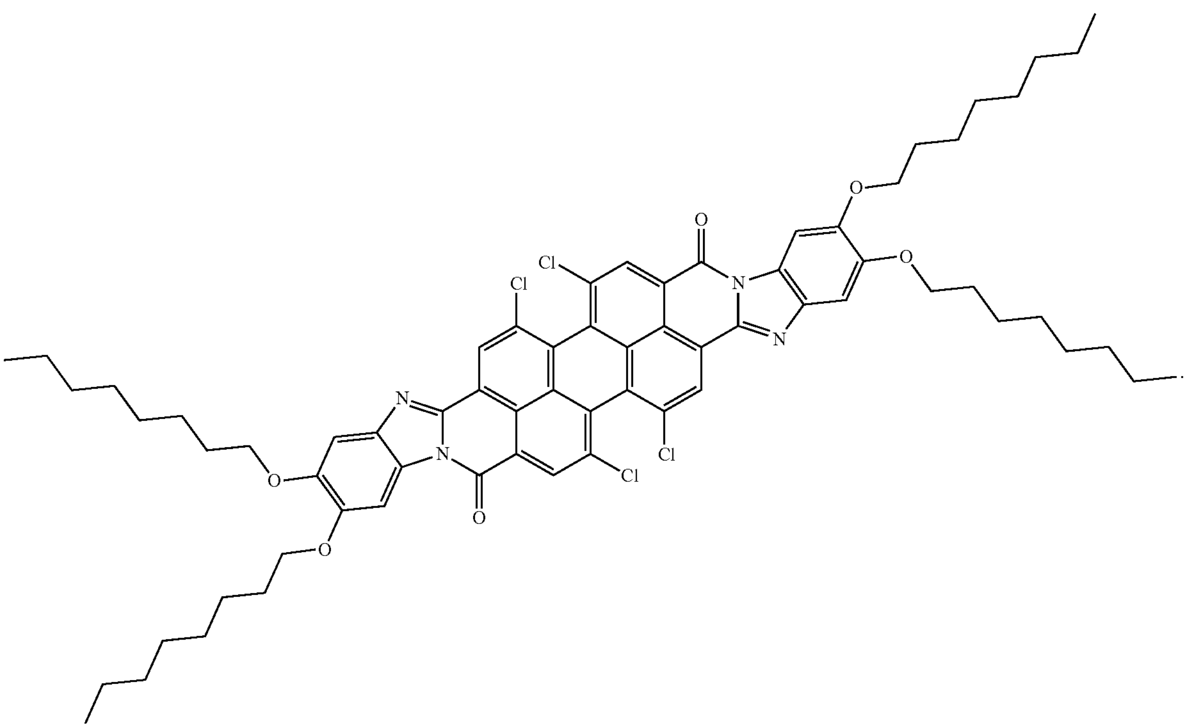 [SMILES: CCCCCCCCOc1cc2nc3c4cc(Cl)c5c6c(Cl)cc7c(=O)n8c9cc(OCCCCCCCC)c(OCCCCCCCC)cc9nc8c8cc(Cl)c(c9c(Cl)cc(c(=O)n3c2cc1OCCCCCCCC)c4c95)c6c78]

The mixture CM-1 is filled into a test cell having antiparallel polyimide alignment layers and a cell gap of 23.7 μm. Strong residual fluorescence is visible by eye.

Comparative Example 2

A mixture CM-2 is prepared by mixing 96.350% of mixture B-1 as described in Reference Example 1 above with 0.050% of the compound of formula

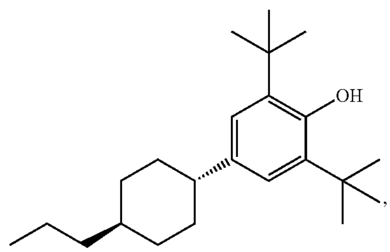 [SMILES: CCC[C@H]1CC[C@H](c2cc(C(C)(C)C)c(O)c(C(C)(C)C)c2)CC1]

which in the following will be referred to as ST-1, 1.460% of the compound of formula I-1, 1.644% of the compound of formula I-2 and 0.496% of the compound of formula I-3.

The mixture CM-2 is filled into a test cell having antiparallel polyimide alignment layers and a cell gap of 11.6 μm. Comparatively strong residual fluorescence is still observed.

In the following the compositions and media comprising the dyes according to the invention are investigated with respect to their physical properties and their suitability for use in devices for regulating energy transmission.

Example 1

A mixture M-1 is prepared by mixing 98.919% of mixture B-1 as described in Reference Example 1 above with 0.030% of the compound ST-1 shown in Comparative Example 2 above, 0.030% of the compound of formula I-1, 0.230% of the compound of formula I-2, 0.137% of the compound of formula I-4, 0.272% of the compound of formula II-1 and 0.382% of the compound of formula II-4.

The mixture M-1 is filled into a test cell having antiparallel polyimide alignment layers and a cell gap of 23.7 μm. Only a weak residual fluorescence is observed.

Example 2

A mixture M-2 is prepared by mixing 94.905% of mixture B-1 as described in Reference Example 1 above with 0.050% of compound ST-1 shown in Comparative Example 2 above, 0.434% of the compound of formula I-1, 0.997% of the compound of formula I-2, 0.849% of the compound of formula I-3, 1.300% of the compound of formula II-1 and 1.465% of the compound of formula II-4.

The dye compounds combined show excellent solubility and excellent stability against heat and light in the host mixture.

The mixture M-2 is filled into an electrically switchable test cell having antiparallel polyimide alignment layers, where the switching layer has a thickness of 25 μm. The performance for the bright state and the dark state are evaluated. Measurements are performed according to norm EN410.

The following values are determined:
light transmittance $\tau_v$ (dark state): 18.4%
light transmittance $\tau_v$ (bright state): 36.7%
chromaticity coordinate x (dark state): 0.321
chromaticity coordinate y (dark state): 0.355
chromaticity coordinate x (bright state): 0.321
chromaticity coordinate y (bright state): 0.355.

The chromaticity coordinates or colour coordinates are determined according to CIE 1931 2° standard observer.

Fluorescence measurements are performed using a spectrophotometer respectively with excitation wavelengths of 300 nm, 350 nm, 400 nm, 450 nm, 500 nm and 550 nm. No discernible residual fluorescence in the visible spectral range is observed.

The mixture M-2 is filled into an electrically switchable test cell having the Heilmeier configuration, using an ITOS XP-40HT polariser, antiparallel polyimide alignment layers and a switching layer thickness of 12 μm. The performance for the bright state and the dark state are evaluated. Measurements are performed according to norm EN410.

The following values are determined:
light transmittance $\tau_v$ (dark state): 0.6%
light transmittance $\tau_v$ (bright state): 24.6%
chromaticity coordinate x (dark state): 0.301
chromaticity coordinate y (dark state): 0.323
chromaticity coordinate x (bright state): 0.324
chromaticity coordinate y (bright state): 0.354.

The mixture M-2 is well suited for the use in devices for regulating the passage of energy from an outside space into an inside space, for example in windows.

Example 3

The following mixtures M-3-1, M-3-2, M-3-3, M-3-4 and M-3-5 are prepared by respectively mixing the base mixture B-1 with the additional compounds according to the following Table.

| | M-3-1 | M-3-2 | M-3-3 | M-3-4 | M-3-5 |
|---|---|---|---|---|---|
| B-1 | 94.896% | 94.691% | 95.391% | 95.855% | 94.653% |
| ST-1 | 0.050% | 0.050% | 0.050% | 0.050% | 0.050% |
| I-1 | 0.704% | 0.752% | 0.500% | 0.550% | 0.360% |
| I-2 | 0.765% | 0.698% | 0.945% | 0.866% | 1.252% |
| I-3 | 0.919% | 0.879% | 0.840% | 0.963% | 0.734% |
| II-1 | 1.406% | 1.771% | 1.428% | 1.122% | 1.669% |
| II-4 | 1.260% | 1.159% | 0.846% | 0.594% | 1.282% |

The mixtures M-3-1, M-3-2, M-3-3, M-3-4 and M-3-5 are respectively filled into electrically switchable devices having the Heilmeier configuration, using an ITOS XP-40HT polariser, antiparallel polyimide alignment layers and a switching layer thickness of 11.6 μm.

The performance for the bright state and the dark state is evaluated. Measurements are performed according to norm EN410.

| | M-3-1 | M-3-2 | M-3-3 | M-3-4 | M-3-5 |
|---|---|---|---|---|---|
| light transmittance $\tau_v$ (dark state) | 0.6% | 0.6% | 0.6% | 0.6% | 0.5% |
| light transmittance $\tau_v$ (bright state) | 24.7% | 24.7% | 25.1% | 25.2% | 24.2% |
| chromaticity coordinate x (dark state) | 0.286 | 0.260 | 0.287 | 0.288 | 0.313 |
| chromaticity coordinate y (dark state) | 0.363 | 0.373 | 0.287 | 0.256 | 0.305 |

-continued

| | M-3-1 | M-3-2 | M-3-3 | M-3-4 | M-3-5 |
|---|---|---|---|---|---|
| chromaticity coordinate x (bright state) | 0.321 | 0.317 | 0.321 | 0.320 | 0.325 |
| chromaticity coordinate y (bright state) | 0.355 | 0.356 | 0.345 | 0.339 | 0.350 |

Fluorescence measurements are performed using a spectrophotometer respectively with excitation wavelengths of 300 nm, 350 nm, 400 nm, 450 nm, 500 nm and 550 nm. No discernible residual fluorescence in the visible spectral range is observed for the mixtures M-3-1, M-3-2, M-3-3, M-3-4 and M-3-5.

The mixtures M-3-1, M-3-2, M-3-3, M-3-4 and M-3-5 are well suited for the use in devices for regulating the passage of energy from an outside space into an inside space, for example in windows.

Example 4

A mixture M-4 is prepared by mixing 94.367% of mixture B-1 as described in Reference Example 1 above with 0.369% of the compound of formula I-1, 1.192% of the compound of formula I-2, 0.699% of the compound of formula I-4, 1.636% of the compound of formula II-1, 1.187% of the compound of formula II-4, 0.150% of compound ST-1 shown in Comparative Example 2 above, 0.150% of the compound of formula

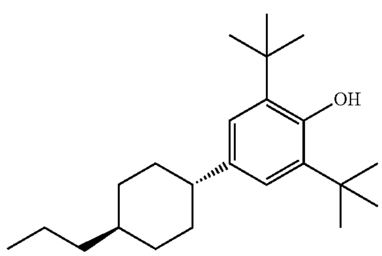 [SMILES: CCC[C@H]1CC[C@H](c2cc(C(C)(C)C)c(O)c(C(C)(C)C)c2)CC1]

and 0.250% of the compound of formula

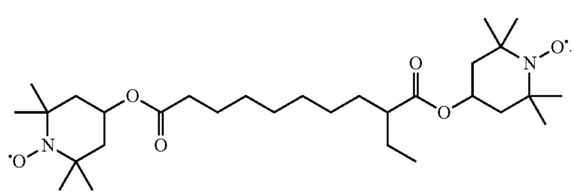

The mixture M-4 is filled into a test cell having a cell gap of 23.6 μm. The stability of M-4 against exposure to light over time is investigated using a Suntest CPS+ from MTS-Atlas at a black standard temperature of 70° C. No colour change is observed for a time period of over 26 weeks.

Example 5

A mixture M-5 is prepared by mixing 94.667% of mixture B-1 as described in Reference Example 1 above with 0.369% of the compound of formula I-1, 1.192% of the compound of formula I-2, 0.699% of the compound of formula I-4, 1.636% of the compound of formula II-1, 1.187% of the compound of formula II-4, 0.150% of compound ST-1 shown in Comparative Example 2 above and 0.100% of the compound of formula

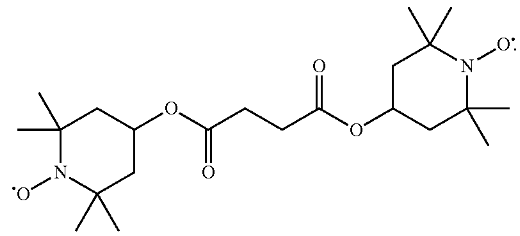

The mixture M-5 is filled into a test cell having a cell gap of 23.1 μm. The stability of M-5 against exposure to light over time is investigated using a Suntest CPS+ from MTS-Atlas at a black standard temperature of 70° C. No colour change is observed for a time period of over 39 weeks.

Example 6

A mixture M-6 is prepared by mixing 94.767% of mixture B-1 as described in Reference Example 1 above with 0.369% of the compound of formula I-1, 1.192% of the compound of formula I-2, 0.699% of the compound of formula I-3, 1.636% of the compound of formula II-1, 1.187% of the compound of formula II-4 and 0.150% of the compound of formula

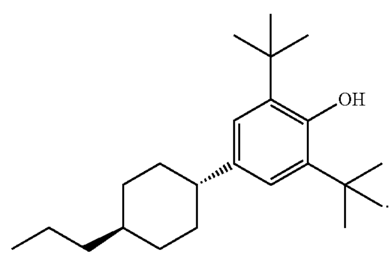 [SMILES: CCC[C@H]1CC[C@H](c2cc(C(C)(C)C)c(O)c(C(C)(C)C)c2)CC1]

The mixture M-6 is filled into a test cell having a cell gap of 22.5 μm. The stability of M-6 against exposure to light over time is investigated using a Suntest CPS+ from MTS-Atlas at a black standard temperature of 70° C. No colour change is observed for a time period of over 26 weeks.

Examples 7 to 14

Mixtures M-7 to M-14 are prepared analogous to mixture M-2 described in Example 2, wherein instead of base mixture B-1 respectively the mixtures B-2, C-2, B-3, B-4, B-5, B-6, B-7 and H-7 described in Reference Examples 2 to 7 above are used as the host mixtures.

The mixtures M-7 to M-14 are treated and analysed analogous to M-2 described in Example 2 above. The mixtures are suitable for the use in devices for regulating the passage of energy from an outside space into an inside space, for example in windows.

Example 15

A mixture M-15 is prepared by mixing 96.364% of mixture B-8 as described in Reference Example 8 above with 0.566% of the compound of formula I-1, 0.847% of the compound of formula I-4, 0.730% of the compound of formula II-1, 0.962% of the compound of formula II-4, 0.030% of compound ST-1 shown in Comparative Example 2 above, and 0.501% of the compound of formula

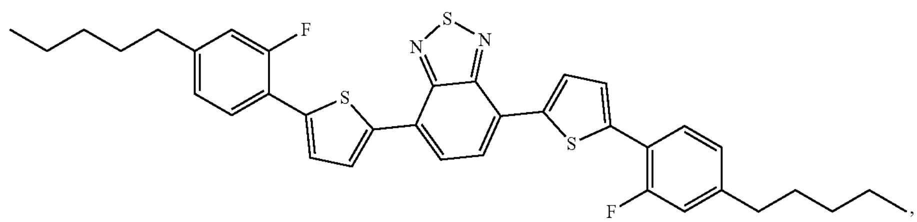 [SMILES: CCCCCc1ccc(-c2ccc(-c3ccc(-c4ccc(-c5ccc(CCCCC)cc5F)s4)c4nsnc34)s2)c(F)c1]

The mixture M-15 is filled into a test cell having a cell gap of 23.0 μm. The stability of M-15 against exposure to light over time is investigated using a Suntest CPS+ from MTS-Atlas at a black standard temperature of 70° C. No colour change is observed for a time period of over 10 weeks.

Example 16

A mixture M-16 is prepared by mixing 96.359% of mixture B-8 as described in Reference Example 8 above with 0.566% of the compound of formula I-1, 0.847% of the compound of formula I-4, 0.730% of the compound of formula II-1, 0.967% of the compound of formula II-4, 0.030% of compound ST-1 shown in Comparative Example 2 above, and 0.501% of the compound of formula

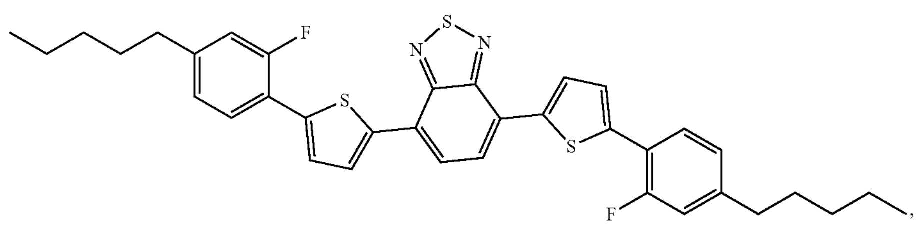 [SMILES: CCCCCc1ccc(-c2ccc(-c3ccc(-c4ccc(-c5ccc(CCCCC)cc5F)s4)c4nsnc34)s2)c(F)c1]

The mixture M-16 is filled into a test cell having a cell gap of 23.0 μm. The stability of M-16 against exposure to light over time is investigated using a Suntest CPS+ from MTS-Atlas at a black standard temperature of 70° C. No colour change is observed for a time period of over 10 weeks.

The mixture M-16 is filled into an electrically switchable device having a switching layer thickness of 23.0 μm. The dye compounds combined show excellent solubility and excellent stability against heat and light in the host mixture and give an excellent switching contrast.

The mixture M-16 is well suited for the use in devices for regulating the passage of energy from an outside space into an inside space, for example in windows.

Examples 17 to 25

Mixtures M-17 to M-25 are prepared analogous to mixture M-16 described in Example 16, wherein instead of base mixture B-8 respectively the mixtures B-9, B-10, B-11, B-12, B-13, B-14, B-15, B-16 and B-17 described in Reference Examples 9 to 17 above are used as the host mixtures.

The mixtures are suitable for the use in devices for regulating the passage of energy from an outside space into an inside space, for example in windows.

Example 26

A mixture M-26 is prepared by mixing 95.596% of mixture B-1 as described in Reference Example 1 above with 0.050% of the compound ST-1 shown in Comparative Example 2 above, 0.450% of the compound of formula I-1, 0.924% of the compound of formula I-2, 0.780% of the compound of formula I-3, 1.550% of the compound of formula II-4 and 0.650% of the compound (182)

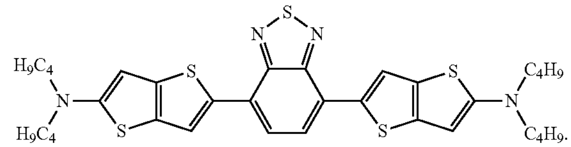

The mixture is suitable for the use in devices for regulating the passage of energy from an outside space into an inside space, for example in windows.

Example 27

A mixture M-27 is prepared by mixing 95.646% of mixture B-1 as described in Reference Example 1 above with 0.450% of the compound of formula I-1, 0.924% of the compound of formula I-2, 0.780% of the compound of formula I-3, 1.550% of the compound of formula II-4 and 0.650% of the compound (182) shown in Example 26 above.

The mixture is suitable for the use in devices for regulating the passage of energy from an outside space into an inside space, for example in windows.

Example 28

A mixture M-28 is prepared by mixing 89.45% of mixture B-1 as described in Reference Example 1 above with 0.05% of the compound ST-1 shown in Comparative Example 2 above, 1.00% of the compound of formula I-1, 2.20% of the compound of formula I-2, 2.20% of the compound of formula I-3, 2.00% of the compound of formula II-4, 1.30% of the compound of formula II-5 and 1.80% of the compound (182) shown in Example 26 above.

The mixture is suitable for the use in devices for regulating the passage of energy from an outside space into an inside space, for example in windows.

Example 29

A mixture M-29 is prepared by mixing 89.45% of mixture B-8 as described in Reference Example 8 above with 0.05% of the compound ST-1 shown in Comparative Example 2 above, 1.00% of the compound of formula I-1, 2.20% of the compound of formula I-2, 2.20% of the compound of formula I-3, 2.00% of the compound of formula II-4, 1.30% of the compound of formula II-5 and 1.80% of the compound (182) shown in Example 26 above.

The mixture is suitable for the use in devices for regulating the passage of energy from an outside space into an inside space, for example in windows.

Example 30

A mixture M-30 is prepared by mixing 89.268% of mixture B-1 as described in Reference Example 1 above with 0.100% of the compound ST-1 shown in Comparative Example 2 above, 0.382% of the compound of formula R-5011 as described in Table F above, 0.950% of the compound of formula I-1, 1.900% of the compound of formula I-2, 2.300% of the compound of formula I-3, 1.800% of the compound of formula II-1, 2.200% of the compound of formula II-4 and 1.100% of the compound of formula II-5.

The mixture is suitable for the use in devices for regulating the passage of energy from an outside space into an inside space, for example in windows.

The invention claimed is:

1. A liquid-crystalline medium comprising:

two or more compounds of formula I

I

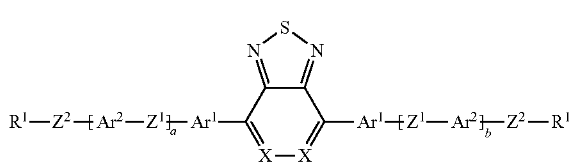

and two or more compounds of formula II

II

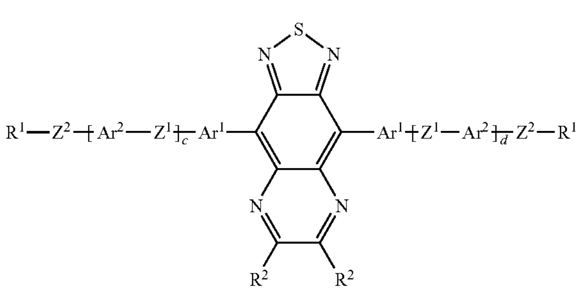

wherein $R^1$ on each occurrence, identically or differently, denotes H, F, CN, $N(R^z)_2$, $Si(R^z)_3$, or a straight-chain having 1 to 20 C atoms or branched alkyl or alkoxy having 3 to 20 C atoms, in which, in addition, one or more non-adjacent $CH_2$ groups may each be replaced, independently of one another, by —C($R^z$)═C($R^z$)—, —C≡C—,

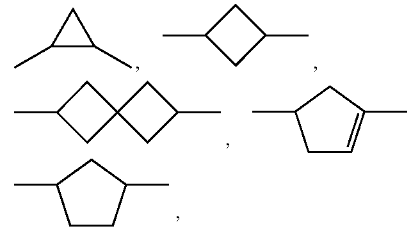

—N($R^z$)—, —O—, —S—, —CO—, —CO—O—, —O—CO— or —O—CO—O— in such a way that O and/or S atoms are not linked directly to one another, and in which, in addition, one or more H atoms may each be replaced by F or CN, X on each occurrence, identically or differently, denotes $CR^a$ or N, $R^a$ on each occurrence, identically or differently, denotes H, straight-chain alkyl having 1 to 12 C atoms, branched alkyl having 3 to 12 C atoms, F, Cl, $N(R^z)_2$ or CN, $R^2$ and $R^z$ on each occurrence, identically or differently, denote H, halogen, or straight-chain alkyl having 1 to 12 C atoms, branched alkyl having 3 to 12 C atoms, or cyclic alkyl having 3 to 12 C atoms, in which, in addition, one or more non-adjacent $CH_2$ groups may each be replaced by —O—, —S—, —CO—, —CO—O—, —O—CO— or —O—CO—O— in such a way that O and/or S atoms are not linked directly to one another, and in which, in addition, one or more H atoms may each be replaced by F or Cl, $Ar^1$ and $Ar^2$ on each occurrence, identically or differently, denote an aryl or heteroaryl group, which may be substituted by one or more radicals L, L on each occurrence, identically or differently, denotes F, Cl, CN, OH, SCN, $SF_5$, $N(R^z)_2$, straight-chain, optionally fluorinated, alkyl or alkoxy having 1 to 12 C atoms, branched, optionally fluorinated, alkyl or alkoxy having 3 to 12 C atoms, straight-chain alkylcarbonyl, alkoxycarbonyl, alkylcarbonyloxy or alkoxycarbonyloxy, optionally fluorinated, having 2 to 12 C atoms, or branched alkylcarbonyl, alkoxycarbonyl, alkylcarbonyloxy or alkoxycarbonyloxy, optionally fluorinated, having 4 to 12 C atoms $Z^1$ on each occurrence, identically or differently, denotes a single bond, —O—, —S—, —C(O)—, —$CR^{y1}R^{y2}$—, —$CF_2O$—, —$OCF_2$—, —C(O)—O—, —O—C(O)—, —$OCH_2$—, —$CH_2O$—, —$CR^{x1}$═$CR^{x2}$—, —C≡C—, —$CR^{x1}$═$CR^{x2}$—CO—, —CO—$CR^{x1}$═$CR^{x2}$—, —$CR^{x1}$═$CR^{x2}$—COO—, —OCO—$CR^{x1}$═$CR^{x2}$— or —N═N—, $Z^2$ on each occurrence, identically or differently, denotes a single bond, —$CF_2O$—, —$OCF_2$— or —C≡C—, a, b, c and d independently of one another, denote 0 or 1, $R^{x1}$, $R^{x2}$ independently of one another, denote H, F, Cl, CN or alkyl having 1 to 12 C atoms, $R^{y1}$ denotes H or alkyl having 1 to 12 C atoms, and $R^{y2}$ denotes alkyl having 1 to 12 C atoms, and one or more mesogenic compounds, wherein the composition comprises at least one purple dye, at least one blue dye, at least one yellow dye, at least one red dye and at least one near-infrared dye.

2. The liquid-crystalline medium according to claim 1, wherein $Ar^1$ and $Ar^2$ denote, independently of one another, 1,4-phenylene, 1,4-naphthylene, 2,6-naphthylene, thiazole- 2,5-diyl, thiophene-2,5-diyl or thienothiophene-2,5-diyl, wherein one or more H atoms may be replaced by the group L as defined in claim 1.

3. The liquid-crystalline medium according to claim 1, wherein at least one of $Ar^1$ is thiophene-2,5-diyl or thienothiophene-2,5-diyl.

4. The liquid-crystalline medium according to claim 1, wherein $R^1$ identically or differently, denotes a straight-chain alkyl or alkoxy having 1 to 15 C atoms, branched alkyl or alkoxy having 3 to 15 C atoms, or $N(R^b)_2$, $R^b$ is, independently of one another, a straight-chain alkyl having 1 to 9 C atoms, $R^2$ identically or differently, denotes a straight-chain alkyl having 1 to 9 C atoms, a, b, c, and d each denote 1, $Z^1$ is a single bond, and $Z^2$ is a single bond.

5. The liquid-crystalline medium according to claim 1, wherein at least one of said two or more compounds of formula I is selected from the compounds of formulae I-1, I-2, I-3, and I-4

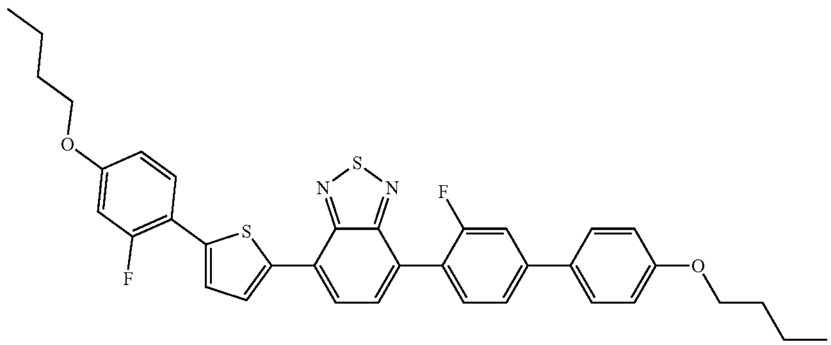

I-1

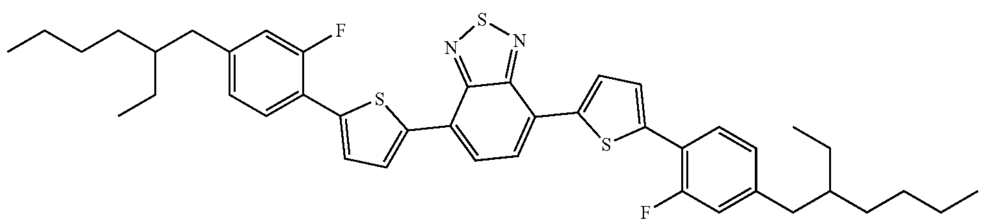

I-2

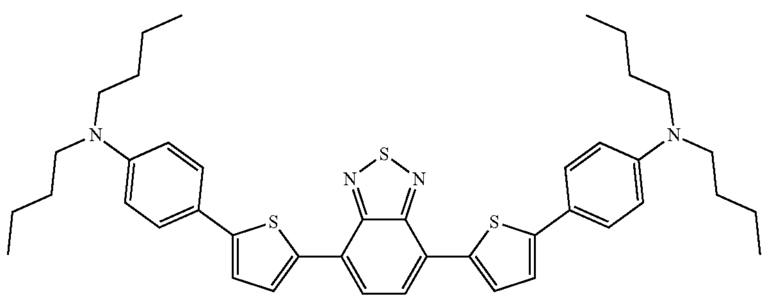

I-3

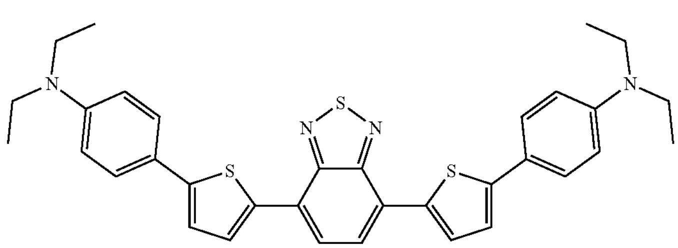

I-4 and at least one of said two or more compounds of formula II is selected from the compounds of formulae II-1, II-2, II-3, II-4, and II-5
II-1
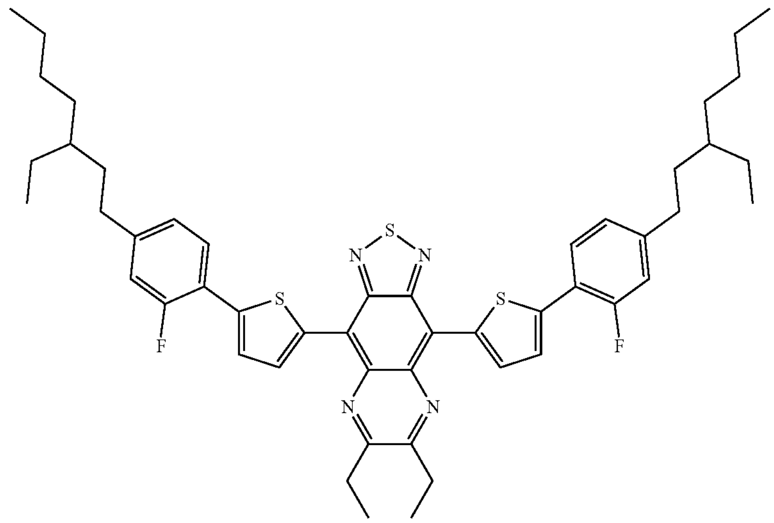
II-2
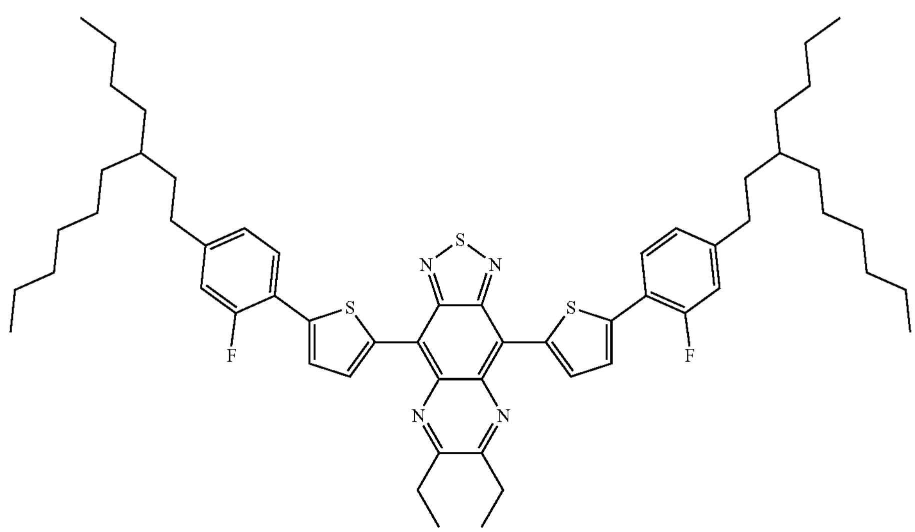

-continued
II-3
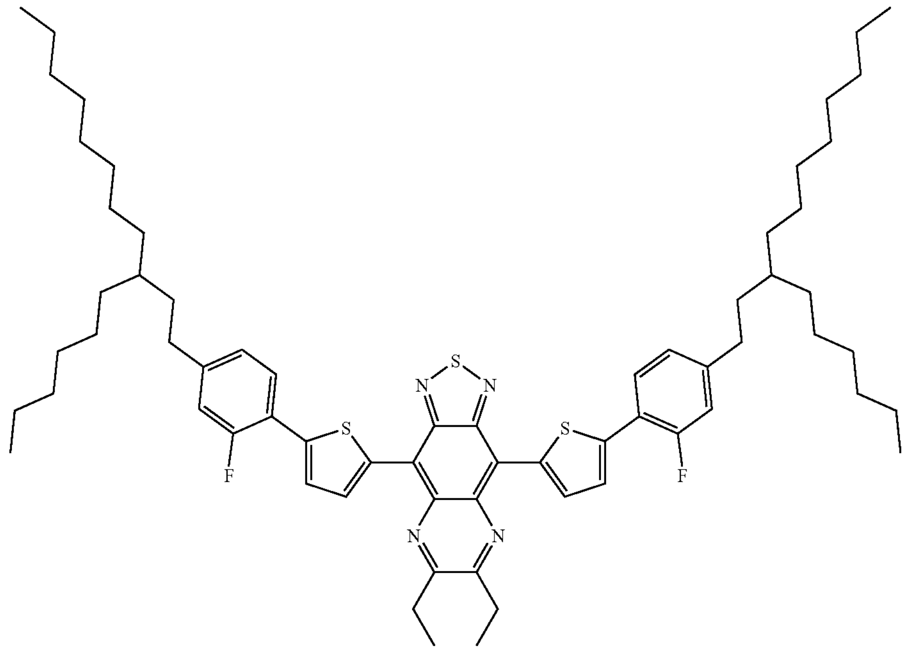
II-4
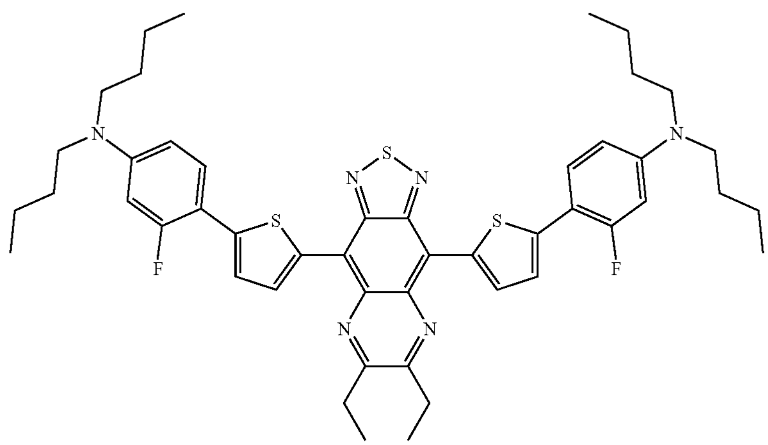
II-5
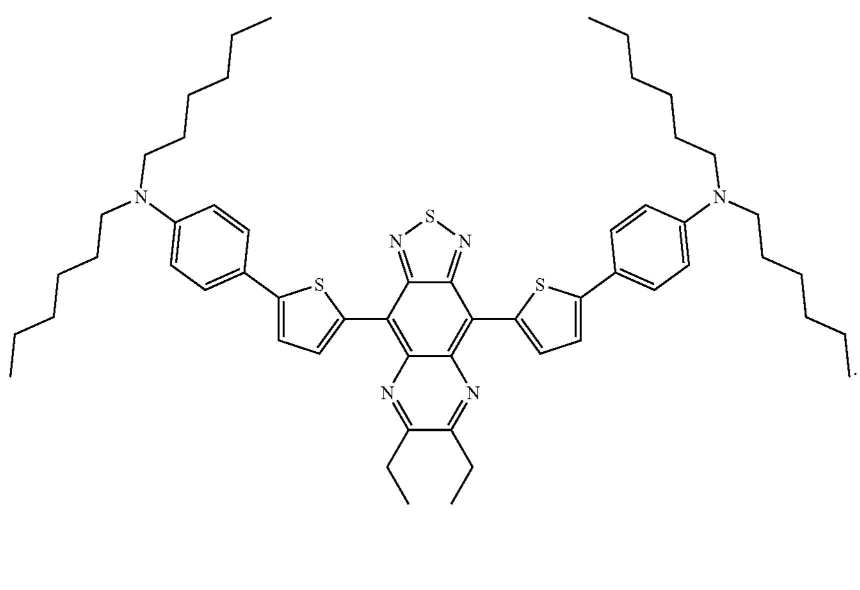

6. The liquid-crystalline medium according to claim 1, wherein the medium comprises one or more compounds selected from the group of compounds of formulae CY, PY, and AC

CY

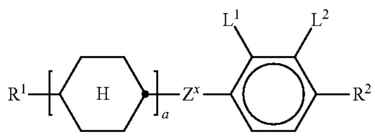

PY

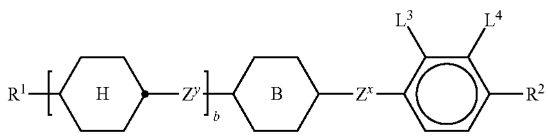

AC

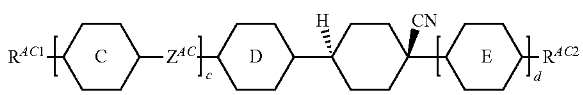

wherein

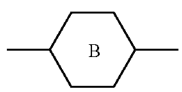

denotes

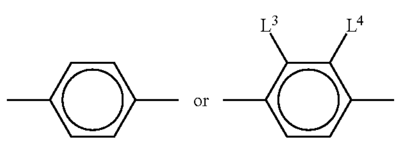

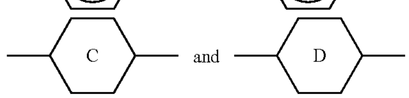

denote

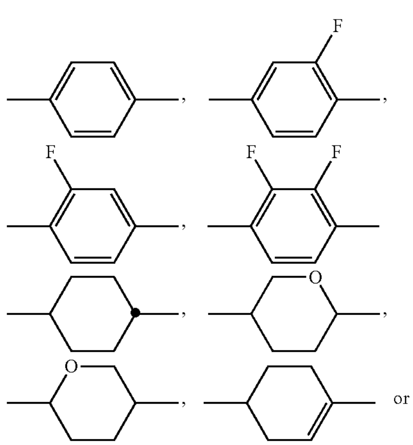

-continued

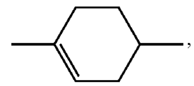

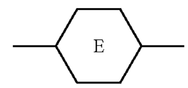

denotes

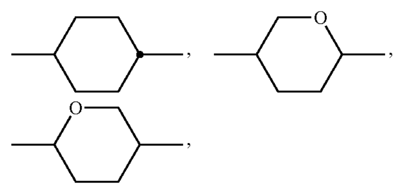

$R^1$, $R^2$, $R^{AC1}$, $R^{AC2}$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another, $Z^x$, $Z^y$, $Z^{AC}$ each, independently of one another, denote —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, $L^1$, $L^2$, $L^3$, $L^4$ each, independently of one another, denote F, Cl, CN, $OCF_3$, $CF_3$, $CH_3$, $CH_2F$, or $CHF_2$, a is 1 or 2, b is 0 or 1, c is 0, 1 or 2, and d is 0 or 1.

7. The liquid-crystalline medium according to claim 1, wherein the medium comprises one or more compounds selected from the group of compounds of formulae IIA to VIII

IIA

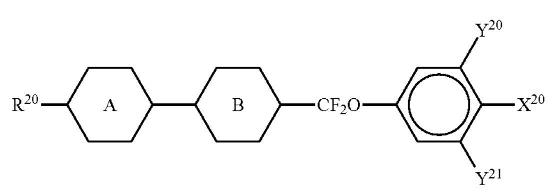

III

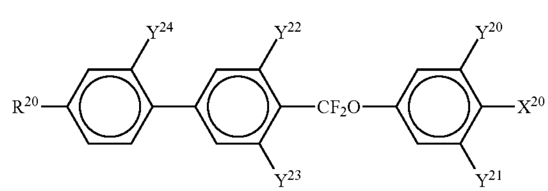

-continued

IV

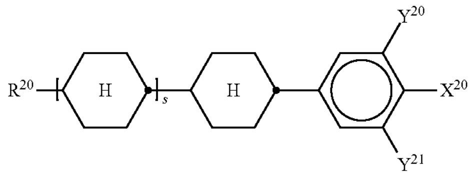

V

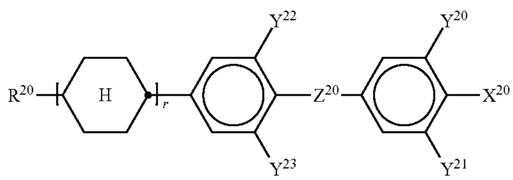

VI

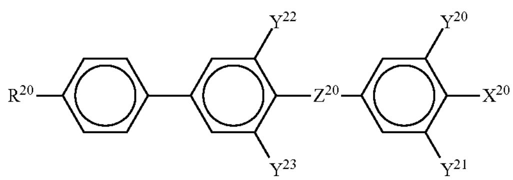

VII

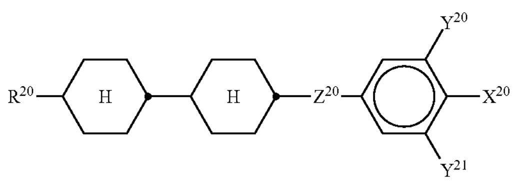

VIII

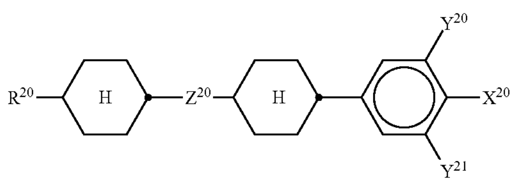

wherein

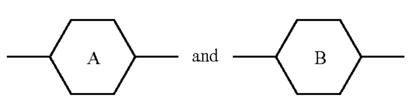

each, independently of one another, denote

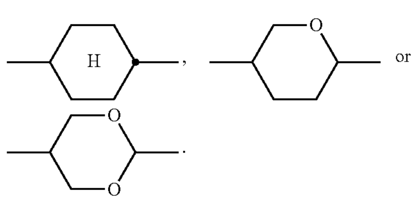

identically or differently, denotes a halogenated or unsubstituted alkyl or alkoxy radical having 1 to 15 C atoms, where, in addition, one or more $CH_2$ groups in these radicals may each be replaced, independently of one another, by —C≡C—, —$CF_2O$—, —CH═CH—,

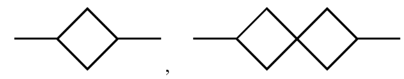

—O—, —CO—O— or —O—CO— in such a way that O atoms are not linked directly to one another, $X^{20}$ identically or differently, denotes F, Cl, CN, $SF_5$, SCN, NCS, a halogenated alkyl radical having 1 to 6 C atoms, a halogenated alkenyl radical having 2 to 6 C atoms, a halogenated alkoxy radical having 1 to 6 C atoms, or a halogenated alkenyloxy radical having 2 to 6 C atoms, and $Y^{20}$, $Y^{21}$, $Y^{22}$, $Y^{23}$, $Y^{24}$ each, identically or differently, denote H or F, $Z^{20}$ denotes —$C_2H_4$—, —$(CH_2)_4$—, —CH═CH—, —CF═CF—, —$C_2F_4$—, —$CH_2CF_2$—, —$CF_2CH_2$—, —$CH_2O$—, —$OCH_2$—, —COO— or —$OCF_2$—, and, in formulae V to VIII, $Z^{20}$ can also be —$CF_2O$—, r denotes 0 or 1, and s denotes 0 or 1.

8. The liquid-crystalline medium according to claim 1, wherein the medium additionally comprises one or more compounds selected from the group of compounds of formulae DK and O

DK

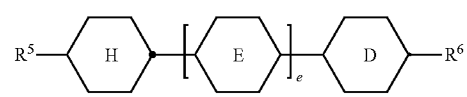

O

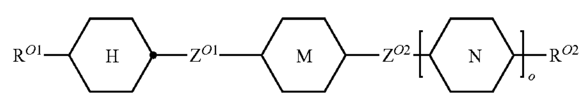

wherein $R^5$, $R^6$, $R^{O1}$ and $R^{O2}$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another,

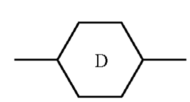

denotes

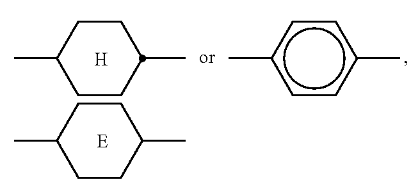

denotes

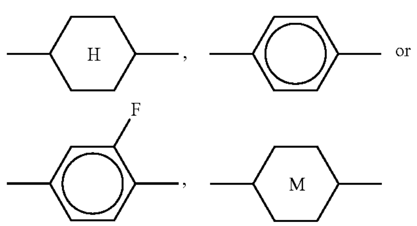

denotes

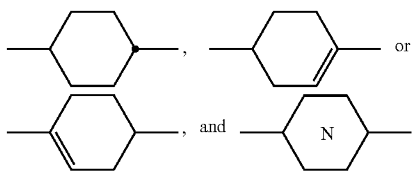

denotes

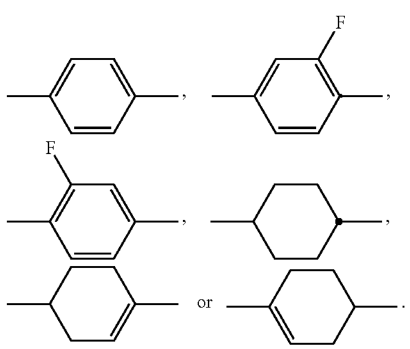

$Z^{O1}$ denotes $—CH_2CH_2—$, $—CF_2CF_2—$, —C≡C—, or a single bond, $Z^{O2}$ denotes $CH_2O$, —C(O)O—, $—CH_2CH_2—$, $—CF_2CF_2—$, or a single bond, o is 1 or 2, and e is 1 or 2.

9. The liquid-crystalline medium according to claim 1, wherein the medium additionally comprises one or more compounds selected from the group of compounds of formulae O3 to O5

O3

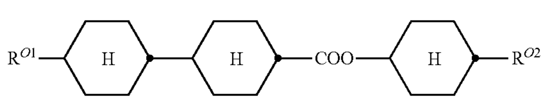

O4

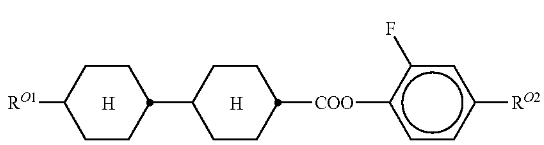

-continued

O5

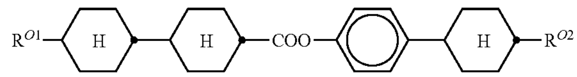

wherein $R^{O1}$ and $R^{O2}$, identically or differently, denote straight-chain alkyl having 1 to 6 C atoms or straight-chain alkenyl having 2 to 6 C atoms.

10. The liquid-crystalline medium according to claim 1, wherein the medium additionally comprises one or more compounds selected from the group of compounds of formulae DK1 to DK12:

DK1

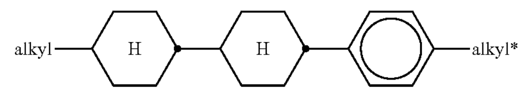

DK2

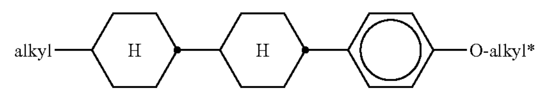

DK3

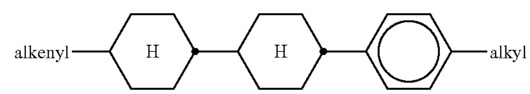

DK4

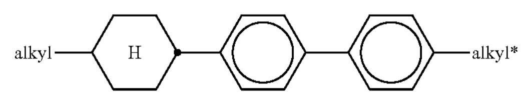

DK5

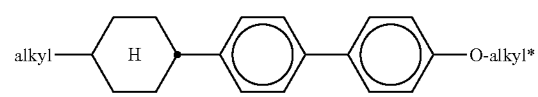

DK6

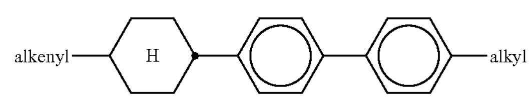

DK7

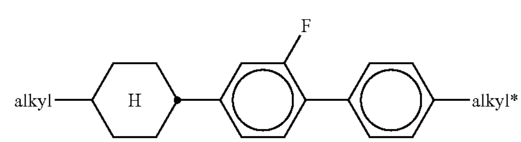

DK8

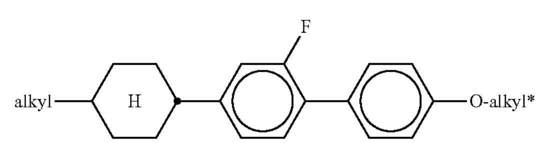

DK9

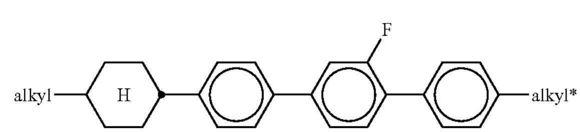

-continued

DK10

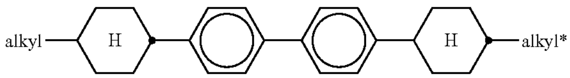

DK11

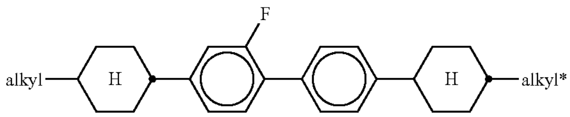

DK12

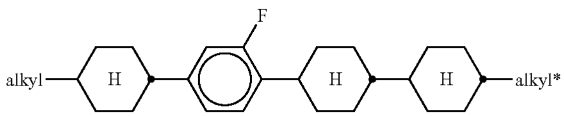

in which alkyl and alkyl* each, independently of one another, denote a straight-chain alkyl radical having 1 to 6 C atoms, and alkenyl denotes a straight-chain alkenyl radical having 2 to 6 C atoms.

11. A device for regulating the passage of energy from an outside space into an inside space, said device comprising a switching layer that contains a liquid-crystalline medium according to claim 1.

12. A window comprising the device according to claim 11.

13. An architectural window or a car sunroof, comprising a liquid crystalline medium according to claim 1.

14. The liquid-crystalline medium according to claim 1, wherein at least one of $Ar^1$ is thiophene-2,5-diyl.

15. The liquid-crystalline medium according to claim 1, wherein $R^1$ identically or differently, denotes a branched, alkyl or alkoxy having 3 to 15 C atoms or $N(R^b)_2$, $R^b$ is, independently of one another, ethyl, butyl, or hexyl, $R^2$ identically or differently, denotes ethyl, a, b, c, and d each denote 1, $Z^1$ is a single bond, and $Z^2$ is a single bond.

16. The liquid-crystalline medium according to claim 5, wherein the composition contains two or more compounds selected from the compounds of formulae I-1, I-2, I-3, and I-4, and two or more compounds selected from the compounds of formulae II-1, II-2, II-3, II-4, and II-5.

17. The liquid-crystalline medium according to claim 5, wherein at least one of said two or more compounds of formula I is a compound of formula I-1 and at least one of said two or more compounds of formula II is a compound of formulae II-1.

18. The liquid-crystalline medium according to claim 1, wherein each compound of formula I is present in said medium in an amount of 0.005% by weight to 12.5% by weight, and each compound of formula II is present in said medium in an amount of 0.005% by weight to 12.5% by weight.

19. The liquid-crystalline medium according to claim 1, wherein the total concentration of compounds of formula I and compounds of formula II in said medium is 0.01% by weight to 30% by weight.

20. The liquid-crystalline medium according to claim 5, wherein at least one of said two or more compounds of formula I is a compound of formula I-1, and said two or more compounds of formula II includes a compound of formulae II-1 and a compound of formulae II-4.

21. The liquid-crystalline medium according to claim 5, wherein said two or more compounds of formula I includes a compound of formula I-1 and a compound of formula I-2, and said two or more compounds of formula II includes a compound of formulae II-1 and a compound of formulae II-4.

* * * * *